United States Patent
Kenten et al.

(10) Patent No.: US 12,553,887 B2
(45) Date of Patent: Feb. 17, 2026

(54) ELECTROCHEMILUMINESCENT LABELED PROBES FOR USE IN IMMUNOASSAY METHODS, METHODS USING SUCH AND KITS COMPRISING SAME

(71) Applicant: Meso Scale Technologies, LLC., Rockville, MD (US)

(72) Inventors: John Kenten, Boyds, MD (US); Mikayla Higgins, Gaithersburg, MD (US); George Sigal, Rockville, MD (US)

(73) Assignee: MESO SCALE TECHNOLOGIES, LLC., Rockville, MD (US)

( * ) Notice: Subject to any disclaimer, the term of this patent is extended or adjusted under 35 U.S.C. 154(b) by 1168 days.

(21) Appl. No.: 17/434,938

(22) PCT Filed: Feb. 28, 2020

(86) PCT No.: PCT/US2020/020288
§ 371 (c)(1),
(2) Date: Aug. 30, 2021

(87) PCT Pub. No.: WO2020/180645
PCT Pub. Date: Sep. 10, 2020

(65) Prior Publication Data
US 2022/0099661 A1 Mar. 31, 2022

Related U.S. Application Data

(60) Provisional application No. 62/812,928, filed on Mar. 1, 2019.

(51) Int. Cl.
| | | |
|---|---|---|
| G01N 33/533 | (2006.01) | |
| C07F 15/00 | (2006.01) | |
| C12Q 1/68 | (2018.01) | |
| C12Q 1/6816 | (2018.01) | |
| G01N 21/64 | (2006.01) | |
| G01N 21/66 | (2006.01) | |
| G01N 33/58 | (2006.01) | |

(52) U.S. Cl.
CPC ....... G01N 33/533 (2013.01); C07F 15/0053 (2013.01); C12Q 1/6816 (2013.01); G01N 21/6428 (2013.01); G01N 21/66 (2013.01); G01N 33/582 (2013.01); G01N 2021/6439 (2013.01)

(58) Field of Classification Search
CPC .............. G01N 33/533; G01N 33/582; G01N 21/6428; G01N 21/66; C07F 15/0053; C12Q 1/6816
See application file for complete search history.

(56) References Cited

U.S. PATENT DOCUMENTS

| | | |
|---|---|---|
| 3,996,345 A | 12/1976 | Ullman et al. |
| 4,235,601 A | 11/1980 | Deutsch et al. |
| 4,342,566 A | 8/1982 | Theofilopoulos et al. |
| 4,442,204 A | 4/1984 | Greenquist et al. |
| 4,595,661 A | 6/1986 | Cragle et al. |
| 4,988,617 A | 1/1991 | Landegren et al. |
| 5,026,653 A | 6/1991 | Lee et al. |
| 5,028,535 A | 7/1991 | Buechler et al. |
| 5,093,268 A | 3/1992 | Leventis et al. |
| 5,147,806 A | 9/1992 | Kamin et al. |
| 5,185,243 A | 2/1993 | Ullman et al. |
| 5,200,314 A | 4/1993 | Urdea |
| 5,238,808 A | 8/1993 | Bard et al. |
| 5,240,863 A | 8/1993 | Shibue et al. |
| 5,308,754 A | 5/1994 | Kankare et al. |
| 5,324,457 A | 6/1994 | Zhang et al. |
| 5,561,043 A | 10/1996 | Cantor et al. |
| 5,589,136 A | 12/1996 | Northrup et al. |
| 5,591,581 A | 1/1997 | Massey et al. |
| 5,597,910 A | 1/1997 | Gudibande et al. |
| 5,620,851 A | 4/1997 | Axelrod et al. |
| 5,629,156 A | 5/1997 | Shah et al. |
| 5,629,157 A | 5/1997 | Goodman et al. |
| 5,635,347 A | 6/1997 | Link et al. |
| 5,641,623 A | 6/1997 | Martin |
| 5,643,713 A | 7/1997 | Liang et al. |
| 5,652,107 A | 7/1997 | Lizardi et al. |
| 5,656,731 A | 8/1997 | Urdea |
| 5,660,991 A | 8/1997 | Lakowicz et al. |
| 5,665,539 A | 9/1997 | Sano et al. |
| 5,667,974 A | 9/1997 | Birkenmeyer et al. |
| 5,679,519 A * | 10/1997 | Oprandy .............. G01N 33/582 435/7.1 |
| 5,705,402 A | 1/1998 | Leland et al. |
| 5,714,089 A | 2/1998 | Bard et al. |

(Continued)

FOREIGN PATENT DOCUMENTS

| | | |
|---|---|---|
| CN | 1446050 A | 10/2003 |
| CN | 101198707 A | 6/2008 |

(Continued)

OTHER PUBLICATIONS

Kopecky et al., "Quantification of HDL Proteins, Cardiac Events, and Mortality in Patients with Type 2 Diabetes on Hemodialysis," Clin J Am Soc Nephrol 10:224-231 (2015).

(Continued)

*Primary Examiner* — Jezia Riley
(74) *Attorney, Agent, or Firm* — MEDLER FERRO WOODHOUSE & MILLS PLLC

(57) ABSTRACT

The present invention is directed to assay methods and compounds and kits used in such assays.

20 Claims, 42 Drawing Sheets
Specification includes a Sequence Listing.

(56) References Cited

U.S. PATENT DOCUMENTS

| | | |
|---|---|---|
| 5,714,320 A | 2/1998 | Kool |
| 5,731,147 A | 3/1998 | Bard et al. |
| 5,759,773 A | 6/1998 | Tyagi et al. |
| 5,776,672 A | 7/1998 | Hashimoto et al. |
| 5,786,141 A | 7/1998 | Bard et al. |
| 5,837,446 A | 11/1998 | Cozzette et al. |
| 5,846,485 A | 12/1998 | Leland |
| 5,854,033 A | 12/1998 | Lizardi |
| 5,866,434 A | 2/1999 | Massey et al. |
| 5,871,921 A | 2/1999 | Landegren et al. |
| 5,925,517 A | 7/1999 | Tyagi et al. |
| 5,942,391 A | 8/1999 | Zhang et al. |
| 6,048,687 A | 4/2000 | Kenten et al. |
| 6,054,274 A | 4/2000 | Sampson et al. |
| 6,066,448 A | 5/2000 | Wohlstadter et al. |
| 6,077,668 A | 6/2000 | Kool |
| 6,136,268 A | 10/2000 | Ala-Kleme et al. |
| 6,140,135 A | 10/2000 | Andegren et al. |
| 6,143,495 A | 11/2000 | Lizardi et al. |
| 6,183,960 B1 | 2/2001 | Lizardi |
| 6,207,369 B1 | 3/2001 | Wohlstadter et al. |
| 6,210,884 B1 | 4/2001 | Lizardi |
| 6,214,552 B1 | 4/2001 | Heroux et al. |
| 6,235,472 B1 | 5/2001 | Landegren et al. |
| 6,287,824 B1 | 9/2001 | Lizardi |
| 6,291,187 B1 | 9/2001 | Kingsmore et al. |
| 6,316,229 B1 | 11/2001 | Lizardi et al. |
| 6,316,607 B1 | 11/2001 | Massey et al. |
| 6,323,009 B1 | 11/2001 | Lasken et al. |
| 6,329,150 B1 | 12/2001 | Lizardi et al. |
| 6,344,329 B1 | 2/2002 | Lizardi |
| 6,368,801 B1 | 4/2002 | Faruqi |
| 6,444,661 B1 | 9/2002 | Barton et al. |
| 6,468,741 B1 | 10/2002 | Massey et al. |
| 6,479,233 B1 | 11/2002 | Bard et al. |
| 6,511,809 B2 | 1/2003 | Baez et al. |
| 6,531,283 B1 | 3/2003 | Kingsmore et al. |
| 6,558,928 B1 | 5/2003 | Landegren |
| 6,569,647 B1 | 5/2003 | Zhang et al. |
| 6,632,609 B2 | 10/2003 | Lizardi |
| 6,646,118 B2 | 11/2003 | Kwiatkowski et al. |
| 6,673,533 B1 | 1/2004 | Wohlstadter et al. |
| RE38,442 E | 2/2004 | Zhang et al. |
| 6,709,815 B1 | 3/2004 | Dong et al. |
| 6,797,474 B2 | 9/2004 | Lizardi |
| 6,878,515 B1 | 4/2005 | Landegren |
| 6,939,720 B2 | 9/2005 | Chandler et al. |
| 6,977,722 B2 | 12/2005 | Wohlstadter et al. |
| 7,074,564 B2 | 7/2006 | Landegren |
| 7,192,703 B2 | 3/2007 | Sun et al. |
| 7,306,904 B2 | 12/2007 | Landegren et al. |
| 7,320,860 B2 | 1/2008 | Landegren et al. |
| 7,351,528 B2 | 4/2008 | Landegren |
| 7,618,776 B2 | 11/2009 | Lizardi |
| 7,790,388 B2 | 9/2010 | Landegren et al. |
| 7,807,448 B2 | 10/2010 | Glezer et al. |
| 7,842,246 B2 | 11/2010 | Wohlstadter et al. |
| 7,883,848 B2 | 2/2011 | Ericsson |
| 7,883,849 B1 | 2/2011 | Dahl |
| 7,932,060 B2 | 4/2011 | Nadeau et al. |
| 8,013,134 B2 | 9/2011 | Fredriksson et al. |
| 8,053,188 B2 | 11/2011 | Gullberg et al. |
| 8,080,393 B2 | 12/2011 | Koch et al. |
| 8,163,499 B2 | 4/2012 | Singh et al. |
| 8,222,047 B2 | 7/2012 | Duffy et al. |
| 8,236,574 B2 | 8/2012 | Duffy et al. |
| 8,268,554 B2 | 9/2012 | Schallmeiner |
| 8,338,776 B2 | 12/2012 | Walt et al. |
| 8,343,526 B2 | 1/2013 | Billadeau et al. |
| 8,741,559 B2 | 6/2014 | Treiber et al. |
| 8,770,471 B2 | 7/2014 | Cong et al. |
| 9,499,573 B2 | 11/2016 | Bergmann et al. |
| 9,618,510 B2 | 4/2017 | Aghvanyan et al. |
| 9,714,937 B2 | 7/2017 | Dunaway et al. |
| 9,731,297 B2 | 8/2017 | Glezer et al. |
| 9,777,338 B2 | 10/2017 | Glezer et al. |
| 9,921,166 B2 | 3/2018 | Glezer et al. |
| 10,114,015 B2 | 10/2018 | Glezer et al. |
| 10,184,884 B2 | 1/2019 | Anderson et al. |
| 10,201,812 B2 | 2/2019 | Glezer et al. |
| 10,272,436 B2 | 4/2019 | Glezer et al. |
| 10,281,678 B2 | 5/2019 | Chamberlin et al. |
| 10,408,823 B2 | 9/2019 | Aghvanyan et al. |
| 10,908,157 B2 | 2/2021 | Aghvanyan et al. |
| 11,242,570 B2 | 2/2022 | Glezer |
| 11,525,825 B2 | 12/2022 | Aghvanyan et al. |
| 11,697,840 B2 | 7/2023 | Glezer et al. |
| 12,359,264 B2 | 7/2025 | Glezer et al. |
| 2001/0023063 A1 | 9/2001 | Richter et al. |
| 2001/0053519 A1 | 12/2001 | Fodor et al. |
| 2002/0035247 A1 | 3/2002 | Kwiatkowski et al. |
| 2002/0051986 A1 | 5/2002 | Baez et al. |
| 2002/0064779 A1 | 5/2002 | Landegren et al. |
| 2002/0102592 A1 | 8/2002 | Landegren |
| 2002/0127658 A1 | 9/2002 | Amouyal |
| 2002/0155490 A1 | 10/2002 | Skinner et al. |
| 2003/0027357 A1 | 2/2003 | Sigal et al. |
| 2003/0077670 A1 | 4/2003 | Cheng et al. |
| 2004/0023271 A1 | 2/2004 | Kurn et al. |
| 2004/0121382 A1 | 6/2004 | Liu et al. |
| 2004/0142323 A1 | 7/2004 | Boyde |
| 2004/0189311 A1 | 9/2004 | Glezer et al. |
| 2004/0209261 A1 | 10/2004 | Keys et al. |
| 2004/0248103 A1 | 12/2004 | Feaver et al. |
| 2004/0265897 A1 | 12/2004 | Lizardi |
| 2005/0003432 A1 | 1/2005 | Hall et al. |
| 2005/0009050 A1 | 1/2005 | Nadeau et al. |
| 2005/0014140 A1 | 1/2005 | Erikson et al. |
| 2005/0142033 A1 | 6/2005 | Glezer et al. |
| 2005/0282158 A1 | 12/2005 | Landegren |
| 2005/0287526 A1 | 12/2005 | Landegren et al. |
| 2007/0154899 A1 | 7/2007 | Coull et al. |
| 2007/0161029 A1 | 7/2007 | Li et al. |
| 2007/0259381 A1 | 11/2007 | Rissin et al. |
| 2007/0259385 A1 | 11/2007 | Rissin et al. |
| 2007/0259448 A1 | 11/2007 | Rissin et al. |
| 2008/0188638 A1 | 8/2008 | Breitenkamp et al. |
| 2009/0011943 A1 | 1/2009 | Drmanac et al. |
| 2009/0176318 A1 | 7/2009 | Kolpashchikov |
| 2009/0178934 A1 | 7/2009 | Jarvius et al. |
| 2009/0191553 A1 | 7/2009 | Hendrickson |
| 2009/0203155 A1 | 8/2009 | Chiku |
| 2010/0075862 A1 | 3/2010 | Duffy et al. |
| 2010/0129819 A1 | 5/2010 | Hu et al. |
| 2010/0261292 A1 | 10/2010 | Glezer et al. |
| 2011/0022331 A1 | 1/2011 | Clinton et al. |
| 2011/0027772 A1 | 2/2011 | Ahn et al. |
| 2011/0177054 A1 | 7/2011 | Gibbings et al. |
| 2011/0212537 A1 | 9/2011 | Rissin et al. |
| 2012/0196774 A1 | 8/2012 | Fournier et al. |
| 2012/0252692 A1 | 10/2012 | Kutyavin |
| 2012/0289428 A1 | 11/2012 | Duffy et al. |
| 2013/0059741 A1 | 3/2013 | Weiner |
| 2013/0171066 A1 | 7/2013 | Sellergren et al. |
| 2013/0323756 A1 | 12/2013 | Tullis et al. |
| 2014/0087379 A1 | 3/2014 | Bashkirov et al. |
| 2014/0194311 A1 | 7/2014 | Gullberg et al. |
| 2014/0256588 A1 | 9/2014 | Glezer et al. |
| 2014/0272939 A1 | 9/2014 | Aghvanyan et al. |
| 2014/0274775 A1 | 9/2014 | Glezer et al. |
| 2014/0315189 A1 | 10/2014 | Glezer et al. |
| 2015/0044674 A1 | 2/2015 | Fredriksson et al. |
| 2017/0089892 A1 | 3/2017 | Aghvanyan et al. |
| 2017/0168047 A1 | 6/2017 | Aghvanyan et al. |
| 2017/0362668 A1 | 12/2017 | Glezer et al. |
| 2018/0074082 A1 | 3/2018 | Glezer et al. |
| 2019/0002971 A1 | 1/2019 | Koslover et al. |
| 2019/0011441 A1 | 1/2019 | Glezer et al. |
| 2019/0391140 A1 | 12/2019 | Aghvanyan et al. |
| 2019/0391170 A1 | 12/2019 | Kochar et al. |
| 2021/0190778 A1 | 6/2021 | Aghvanyan et al. |

(56) References Cited

U.S. PATENT DOCUMENTS

| | | |
|---|---|---|
| 2022/0033918 A1 | 2/2022 | Glezer et al. |
| 2022/0357318 A1 | 11/2022 | Aghvanyan et al. |

FOREIGN PATENT DOCUMENTS

| | | | |
|---|---|---|---|
| CN | 101988920 | A | 3/2011 |
| CN | 102317779 | A | 1/2012 |
| CN | 103703145 | A | 4/2014 |
| CN | 104114718 | A | 10/2014 |
| CN | 108374052 | A | 8/2018 |
| EP | 1 985 714 | A1 | 10/2008 |
| EP | 2 500 435 | A1 | 9/2012 |
| JP | H04-262799 | A | 9/1992 |
| JP | H08-505050 | A | 6/1996 |
| JP | H11-508040 | | 7/1999 |
| JP | 2003-515149 | A | 4/2003 |
| JP | 2004-535769 | A | 12/2004 |
| JP | 2005-521409 | A | 7/2005 |
| JP | 2005-522405 | A | 7/2005 |
| JP | 2006-511807 | A | 4/2006 |
| JP | 2007-525661 | A | 9/2007 |
| JP | 2009-501005 | A | 1/2009 |
| JP | 2009-106220 | A | 5/2009 |
| JP | 2009-222712 | A | 10/2009 |
| JP | 2012-531887 | A | 12/2012 |
| KR | 10-2013-0003127 | A1 | 1/2013 |
| WO | 90/05910 | A1 | 5/1990 |
| WO | 91/17442 | A1 | 11/1991 |
| WO | 94/14961 | A1 | 7/1994 |
| WO | 95/35390 | A1 | 12/1995 |
| WO | 96/35812 | A1 | 11/1996 |
| WO | 97/36931 | A1 | 10/1997 |
| WO | 98/12539 | A1 | 3/1998 |
| WO | 98/57154 | A1 | 12/1998 |
| WO | 99/14599 | A1 | 3/1999 |
| WO | 99/32662 | A1 | 7/1999 |
| WO | 99/49079 | A1 | 9/1999 |
| WO | 99/58962 | A1 | 11/1999 |
| WO | 99/63347 | A2 | 12/1999 |
| WO | 00/03233 | A1 | 1/2000 |
| WO | 00/04193 | A1 | 1/2000 |
| WO | 01/35100 | A2 | 5/2001 |
| WO | 01/84146 | A2 | 11/2001 |
| WO | 03/022028 | A2 | 3/2003 |
| WO | 03/033722 | A2 | 4/2003 |
| WO | 2004/045543 | A2 | 6/2004 |
| WO | 2004/061131 | A1 | 7/2004 |
| WO | 2004/094456 | A2 | 11/2004 |
| WO | 2005/059509 | A2 | 6/2005 |
| WO | 2009/029073 | A1 | 3/2009 |
| WO | 2009/067009 | A1 | 5/2009 |
| WO | 2009/092386 | A2 | 7/2009 |
| WO | 2010/059820 | A1 | 5/2010 |
| WO | 2011/047087 | A2 | 4/2011 |
| WO | 2011/143583 | A1 | 11/2011 |
| WO | 2012/007511 | A1 | 2/2012 |
| WO | 2012/049316 | A1 | 4/2012 |
| WO | 2012/060083 | A1 | 5/2012 |
| WO | 2012/104261 | A1 | 8/2012 |
| WO | 2012/152942 | A1 | 11/2012 |
| WO | 2012/160083 | A1 | 11/2012 |
| WO | 2013/113699 | A2 | 8/2013 |
| WO | 2014/031984 | A1 | 2/2014 |
| WO | 2014/160192 | A1 | 10/2014 |
| WO | 2014/165061 | A1 | 10/2014 |
| WO | 2015/175856 | A1 | 11/2015 |
| WO | 2016/164477 | A1 | 10/2016 |
| WO | 2017/015636 | A1 | 1/2017 |
| WO | 2018/017156 | A1 | 1/2018 |
| WO | 2020/092835 | A1 | 5/2020 |
| WO | 2020/142313 | A1 | 7/2020 |
| WO | 2022/051485 | A2 | 3/2022 |

OTHER PUBLICATIONS

Ribas et al., "Human apolipoprotein A-II enrichment displaces paraoxonase from HDL and impairs its antioxidant properties: a new mechanism linking HDL protein composition and antiatherogenic potential," Circ Res 95(8):789-797 (2004).

Watanabe et al., "Proteomic profiling following immunoaffinity capture of high-density lipoprotein: association of acute-phase proteins and complement factors with proinflammatory high-density lipoprotein in rheumatoid arthritis," Arthritis Rheum 64(6):1828-1837 (2012).

Non-Final Office Action in U.S. Appl. No. 17/504,937, mailed Sep. 25, 2024.

Weibrecht et al., "Proximity Ligation Assays: A Recent Addition to the Proteomics Toolbox," Expert Rev Proteomics 7(3): 401-409 (2010).

Yamada et al., "Detection of Methicillin-Resistant *Staphylococcus aureus* Using a Specific Anti-PBP2a Chicken IgY Antibody," Japan J Infect Dis 66: 103-108 (2013).

Zhang et al., "Amplification of Circularizable Probes for the Detection of Target Nucleic Acids and Proteins," Clinical Chimica Acta 363: 61-70 (2006).

Zhou et al., "Two-Color, Rolling-Circle Amplification on Antibody Microarrays for Sensitive, Multiplexed Serum-Protein Measurements," Genome Biol 5:R28 (2004).

International Search Report issued in PCT/US12/64263, dated Mar. 15, 2013.

International Search Report issued in PCT/US14/26010, dated Jul. 7, 2014.

International Search Report issued in PCT/US14/24279, dated Jul. 17, 2014.

International Search Report issued in PCT/US15/30925, dated Aug. 27, 2015.

Non-Final Office Action in U.S. Appl. No. 14/206,284, issued Oct. 16, 2015.

Final Office Action in U.S. Appl. No. 14/206,284, issued Jul. 6, 2016.

Non-Final Office Action in U.S. Appl. No. 14/208,040, issued Dec. 30, 2015.

Final Office Action in U.S. Appl. No. 14/208,040, issued Oct. 11, 2016.

Non-Final Office Action in U.S. Appl. No. 14/208,040, issued Feb. 7, 2017.

Final Office Action in U.S. Appl. No. 14/208,040, issued Jul. 27, 2017.

Non-Final Office Action in U.S. Appl. No. 14/208,040, issued Jan. 16, 2018.

Restriction Requirement in U.S. Appl. No. 14/357,653, dated Jul. 31, 2015.

Non-Final Office Action in U.S. Appl. No. 14/357,653, dated Oct. 26, 2015.

Final Office Action in U.S. Appl. No. 14/357,653, dated Jun. 22, 2016.

Non-Final Office Action in U.S. Appl. No. 14/357,653, dated Jan. 31, 2017.

Non-Final Office Action in U.S. Appl. No. 15/440,191, dated Jun. 20, 2019.

Final Office Action in U.S. Appl. No. 15/440,191, dated Dec. 16, 2019.

Final Office Action in U.S. Appl. No. 15/440,191, dated May 22, 2020.

Non-Final Office Action in U.S. Appl. No. 15/696,953, dated Mar. 27, 2019.

Final Office Action in U.S. Appl. No. 15/696,953, dated Nov. 25, 2019.

Final Office Action in U.S. Appl. No. 15/696,953, dated Jun. 15, 2020.

Non-Final Office Action in U.S. Appl. No. 15/696,953, dated Mar. 9, 2021.

Notice of Allowance in U.S. Appl. No. 15/696,953, dated Sep. 27, 2021.

Restriction Requirement in U.S. Appl. No. 16/136,498, dated Mar. 19, 2021.

(56) References Cited

OTHER PUBLICATIONS

Non-Final Office Action in U.S. Appl. No. 16/136,498, dated Oct. 13, 2021.
Final Office Action in U.S. Appl. No. 16/136,498, dated Apr. 20, 2022.
Advisory Action in U.S. Appl. No. 16/136,498, dated Jul. 5, 2022.
Lee et al., "Diffractometric Detection of Proteins using Microbead-based Rolling Circle Amplification," Analytical Chemistry 82(1):197 (2010).
Break et al., "Utilization of the N-PLEX™ Platform for the Detection of Antisense Oligonucleotides (ASOs) in Plasma," Molecular Therapy; 2020 ASGCT Annual Meeting Abstracts, 28(4-S1):549 (Apr. 28, 2020).
International Search Report issued in PCT/US2021/048854, dated Feb. 24, 2023.
Non-Final Office Action in U.S. Appl. No. 16/136,498, dated Oct. 14, 2022.
Notice of Allowance in U.S. Appl. No. 16/136,498, dated Feb. 21, 2023.
Notice of Allowance in U.S. Appl. No. 16/136,498, dated Mar. 1, 2023.
Non-Final Office Action in U.S. Appl. No. 17/504,937, dated Apr. 17, 2023.
Gu et al., "Protein tag-mediated conjugation of oligonucleotides to recombinant affinity binders for proximity ligation," New Biotechnology 30(2):144-152 (2013).
International Search Report in PCT/US2020/020288, mailed May 14, 2020.
International Search Report issued in PCT/US2023/084737, mailed May 15, 2024.
Final Office Action issued in U.S. Appl. No. 17/132,380, mailed May 3, 2024.
Advisory Action issued in U.S. Appl. No. 17/132,380, mailed Jul. 29, 2024.
Notice of Allowance issued in U.S. Appl. No. 17/132,380, mailed Aug. 7, 2024.
Non-Final Office Action issued in U.S. Appl. No. 17/813,965, mailed Jul. 18, 2024.
Adler et al., "Detection of rViscumin in plasma samples by immuno-PCR," Biochemical and Biophysical Research Communications 300:757-763 (2003).
Andras et al., "Strategies for Signal Amplification in Nucleic Acid Detection," Mol Biotechnol 19: 29-44 (2001).
Baner et al., "Signal Amplification of Padlock Probes by Rolling Circle Replication", Nucleic Acids Research 26 (22):5073-5078 (1998).
Chan, "General principle of immunoassay." Immunoassay: a practical guide pp. 1-23 (1987).
Dahl et al., "Circle-to-Circle Amplification for Precise and Sensitive DNA Analysis," PNAS 101 (13): 4548-4553 (2004).
Darmanis et al., "Self-Assembly of Proximity Probes for Flexible and Modular Proximity Ligation Assays," Biotechniques 46(4): 443-450 (2007).
Darmanis et al., "Sensitive Plasma Protein Analysis by Microparticle-based Proximity Ligation Assays", Molecular & Cellular Proteomics 9:327-335 (2010).
Darmanis et al, "ProteinSeq: High-Performance Proteomic Analyses by Proximity Ligation and Next Generation Sequencing," PLOS One 6(9) p. e25583 (2011).
Dean et al., "Rapid Amplification of Plasmid and Phage DNA Using Phi29 DNA Polymerase and Multiply-Primed Rolling Circle Amplification", Genome Research 11: 1095-1099 (2001).
Duolink II Probemaker PLUS, Duolink II Probemaker MINUS, Product Insert Doc No. 0564, OLINK Bioscience, cited in U.S. Appl. No. 14/208,040 filed May 8, 2014.
Ericsson et al., "A Dual-Tag Microarray Platform for High-Performance Nucleic Acid and Protein Analyses," Nucleic Acid Res. 36(8): e45 (2008).
Faruqi et al., "High-Throughput Genotyping of Single Nucleotide Polymorphisms With Rolling Circle Amplification", BMC Genomics, vol. 2(4) (2001).
Fire et al., "Rolling Replication of Short DNA Circles," PNAS 92: 4641-4645 (1995).
Fredriksson et al., "Protein Detection Using Proximity-Dependent DNA Ligation Assays," Nature Biotech. 20: 473-477 (2002).
Fredriksson et al., "Multiplexed Protein Detection by Proximity Ligation for Cancer Biomarker Validation," Nat Methods 4(4): 327-329 (2007).
Fredriksson et al. Supplementary Table 2 in "Multiplexed Protein Detection by Proximity Ligation for Cancer Biomarker Validation," Nat Methods 4(4): 327-329 (2007).
Gajadhar et al., "A proximity Ligation Assay Using Transiently Transfected, Epitope-Tagged Proteins: Application for In Situ Detection of Dimerized Receptor Tyrosine Kinases," Biotechniques 48(2): 145-151 (2010).
Gill et al., "Nucleic Acid Isothermal Amplification Technologies—A Review," Nucleosides, Nucleotides & Nucleic Acids, 27(3): 224-243 (2008).
Griffiths et al., "Miniaturising the Laboratory in Emulsion Droplets," Trends in Biotechn. 24(9): 395-402 (2006).
Gullberg et al., "A Sense of Closeness: Protein Detection by Proximity Ligation," Curr Opin Biotechnol 14: 82-86 (2003).
Gustafsdottir et al., "Detection of Individual Microbial Pathogens by Proximity Ligation," Clin Chem 52(6):1152-1160 (2006).
He, "Development of on-chip proximity ligation assay with in situ single molecule sequencing readout," Masters Dissertation, Uppsala University (2011).
Heyduk et al., "Molecular Pincers: Antibody-Based Homogeneous Protein Sensors," Analytical Chemistry 80 (13):5152-5159 (2008).
Hochman et al., "An Active Antibody Fragment (Fv) Composed of the Variable Portions of Heavy and Light Chains," Biochemistry 12(6): 1130-1135 (1973).
Holder et al., "Assignment of Neisseria Meningitidis Serogroup A and C Class-Specific Anticapsular Antibody Concentrations to the New Standard Reference Serum CDC1992," Clinical and Diagnostic Laboratory Immunology 2(2):132-137 (1995).
Hu et al., "Quantitation of Femtomolar Protein Levels Via Direct Readout With the Electrochemical Proximity Assay," Journal of the American Chemical Society 134(16): 7066-7072 (2012).
Jeong et al., "Isothermal DNA Amplification In Vitro: The Helicase-Dependent Amplification System," Cell Mol Life Sci 66: 3325-3336 (2009).
Landegren et al., "A Ligase-Mediated Gene Detection Technique," Science 241: 1077-1080 (1988).
Leuchowius et al., "Parallel Visualization of Multiple Protein Complexes in Individual Cells in Tumor Tissue," Mol Cell Proteomics 12: 1563-1571 (2013).
Lizardi et al., "Mutation Detection and Single-Molecule Counting Using Isothermal Rolling-Circle Amplification", Nature Genetics 19:225-232 (1998).
Marchese et al., "Optimization and Validation of a Multiplex, Electrochemiluminescence-Based Detection Assay for the Quantitation of Immunoglobulin G Serotype-Specific Antipneumococcal Antibodies in Human Serum," Clinical and Vaccine Immunology 16(3):387-396 (2009).
Mendoza et al., "High-Throughput Micro array-Based Enzyme-Linked Immunosorbent Assay (ELISA)", BioTechniques 27(4):778-788 (1999).
Meso Scale Discovery Inc: "Sandwich Immunogenicity Assays for Protein Drugs," Meso Scale Discovery, Inc. Rockville, Maryland, USA (1 page), Nov. 1, 2012.
Nallur et al., "Signal Amplification by Rolling Circle Amplification on DNA Microarrays", Nucleic Acids Research J9 (23):e118 (2001).
Niemeyer et al., "Fluorometric Polymerase Chain Reaction (PCR) Enzyme-Linked Immunosorbent Assay for Quantification of Immuno-PCR Products in Microplates," Analytical Biochemistry 246:140-145 (1997).
Nilsson et al., "Padlock Probes: Circularizing Oligonucleotides for Localized DNA Detection," Science 265: 2085-2088 (1994).

(56) References Cited

OTHER PUBLICATIONS

Nolan et al., "Multiplexed and Micro particle-Based Analyses: Quantitative Tools for the Large-Scale Analysis of Biological Systems", Cytometry Part A 69A:318-325 (2006).
Nong et al., "Solid-Phase Proximity Ligation Assays for Individual or Parallel Protein Analyses With Readout Via Real-Time PCR or Sequencing", Nature Protocols 8(6):1234-1248 (2013).
Nordengrahn et al., "Evaluation of a Novel Proximity Ligation Assay for the Sensitive and Rapid Detection of Food-and-Mouth Disease Virus," Vet Microbial 127: 227-236 (2008).
Porter et al., "Subunits of Immunoglobulins and Their Relationship to Antibody Specificity," J Cell Physiol 67(Sup 1): 51-64 (1966).
Samiotaki et al., "Dual-Color Detection of DNA Sequence Variants by Ligase-Mediated Analysis," Genomics 20: 238-242 (1994).
Schallmeiner et al., "Sensitive Protein Detection Via Triple-Binder Proximity Ligation Assay," Nat Methods 4(2)135-137 (2007).
Schweitzer et al., "Immunoassays With Rolling Circle DNA Amplification: A Versatile Platform for Ultrasensitive Antigen Detection", PNAS 97(18):10113-10119 (2000).
Schweitzer et al., "Multiplexed Protein Profiling on Microarrays by Rolling-Circle Amplification", Nature Biotechnology 20:359-365 (2002).
Soderberg et al., "Direct observation of individual endogenous protein complexes in situ by proximity ligation," Nature Methods 3(12):995-1000 (2006).
Soderberg et al., "Characterizing Proteins and Their Interactions in Cells and Tissues Using the in situ Proximity igation Assay", Methods 45:227-232 (2008).
Spits et al., "Whole-Genome Multiple Displacement Amplification from Single Cells," Nat Protocols 1 (4): 1965-1970 (2006).
Tavoosidana et al. "Multiple Recognition Assay Reveals Prostasomes as Promising Plasma Biomarkers for Prostate Cancer," PNAS 108(21):8809-8814 (2011).
Vincent et al., "Helicase-Dependent Isothermal DNA Amplification," European Molecular Biology Organization 5(8): 795-800 (2004).
Vuoriluoto et al., "Spatio-Temporal Composition of the Mitotic Chromosomal Passenger Complex Detected Using In Situ Proximity Ligation Assay," Mol Oncol 5: 105-111 (2011).
Flamme et al., "Applications of Ruthenium Complexes Covalently Linked to Nucleic Acid Derivatives," *Molecules,* 23:1515 (2018).
Ghesquiere et al., "What Does the Future Hold for Photo-Oxidizing $Ru^{II}$ Complexes with Polyazaaromatic Ligands in Medicinal Chemistry?" *Curr Top Med Chem.* 12:185-196 (2012).

Kumar et al., "Development & evaluation of biotinylated DNA probe for clinical diagnosis of chikungunya infection in patients' acute phase serum & CSF samples," *Indian J Med Res.* 138:117-124 (2013).
Shibayama et al., "Nucleic acid (DNA/RNA) quantitative method," *Bunseki J.* 7:268-274 (2018).
Zhang et al., "Ruthenium Polypyridine Complexes Combined with Oligonucleotides for Bioanalysis: A Review," *Molecules* 19:11933-11987 (2014).
Restriction Requirement in U.S. Appl. No. 17/813,965, dated Mar. 19, 2024.
Final Office Action in U.S. Appl. No. 17/405,937, dated Oct. 16, 2023.
Non-Final Office Action in U.S. Appl. No. 17/132,380, dated Nov. 24, 2023.
Non-Final Office Action in U.S. Appl. No. 17/813,965, mailed Dec. 19, 2024.
Notice of Allowance in U.S. Appl. No. 17/813,965, mailed May 9, 2025.
Corrected Notice of Allowance in U.S. Appl. No. 17/813,965, mailed Jul. 22, 2025.
Buijs et al., "Interference by antiruthenium antibodies in the Roche thyroid-stimulating hormone assay," Ann Clin Biochem 48(3):276-281 (2011).
Gessl et al., "Anti-ruthenium antibodies mimic macro-TSH in electrochemiluminescent immunoassay," Clin Chem Lab Med 52(11):1589-1594 (2014).
Lin et al., "A Sulfhydryl-Reactive Ruthenium (II) Complex and Its Conjugation to Protein G as a Universal Reagent for Fluorescent Immunoassays," PLoS One 7(4):e36086 (2012).
Ohba et al., "Falsely elevated thyroid hormone levels caused by antiruthenium interference in the Elecsys assay resembling the syndrome of inappropriate secretion of thyrotropin," Endocr J 59(8):663-667 (2012).
Sargeant et al., "Platform Perfection," Medical Product Outsourcing, May 17, 2010. Accessed at <https://www.mpo-mag.com/issues/2010-05/view_features/platform-perfection>.
Zhu et al., "Electrochemiluminescence Immunosensor Based on Au Nanocluster and Hybridization Chain Reaction Signal Amplification for Ultrasensitive Detection of Cardiac Troponin I," ACS Sens 4(10):2778-2785 (2019).
International Search Report in International Application No. PCT/US2022/035068, dated Dec. 1, 2022.
Non-Final Office Action issued in U.S. Appl. No. 18/043,275, dated Sep. 25, 2025.
Restriction Requirement issued in U.S. Appl. No. 17/849,917, dated May 29, 2025.
Non-Final Office Action issued in U.S. Appl. No. 17/849,917, dated Sep. 26, 2025.

\* cited by examiner

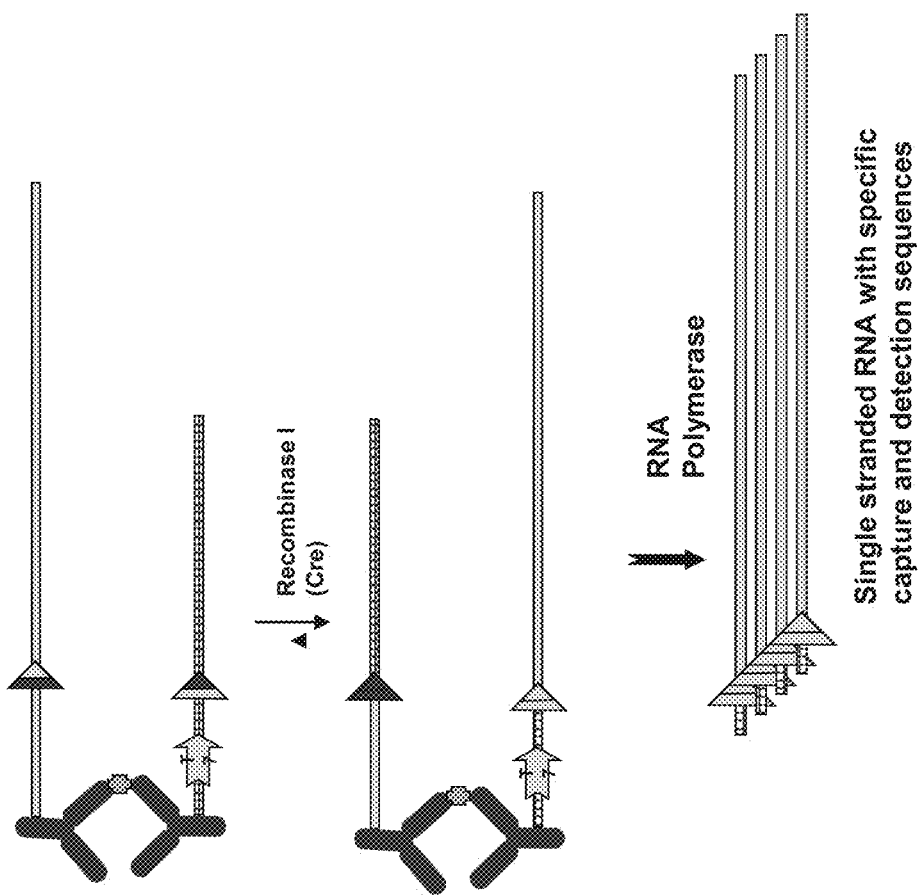

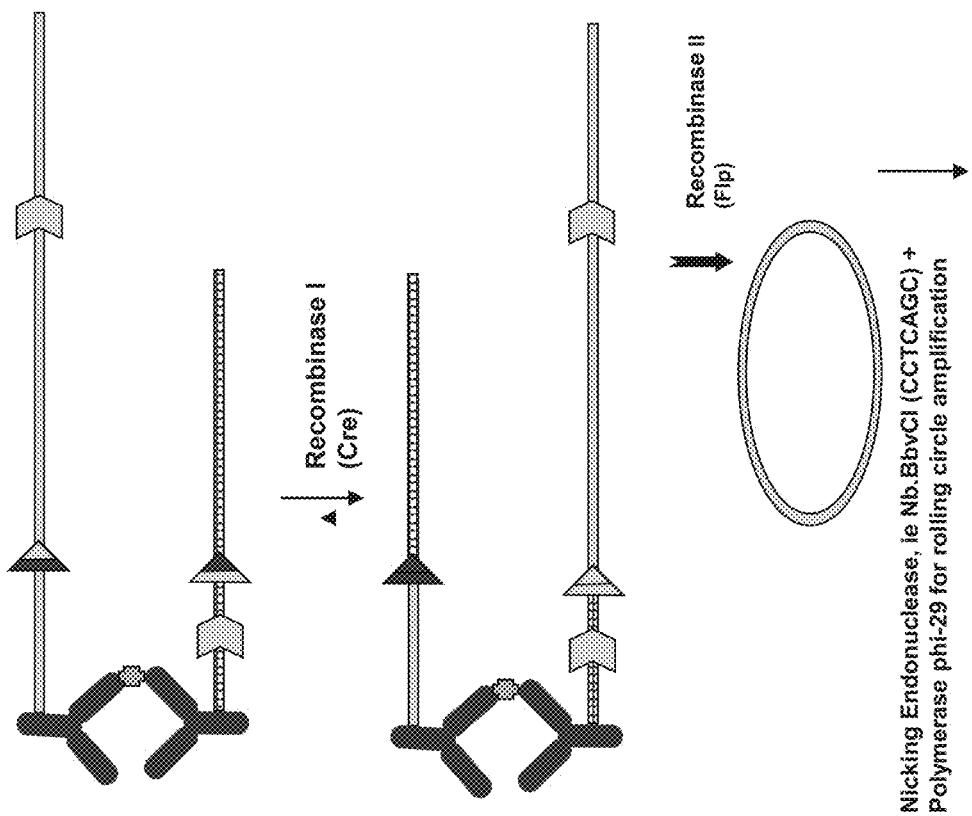

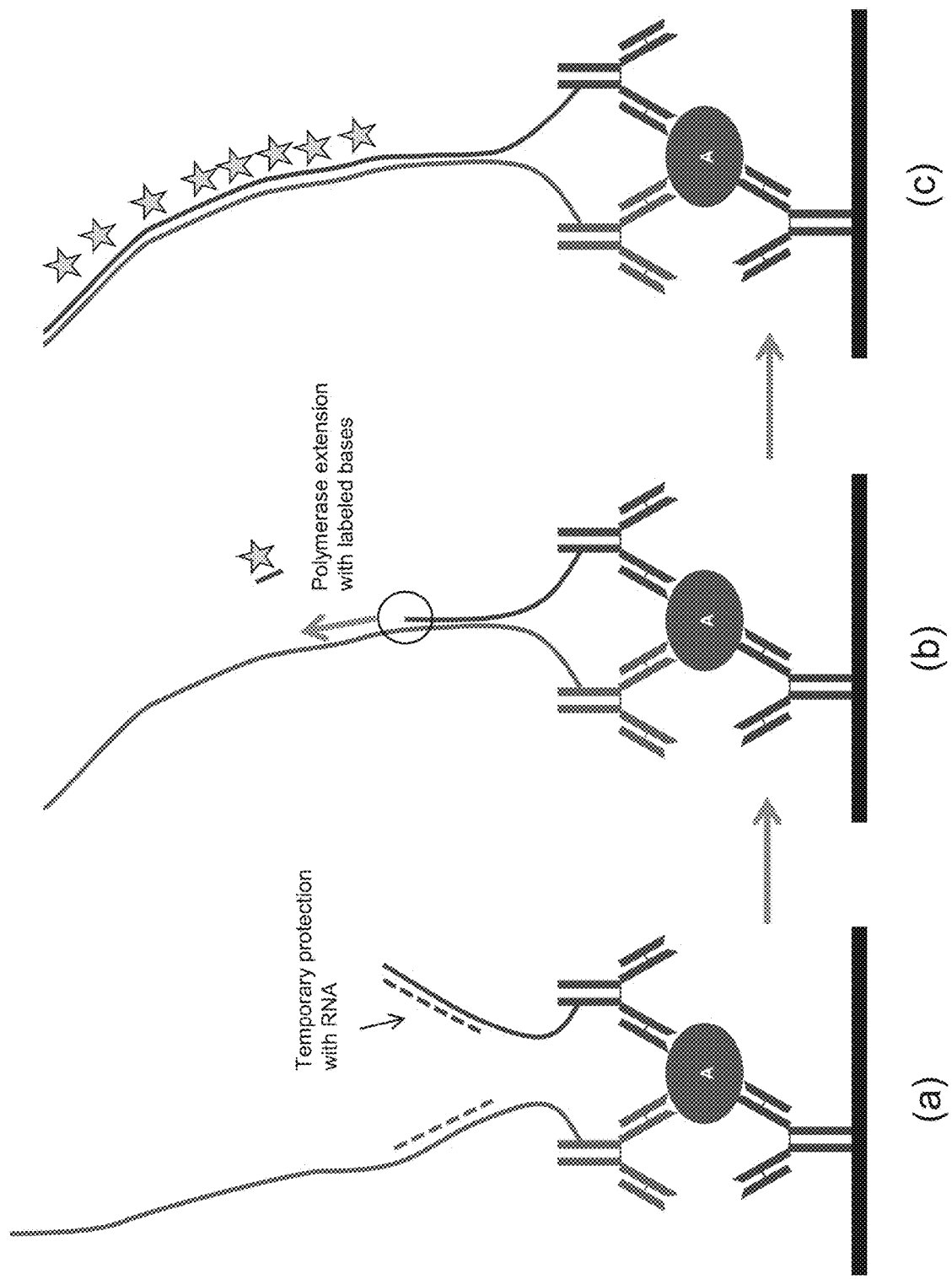

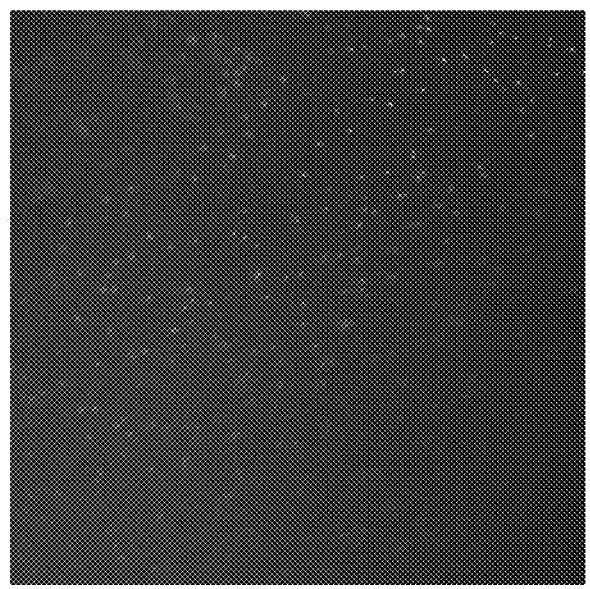
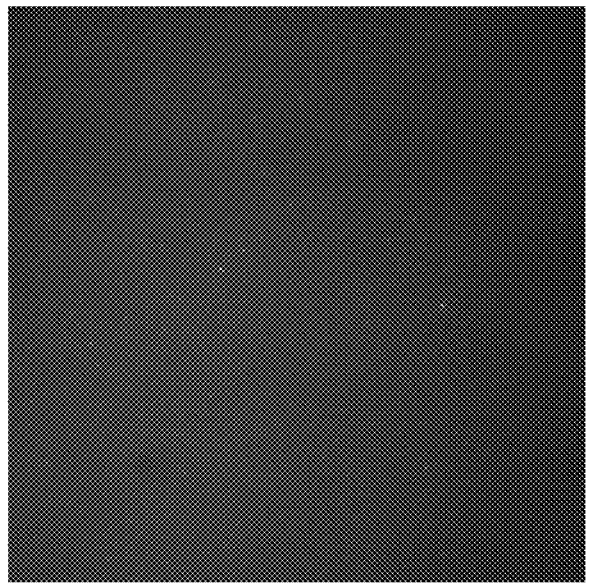
Fig. 10(a)-(b)

(a)

| HIV-1 p24 assay | | | Release salt [C], Temperature | | | | | | Release salt [C], Temperature | | | | | |
|---|---|---|---|---|---|---|---|---|---|---|---|---|---|---|
| | | | 0 salt | | | 10mM | | | 0 salt | | | 10mM | | |
| Assay | Binding [Mono+] | Bead-Capture oligo | 25C | 30C | 37C | 25C | 30C | 37C | 25C | 30C | 37C | 25C | 30C | 37C |
| Bead Cap-Release | 1M | Cap 1:13 | | 17,429 | 46,572 | | 8,268 | 32,704 | 8% | 4% | 13% | 20% | 9% | 26% |
| | | Cap 1:11 | 22,842 | 42,265 | 34,946 | 10,260 | 32,714 | 22,385 | 14% | 9% | 7% | 14% | 12% | 11% |
| | | Cap 1:10 | 43,019 | 43,260 | 34,771 | 41,851 | 37,504 | 33,651 | 15% | 7% | 14% | 4% | 27% | 15% |
| | | Cap 1:9 | 45,161 | 42,834 | 42,337 | 43,245 | 42,635 | 40,488 | 10% | 12% | 4% | 8% | 9% | 4% |
| | 0.5M | Cap 1:13 | | | 40,514 | | 11,873 | 37,773 | 20% | 9% | 12% | 17% | 15% | 13% |
| | | Cap 1:11 | 10,206 | 35,286 | 33,755 | 25,633 | 32,878 | 24,881 | 3% | 16% | 19% | 12% | 11% | 14% |
| | | Cap 1:10 | 28,898 | 38,518 | 37,488 | 45,106 | 44,400 | 35,133 | 12% | 11% | 15% | 11% | 15% | 12% |
| | | Cap 1:9 | 30,627 | 38,024 | 40,903 | 46,526 | 44,581 | 42,991 | 17% | 17% | 29% | 10% | 13% | 9% |

(b)

| Cntrl - beads w/o cap oligo | | | |
|---|---|---|---|
| | No low salt treatment | | |
| Binding [Mono+] | 25C | 30C | 37C |
| 1M | | | 7% |
| 0.5M | | | 8% |
| 1M | 13% | 9% | |
| 0.5M | 18% | 8% | |

(c)

| Direct plate assay | ECL | NSB |
|---|---|---|
| Dil 2/11 | 241,492 | 60 |
| 1M | 107,573 | |
| 0.5M | 213,186 | 105 |
| Dil 2/11 | 6% | 32 |
| 1M | 5% | |
| 0.5M | 9% | 32 |

Fig. 14(a)-(c)

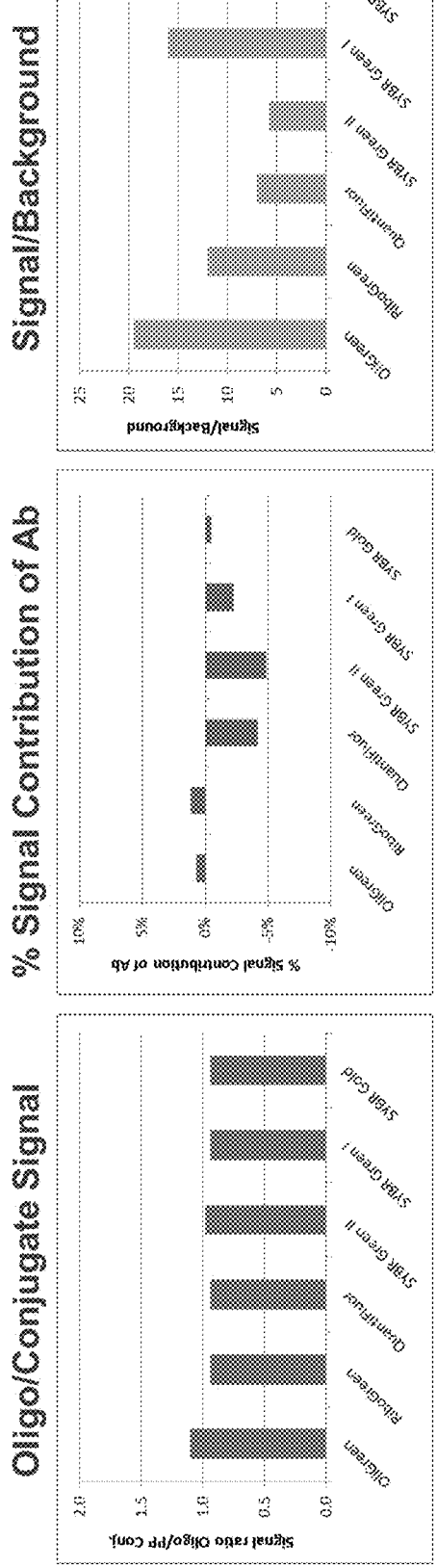
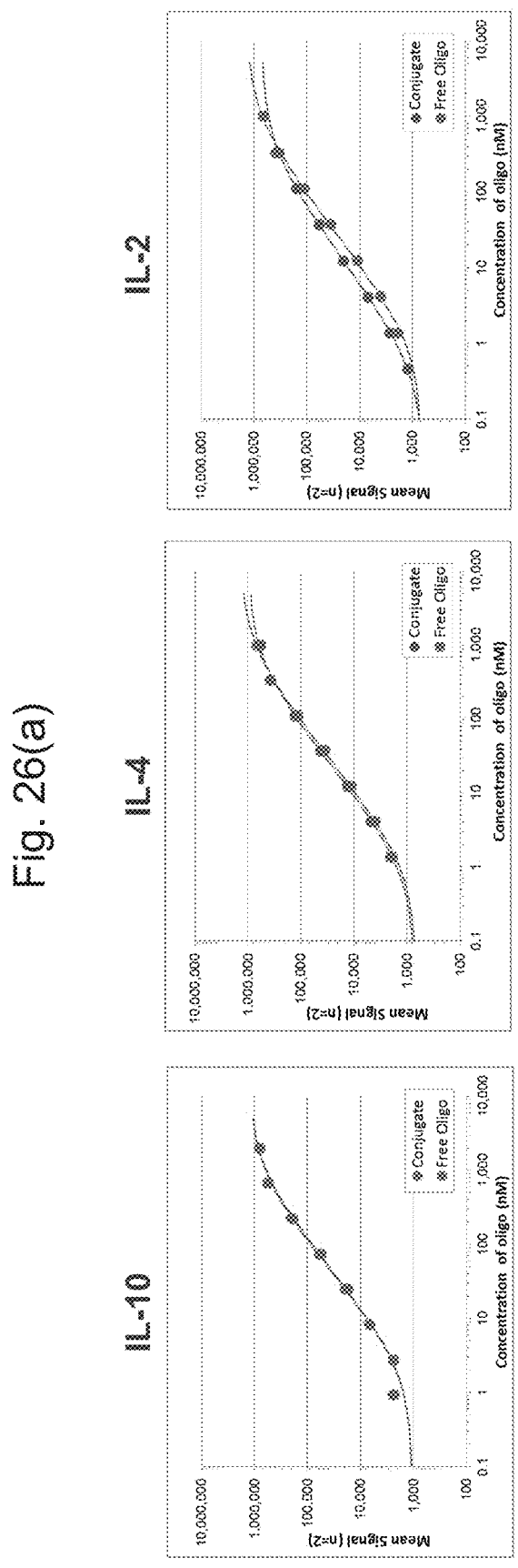
Fig. 26(a)
Fig. 26(b)

| Concentration (fg/mL) | Regular Circ2(90bp) | LCS2 Min 2(78bp) | LCS2 Min 1(68bp) | LCS2 Min 3(61bp) | LCS2 Min 4(53bp) |
|---|---|---|---|---|---|
| 60,000 | 733,254 | 871,910 | 1,273,967 | 1,183,597 | 520,832 |
| 8,571 | 101,423 | 138,786 | 179,267 | 183,383 | 68,388 |
| 1,224 | 13,171 | 18,329 | 25,150 | 25,031 | 8,757 |
| 174.927 | 2,023 | 2,757 | 3,727 | 3,970 | 1,426 |
| 24.990 | 369 | 540 | 823 | 611 | 236 |
| 3.570 | 146 | 260 | 312 | 234 | 61 |
| 0.510 | 116 | 132 | 203 | 273 | 57 |
| 0 | 201 | 149 | 189 | 232 | 43 |
| Hill | 1.04 | 0.99 | 0.99 | 1.06 | 1.02 |
| $R^2$ | 1.00 | 1.00 | 1.00 | 1.00 | 1.00 |
| Detection Limit | 19.43 | 5.48 | 4.04 | 8.58 | 6.11 |

Fig. 32

ELECTROCHEMILUMINESCENT LABELED PROBES FOR USE IN IMMUNOASSAY METHODS, METHODS USING SUCH AND KITS COMPRISING SAME

SEQUENCE LISTING

The instant application contains a Sequence Listing which has been submitted electronically in ASCII format and is hereby incorporated by reference in its entirety. The ASCII copy, created on Feb. 26, 2020, is named 0076-0010WO1_SL.txt and is 12,578 bytes in size.

FIELD OF THE INVENTION

The present invention is directed to methods for conducting immunoassays. The methods are designed to amplify signals in immunoassays and anchor immunoassay complexes employed therein.

BACKGROUND OF THE INVENTION

A substantial body of literature has been developed concerning techniques that employ binding reactions, e.g., antigen-antibody reactions, nucleic acid hybridization and receptor-ligand reactions, for the sensitive measurement of analytes of interest in samples. The high degree of specificity in many biochemical binding systems has led to many assay methods and systems of value in a variety of markets including basic research, human and veterinary diagnostics, environmental monitoring and industrial testing. The presence of an analyte of interest may be measured by directly measuring the participation of the analyte in a binding reaction. In some approaches, this participation may be indicated through the measurement of an observable label attached to one or more of the binding materials.

While the sandwich immunoassay format provides excellent sensitivity and specificity in many applications, some analytes are present at concentrations that are too low for detection by conventional immunoassay techniques. The performance of sandwich immunoassays can also be limited by the non-specific binding of detection antibodies and by the instability of sandwich complexes comprising high off-rate antibodies. However, efforts to modify conventional immunoassay techniques to improve sensitivity and specificity often yield more complex, labor intensive protocols that can be hampered by inefficiencies at each step that can greatly impact the sensitivity and specificity of an assay. For example, in a complex assay requiring multiple binding events and/or reactions, if any one event or reaction is less than optimal, the sensitivity and specificity of the overall assay can suffer.

SUMMARY OF THE INVENTION

The present invention contemplates the following specific embodiments. Various modifications, additions and alterations may be made to embodiments described herein by one skilled in the art without departing from the spirit and scope of the invention. Such modifications, additions, and alterations are intended to fall within the scope of the claims.

Embodiment (1): a method of detecting an analyte of interest in a sample comprising: binding the analyte to: (i) a capture reagent on a surface comprising the capture reagent for the analyte, and an anchoring reagent; and (ii) a detection reagent for the analyte that is linked to a nucleic acid probe; thereby forming a complex on the surface comprising the capture reagent, the analyte and the detection reagent; extending the probe to form an extended sequence comprising an anchoring region that binds the anchoring reagent; binding the extended sequence to the anchoring reagent; and measuring the amount of extended sequence bound to the surface.

In embodiment (1), the capture reagent can be an antibody, antigen, ligand, receptor, oligonucleotide, hapten, epitope, mimotope, or an aptamer. In a specific embodiment, the capture reagent is an antibody. The detection reagent can be an antibody, antigen, ligand, receptor, oligonucleotide, hapten, epitope, mimotope, or an aptamer, and in a specific embodiment, the detection reagent is an antibody. In one specific example of embodiment (1), the capture and detection reagents are antibodies to the analyte. The anchoring reagent can include an oligonucleotide sequence, aptamer, aptamer ligand, antibody, antigen, ligand, receptor, hapten, epitope, or a mimotope; and optionally, the anchoring region can include an aptamer and the anchoring reagent can include an aptamer ligand. The anchoring region can comprise a nucleic acid sequence and the anchoring reagent can include a DNA-binding protein. The anchoring region can include an oligonucleotide sequence and the anchoring reagent can include a complementary oligonucleotide sequence. The anchoring region can include a single stranded oligonucleotide sequence or a double stranded oligonucleotide sequence.

The binding step of embodiment (1) can further include forming a triple helix between the anchoring region and the anchoring reagent. The method can also further comprise denaturing the anchoring region to expose a single stranded sequence prior to the binding step; exposing the anchoring region to helicase activity prior to the binding step; and/or exposing the anchoring region to nuclease treatment prior to the binding step. In this embodiment, the anchoring region can comprise one or more hapten-modified bases and the anchoring reagent can include one or more antibodies specific for the hapten; and/or the anchoring region can include one or more ligand-modified bases and the anchoring reagent can include one or more receptors specific for the ligand. The extended sequence can further comprise one or more detection sequences and the measuring step can include contacting the extended sequence with a plurality of labeled probes complementary to the one or more detection sequences; the extended sequence can include one or more modified bases and the measuring step can include contacting the extended sequence with a plurality of detectable moieties capable of binding to the one or more modified bases; and/or the extended sequence can comprise one or more labeled bases and the measuring step can further include detecting the presence of the one or more labeled bases. In this embodiment, the one or more modified bases comprise an aptamer, aptamer ligand, antibody, antigen, ligand, receptor, hapten, epitope, or a mimotope and the plurality of detectable moieties each comprise a binding partner of the one or more modified bases and a detectable label. The one or more modified bases can comprise streptavidin and the plurality of detectable moieties each comprise biotin and a detectable label; and/or the one or more modified bases can comprise biotin and the plurality of detectable moieties each comprise streptavidin and a detectable label; and/or the one or more modified bases can comprise avidin and the plurality of detectable moieties each comprise biotin and a detectable label; and/or the one or more modified bases can comprise biotin and the plurality of detectable moieties each comprise avidin and a detectable label.

The first step of embodiment (1) can comprise binding the analyte to the following species in the following order: (i) the capture reagent on a surface; and (ii) the detection reagent for the analyte; or the first step of embodiment (1) can comprise binding the analyte to the following species in the following order: (i) the detection reagent for the analyte; and (ii) the capture reagent on the surface; and/or the first step can comprise binding the analyte to the following species simultaneously or substantially simultaneously: (i) the capture reagent on a surface; and (ii) the detection reagent for the analyte.

The extending step of embodiment (1) can comprise binding the probe to a circular nucleic acid and extending the circular template by rolling circle amplification. The extending step of embodiment (1) can comprise binding the probe to a template nucleic acid sequence and extending the probe by polymerase chain reaction; and/or binding the probe to a template nucleic acid sequence, forming a circular nucleic acid template (for example, by ligation of a linear template to form a circle), and extending the circular template by rolling circle amplification. In these embodiments, the extended probe can remain localized on the surface following probe extension. In such an embodiment, the probe may be an optimized probe having a probe sequence between 14 to 24 nucleotides in length and/or the template may be an optimized template having a template sequence between 53 and 76 nucleotides in length. Therefore, the complex can remain bound to the surface after the extending step, e.g., the extended probe is bound to the anchoring reagent at a position within 10-100 µm of the location of the complex on the surface. In one specific embodiment, the extended probe is bound to the anchoring reagent at a position less than 100 µm, less than 50 µm, or more particularly, less than 10 µm from the location of the complex on the surface.

The extending step of embodiment (1) can comprise PCR (Polymerase Chain Reaction), LCR (Ligase Chain Reaction), SDA (Strand Displacement Amplification), 3SR (Self-Sustained Synthetic Reaction), or isothermal amplification methods. In one embodiment, the extending step can include isothermal amplification methods, e.g., helicase-dependent amplification or rolling circle amplification (RCA).

The surface referenced in embodiment (1) can comprise a particle and/or a well of a multi-well plate. The surface can comprise a plurality of distinct binding domains and the capture reagent and the anchoring reagent are located on two distinct binding domains on the surface. If the surface is a well of a plate, the well can comprise a plurality of distinct binding domains and the capture reagent and the anchoring reagent are located on two distinct binding domains within the well; and/or the surface can include a plurality of distinct binding domains and the capture reagent and the anchoring reagent are located on the same binding domain on the surface. In one embodiment, the well can include a plurality of distinct binding domains and the capture reagent and the anchoring reagent are located on the same binding domain within the well. The capture reagent and the anchoring reagent may be within 10-100 nm on the surface. The surface can include an electrode and the measuring step further can include applying a voltage waveform to the electrode to generate an electrochemiluminesce signal, and optionally, the method includes collecting the particle on an electrode and applying a voltage waveform to the electrode to generate an electrochemiluminescence signal.

The measuring step of embodiment (1) can further comprise binding the extended sequence to a detection probe having a detectable label, measuring the detectable label and correlating the measurement to the amount of analyte in the sample, wherein the detection probe comprising a nucleic acid sequence that is complementary to a region of the extended sequence. The detectable label can be measured by a measurement of light scattering, optical absorbance, fluorescence, chemiluminescence, electrochemiluminescence, bioluminescence, phosphorescence, radioactivity, magnetic field, or combinations thereof. In a particular example of embodiment (1), the detectable label is an ECL label and the measuring step can include measuring an ECL signal. The detection probe may have multiple ECL labels. The detection probe may be linked to a multiply ECL labeled moiety through linkages at the 3' end of the probe nucleotide component.

Embodiment (2): a kit for the detection of an analyte of interest in a sample comprising, in one or more vials, containers, or compartments: (a) a surface comprising (i) a capture reagent for the analyte, and (ii) an anchoring reagent; and (b) a detection reagent for the analyte that is linked to a nucleic acid probe.

The anchoring reagent of embodiment (2) can comprise an oligonucleotide sequence, aptamer, aptamer ligand, antibody, antigen, ligand, receptor, hapten, epitope, or a mimotope, and the capture reagent can comprise an antibody, antigen, ligand, receptor, oligonucleotide, hapten, epitope, mimotope, or aptamer. In a particular embodiment, the capture reagent can include an antibody and/or the detection reagent can include an antibody, antigen, ligand, receptor, oligonucleotide, hapten, epitope, mimotope, or aptamer. In a specific embodiment of the kit, the detection reagent is an antibody.

The surface of the kit of embodiment (2) can include a particle and/or a well of a multi-well plate. The surface can comprise a plurality of distinct binding domains and the capture reagent and the anchoring reagent are located on two distinct binding domains on the surface. If the surface of the kit is a well of a plate, the surface can comprise a plurality of distinct binding domains and the capture reagent and the anchoring reagent are located on two distinct binding domains within the well; and/or the surface can include a plurality of distinct binding domains and the capture reagent and the anchoring reagent are located on the same binding domain on the surface. In a particular example of the kit, the surface is a well and the well can include a plurality of distinct binding domains and the capture reagent and the anchoring reagent are located on the same binding domain within the well. The capture reagent and the anchoring reagent can be within 10-100 nm on the surface. Moreover, the surface of the kit can comprise an electrode.

Embodiment (3): a method of detecting an analyte of interest in a sample comprising: (a) binding the analyte to: (i) a capture reagent on a surface comprising the capture reagent for the analyte, and an anchoring reagent comprising an anchoring oligonucleotide sequence; and (ii) a detection reagent for the analyte that is linked to a nucleic acid probe; thereby forming a complex on the surface comprising the capture reagent, the analyte and the detection reagent; (b) extending the probe to form an extended sequence comprising an anchoring sequence complement that is complementary to the anchoring sequence; (c) hybridizing the anchoring sequence to the anchoring sequence complement; and (d) measuring the amount of extended sequence bound to the surface.

In embodiment (3), the capture reagent can be an antibody, antigen, ligand, receptor, oligonucleotide, hapten, epitope, mimotope, or an aptamer, and in a particular example, the capture reagent is an antibody. Likewise, the detection reagent is an antibody, antigen, ligand, receptor, oligonucleotide, hapten, epitope, mimotope, or an aptamer, and in a particular example of embodiment (3), the detection reagent is an antibody. In one example of embodiment (3), the capture and detection reagents are antibodies to the analyte. The anchoring oligonucleotide sequence can comprise a single stranded oligonucleotide sequence or a double stranded oligonucleotide sequence. The extended sequence may further comprise one or more detection sequences and the measuring step further can include contacting the extended sequence with a plurality of labeled probes complementary to the one or more detection sequences; alternatively or additionally, the extended sequence further can include one or more modified bases and the measuring step further can include contacting the extended sequence with a plurality of detectable moieties capable of binding to the one or more modified bases. In a particular example, the extended sequence further can include one or more labeled bases and the measuring step further can include detecting the presence of the one or more labeled bases. The one or more modified bases comprise an aptamer, aptamer ligand, antibody, antigen, ligand, receptor, hapten, epitope, or a mimotope and the plurality of detectable moieties each comprise a binding partner of the one or more modified bases and a detectable label. The one or more modified bases can comprise streptavidin and the plurality of detectable moieties each comprise biotin and a detectable label; the one or more modified bases comprise biotin and the plurality of detectable moieties each comprise streptavidin and a detectable label; the one or more modified bases comprise avidin and the plurality of detectable moieties each comprise biotin and a detectable label; and/or the one or more modified bases comprise biotin and the plurality of detectable moieties each comprise avidin and a detectable label.

Step (a) of embodiment (3) can include binding the analyte to the following species in the following order: (i) the capture reagent on a surface; and (ii) the detection reagent for the analyte. Alternatively, step (a) can include binding the analyte to the following species in the following order: (i) the detection reagent for the analyte; and (ii) the capture reagent on the surface. In yet another example, step (a) can include binding the analyte to the following species simultaneously or substantially simultaneously: (i) the capture reagent on a surface; and (ii) the detection reagent for the analyte.

The extending step of embodiment (3) can include binding the probe to a template nucleic acid sequence and extending the probe by polymerase chain reaction. Alternatively, the extending step can include binding the probe to a template circular nucleic acid and extending the circular template by rolling circle amplification. Alternatively, the extending step can include binding the probe to a template nucleic acid sequence, forming a circular nucleic acid template (for example, by ligation), and extending the circular template by rolling circle amplification. In such an embodiment, the probe may be an optimized probe having a probe sequence between 14 to 24 nucleotides in length and/or the template may be an optimized template having a template sequence between 53 and 76 nucleotides in length. The extended probe can remain localized on the surface following probe extension, e.g., the complex remains bound to the surface after the extending step. In one example, the extended probe is bound to the anchoring reagent at a position within 10-100 μm of the location of the complex on the surface. In one specific embodiment, the extended probe is bound to the anchoring reagent at a position less than 100 μm, less than 50 μm, or more particularly, less than 10 μm from the location of the complex on the surface. In this particular embodiment, the extending step can include PCR (Polymerase Chain Reaction), LCR (Ligase Chain Reaction), SDA (Strand Displacement Amplification), 3SR (Self-Sustained Synthetic Reaction), or isothermal amplification methods. For example, the extending step can include isothermal amplification methods, e.g., helicase-dependent amplification or rolling circle amplification (RCA).

The surface of embodiment (3) can comprise a particle and/or a well of a multi-well plate. The surface can comprise a plurality of distinct binding domains and the capture reagent and the anchoring reagent are located on two distinct binding domains on the surface. If the surface is a well of a plate, it can comprise a plurality of distinct binding domains and the capture reagent and the anchoring reagent are located on two distinct binding domains within the well. The surface can comprise a plurality of distinct binding domains and the capture reagent and the anchoring reagent are located on the same binding domain on the surface. If the surface is a well, it can comprise a plurality of distinct binding domains and the capture reagent and the anchoring reagent are located on the same binding domain within the well. The capture reagent and the anchoring reagent can be within 10-100 nm on the surface. In a particular example, the surface can include an electrode and the measuring step further can include applying a voltage waveform to the electrode to generate an electrochemiluminesce signal. The method can further include collecting the particle on an electrode and applying a voltage waveform to the electrode to generate an electrochemiluminescence signal. The measuring step can further comprise binding the extended sequence to a detection probe having a detectable label, measuring the detectable label and correlating the measurement to the amount of analyte in the sample, wherein the detection probe comprising a nucleic acid sequence that is complementary to a region of the extended sequence. In this embodiment, the detectable label is measured by a measurement of light scattering, optical absorbance, fluorescence, chemiluminescence, electrochemiluminescence, bioluminescence, phosphorescence, radioactivity, magnetic field, or combinations thereof. For example, the detectable label is an ECL label and the measuring step can include measuring an ECL signal. The detection probe may have multiple ECL labels. The detection probe may be linked to a multiply ECL labeled moiety through linkages at the 3' end of the probe nucleotide component.

Embodiment (4): a kit for the detection of an analyte of interest in a sample comprising, in one or more vials, containers, or compartments: (a) a surface comprising (i) a capture reagent for the analyte, and (ii) an anchoring reagent comprising an anchoring oligonucleotide sequence; and (b) a detection reagent for the analyte that is linked to a nucleic acid probe.

The kit of embodiment (4) includes a capture reagent comprising an antibody, antigen, ligand, receptor, oligonucleotide, hapten, epitope, mimotope, or aptamer. In a specific example, the capture reagent can include an antibody. Likewise, the detection reagent can include an antibody, antigen, ligand, receptor, oligonucleotide, hapten, epitope, mimotope, or aptamer, and particularly, the detection reagent can include an antibody.

The kit of embodiment (4) includes a surface that can comprise a particle and/or a well of a multi-well plate. The surface can include a plurality of distinct binding domains and the capture reagent and the anchoring reagent are located on two distinct binding domains on the surface. If the surface is a well, the well can include a plurality of distinct binding domains and the capture reagent and the anchoring reagent are located on two distinct binding domains within the well. The surface can comprise a plurality of distinct binding domains and the capture reagent and the anchoring reagent are located on the same binding domain on the surface, e.g., if the surface is a well, the well can include a plurality of distinct binding domains and the capture reagent and the anchoring reagent are located on the same binding domain within the well. For example, the capture reagent and the anchoring reagent are within 10-100 nm on the surface. The surface of embodiment (4) can include an electrode.

Embodiment (5): a method of detecting an analyte of interest in a sample comprising: (a) binding the analyte to: (i) a capture reagent on a surface comprising the capture reagent for the analyte, and an anchoring reagent comprising an anchoring oligonucleotide sequence; (ii) a first detection reagent for the analyte that is linked to a first nucleic acid probe; and (iii) a second detection reagent for the analyte that is linked to a second nucleic acid probe; thereby forming a complex on the surface comprising the binding reagent, the analyte and the first and second detection reagents; (b) using an extension process that requires the first and second probes to be in proximity, extending the second probe to form an extended sequence comprising an anchoring sequence complement that is complementary to the anchoring sequence; (c) hybridizing the anchoring sequence to the anchoring sequence complement; and (d) measuring the amount of extended sequence bound to the surface.

The capture reagent of embodiment (5) can be an antibody, antigen, ligand, receptor, oligonucleotide, hapten, epitope, mimotope, or an aptamer. In a specific example, the capture reagent is an antibody. Likewise, the first detection reagent is an antibody, antigen, ligand, receptor, oligonucleotide, hapten, epitope, mimotope, or an aptamer, and in a particular example, the first detection reagent is an antibody. The second detection reagent can be an antibody, antigen, ligand, receptor, oligonucleotide, hapten, epitope, mimotope, or an aptamer, and in a particular example, the second detection reagent is an antibody. More particularly, the capture reagent and the first and second detection reagents are antibodies to the analyte.

In embodiment (5), the anchoring oligonucleotide sequence can include a single stranded oligonucleotide sequence or a double stranded oligonucleotide sequence. In this embodiment, the extended sequence further can include one or more detection sequences and the measuring step further can include contacting the extended sequence with a plurality of labeled probes complementary to the one or more detection sequences. The extended sequence can also include one or more modified bases and the measuring step further can include contacting the extended sequence with a plurality of detectable moieties capable of binding to the one or more modified bases. The extended sequence can further comprise one or more labeled bases and the measuring step further can include detecting the presence of the one or more labeled bases. The one or more modified bases can comprise an aptamer, aptamer ligand, antibody, antigen, ligand, receptor, hapten, epitope, or a mimotope and the plurality of detectable moieties each comprise a binding partner of the one or more modified bases and a detectable label. For example, the one or more modified bases comprise streptavidin and the plurality of detectable moieties each comprise biotin and a detectable label; the one or more modified bases comprise biotin and the plurality of detectable moieties each comprise streptavidin and a detectable label; the one or more modified bases comprise avidin and the plurality of detectable moieties each comprise biotin and a detectable label; and/or the one or more modified bases comprise biotin and the plurality of detectable moieties each comprise avidin and a detectable label.

Step (a) of embodiment (5) can include binding the analyte to the following species in the following order: (i) the capture reagent on a surface; and (ii) the detection reagent for the analyte. Alternatively, step (a) can include binding the analyte to the following species in the following order: (i) the detection reagent for the analyte; and (ii) the capture reagent on the surface; or step (a) can include binding the analyte to the following species simultaneously or substantially simultaneously: (i) the capture reagent on a surface; and (ii) the detection reagent for the analyte.

The extending step of embodiment (5) can include binding the probe to a template nucleic acid sequence and extending the probe by polymerase chain reaction. The extending step can further include binding the probe to a template nucleic acid sequence, forming a circular nucleic acid template, and extending the circular template by rolling circle amplification. The extended probe can remain localized on the surface following probe extension, e.g., the complex remains bound to the surface after the extending step. The extended probe can be bound to the anchoring reagent at a position within 10-100 µm of the location of the complex on the surface. In one specific embodiment, the extended probe is bound to the anchoring reagent at a position less than 100 µm, less than 50 µm, or more particularly, less than 10 um from the location of the complex on the surface. The extending step can include PCR (Polymerase Chain Reaction), LCR (Ligase Chain Reaction), SDA (Strand Displacement Amplification), 3SR (Self-Sustained Synthetic Reaction), or isothermal amplification methods. In a particular example, the extending step can include isothermal amplification methods, e.g., is helicase-dependent amplification or rolling circle amplification (RCA).

The extension process of embodiment (5) can include contacting the complex formed in step (a) with a connector sequence comprising (i) an interior sequence complementary to the second probe and (ii) two end sequences complementary to non-overlapping regions of the first probe. The method can further include ligating the two end sequences of the connector oligonucleotide to form a circular target sequence that is hybridized to both the first and second probes. Alternatively, the extension process can include contacting the complex formed in step (a) of embodiment (5) with a first connector oligonucleotide sequence including a first connector probe sequence complementary to a first region of the first probe and a first region on the second probe, and a second connector oligonucleotide comprising a second probe sequence complementary to a second non-overlapping region of the first probe and a second non-overlapping region of the second probe; and optionally, ligating the first and second connector oligonucleotides to form a circular target sequence that is hybridized to both the first and second probes.

The surface of embodiment (5) can include a particle and/or a well of a multi-well plate. The surface can include a plurality of distinct binding domains and the capture reagent and the anchoring reagent are located on two distinct binding domains on the surface. If the surface is a well of a plate, the well can include a plurality of distinct binding domains and the capture reagent and the anchoring reagent are located on two distinct binding domains within the well. The surface can also include a plurality of distinct binding domains and the capture reagent and the anchoring reagent are located on the same binding domain on the surface. If the surface is a well of a plate, the well can include a plurality of distinct binding domains and the capture reagent and the anchoring reagent are located on the same binding domain within the well. The capture reagent and the anchoring reagent can be within 10-100 nm on the surface. In a specific example, the surface can include an electrode and the measuring step further can include applying a voltage waveform to the electrode to generate an electrochemiluminesce signal, and optionally, the method of embodiment (5) further includes collecting the particle on an electrode and applying a voltage waveform to the electrode to generate an electrochemiluminescence signal.

The measuring step of embodiment (5) further can include binding the extended sequence to a detection probe having a detectable label, measuring the detectable label and correlating the measurement to the amount of analyte in the sample, wherein the detection probe comprising a nucleic acid sequence that is complementary to a region of the extended sequence. The detectable label can be measured by a measurement of light scattering, optical absorbance, fluorescence, chemiluminescence, electrochemiluminescence, bioluminescence, phosphorescence, radioactivity, magnetic field, or combinations thereof. In a particular example, the detectable label is an ECL label and the measuring step can include measuring an ECL signal. The detection probe may have multiple ECL labels. The detection probe may be linked to a multiply ECL labeled moiety through linkages at the 3' end of the probe nucleotide component.

Embodiment (6): a kit for the detection of an analyte of interest in a sample comprising, in one or more vials, containers, or compartments: (a) a surface comprising (i) a capture reagent for the analyte, and (ii) an anchoring reagent comprising an anchoring oligonucleotide sequence; (b) a first detection reagent for the analyte that is linked to a first nucleic acid probe; and (c) a second detection reagent for the analyte that is linked to a second nucleic acid probe.

The capture reagent of embodiment (6) can include an antibody, antigen, ligand, receptor, oligonucleotide, hapten, epitope, mimotope, or aptamer, and in a specific example the capture reagent can include an antibody. Likewise, the first detection reagent can include an antibody, antigen, ligand, receptor, oligonucleotide, hapten, epitope, mimotope, or aptamer, and in a specific example, the first detection reagent can include an antibody. Similarly, the second detection reagent can include an antibody, antigen, ligand, receptor, oligonucleotide, hapten, epitope, mimotope, or aptamer, and in a specific example, the second detection reagent can include an antibody.

The surface of embodiment (6) can comprise a particle and/or a well of a multi-well plate. The surface can include a plurality of distinct binding domains and the capture reagent and the anchoring reagent are located on two distinct binding domains on the surface. If the surface is a well, the well can comprise a plurality of distinct binding domains and the capture reagent and the anchoring reagent are located on two distinct binding domains within the well. The surface can include a plurality of distinct binding domains and the capture reagent and the anchoring reagent are located on the same binding domain on the surface; and/or if the surface is a well, the well can include a plurality of distinct binding domains and the capture reagent and the anchoring reagent are located on the same binding domain within the well. The capture reagent and the anchoring reagent can be within 10-100 nm on the surface. In a specific example, the surface can include an electrode.

Embodiment (7): a method of detecting an analyte of interest in a sample comprising: (a) binding the analyte to: (i) a capture reagent for the analyte on a surface comprising the capture reagent and an anchoring reagent; (ii) a first detection reagent for the analyte comprising a first proximity probe, and (iii) a second detection reagent for the analyte comprising a second proximity probe; thereby forming a detection complex on the surface comprising the capture reagent, the analyte and the first and second detection reagents; (b) contacting the detection complex formed in (c) with a connector sequence comprising (i) an interior sequence complementary to the second proximity probe and (ii) two end sequences complementary to non-overlapping regions of the first proximity probe; (c) hybridizing the connector sequence to the first and second proximity probes; (d) ligating the two end sequences of the connector oligonucleotide to form a circular target sequence that is hybridized to both the first and second proximity probes; (e) extending the second proximity probe by rolling circle amplification of the target sequence to generate an amplicon comprising a binding domain that binds the anchoring reagent; (f) binding the amplicon to the anchoring reagent; and (g) measuring the amount of amplicon on the surface.

Embodiment (8): a method of detecting an analyte of interest in a sample comprising: (a) binding the analyte to: (i) a capture reagent for the analyte on a surface comprising the capture reagent and an anchoring reagent; (ii) a first detection reagent for the analyte comprising a first proximity probe, and (iii) a second detection reagent for the analyte comprising a second proximity probe; thereby forming a detection complex on the surface comprising the capture reagent, the analyte and the first and second detection reagents; (b) contacting the detection complex formed in (c) with a first connector oligonucleotide and a second connector oligonucleotide, wherein (i) a first end of the first connector and a first end of the second connector are complementary to two non-overlapping regions of the first proximity probe and (ii) a second end of the first connector and a second end of the second connector are complementary to two non-overlapping regions of the first proximity probe; (c) hybridizing the first and second connector oligonucleotides to the first and second proximity probes; (d) ligating the first and second connector oligonucleotides to form a circular target sequence that is hybridized to both the first and second proximity probes; (e) extending the second proximity probe by rolling circle amplification of the target sequence to generate an amplicon comprising a binding domain that binds the anchoring reagent; (f) binding the amplicon to the anchoring reagent; and (g) measuring the amount of amplicon on the surface.

The capture reagent of embodiments (7) and (8) can be an antibody, antigen, ligand, receptor, oligonucleotide, hapten, epitope, mimotope, or an aptamer, and in a specific example, the capture reagent is an antibody. Similarly, the first detection reagent can be an antibody, antigen, ligand, receptor, oligonucleotide, hapten, epitope, mimotope, or an aptamer, e.g., the first detection reagent is an antibody. In addition, the second detection reagent is an antibody, antigen, ligand, receptor, oligonucleotide, hapten, epitope, mimotope, or an aptamer, e.g., the second detection reagent is an antibody. In a specific example of embodiments (7) and (8), the capture reagent and the first and second detection reagents are antibodies to the analyte.

The anchoring reagent of embodiments (7) and (8) can include an oligonucleotide sequence, aptamer, aptamer ligand, antibody, antigen, ligand, receptor, hapten, epitope, or a mimotope. In one example, the binding domain can include an aptamer and the anchoring reagent can include an aptamer ligand. The binding domain can include a nucleic acid sequence and the anchoring reagent can include a DNA-binding protein; and/or the anchoring reagent can include an oligonucleotide sequence and the amplicon can include a complementary oligonucleotide sequence.

The amplicon of embodiments (7) and (8) can further comprise one or more detection sequences and the measuring step can further comprise contacting the extended sequence with a plurality of labeled probes complementary to the one or more detection sequences. Moreover, the amplicon may further comprise one or more modified bases and the measuring step further can include contacting the extended sequence with a plurality of detectable moieties capable of binding to the one or more modified bases. Still further, the amplicon may further include one or more labeled bases and the measuring step further can include detecting the presence of the one or more labeled bases. The one or more modified bases can comprise an aptamer, aptamer ligand, antibody, antigen, ligand, receptor, hapten, epitope, or a mimotope and the plurality of detectable moieties each comprise a binding partner of the one or more modified bases and a detectable label. The one or more modified bases can comprise streptavidin and the plurality of detectable moieties each comprise biotin and a detectable label; the one or more modified bases can comprise biotin and the plurality of detectable moieties each comprise streptavidin and a detectable label; the one or more modified bases can comprise avidin and the plurality of detectable moieties each comprise biotin and a detectable label; and/or the one or more modified bases can comprise biotin and the plurality of detectable moieties each comprise avidin and a detectable label.

Step (a) of embodiments (7) and (8) can comprise binding the analyte to the following species in the following order: (i) the capture reagent on a surface; and (ii) the first and second detection reagents for the analyte. Alternatively, step (a) can include binding the analyte to the following species in the following order: (i) the first and second detection reagents for the analyte; and (ii) the capture reagent on the surface. Still further, step (a) can include binding the analyte to the following species simultaneously or substantially simultaneously: (i) the capture reagent on a surface; and (ii) the first and second detection reagents for the analyte.

The amplicon of embodiments (7) and (8) can remain localized on the surface following probe extension. The complex can remain bound to the surface after the extending step. For example, the amplicon is bound to the anchoring reagent at a position within 10-100 µm of the location of the complex on the surface. In one specific embodiment, the extended probe is bound to the anchoring reagent at a position less than 100 µm, less than 50 µm, or more particularly, less than 10 µm from the location of the complex on the surface.

The surface of embodiments (7) and (8) can include a particle and/or a well of a multi-well plate. The surface can include a plurality of distinct binding domains and the capture reagent and the anchoring reagent are located on two distinct binding domains on the surface. If the surface is a well of a plate, the well can comprise a plurality of distinct binding domains and the capture reagent and the anchoring reagent are located on two distinct binding domains within the well. The surface can include a plurality of distinct binding domains and the capture reagent and the anchoring reagent are located on the same binding domain on the surface. If the surface is a well of a plate, the well can include a plurality of distinct binding domains and the capture reagent and the anchoring reagent are located on the same binding domain within the well. In a specific example, the capture reagent and the anchoring reagent are within 10-100 nm on the surface.

Still further, the surface can include an electrode and the measuring step can include applying a voltage waveform to the electrode to generate an electrochemiluminesce signal. In these embodiments ((7) and (8)), the method can further include collecting the particle on an electrode and applying a voltage waveform to the electrode to generate an electrochemiluminescence signal. The measuring step can include binding the amplicon to a detection probe having a detectable label, measuring the detectable label and correlating the measurement to the amount of analyte in the sample, wherein the detection probe comprising a nucleic acid sequence that is complementary to a region of the amplicon. The detectable label is measured by a measurement of light scattering, optical absorbance, fluorescence, chemiluminescence, electrochemiluminescence, bioluminescence, phosphorescence, radioactivity, magnetic field, or combinations thereof. For example, the detectable label is an ECL label and the measuring step can include measuring an ECL signal. The detection probe may have multiple ECL labels. The detection probe may be linked to a multiply ECL labeled moiety through linkages at the 3' end of the probe nucleotide component.

Embodiment (9): a kit for the detection of an analyte of interest in a sample comprising, in one or more vials, containers, or compartments: (a) a surface comprising (i) a capture reagent for the analyte, and (ii) an anchoring reagent; (b) a first detection reagent for the analyte comprising a first proximity probe; (c) a second detection reagent for the analyte comprising a second proximity probe; and (d) a connector sequence comprising (i) an interior sequence complementary to the second proximity probe and (ii) two end sequences complementary to non-overlapping regions of the first proximity probe. In embodiments, the first and second proximity probes are nucleic acid probes.

Embodiment (10): a kit for the detection of an analyte of interest in a sample comprising, in one or more vials, containers, or compartments: (a) a surface comprising (i) a capture reagent for the analyte, and (ii) an anchoring reagent; and (b) a first detection reagent for the analyte comprising a first proximity probe; (c) a second detection reagent for the analyte comprising a second proximity probe; and (d) (i) a first connector oligonucleotide and (ii) a second connector oligonucleotide, wherein (x) a first end of the first connector and a first end of the second connector are complementary to two non-overlapping regions of the first proximity probe and (y) a second end of the first connector and a second end of the second connector are complementary to two non-overlapping regions of the first proximity probe. In embodiments, the first and second proximity probes are nucleic acid probes.

The capture reagent of embodiments (9) and (10) can include an antibody, antigen, ligand, receptor, oligonucleotide, hapten, epitope, mimotope, or aptamer. In a specific example, the capture reagent can include an antibody. The first detection reagent can include an antibody, antigen, ligand, receptor, oligonucleotide, hapten, epitope, mimotope, or aptamer, and in a specific example, the first detection reagent can include an antibody. The second detection reagent can include an antibody, antigen, ligand, receptor, oligonucleotide, hapten, epitope, mimotope, or aptamer, and in a specific example, the second detection reagent can include an antibody.

The surface of embodiments (9) and (10) can include a particle and/or a well of a multi-well plate. The surface can include a plurality of distinct binding domains and the capture reagent and the anchoring reagent are located on two distinct binding domains on the surface. If the surface is a well of a plate, the well can include a plurality of distinct binding domains and the capture reagent and the anchoring reagent are located on two distinct binding domains within the well. The surface can include a plurality of distinct binding domains and the capture reagent and the anchoring reagent are located on the same binding domain on the surface. If the surface is a well, the well can include a plurality of distinct binding domains and the capture reagent and the anchoring reagent are located on the same binding domain within the well. In a specific example, the capture reagent and the anchoring reagent are within 10-100 nm on the surface.

The surface of embodiments (9) and (10) can include an electrode.

Embodiment (11): a method of detecting an analyte of interest in a sample comprising: (a) binding the analyte to: (i) a capture reagent for the analyte on a surface comprising the capture reagent and an anchoring reagent comprising an anchoring oligonucleotide sequence; (ii) a first detection reagent for the analyte comprising a first proximity probe, and (iii) a second detection reagent for the analyte comprising a second proximity probe; thereby forming a detection complex on the surface comprising the capture reagent, the analyte and the first and second detection reagents; (b) contacting the detection complex formed in (c) with a connector sequence comprising (i) an interior sequence complementary to the second proximity probe, (ii) two end sequences complementary to non-overlapping regions of the first proximity probe and (iii) a sequence matching the anchoring sequence; (c) hybridizing the connector sequence to the first and second proximity probes; (d) ligating the two end sequences of the connector oligonucleotide to form a circular target sequence that is hybridized to both the first and second proximity probes; (e) extending the second proximity probe by rolling circle amplification of the target sequence to generate an amplicon comprising a plurality of anchoring sequence complements that are complementary to the anchoring sequence; (f) hybridizing the anchoring sequence to one of the anchoring sequence complements; and (g) measuring the amount of amplicon on the surface. In embodiments, the first and second proximity probes are nucleic acid probes.

Embodiment (12): a method of detecting an analyte of interest in a sample comprising: (a) binding the analyte to: (i) a capture reagent for the analyte on a surface comprising the capture reagent and an anchoring reagent comprising an anchoring oligonucleotide sequence; (ii) a first detection reagent for the analyte comprising a first proximity probe, and (iii) a second detection reagent for the analyte comprising a second proximity probe; thereby forming a detection complex on the surface comprising the capture reagent, the analyte and the first and second detection reagents; (b) contacting the detection complex formed in (a) with a first connector oligonucleotide and a second connector oligonucleotide, wherein (i) a first end of the first connector and a first end of the second connector are complementary to two non-overlapping regions of the first proximity probe, (ii) a second end of the first connector and a second end of the second connector are complementary to two non-overlapping regions of the first proximity probe and (iii) the first and/or second connector also comprise a sequence matching the anchoring sequence; (c) hybridizing the first and second connector oligonucleotides to the first and second proximity probes; (d) ligating the first and second connector oligonucleotides to form a circular target sequence that is hybridized to both the first and second proximity probes; (e) extending the second proximity probe by rolling circle amplification of the target sequence to generate an amplicon comprising a plurality of anchoring sequence complements that are complementary to the anchoring sequence; (f) hybridizing the anchoring sequence to one of the anchoring sequence complements; and (g) measuring the amount of amplicon on the surface. In embodiments, the first and second proximity probes are nucleic acid probes.

The capture reagent of embodiments (11) and (12) is an antibody, antigen, ligand, receptor, oligonucleotide, hapten, epitope, mimotope, or an aptamer. In a specific example, the capture reagent is an antibody. The first detection reagent is an antibody, antigen, ligand, receptor, oligonucleotide, hapten, epitope, mimotope, or an aptamer, and in a specific example, the first detection reagent is an antibody. Likewise, the second detection reagent is an antibody, antigen, ligand, receptor, oligonucleotide, hapten, epitope, mimotope, or an aptamer, and in a specific example, the second detection reagent is an antibody. In one example, the first and second detection reagents are antibodies to the analyte.

The amplicon of embodiments (11) and (12) can further comprise one or more detection sequences and the measuring step can include contacting the extended sequence with a plurality of labeled probes complementary to the one or more detection sequences. Moreover, the amplicon can also comprise one or more modified bases and the measuring step can include contacting the extended sequence with a plurality of detectable moieties capable of binding to the one or more modified bases. The amplicon additionally includes one or more labeled bases and the measuring step can include detecting the presence of the one or more labeled bases. The one or more modified bases comprise an aptamer, aptamer ligand, antibody, antigen, ligand, receptor, hapten, epitope, or a mimotope and the plurality of detectable moieties each comprise a binding partner of the one or more modified bases and a detectable label. The one or more modified bases can comprise streptavidin and the plurality of detectable moieties each comprise biotin and a detectable label; the one or more modified bases can comprise biotin and the plurality of detectable moieties each comprise streptavidin and a detectable label; the one or more modified bases can comprise avidin and the plurality of detectable moieties each comprise biotin and a detectable label; and/or the one or more modified bases can include biotin and the plurality of detectable moieties each comprise avidin and a detectable label.

Step (a) of embodiments (11) and (12) can comprise binding the analyte to the following species in the following order: (i) the capture reagent on a surface; and (ii) the first and second detection reagents for the analyte. Alternatively, step (a) can include binding the analyte to the following species in the following order: (i) the first and second detection reagents for the analyte; and (ii) the capture reagent on the surface. Still further, step (a) can include binding the analyte to the following species simultaneously or substantially simultaneously: (i) the capture reagent on a surface; and (ii) the first and second detection reagents for the analyte.

The amplicon in embodiments (11) and (12) can remain localized on the surface following probe extension, and optionally, the complex remains bound to the surface after the extending step. For example, the amplicon is bound to the anchoring reagent at a position within 10-100 µm of the location of the complex on the surface. In one specific embodiment, the extended probe is bound to the anchoring reagent at a position less than 100 µm, less than 50 µm, or more particularly, less than 10 um from the location of the complex on the surface.

The surface of embodiments (11) and (12) can include a particle and/or a well of a multi-well plate. Optionally, the surface can include a plurality of distinct binding domains and the capture reagent and the anchoring reagent are located on two distinct binding domains on the surface. If the surface is a well, the well can include a plurality of distinct binding domains and the capture reagent and the anchoring reagent are located on two distinct binding domains within the well. The surface can include a plurality of distinct binding domains and the capture reagent and the anchoring reagent are located on the same binding domain on the surface. If the surface is a well, the well can comprise a plurality of distinct binding domains and the capture reagent and the anchoring reagent are located on the same binding domain within the well. The capture reagent and the anchoring reagent can be within 10-100 nm on the surface.

The surface of embodiments (11) and (12) can comprise an electrode and the measuring step can include applying a voltage waveform to the electrode to generate an electrochemiluminesce signal. Optionally, embodiments (11) and (12) further comprise collecting the particle on an electrode and applying a voltage waveform to the electrode to generate an electrochemiluminescence signal. The measuring step can also include binding the amplicon to a detection probe having a detectable label, measuring the detectable label and correlating the measurement to the amount of analyte in the sample, wherein the detection probe comprising a nucleic acid sequence that is complementary to a region of the amplicon. The detectable label can be measured by a measurement of light scattering, optical absorbance, fluorescence, chemiluminescence, electrochemiluminescence, bioluminescence, phosphorescence, radioactivity, magnetic field, or combinations thereof. In one example, the detectable label is an ECL label and the measuring step can include measuring an ECL signal. The detection probe may have multiple ECL labels. The detection probe may be linked to a multiply ECL labeled moiety through linkages at the 3' end of the probe nucleotide component.

The sample of embodiments (11) and (12) can comprise one or more analyte molecules, and the surface can include a plurality of capture reagents for the one or more analyte molecules distributed across a plurality of resolvable binding regions positioned on the surface, and the method can include: (x) binding the one or more analyte molecules to one or more capture reagents on the surface; (y) determining the presence or absence of an analyte molecule in each binding region; and (z) identifying the number of binding regions that contain an analyte molecule and/or the number of analyte domains that do not contain an analyte molecule. The measuring step can include imaging an optical signal from the surface to generate an image comprising a plurality of pixels and each resolvable binding region maps to one or more pixels in the image. The resolvable binding regions can be elements of an array and/or the resolvable binding regions are configured to isolate individual particles. Each resolvable binding region can be an individual nano-wells having a volume<100 nL, e.g., wherein at least 99% of the binding regions contain either zero or one analyte molecule, wherein at least about 95% of the binding regions contain either zero or one analyte molecule, wherein at least about 80% of the binding regions contain either zero or one analyte molecule, and/or wherein at least about 50% of the binding regions contain either zero or one analyte molecule. The concentration of analyte molecules in the sample in embodiments (11) and (12) can be determined at least in part using a calibration curve, a Poisson distribution analysis and/or a Gaussian distribution analysis of the number of binding regions that contain at least one or one analyte molecule.

In embodiments (11) and (12), the sample can comprise one or more analyte molecules, the surface can include a plurality of particles each comprising a plurality of binding reagents for an analyte molecule wherein the plurality of particles is distributed across a plurality of resolvable binding regions, and the method can include: (i) binding the one or more analyte molecules to one or more binding reagents on the surface, and (ii) distributing the plurality of particles across an array of resolvable binding regions; and (iii) determining the presence or absence of an analyte molecule in each resolvable binding regions, so as to identify the number of binding regions that contain an analyte molecule and/or the number of binding regions that do not contain an analyte molecule.

Embodiment (13): a kit for the detection of an analyte of interest in a sample comprising, in one or more vials, containers, or compartments: (a) a surface comprising (i) a capture reagent for the analyte, and (ii) an anchoring reagent comprising an anchoring oligonucleotide sequence; (b) a first detection reagent for the analyte comprising a first proximity probe; (c) a second detection reagent for the analyte comprising a second proximity probe; and (d) a connector sequence comprising (i) an interior sequence complementary to the second proximity probe and (ii) two end sequences complementary to non-overlapping regions of the first proximity probe. In embodiments, the first and second proximity probes are nucleic acid probes.

Embodiment (14): a kit for the detection of an analyte of interest in a sample comprising, in one or more vials, containers, or compartments: (a) a surface comprising (i) a capture reagent for the analyte, and (ii) an anchoring reagent comprising an anchoring oligonucleotide sequence; and (b) a first detection reagent for the analyte comprising a first proximity probe; (c) a second detection reagent for the analyte comprising a second proximity probe; and (d) (i) a first connector oligonucleotide and (ii) a second connector oligonucleotide, wherein (x) a first end of the first connector and a first end of the second connector are complementary to two non-overlapping regions of the first proximity probe and (y) a second end of the first connector and a second end of the second connector are complementary to two non-overlapping regions of the first proximity probe. In embodiments, the first and second proximity probes are nucleic acid probes.

The capture reagent of embodiments (13) and (14) can comprise an antibody, antigen, ligand, receptor, oligonucleotide, hapten, epitope, mimotope, or aptamer, e.g., the capture reagent can include an antibody. Likewise, the first detection reagent can include an antibody, antigen, ligand, receptor, oligonucleotide, hapten, epitope, mimotope, or aptamer, e.g., the first detection reagent can include an antibody. Similarly, the second detection reagent can include an antibody, antigen, ligand, receptor, oligonucleotide, hapten, epitope, mimotope, or aptamer, e.g., the second detection reagent can include an antibody.

The surface of embodiments (13) and (14) can include a particle and/or a well of a multi-well plate. The can include a plurality of distinct binding domains and the capture reagent and the anchoring reagent are located on two distinct binding domains on the surface. If the surface is a well, the well can comprise a plurality of distinct binding domains and the capture reagent and the anchoring reagent are located on two distinct binding domains within the well. The surface can include a plurality of distinct binding domains and the capture reagent and the anchoring reagent are located on the same binding domain on the surface. If the surface is a well, the well can include a plurality of distinct binding domains and the capture reagent and the anchoring reagent are located on the same binding domain within the well. The capture reagent and the anchoring reagent can be within 10-100 nm on the surface, and optionally, the surface can include an electrode.

Embodiment (15): a method of detecting analytes in a sample, wherein the method can include: (a) binding the analytes to first and second detection reagents to form detection complexes, each detection complex comprising an analyte, a first detection reagent and a second detection reagent, wherein the first detection reagent has a first detectable label and the second detection reagent has a second detectable label, (b) partitioning the analytes across a plurality of reaction vessels so that the majority of reaction vessels contain one or fewer analytes; and (c) detecting the number of analyte molecules by counting the number of reaction vessels that contain the first and second detectable labels. In this embodiment (15), the first detection reagent can be an antibody, antigen, ligand, receptor, oligonucleotide, hapten, epitope, mimotope, or an aptamer, e.g., the first detection reagent is an antibody. Likewise, the second detection reagent can be an antibody, antigen, ligand, receptor, oligonucleotide, hapten, epitope, mimotope, or an aptamer, e.g., the second detection reagent is an antibody. In a specific example, the first and second detection reagents are antibodies to the analyte.

Step (a) of embodiment (15) can further comprise forming a solution comprising said analytes and said detection reagents and step (b) can include partitioning the solution across the plurality of reaction vessels so that the likelihood of finding an unbound first detection reagent and an unbound second detection reagent in the same vessel is less than 1 in 10. Alternatively, step (a) of embodiment (15) can further comprise forming a solution comprising said analytes and said detection reagents and step (b) can include partitioning the solution across the plurality of reaction vessels so that the likelihood of finding an unbound first detection reagent and an unbound second detection reagent in the same vessel is less than 1 in 100. Still further, step (a) of embodiment (15) can further comprise forming a solution comprising said analytes and said detection reagents and step (b) can include partitioning the solution across the plurality of reaction vessels so that the likelihood of finding an unbound first detection reagent and an unbound second detection reagent in the same vessel is less than 1 in 1000. Moreover, step (a) of embodiment (15) can further comprise forming a solution comprising said analytes and said detection reagents and step (b) can include partitioning the solution across the plurality of reaction vessels so that the likelihood of finding an unbound first detection reagent and an unbound second detection reagent in the same vessel is less than 1 in 10000.

Embodiment (16): a method of detecting analytes in a sample, the method comprising: (a) binding the analytes to capture reagents and first and second detection reagents to form detection complexes, each detection complex comprising a capture reagent, an analyte, a first detection reagent and a second detection reagent, wherein (i) the first detection reagent has a first detectable label and the second detection reagent has a second detectable label, (ii) the capture reagent is on a surface; (b) partitioning the analytes across a plurality of reaction vessels so that the majority of reaction vessels contain one or fewer analytes; and (c) detecting the number of analyte molecules by counting the number of reaction vessels that contain the first and second detectable labels. In this embodiment, the capture reagent can be an antibody, antigen, ligand, receptor, oligonucleotide, hapten, epitope, mimotope, or an aptamer, e.g., the capture reagent is an antibody. Likewise, the first detection reagent can be an antibody, antigen, ligand, receptor, oligonucleotide, hapten, epitope, mimotope, or an aptamer, e.g., the first detection reagent is an antibody. Moreover, the second detection reagent can be an antibody, antigen, ligand, receptor, oligonucleotide, hapten, epitope, mimotope, or an aptamer, e.g., the second detection reagent is an antibody. For example, the capture reagent, first and second detection reagents are antibodies to the analyte.

Step (b) of embodiment (16) can further comprise partitioning the solution across the plurality of reaction vessels so that the likelihood of finding an unbound first detection reagent and an unbound second detection reagent in the same vessel is less than 1 in 10. Moreover, step (b) of embodiment (16) can further comprise partitioning the solution across the plurality of reaction vessels so that the likelihood of finding an unbound first detection reagent and an unbound second detection reagent in the same vessel is less than 1 in 100. Step (b) of embodiment (16) can further comprise partitioning the solution across the plurality of reaction vessels so that the likelihood of finding an unbound first detection reagent and an unbound second detection reagent in the same vessel is less than 1 in 1000. Further, step (b) of embodiment (16) can further comprise partitioning the solution across the plurality of reaction vessels so that the likelihood of finding an unbound first detection reagent and an unbound second detection reagent in the same vessel is less than 1 in 10000.

The capture reagent in the detection complex of embodiment (16) can be on the surface prior to binding the capture reagent to the analyte; or the capture reagent in the detection complex binds to the analyte prior to immobilizing the capture reagent on the surface. In one example, the capture reagent can include a targeting moiety and the surface can include a targeting moiety complement. The targeting moiety and the targeting agent binding partner are selected from the following binding pairs: avidin-biotin, streptavidin-biotin, receptor-ligand, antibody-antigen, nucleic acid-nucleic acid complement.

The surface of embodiment (16) is a particle, and optionally, the capture reagents are immobilized on a plurality of particles and the partitioning of analytes is achieved by binding the analytes to the capture reagents and partitioning the particles into the plurality of reaction vessels. The capture reagents can be immobilized on a plurality of particles and the partitioning of analytes is achieved by partitioning the particles into a plurality of reaction vessels and then binding the analytes to the capture reagents.

Embodiment (16) can further comprise partitioning a plurality of particles into the plurality of reaction vessels, wherein the plurality of particles comprise targeting moieties, the capture reagents comprise a targeting moiety complement and the partitioning of analytes is achieved by binding the targeting moiety complements to the targeting moieties. Embodiment (16) can also include washing the particles prior to the partitioning step and/or after the partitioning step.

The surface of embodiment (16) can be a location within one of the reaction vessels. In this embodiment, the capture reagents can be immobilized on surfaces of the plurality of reaction vessels and the partitioning of analytes is achieved by binding the analytes to the capture reagents. Optionally, the reaction vessels have surfaces with targeting moieties immobilized thereon, the capture reagents comprise targeting moiety complements, and the partitioning of analytes is achieved by binding the targeting moiety complements to the targeting moieties. In this specific example, the method can further comprise washing the reaction vessel prior to the detection step.

The plurality of reaction vessels of embodiment (16) can comprise an array of nanowells. The plurality of reaction vessels can comprise at least 10,000 reaction vessels. In one embodiment, the reaction vessels have a volume of less than 100 nL. Optionally, less than 50% of the reaction vessels contain an analyte at the time of detection, less than 10% of the reaction vessels contain an analyte at the time of detection, less than 1% of the reaction vessels contain an analyte at the time of detection, and/or less than 0.1% of the reaction vessels contain an analyte at the time of detection.

In one aspect of embodiment (16), the first detectable label is a first enzyme of a coupled enzyme reaction system and the second detectable label is a second enzyme of the couple enzyme reaction system and the step (d) can include adding one or more substrates of the reaction system, producing a product of the enzyme reaction system and counting the reaction vessels that contain the product. In this embodiment, the product may only be produced when the first enzyme and second enzyme are in close proximity, e.g., the first and second enzymes are within 200 nM of each other, or the first and second enzymes are within 50 nM of each other. For example, the first enzyme is an oxidase, the second enzyme is a peroxidase, and the substrates comprise an oxidase substrate and a labeled Amplex Red or luminol derivative. In this embodiment, the oxidase can be glucose oxidase and the oxidase substrate is glucose. In one embodiment, the reactions catalyzed by the first and second enzymes in the detection complex lead to immobilization of the labeled Amplex Red or luminol on the surface, and optionally, the method can include measuring the labeled Amplex Red or luminol on the surface. The labeled Amplex Red or luminol is optionally biotin-Amplex Red or luminol, and the method can include adding labeled streptavidin and measuring the labels on the streptavidin.

Step (d) of embodiment (16) may include measuring a proximity-dependent signal that is generated when the first and second detectable labels are bound to the same analyte molecule and counting the number of reaction vessels that produce the proximity-dependent signal, e.g., the proximity-dependent signal is generated by PLA-RCA. For example, the first detectable label can be a FRET donor and the detectable label is a FRET acceptor and the proximity-dependent signal is measured by exciting the FRET donor and measuring emission from the FRET acceptor. In one example, the first and second detectable labels can be measured independently. Optionally, the first and second detectable labels are luminescent labels that differ from one another with respect to spectral properties. In one example, the first detectable label is a first enzyme that reacts with a first substrate to produce a first signal and the second detectable label is a second enzyme that reacts with a second substrate to produce a different second signal, and step (d) of embodiment (16) can include adding the first enzyme substrate and the second enzyme substrate and counting the number of reaction vessels in which the first and second signals are generated. The first and second signals can be changes in optical absorbance with different spectral properties. Optionally, first and second signals are luminescent signals with different spectral properties. The first and second enzymes can be hydrolytic enzymes, e.g., selected from a phosphatase, sulfatase, galactosidase, glucuronidase, or combinations thereof, and the first and second substrates are selected from phosphate, sulfate, galactoside and glucuronide modified stabilized dioxetanes, 4-methylumbelliferyl, fluorescein, or combinations thereof. In a specific example, the first and second enzymes are selected from horseradish peroxidase, beta-galactosidase, and alkaline phosphatase. The detection step of embodiment (16) can include detection via light scattering, optical absorbance, fluorescence, chemiluminescence, electrochemiluminescence, luminescence, radioactivity, magnetic field, or combinations thereof.

Embodiment (17): a kit for the detection of analytes in a sample, the kit comprising, in one or more vials, containers, or compartments: (a) a first detection reagent comprising a first detectable label; (b) a second detection reagent comprising a second detectable label; (c) a plurality of reaction vessels configured to contain one or fewer analyte molecules.

Embodiment (18): a kit for the detection of analytes in a sample, the kit comprising, in one or more vials, containers, or compartments: (a) a first detection reagent comprising a first detectable label; (b) a second detection reagent comprising a second detectable label; (c) a surface comprising a capture reagent; and (d) a plurality of reaction vessels configured to contain one or fewer analyte molecules.

The first and second detection reagents of embodiments (17) and (18) can comprise an antibody, antigen, ligand, receptor, oligonucleotide, hapten, epitope, mimotope, aptamer, or combinations thereof. In one example, the first and second detection reagents comprise an antibody. The capture antibody can comprise an antibody, antigen, ligand, receptor, oligonucleotide, hapten, epitope, mimotope, or aptamer, e.g., the capture antibody can include an antibody. In one example, the capture reagent can include a targeting moiety and the surface can include a targeting moiety complement, e.g., the targeting moiety and the targeting agent binding partner are selected from the following binding pairs: avidin-biotin, streptavidin-biotin, receptor-ligand, antibody-antigen, nucleic acid-nucleic acid complement.

The surface of embodiments (17) and (18) can be a particle, and for example, the capture reagents are immobilized on a plurality of particles. Alternatively, the surface is a location within one of the reaction vessels and e.g., the capture reagents are immobilized on surfaces of the plurality of reaction vessels. Optionally, the reaction vessels have surfaces with targeting moieties immobilized thereon and the capture reagents comprise targeting moiety complements. The plurality of reaction vessels can comprise an array of nanowells or water droplets dispersed in a water-in-oil emulsion. The plurality of reaction vessels can include at least 10,000 reaction vessels and optionally, a reaction vessel in the plurality has a volume of less than 100 nL.

In the kit of embodiments (17) and (18), the first detectable label can be a first enzyme of a coupled enzyme reaction system and the second detectable label is a second enzyme of the couple enzyme reaction system and the kit can include, in one or more additional vials, containers, or compartments, one or more substrates of the reaction system. For example, the first enzyme is an oxidase, the second enzyme is a peroxidase, and the substrates comprise an oxidase substrate and a labeled Amplex Red or luminol derivative. In a specific embodiment, the oxidase is glucose oxidase and the oxidase substrate is glucose. The first and second detectable labels can be components of a proximity-dependent system, e.g., the first detectable label is a FRET donor and the detectable label is a FRET acceptor. The first and second detectable labels can be measured independently. Optionally, the first and second detectable labels are luminescent labels that differ from one another with respect to spectral properties.

In the kit of embodiments (17) and (18), the first detectable label is a first enzyme that reacts with a first substrate to produce a first signal and the second detectable label is a second enzyme that reacts with a second substrate to produce a different second signal, and the kit can include, in one or more vials, containers, or compartments, the first enzyme substrate and the second enzyme substrate. Optionally, the first and second signals are changes in optical absorbance with different spectral properties. In one example, the first and second signals are luminescent signals with different spectral properties. The first and second enzymes can be hydrolytic enzymes. In one example, the first and second enzymes are selected from a phosphatase, sulfatase, galactosidase, glucuronidase, or combinations thereof. The first and second substrates can be selected from phosphate, sulfate, galactoside and glucuronide modified stabilized dioxetanes, 4-methylumbelliferyl, fluorescein, or combinations thereof. Optionally, the first and second enzymes are selected from horseradish peroxidase, beta-galactosidase, and alkaline phosphatase.

Embodiment (19): a method of detecting an analyte of interest in a sample comprising: (a) binding the analyte to a capture reagent, a first detection reagent having a first detectable label and a second detection reagent having a second detectable label and forming a complex, wherein the capture reagent in the complex is immobilized on a surface; (b) cross-linking the first and second detection reagent to form a cross-linked product; (c) releasing the cross-linked product from the surface into an eluent; (d) counting individual cross-linked products in the eluent that comprise both the first and second detectable labels. In this example (19), the capture reagent is an antibody, antigen, ligand, receptor, oligonucleotide, hapten, epitope, mimotope, or an aptamer, and in a specific example, the capture reagent is an antibody. Likewise, the first detection reagent can be an antibody, antigen, ligand, receptor, oligonucleotide, hapten, epitope, mimotope, or an aptamer, and in a specific example, the first detection reagent is an antibody. Moreover, the second detection reagent is an antibody, antigen, ligand, receptor, oligonucleotide, hapten, epitope, mimotope, or an aptamer, and specifically, the second detection reagent can be an antibody. In one particular example, the capture reagent and the first and second detection reagents are antibodies to the analyte.

Embodiment (19) can further comprise adding a cross-linking agent to cross-link the first and second detection reagents, e.g., the first and second detection reagents comprise reactive moieties and the cross-linking agent is a multifunctional cross-linking agent that links to the reactive moieties. For example, the reactive moieties comprise an amine, thiol, hydrazide, aldehyde, ester, iodoacetamide, maleimide, click chemistry reagents, and combinations thereof. The cross-linking agents can comprise an amine, thiol, hydrazide, aldehyde, ester, iodoacetamide, maleimide, click chemistry reagents, and combinations thereof. The first and second detection reagents can include binding moieties and the cross-linking agent is a multivalent binding partner of the binding moieties. In one example, the first and second detection reagents are antibodies of an animal species and the cross-linking agent is a multivalent anti-species antibody targeting antibodies of the animal species. The first and second detection reagents can comprise biotin and the cross-linking agent is streptavidin; the first and second detection reagents include streptavidin and the cross-linking agent is biotin; the first and second detection reagents are linked to streptavidin and the cross-linking agent is a polymer comprising a plurality of biotin molecules; and/or the first and second detection reagents comprise first and second nucleic acid probes, respectively, and the cross-linking agent is an oligonucleotide that can include a sequence complementary to the first nucleic acid probe and a separate sequence complementary to the second nucleic acid probe.

The surface of embodiment (19) can comprise a particle, a reaction vessel, e.g., a tube or ampoule, and/or the surface can include a well of a multi-well plate. The method of embodiment (19) can further include collecting the particles and washing the particles to remove impurities and optionally, the first and second detectable labels are measured by a measurement of light scattering, optical absorbance, fluorescence, chemiluminescence, electrochemiluminescence, bioluminescence, phosphorescence, radioactivity, magnetic field, or combinations thereof. In a specific example, the first and second detectable labels comprise an ECL label and the counting step can include measuring an ECL signal.

Embodiment (20): a kit for the detection of an analyte of interest in a sample comprising, in one or more vials, containers, or compartments: (a) a surface comprising an immobilized capture reagent; (b) a first detection reagent having a first detectable label; (c) a second detection reagent having a second detectable label; and (d) a cross-linking agent reactive with the first and second detection reagents.

The first and second detection reagents of embodiment (20) can comprise reactive moieties and the cross-linking agent is a multifunctional cross-linking agent that links to the reactive moieties. The reactive moieties can include an amine, thiol, hydrazide, aldehyde, ester, iodoacetamide, maleimide, click chemistry reagents, and combinations thereof; and the cross-linking agents can include an amine, thiol, hydrazide, aldehyde, ester, iodoacetamide, maleimide, click chemistry reagents, and combinations thereof. The first and second detection reagents of embodiment (20) can comprise binding moieties and the cross-linking agent is a multivalent binding partner of the binding moieties, e.g., the first and second detection reagents are antibodies of an animal species and the cross-linking agent is a multivalent anti-species antibody targeting antibodies of the animal species; the first and second detection reagents comprise biotin and the cross-linking agent is streptavidin; the first and second detection reagents comprise streptavidin and the cross-linking agent is biotin; the first and second detection reagents are linked to streptavidin and the cross-linking agent is a polymer comprising a plurality of biotin molecules; and/or the first and second detection reagents comprise first and second nucleic acid probes, respectively, and the cross-linking agent is an oligonucleotide that can include a sequence complementary to the first nucleic acid probe and a separate sequence complementary to the second nucleic acid probe.

The surface of embodiment (20) can include a particle, a well of a multi-well plate, or a reaction vessel, e.g., a tube or ampoule. In addition, the surface can include a plurality of distinct binding domains and the capture reagent is located on a distinct binding domain on the surface. If the surface is a well, the well can include a plurality of distinct binding domains and the capture reagent is located on a distinct binding domain within the well. The surface can also include an electrode.

Embodiment (21): a method of detecting an analyte of interest in a sample comprising: (a) binding the analyte to a capture reagent, a first detection reagent and a second detection reagent to form a complex, wherein the first detection reagent can include a first detectable label and a first nucleic acid probe, the second detection reagent can include a second detectable label and a second nucleic acid probe, and the capture reagent in the complex is immobilized on a surface; (b) cross-linking the first and second detection reagent by (i) hybridizing the first probe to the second probe, (ii) hybridizing the first and second probes to a third nucleic acid having regions complementary to the first and second probes, or (iii) ligating the first and second probes; (c) releasing the cross-linked product from the surface into an eluent; (d) counting individual cross-linked products in the eluent that comprise both the first and second detectable labels.

The capture reagent of embodiment (21) can be an antibody, antigen, ligand, receptor, oligonucleotide, hapten, epitope, mimotope, or an aptamer, e.g., the capture reagent is an antibody. Likewise, the first detection reagent is an antibody, antigen, ligand, receptor, oligonucleotide, hapten, epitope, mimotope, or an aptamer, e.g., the first detection reagent is an antibody; the second detection reagent can be an antibody, antigen, ligand, receptor, oligonucleotide, hapten, epitope, mimotope, or an aptamer, e.g., the second detection reagent is an antibody. In a specific example, the capture reagent and the first and second detection reagents are antibodies to the analyte.

The surface of embodiment (21) can include a particle, a reaction vessel, e.g., a tube or ampoule, or a well of a multi-well plate. The method of embodiment (21) can further comprise collecting the particles and washing the particles to remove impurities. The first and second detectable labels can be measured by a measurement of light scattering, optical absorbance, fluorescence, chemiluminescence, electrochemiluminescence, bioluminescence, phosphorescence, radioactivity, magnetic field, or combinations thereof. In a specific example, the first and second detectable labels comprise an ECL label and the counting step can include measuring an ECL signal.

Embodiment (22): a kit for the detection of an analyte of interest in a sample comprising, in one or more vials, containers, or compartments: (a) a surface comprising an immobilized capture reagent; (b) a first detection reagent having a first detectable label and a first nucleic acid probe; (c) a second detection reagent having a second detectable label and a second nucleic acid probe; and (d) a third nucleic acid having regions complementary to the first and second nucleic acid probes.

The surface of embodiment (22) can include a particle, a well of a multi-well plate, or a reaction vessel, e.g., a tube or ampoule. The surface can include a plurality of distinct binding domains and the capture reagent is located on a distinct binding domain on the surface, and if the surface is a well, the well can comprise a plurality of distinct binding domains and the capture reagent is located on a distinct binding domain within the well. The surface optionally can include an electrode.

Embodiment (23): a method of detecting an analyte of interest in a sample comprising: (a) binding the analyte to a capture reagent, a first detection reagent and a second detection reagent to form a complex, wherein the first detection reagent can include a first nucleic acid probe, the second detection reagent can include a second nucleic acid probe, and the capture reagent in the complex is immobilized on a surface; (b) extending the second nucleic acid probe to form an extended sequence comprising a detectable label, the extension being dependent on the co-localization of the first and second nucleic acid probes in the complex; (c) releasing the extended sequence from the surface into an eluent; and (d) counting individual extended sequences in the eluent. In this embodiment, the capture reagent is an antibody, antigen, ligand, receptor, oligonucleotide, hapten, epitope, mimotope, or an aptamer. In a specific example, the capture reagent is an antibody. Likewise, the first detection reagent is an antibody, antigen, ligand, receptor, oligonucleotide, hapten, epitope, mimotope, or an aptamer, and in a specific example, the first detection reagent is an antibody. The second detection reagent is an antibody, antigen, ligand, receptor, oligonucleotide, hapten, epitope, mimotope, or an aptamer, and specifically, the second detection reagent is an antibody. In a specific example, the capture reagent and the first and second detection reagents are antibodies to the analyte.

The surface of embodiment (23) can include a particle, a reaction vessel, e.g., a tube or ampoule; or a well of a multi-well plate. The method of embodiment (23) can further comprise collecting the particles and washing the particles to remove impurities.

The label of embodiment (23) can be measured by a measurement of light scattering, optical absorbance, fluorescence, chemiluminescence, electrochemiluminescence, bioluminescence, phosphorescence, radioactivity, magnetic field, or combinations thereof. In a specific example, the label can include an ECL label and the counting step can include measuring an ECL signal.

The extending step of embodiment (23) can include binding the probe to a template nucleic acid sequence and extending the probe by polymerase chain reaction. The extending step can also comprise binding the first probe to a template nucleic acid sequence, forming a circular nucleic acid template, and extending the circular template by rolling circle amplification. The extending step may comprise binding the first probe to a template nucleic acid sequence, binding the second probe to the template sequence, and ligating the first and second probes. Optionally, the label is a fluorescent label and the counting of individual extended sequences can include single molecule fluorescence detection, e.g., can include fluorescence correlation spectroscopy and/or fluorescence cross-correlation spectroscopy. Single molecule fluorescence detection can comprise flowing the eluent through a capillary, focusing a light source on a volume within the capillary to create an interrogation zone and observing the interrogation zone with a light detector to detect the passage of fluorescent molecules through the interrogation zone. Single molecule fluorescence detection can also comprise flowing the eluent through a capillary, focusing a light source on a volume within the capillary to create an interrogation zone and observing the interrogation zone with a light detector to detect the passage of fluorescent molecules through the interrogation zone.

Embodiment (24): method of detecting an analyte of interest in a sample comprising: (a) binding the analyte to a capture reagent, a first detection reagent having a first detectable label and a second detection reagent having a second detectable label and forming a complex, wherein the capture reagent in the complex is immobilized on a surface; (b) releasing the formed complex from the surface, by dissociating the immobilized capture reagent from surface into an eluent; and (c) counting individual products in the eluent that comprise both the first and second detectable labels. In this embodiment, the capture reagent is an antibody, antigen, ligand, receptor, oligonucleotide, hapten, epitope, mimotope, or an aptamer, e.g., the capture reagent is an antibody; the first detection reagent is an antibody, antigen, ligand, receptor, oligonucleotide, hapten, epitope, mimotope, or an aptamer, e.g., the first detection reagent is an antibody; the second detection reagent is an antibody, antigen, ligand, receptor, oligonucleotide, hapten, epitope, mimotope, or an aptamer, e.g., the second detection reagent is an antibody; and in a specific example, the capture reagent and the first and second detection reagents are antibodies to the analyte.

The surface of embodiment (24) can comprise a particle, a reaction vessel, e.g., a tube or ampoule, and/or a well of a multi-well plate. The method of embodiment (24) can include collecting the particles and washing the particles to remove impurities. The first and second detectable labels can be measured by a measurement of light scattering, optical absorbance, fluorescence, chemiluminescence, electrochemiluminescence, bioluminescence, phosphorescence, radioactivity, magnetic field, or combinations thereof, and in a specific embodiment, the first and second detectable labels comprise an ECL label and the counting step can include measuring an ECL signal.

Embodiment (25): a method of detecting an analyte of interest in a sample comprising: (a) binding the analyte to: (i) a capture reagent on a surface comprising the capture reagent for the analyte; (ii) a first detection reagent for the analyte that is linked to a first nucleic acid probe; and (iii) a second detection reagent for the analyte that is linked to a second nucleic acid probe; thereby forming a complex on the surface comprising the binding reagent, the analyte and the first and second detection reagents; (b) using an extension process that requires the first and second probes to be in proximity, extending the second probe to form an extended sequence; and (c) measuring the amount of extended sequence bound to the surface. In this embodiment, the capture reagent is an antibody, antigen, ligand, receptor, oligonucleotide, hapten, epitope, mimotope, or an aptamer, e.g., the capture reagent is an antibody; the first detection reagent is an antibody, antigen, ligand, receptor, oligonucleotide, hapten, epitope, mimotope, or an aptamer, e.g., the first detection reagent is an antibody; the second detection reagent is an antibody, antigen, ligand, receptor, oligonucleotide, hapten, epitope, mimotope, or an aptamer; e.g., the second detection reagent is an antibody; and in a specific example, the capture reagent and the first and second detection reagents are antibodies to the analyte.

The extended sequence of embodiment (25) can include one or more detection sequences and the measuring step can include contacting the extended sequence with a plurality of labeled probes complementary to the one or more detection sequences; the extended sequence can include one or more modified bases and the measuring step can include contacting the extended sequence with a plurality of detectable moieties capable of binding to the one or more modified bases; and/or the extended sequence can include one or more labeled bases and the measuring step can include detecting the presence of the one or more labeled bases. The one or more modified bases comprise an aptamer, aptamer ligand, antibody, antigen, ligand, receptor, hapten, epitope, or a mimotope and the plurality of detectable moieties each comprise a binding partner of the one or more modified bases and a detectable label. The one or more modified bases can include streptavidin and the plurality of detectable moieties each comprise biotin and a detectable label; the one or more modified bases comprise biotin and the plurality of detectable moieties each comprise streptavidin and a detectable label; the one or more modified bases comprise avidin and the plurality of detectable moieties each comprise biotin and a detectable label; and/or the one or more modified bases comprise biotin and the plurality of detectable moieties each comprise avidin and a detectable label.

Step (a) of embodiment (25) can include binding the analyte to the following species in the following order: (i) the capture reagent on a surface; and (ii) the detection reagent for the analyte; binding the analyte to the following species in the following order: (i) the detection reagent for the analyte; and (ii) the capture reagent on the surface; or binding the analyte to the following species simultaneously or substantially simultaneously: (i) the capture reagent on a surface; and (ii) the detection reagent for the analyte. The extending step can include binding the probe to a template nucleic acid sequence and extending the probe by polymerase chain reaction; or binding the probe to a template nucleic acid sequence, forming a circular nucleic acid template, and extending the circular template by rolling circle amplification. In this embodiment, the extended probe can remain localized on the surface following probe extension, e.g., the complex remains bound to the surface after the extending step. The extending step can include PCR (Polymerase Chain Reaction), LCR (Ligase Chain Reaction), SDA (Strand Displacement Amplification), 3SR (Self-Sustained Synthetic Reaction), or isothermal amplification methods. In a specific example, the extending step can include isothermal amplification methods, e.g., helicase-dependent amplification or rolling circle amplification (RCA).

The extension process of embodiment (25) can comprise contacting the complex formed in step (a) with a connector sequence comprising (i) an interior sequence complementary to the second probe and (ii) two end sequences complementary to non-overlapping regions of the first probe. The process can further comprise ligating the two end sequences of the connector oligonucleotide to form a circular target sequence that is hybridized to both the first and second probes. The extension process of embodiment (25) can also include contacting the complex formed in step (a) with a first connector oligonucleotide sequence including a first connector probe sequence complementary to a first region of the first probe and a first region on the second probe, and a second connector oligonucleotide comprising a second probe sequence complementary to a second non-overlapping region of the first probe and a second non-overlapping region of the second probe. The process can also include ligating the first and second connector oligonucleotides to form a circular target sequence that is hybridized to both the first and second probes.

The surface of embodiment (25) can comprise a particle or a well of a multi-well plate. The surface can include a plurality of distinct binding domains and the capture reagent(s) are located on two distinct binding domains on the surface. If the surface is a well, the well can include a plurality of distinct binding domains and the capture reagent(s) are located on two distinct binding domains within the well. The surface can include a plurality of distinct binding domains and the capture reagent(s) are located on the same binding domain on the surface, and if the surface is a well, the well can comprise a plurality of distinct binding domains and the capture reagent(s) are located on the same binding domain within the well. The surface can include an electrode and the measuring step can include applying a voltage waveform to the electrode to generate an electrochemiluminesce signal. The method optionally includes collecting the particle on an electrode and applying a voltage waveform to the electrode to generate an electrochemiluminescence signal. The measuring step may further comprise binding the extended sequence to a detection probe having a detectable label, measuring the detectable label and correlating the measurement to the amount of analyte in the sample, wherein the detection probe comprising a nucleic acid sequence that is complementary to a region of the extended sequence. The detectable label can be measured by a measurement of light scattering, optical absorbance, fluorescence, chemiluminescence, electrochemiluminescence, bioluminescence, phosphorescence, radioactivity, magnetic field, or combinations thereof. In a specific example, the detectable label is an ECL label and the measuring step can include measuring an ECL signal. The detection probe may have multiple ECL labels. The detection probe may be linked to a multiply ECL labeled moiety through linkages at the 3' end of the probe nucleotide component.

Embodiment (26): a kit for the detection of an analyte of interest in a sample comprising, in one or more vials, containers, or compartments: (a) a surface comprising a capture reagent for the analyte; (b) a first detection reagent for the analyte that is linked to a first nucleic acid probe; and (c) a second detection reagent for the analyte that is linked to a second nucleic acid probe.

The capture reagent of embodiment (26) can include an antibody, antigen, ligand, receptor, oligonucleotide, hapten, epitope, mimotope, or aptamer, e.g., the capture reagent can include an antibody; the first detection reagent can include an antibody, antigen, ligand, receptor, oligonucleotide, hapten, epitope, mimotope, or aptamer, e.g., the first detection reagent can include an antibody; the second detection reagent can include an antibody, antigen, ligand, receptor, oligonucleotide, hapten, epitope, mimotope, or aptamer, e.g., the second detection reagent can include an antibody; and the surface can include a particle and/or a well of a multi-well plate. The surface can include a plurality of distinct binding domains and the capture reagent(s) are located on two distinct binding domains on the surface; and if the surface is a well, the well can comprise a plurality of distinct binding domains and the capture reagent(s) are located on two distinct binding domains within the well. Optionally, the surface can include a plurality of distinct binding domains and the capture reagent(s) are located on the same binding domain on the surface, and if the surface is a well, the well can include a plurality of distinct binding domains and the capture reagent(s) are located on the same binding domain within the well. The surface can comprise an electrode.

The surface of embodiments 1-26 can include an interior surface of an assay container, e.g., a test tube, cuvette, flow cell, FACS cell sorter, cartridge, or a well of a multi-well plate. The surface can also comprise a slide, assay chips, or assay array; a pin, probe, bead, or filtration media; lateral flow media, e.g., a filtration membrane.

Embodiment (27): a method of detecting an analyte of interest in a sample comprising one or more analyte molecules, the method comprising: (a) contacting the sample with a surface comprising a plurality of resolvable binding regions positioned on the surface, each resolvable binding region comprising a plurality of capture reagents for one or more analyte molecules in the sample; (b) binding one or more analyte molecules to (i) one or more capture reagents on the surface; (ii) a first detection reagent for the analyte comprising a first detectable label, and (iii) a second detection reagent for the analyte comprising a second detectable label; thereby forming a detection complex on a resolvable binding domain on the surface comprising the capture reagent, the analyte and the first and second detection reagents, wherein the first and second detectable labels are different label compounds; (c) determining the presence or absence of the analyte molecule in each binding region; and (d) identifying the number of binding regions that contain the analyte molecule and/or the number of binding regions that do not contain the analyte molecule. The identifying step can include imaging an optical signal from the surface to generate an image comprising a plurality of pixels and each resolvable binding region maps to one or more pixels in the image. The resolvable binding regions can be elements of an array and/or configured to isolate individual particles. Each resolvable binding region can be an individual nano-wells having a volume<100 nL and/or at least 99% of the binding regions contain either zero or one analyte molecule; at least about 95% of the binding regions contain either zero or one analyte molecule; at least about 80% of the binding regions contain either zero or one analyte molecule; or at least about 50% of the binding regions contain either zero or one analyte molecule. The concentration of analyte molecules in the sample can be determined at least in part using a calibration curve, a Poisson distribution analysis and/or a Gaussian distribution analysis of the number of binding regions that contain at least one or one analyte molecule.

The surface of embodiment (27) can include a plurality of particles each comprising a plurality of capture reagents for an analyte molecule wherein the plurality of particles is distributed across a plurality of resolvable binding regions, and the method can include: (i) binding the one or more analyte molecules to one or more capture reagents on the surface, and first and second detection reagents for each of the one or more analyte molecules, wherein the first and second detection reagents include first and second detectable labels, respectively; (ii) distributing the plurality of particles across an array of resolvable binding regions; and (iii) determining the presence or absence of an analyte molecule in each resolvable binding regions, so as to identify the number of binding regions that contain an analyte molecule and/or the number of binding regions that do not contain an analyte molecule, wherein optionally, each resolvable binding region is an individual nano-wells having a volume<100 nL, and/or at least 99% of the binding regions contain either zero or one analyte molecule; at least about 95% of the binding regions contain either zero or one analyte molecule; at least about 80% of the binding regions contain either zero or one analyte molecule; and/or at least about 50% of the binding regions contain either zero or one analyte molecule.

The capture reagent in embodiment (27) is an antibody, antigen, ligand, receptor, oligonucleotide, hapten, epitope, mimotope, or an aptamer, e.g., the capture reagent is an antibody; the first detection reagent is an antibody, antigen, ligand, receptor, oligonucleotide, hapten, epitope, mimotope, or an aptamer, e.g., the first detection reagent is an antibody; the second detection reagent is an antibody, antigen, ligand, receptor, oligonucleotide, hapten, epitope, mimotope, or an aptamer, e.g., the second detection reagent is an antibody. In a specific example, the capture reagent and the first and second detection reagents are antibodies to the analyte.

Step (a) of embodiment (27) can include binding the analyte to the following species in the following order: (i) the capture reagent on a surface; and (ii) the first and second detection reagents for the analyte; binding the analyte to the following species in the following order: (i) the first and second detection reagents for the analyte; and (ii) the capture reagent on the surface; or binding the analyte to the following species simultaneously or substantially simultaneously: (i) the capture reagent on a surface; and (ii) the first and second detection reagents for the analyte.

The surface of embodiment (27) can include a particle or a well of a multi-well plate. In a specific example, the surface can include an electrode and the identifying step can include applying a voltage waveform to the electrode to generate an electrochemiluminesce signal. The method of embodiment (27) can further include collecting the particle on an electrode and applying a voltage waveform to the electrode to generate an electrochemiluminescence signal. The first detectable label is measured by a measurement of light scattering, optical absorbance, fluorescence, chemiluminescence, electrochemiluminescence, bioluminescence, phosphorescence, radioactivity, magnetic field, or combinations thereof; and/or the second detectable label is measured by a measurement of light scattering, optical absorbance, fluorescence, chemiluminescence, electrochemiluminescence, bioluminescence, phosphorescence, radioactivity, magnetic field, or combinations thereof. The first and second detectable labels can be measured independently, and in one example, the first and second detectable labels are luminescent labels that differ from one another with respect to spectral properties.

The surface of embodiment (27) can include an interior surface of an assay container, e.g., a test tube, cuvette, flow cell, FACS cell sorter, cartridge, or a well of a multi-well plate. The surface can also comprise a slide, assay chips, or assay array; a pin, probe, bead, or filtration media; lateral flow media, e.g., a filtration membrane.

Embodiment (28): a kit for the detection of an analyte of interest in a sample comprising one or more analyte molecules, the kit comprising: (a) a surface comprising a plurality of resolvable binding regions positioned on the surface, each resolvable binding region comprising a plurality of capture reagents for one or more analyte molecules in the sample; (b) a first detection reagent for the analyte comprising a first detectable label, and (c) a second detection reagent for the analyte comprising a second detectable label; wherein the first and second detectable labels are different label compounds.

The resolvable binding regions of embodiment (28) can be elements of an array and/or configured to isolate individual particles. Each resolvable binding region is optionally, an individual nano-wells having a volume<100 nL. The surface can include a plurality of particles each comprising a plurality of capture reagents for an analyte molecule wherein the plurality of particles is distributed across a plurality of resolvable binding regions, and the kit can include: first and second detection reagents for each of the one or more analyte molecules, wherein the first and second detection reagents include first and second detectable labels, respectively.

The capture reagent in embodiment (28) is an antibody, antigen, ligand, receptor, oligonucleotide, hapten, epitope, mimotope, or an aptamer, e.g., the capture reagent is an antibody; the first detection reagent is an antibody, antigen, ligand, receptor, oligonucleotide, hapten, epitope, mimotope, or an aptamer, e.g., the first detection reagent is an antibody; the second detection reagent is an antibody, antigen, ligand, receptor, oligonucleotide, hapten, epitope, mimotope, or an aptamer, e.g., the second detection reagent is an antibody. In a specific example, the capture reagent and the first and second detection reagents are antibodies to the analyte.

The surface of embodiment (28) can include a particle or a well of a multi-well plate. In a specific example, the surface can include an electrode and the identifying step can include applying a voltage waveform to the electrode to generate an electrochemiluminesce signal. The first detectable label is measured by a measurement of light scattering, optical absorbance, fluorescence, chemiluminescence, electrochemiluminescence, bioluminescence, phosphorescence, radioactivity, magnetic field, or combinations thereof; and/or the second detectable label is measured by a measurement of light scattering, optical absorbance, fluorescence, chemiluminescence, electrochemiluminescence, bioluminescence, phosphorescence, radioactivity, magnetic field, or combinations thereof. The first and second detectable labels can be measured independently, and in one example, the first and second detectable labels are luminescent labels that differ from one another with respect to spectral properties.

The surface of embodiment (28) can include an interior surface of an assay container, e.g., a test tube, cuvette, flow cell, FACS cell sorter, cartridge, or a well of a multi-well plate. The surface can also comprise a slide, assay chips, or assay array; a pin, probe, bead, or filtration media; lateral flow media, e.g., a filtration membrane.

Embodiment (29): a method of detecting HIV p24 in a sample comprising: (a) binding HIV p24 to: (i) a capture reagent on a surface comprising the capture reagent for HIV p24, and an anchoring reagent comprising an anchoring oligonucleotide sequence; (ii) a first detection reagent for HIV p24 that is linked to a first nucleic acid probe; and (iii) a second detection reagent for HIV p24 that is linked to a second nucleic acid probe; thereby forming a complex on the surface comprising the binding reagent, HIV p24 and the first and second detection reagents; (b) using an extension process that requires the first and second probes to be in proximity, extending the second probe to form an extended sequence comprising an anchoring sequence complement that is complementary to the anchoring sequence; (c) hybridizing the anchoring sequence to the anchoring sequence complement; and (d) measuring the amount of extended sequence bound to the surface.

The capture reagent of embodiment (29) can be an antibody, antigen, ligand, receptor, oligonucleotide, hapten, epitope, mimotope, or an aptamer. In a specific example, the capture reagent is an antibody. Likewise, the first detection reagent is an antibody, antigen, ligand, receptor, oligonucleotide, hapten, epitope, mimotope, or an aptamer, and in a particular example, the first detection reagent is an antibody. The second detection reagent can be an antibody, antigen, ligand, receptor, oligonucleotide, hapten, epitope, mimotope, or an aptamer, and in a particular example, the second detection reagent is an antibody. More particularly, the capture reagent and the first and second detection reagents are antibodies to HIV p24.

In embodiment (29), the anchoring oligonucleotide sequence can include a single stranded oligonucleotide sequence or a double stranded oligonucleotide sequence. In this embodiment, the extended sequence can include one or more detection sequences and the measuring step can include contacting the extended sequence with a plurality of labeled probes complementary to the one or more detection sequences. The extended sequence can also include one or more modified bases and the measuring step can include contacting the extended sequence with a plurality of detectable moieties capable of binding to the one or more modified bases. The extended sequence can further comprise one or more labeled bases and the measuring step can include detecting the presence of the one or more labeled bases. The one or more modified bases can comprise an aptamer, aptamer ligand, antibody, antigen, ligand, receptor, hapten, epitope, or a mimotope and the plurality of detectable moieties each comprise a binding partner of the one or more modified bases and a detectable label. For example, the one or more modified bases comprise streptavidin and the plurality of detectable moieties each comprise biotin and a detectable label; the one or more modified bases comprise biotin and the plurality of detectable moieties each comprise streptavidin and a detectable label; the one or more modified bases comprise avidin and the plurality of detectable moieties each comprise biotin and a detectable label; and/or the one or more modified bases comprise biotin and the plurality of detectable moieties each comprise avidin and a detectable label.

Step (a) of embodiment (29) can include binding HIV p24 to the following species in the following order: (i) the capture reagent on a surface; and (ii) the detection reagent for HIV p24. Alternatively, step (a) can include binding HIV p24 to the following species in the following order: (i) the detection reagent for HIV p24; and (ii) the capture reagent on the surface; or step (a) can include binding HIV p24 to the following species simultaneously or substantially simultaneously: (i) the capture reagent on a surface; and (ii) the detection reagent for HIV p24.

The extending step of embodiment (29) can include binding the probe to a template nucleic acid sequence and extending the probe by polymerase chain reaction. The extending step can further include binding the probe to a template nucleic acid sequence, forming a circular nucleic acid template, and extending the circular template by rolling circle amplification. The extended probe can remain localized on the surface following probe extension, e.g., the complex remains bound to the surface after the extending step. The extended probe can be bound to the anchoring reagent at a position within 10-100 μm of the location of the complex on the surface. In one specific embodiment, the extended probe is bound to the anchoring reagent at a position less than 100 μm, less than 50 μm, or more particularly, less than 10 μm from the location of the complex on the surface. The extending step can include PCR (Polymerase Chain Reaction), LCR (Ligase Chain Reaction), SDA (Strand Displacement Amplification), 3SR (Self-Sustained Synthetic Reaction), or isothermal amplification methods. In a particular example, the extending step can include isothermal amplification methods, e.g., is helicase-dependent amplification or rolling circle amplification (RCA).

The extension process of embodiment (29) can include contacting the complex formed in step (a) with a connector sequence comprising (i) an interior sequence complementary to the second probe and (ii) two end sequences complementary to non-overlapping regions of the first probe. The method can further include ligating the two end sequences of the connector oligonucleotide to form a circular target sequence that is hybridized to both the first and second probes. Alternatively, the extension process can include contacting the complex formed in step (a) of embodiment (29) with a first connector oligonucleotide sequence including a first connector probe sequence complementary to a first region of the first probe and a first region on the second probe, and a second connector oligonucleotide comprising a second probe sequence complementary to a second non-overlapping region of the first probe and a second non-overlapping region of the second probe; and optionally, ligating the first and second connector oligonucleotides to form a circular target sequence that is hybridized to both the first and second probes.

The surface of embodiment (29) can include a particle and/or a well of a multi-well plate. The surface can include a plurality of distinct binding domains and the capture reagent and the anchoring reagent are located on two distinct binding domains on the surface. If the surface is a well of a plate, the well can include a plurality of distinct binding domains and the capture reagent and the anchoring reagent are located on two distinct binding domains within the well. The surface can also include a plurality of distinct binding domains and the capture reagent and the anchoring reagent are located on the same binding domain on the surface. If the surface is a well of a plate, the well can include a plurality of distinct binding domains and the capture reagent and the anchoring reagent are located on the same binding domain within the well. The capture reagent and the anchoring reagent can be within 10-100 nm on the surface. In a specific example, the surface can include an electrode and the measuring step can include applying a voltage waveform to the electrode to generate an electrochemiluminesce signal, and optionally, the method of embodiment (29) further includes collecting the particle on an electrode and applying a voltage waveform to the electrode to generate an electrochemiluminescence signal.

The measuring step of embodiment (29) can include binding the extended sequence to a detection probe having a detectable label, measuring the detectable label and correlating the measurement to the amount of p24 in the sample, wherein the detection probe comprising a nucleic acid sequence that is complementary to a region of the extended sequence. The detectable label can be measured by a measurement of light scattering, optical absorbance, fluorescence, chemiluminescence, electrochemiluminescence, bioluminescence, phosphorescence, radioactivity, magnetic field, or combinations thereof. In a particular example, the detectable label is an ECL label and the measuring step can include measuring an ECL signal. The detection probe may have multiple ECL labels. The detection probe may be linked to a multiply ECL labeled moiety through linkages at the 3' end of the probe nucleotide component.

Embodiment (30): a kit for the detection of HIV p24 in a sample comprising, in one or more vials, containers, or compartments: (a) a surface comprising (i) a capture reagent for HIV p24, and (ii) an anchoring reagent comprising an anchoring oligonucleotide sequence; (b) a first detection reagent for HIV p24 that is linked to a first nucleic acid probe; and (c) a second detection reagent for HIV p24 that is linked to a second nucleic acid probe.

The capture reagent of embodiment (30) can include an antibody, antigen, ligand, receptor, oligonucleotide, hapten, epitope, mimotope, or aptamer, and in a specific example the capture reagent can include an antibody. Likewise, the first detection reagent can include an antibody, antigen, ligand, receptor, oligonucleotide, hapten, epitope, mimotope, or aptamer, and in a specific example, the first detection reagent can include an antibody. Similarly, the second detection reagent can include an antibody, antigen, ligand, receptor, oligonucleotide, hapten, epitope, mimotope, or aptamer, and in a specific example, the second detection reagent can include an antibody.

The surface of embodiment (30) can include a particle and/or a well of a multi-well plate. The surface can include a plurality of distinct binding domains and the capture reagent and the anchoring reagent are located on two distinct binding domains on the surface. If the surface is a well, the well can comprise a plurality of distinct binding domains and the capture reagent and the anchoring reagent are located on two distinct binding domains within the well. The surface can include a plurality of distinct binding domains and the capture reagent and the anchoring reagent are located on the same binding domain on the surface; and/or if the surface is a well, the well can include a plurality of distinct binding domains and the capture reagent and the anchoring reagent are located on the same binding domain within the well. The capture reagent and the anchoring reagent can be within 10-100 nm on the surface. In a specific example, the surface can include an electrode.

Embodiment (31): a method of detecting HIV p24 in a sample comprising: (a) binding HIV p24 to: (i) a capture reagent for HIV p24 on a surface comprising the capture reagent and an anchoring reagent; (ii) a first detection reagent for HIV p24 comprising a first proximity probe, and (iii) a second detection reagent for HIV p24 comprising a second proximity probe; thereby forming a detection complex on the surface comprising the capture reagent, HIV p24 and the first and second detection reagents; (b) contacting the detection complex formed in (c) with a connector sequence comprising (i) an interior sequence complementary to the second proximity probe and (ii) two end sequences complementary to non-overlapping regions of the first proximity probe; (c) hybridizing the connector sequence to the first and second proximity probes; (d) ligating the two end sequences of the connector oligonucleotide to form a circular target sequence that is hybridized to both the first and second proximity probes; (e) extending the second proximity probe by rolling circle amplification of the target sequence to generate an amplicon comprising a binding domain that binds the anchoring reagent; (f) binding the amplicon to the anchoring reagent; and (g) measuring the amount of amplicon on the surface.

Embodiment (32): a method of detecting HIV p24 in a sample comprising: (a) binding HIV p24 to: (i) a capture reagent for HIV p24 on a surface comprising the capture reagent and an anchoring reagent; (ii) a first detection reagent for HIV p24 comprising a first proximity probe, and (iii) a second detection reagent for HIV p24 comprising a second proximity probe; thereby forming a detection complex on the surface comprising the capture reagent, HIV p24 and the first and second detection reagents; (b) contacting the detection complex formed in (c) with a first connector oligonucleotide and a second connector oligonucleotide, wherein (i) a first end of the first connector and a first end of the second connector are complementary to two non-overlapping regions of the first proximity probe and (ii) a second end of the first connector and a second end of the second connector are complementary to two non-overlapping regions of the first proximity probe; (c) hybridizing the first and second connector oligonucleotides to the first and second proximity probes; (d) ligating the first and second connector oligonucleotides to form a circular target sequence that is hybridized to both the first and second proximity probes; (e) extending the second proximity probe by rolling circle amplification of the target sequence to generate an amplicon comprising a binding domain that binds the anchoring reagent; (f) binding the amplicon to the anchoring reagent; and (g) measuring the amount of amplicon on the surface.

The capture reagent of embodiments (31) and (32) is an antibody, antigen, ligand, receptor, oligonucleotide, hapten, epitope, mimotope, or an aptamer, and in a specific example, the capture reagent is an antibody. Similarly, the first detection reagent is an antibody, antigen, ligand, receptor, oligonucleotide, hapten, epitope, mimotope, or an aptamer, e.g., the first detection reagent is an antibody. In addition, the second detection reagent is an antibody, antigen, ligand, receptor, oligonucleotide, hapten, epitope, mimotope, or an aptamer, e.g., the second detection reagent is an antibody. In a specific example of embodiments (31) and (32), the capture reagent and the first and second detection reagents are antibodies to HIV p24.

The anchoring reagent of embodiments (31) and (32) can include an oligonucleotide sequence, aptamer, aptamer ligand, antibody, antigen, ligand, receptor, hapten, epitope, or a mimotope. In one example, the binding domain can include an aptamer and the anchoring reagent can include an aptamer ligand. The binding domain can include a nucleic acid sequence and the anchoring reagent can include a DNA-binding protein; and/or the anchoring reagent can include an oligonucleotide sequence and the amplicon can include a complementary oligonucleotide sequence.

The amplicon of embodiments (31) and (32) can include one or more detection sequences and the measuring step can include contacting the extended sequence with a plurality of labeled probes complementary to the one or more detection sequences. Moreover, the amplicon may further comprise one or more modified bases and the measuring step can include contacting the extended sequence with a plurality of detectable moieties capable of binding to the one or more modified bases. Still further, the amplicon may further include one or more labeled bases and the measuring step can include detecting the presence of the one or more labeled bases. The one or more modified bases can comprise an aptamer, aptamer ligand, antibody, antigen, ligand, receptor, hapten, epitope, or a mimotope and the plurality of detectable moieties each comprise a binding partner of the one or more modified bases and a detectable label. The one or more modified bases can comprise streptavidin and the plurality of detectable moieties each comprise biotin and a detectable label; the one or more modified bases can comprise biotin and the plurality of detectable moieties each comprise streptavidin and a detectable label; the one or more modified bases can comprise avidin and the plurality of detectable moieties each comprise biotin and a detectable label; and/or the one or more modified bases can comprise biotin and the plurality of detectable moieties each comprise avidin and a detectable label.

Step (a) of embodiments (31) and (32) can include binding HIV p24 to the following species in the following order: (i) the capture reagent on a surface; and (ii) the first and second detection reagents for HIV p24. Alternatively, step (a) can include binding HIV p24 to the following species in the following order: (i) the first and second detection reagents for HIV p24; and (ii) the capture reagent on the surface. Still further, step (a) can include binding HIV p24 to the following species simultaneously or substantially simultaneously: (i) the capture reagent on a surface; and (ii) the first and second detection reagents for HIV p24.

The amplicon of embodiments (31) and (32) remains localized on the surface following probe extension. The complex can remain bound to the surface after the extending step. For example, the amplicon is bound to the anchoring reagent at a position within 10-100 µm of the location of the complex on the surface. In one specific embodiment, the extended probe is bound to the anchoring reagent at a position less than 100 µm, less than 50 µm, or more particularly, less than 10 µm from the location of the complex on the surface.

The surface of embodiments (31) and (32) can include a particle and/or a well of a multi-well plate. The surface can include a plurality of distinct binding domains and the capture reagent and the anchoring reagent are located on two distinct binding domains on the surface. If the surface is a well of a plate, the well can comprise a plurality of distinct binding domains and the capture reagent and the anchoring reagent are located on two distinct binding domains within the well. The surface can include a plurality of distinct binding domains and the capture reagent and the anchoring reagent are located on the same binding domain on the surface. If the surface is a well of a plate, the well can include a plurality of distinct binding domains and the capture reagent and the anchoring reagent are located on the same binding domain within the well. In a specific example, the capture reagent and the anchoring reagent are within 10-100 nm on the surface.

Still further, the surface can include an electrode and the measuring step can include applying a voltage waveform to the electrode to generate an electrochemiluminesce signal. In these embodiments ((31) and (32)), the method can further include collecting the particle on an electrode and applying a voltage waveform to the electrode to generate an electrochemiluminescence signal. The measuring step can include binding the amplicon to a detection probe having a detectable label, measuring the detectable label and correlating the measurement to the amount of analyte in the sample, wherein the detection probe comprising a nucleic acid sequence that is complementary to a region of the amplicon. The detectable label is measured by a measurement of light scattering, optical absorbance, fluorescence, chemiluminescence, electrochemiluminescence, bioluminescence, phosphorescence, radioactivity, magnetic field, or combinations thereof. For example, the detectable label is an ECL label and the measuring step can include measuring an ECL signal. The detection probe may have multiple ECL labels. The detection probe may be linked to a multiply ECL labeled moiety through linkages at the 3' end of the probe nucleotide component.

Embodiment (33): A method of detecting an analyte of interest in a sample comprising: (a) concentrating the sample under conditions sufficient to form an analyte complex comprising the analyte bound to a first detection reagent, wherein the first detection reagent is linked to a first nucleic acid probe; (b) binding the analyte complex formed in step (a) to: (i) a capture reagent on a surface comprising the capture reagent for the analyte, and an anchoring reagent comprising an anchoring oligonucleotide sequence; and (ii) a second detection reagent for the analyte that is linked to a second nucleic acid probe; thereby forming a complex on the surface comprising the capture reagent, the analyte and the first and second detection reagents; (c) using an extension process that requires the first and second probes to be in proximity, extending the second probe to form an extended sequence comprising an anchoring sequence complement that is complementary to the anchoring sequence; (d) hybridizing the anchoring sequence to the anchoring sequence complement; and (e) measuring the amount of extended sequence bound to the surface. The concentrating step (a) can further comprise (i) contacting the sample including the analyte with a solid phase linked to a targeting agent complementary to at least a portion of the first nucleic acid probe, thereby forming a concentration complex comprising the analyte bound to the solid phase via a binding reaction between the first nucleic acid probe and the targeting agent; (ii) collecting the concentration complex; (iii) separating unbound components of the sample from the concentration complex; and (iv) releasing the concentration complex to separate the solid phase from the analyte to form the analyte complex.

Embodiment (34): A kit for the detection of an analyte of interest in a sample comprising, in one or more vials, containers, or compartments: (a) a surface comprising (i) a capture reagent for the analyte, and (ii) an anchoring reagent comprising an anchoring oligonucleotide sequence; (b) a first detection reagent for the analyte that is linked to a first nucleic acid probe; (c) a second detection reagent for the analyte that is linked to a second nucleic acid probe; and (d) a solid phase including a targeting agent complementary to at least a portion of the first nucleic acid probe.

Embodiment (35): A method of detecting an exosome in a sample comprising: (a) binding the exosome to: (i) a capture reagent on a surface comprising the capture reagent for the exosome, and an anchoring reagent comprising an anchoring oligonucleotide sequence; (ii) a first detection reagent for the exosome that is linked to a first nucleic acid probe; and (iii) a second detection reagent for the exosome that is linked to a second nucleic acid probe; thereby forming a complex on the surface comprising the binding reagent, the exosome and the first and second detection reagents; (b) using an extension process that requires the first and second probes to be in proximity, extending the second probe to form an extended sequence comprising an anchoring sequence complement that is complementary to the anchoring sequence; (c) hybridizing the anchoring sequence to the anchoring sequence complement; and (d) measuring the amount of extended sequence bound to the surface.

Embodiment (36): A kit for the detection of an exosome of interest in a sample comprising, in one or more vials, containers, or compartments: (a) a surface comprising (i) a capture reagent for the exosome, and (ii) an anchoring reagent comprising an anchoring oligonucleotide sequence; (b) a first detection reagent for the exosome that is linked to a first nucleic acid probe; and (c) a second detection reagent for the exosome that is linked to a second nucleic acid probe.

Embodiment (37): a method of detecting an analyte of interest in a sample comprising: binding the analyte to: (i) a capture reagent on a surface comprising the capture reagent for the analyte, and an anchoring reagent comprising an anchoring sequence; (ii) a first detection reagent for the analyte that is linked to a first nucleic acid probe; (iii) a second detection reagent for the analyte that is linked to a second nucleic acid probe, thereby forming a complex on the surface comprising the binding reagent, the analyte and the first and second detection reagents; (b) extending the first and second nucleic acid probes to form an extended sequence comprising an anchoring sequence complement that is complementary to the anchoring sequence; (c) hybridizing the anchoring sequence to the anchoring sequence complement; and (d) measuring the amount of extended sequence bound to the surface using the labeled probe of Formula I:

Formula I

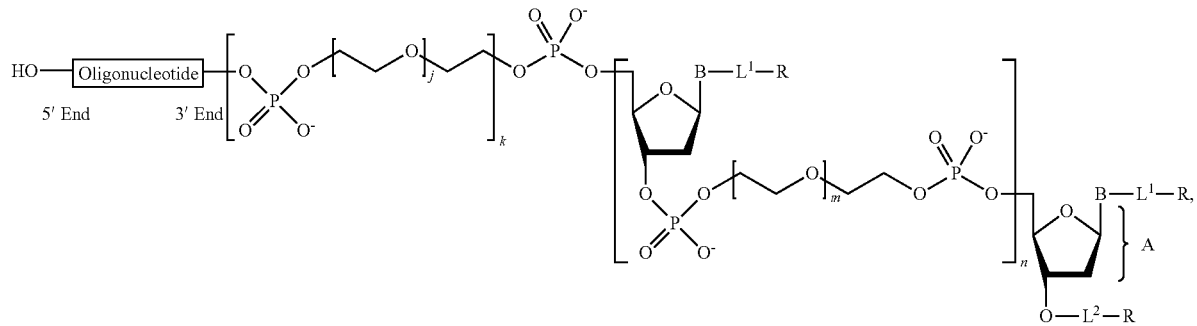

wherein B is a nucleotide base, R is an electrochemiluminescent label, $L^1$ is a linking group, $L^2$ is a linking group, j is an integer between 0 and 11, k is an integer between 0 and 1, m is an integer between 0 and 11, and n is an integer between 0 and 5.

Embodiment (38): a method of detecting an analyte of interest in a sample comprising: binding the analyte to: (i) a capture reagent on a surface comprising the capture reagent for the analyte and an anchoring reagent comprising an anchoring sequence; and (ii) a detection reagent for the analyte that is linked to a nucleic acid probe, thereby forming a complex on the surface comprising the binding reagent, the analyte and the detection reagent; (b) extending the nucleic acid probe to form an extended sequence comprising an anchoring sequence complement that is complementary to the anchoring sequence; (c) hybridizing the anchoring sequence to the anchoring sequence complement; and (d) measuring the amount of extended sequence bound to the surface using the labeled probe of Formula I.

In any of the above embodiments (1) to (38), the anchoring reagent is attached to the surface before, during, or after binding the analyte to the capture reagent. In embodiments comprising a kit, the anchoring reagent is provided separately from the surface and then immobilized on the surface, wherein the capture reagent is immobilized on the surface. In embodiments comprising a kit, the anchoring reagent and the capture reagent are provided as immobilized on the surface.

Any of the above embodiments (1) to (38) can include a labeled probe of Formula I:

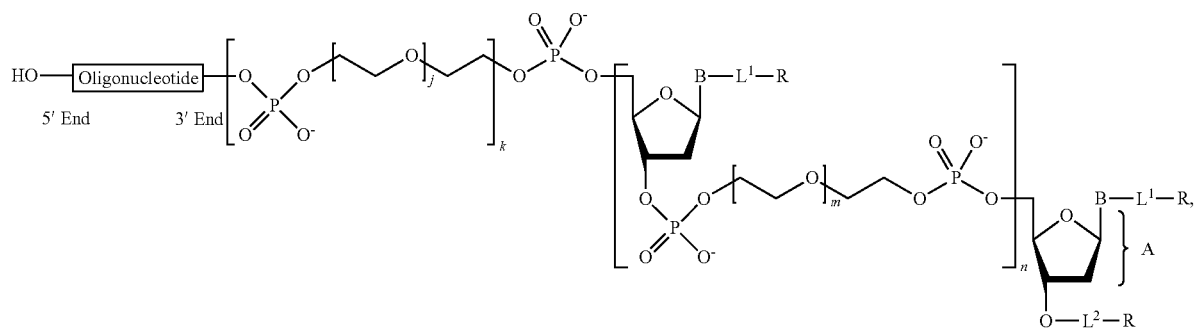

Formula I wherein B is a nucleotide base, R is an electrochemiluminescent label, $L^1$ is a linking group, $L^2$ is a linking group, j is an integer between 0 and 11, k is an integer between 0 and 1, m is an integer between 0 and 11 and n is an integer between 0 and 5.

Any of the above embodiments (1) to (38) can include a labeled probe of Formula II:

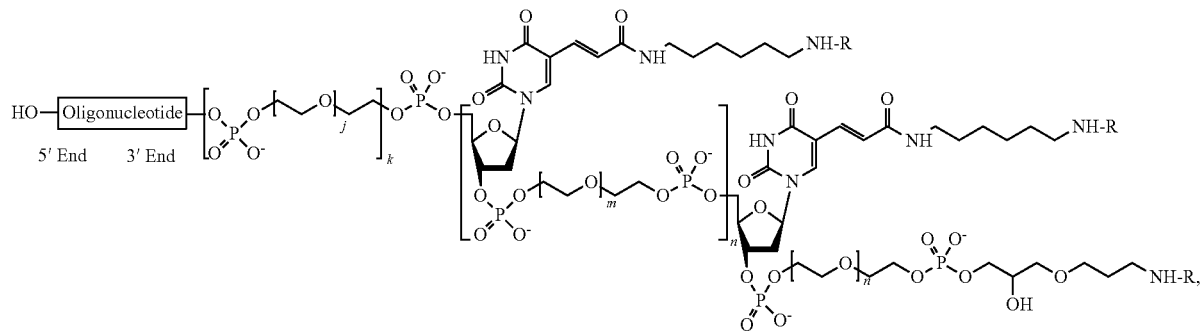

Formula II wherein j is an integer between 0 and 11, k is an integer between 0 and 1, m is an integer between 0 and 11, n is an integer between 0 and 5, and R is an electrochemiluminescence label:

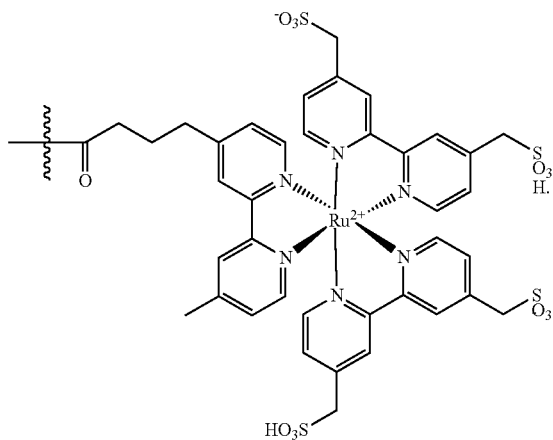

Any of the methods described in embodiments herein can include a method of measuring electrochemiluminescence comprising: (a) applying a potential to an electrode under conditions in which a complex that is in proximity to the electrode will emit electrochemiluminescence, wherein the complex comprises a target oligonucleotide and a labeled probe provided herein, wherein the labeled probe comprises an oligonucleotide complementary to the target oligonucleotide; and (b) measuring the emitted electrochemiluminescence.

The nucleic acid probe described in any of the embodiments (1) to (38), e.g., linked to a detection reagent, can comprise an oligonucleotide, wherein the oligonucleotide is 14-24 nucleotides in length and comprises 14 or 15 contiguous nucleotides of 5'-GACAGAACTAGACAC-3' (SEQ ID NO:33). In embodiments, the invention provides a method of conjugating a nucleic acid probe to a non-nucleic acid detection reagent to form a conjugate, comprising contacting the detection reagent and the nucleic acid probe with a heterobifunctional cross-linking agent under conditions where the detection reagent reacts with a first reactive group of the cross-linking agent and the nucleic acid reacts with a second reactive group of the cross-linking agent to form the conjugate, wherein the heterobifunctional cross-linking agent comprises (i) a first reactive group capable of reacting with the detection reagent to attach the cross-linking agent to the detection reagent and (ii) a second reactive group capable of reacting with the nucleic acid probe to attach the cross-linking agent to the nucleic acid probe, while being substantially unreactive to the detection reagent, wherein the method does not comprise purifying a reaction product of the detection reagent and the cross-linking agent, prior to the reaction of the cross-linking agent with the nucleic acid probe.

In embodiments, the invention provides a method of conjugating a nucleic acid probe to a non-nucleic acid detection reagent to form a conjugate, comprising (a) contacting the detection reagent with a heterobifunctional cross-linking agent under conditions where the detection reagent reacts with a first reactive group of the cross-linking agent to form a first composition, wherein the heterobifunctional cross-linking agent comprises (i) a first reactive group capable of reacting with the detection reagent to attach the cross-linking agent to the detection reagent and (ii) a second reactive group capable of reacting with the nucleic acid probe to attach the cross-linking agent to the nucleic acid probe, while being substantially unreactive to the detection reagent; (b) contacting the first composition with the nucleic acid probe under conditions where the second reactive group in the cross-linking agent reacts with the nucleic acid probe to form the conjugate, wherein the method does not comprise purifying the reaction product of the detection reagent and the cross-linking agent, prior to the reaction of the cross-linking agent with the nucleic acid probe.

In embodiments, the invention provides a kit for conjugating a nucleic acid probe to a non-nucleic acid detection reagent to form a conjugate, comprising: (a) a heterobifunctional cross-linking agent comprising (i) a first reactive group capable of reacting with the detection reagent to attach the cross-linking agent to the detection reagent; and (ii) a second reactive group capable of reacting with the nucleic acid probe to attach the cross-linking agent to the nucleic acid probe, while being substantially unreactive to the detection reagent; (b) a first size separation device capable of separating the conjugate from unreacted nucleic acid probe; and (c) a nucleic acid binding fluorophore, wherein the fluorophore's fluorescence intensity increases when the fluorophore is bound to nucleic acid. In embodiments, the invention provides a method for conjugating a nucleic acid probe to a non-nucleic acid detection reagent to form a conjugate comprising: (a) reacting a detection reagent and a nucleic acid probe to form a conjugate; (b) using a size separation device to separate the conjugate from unreacted nucleic acid probe to form purified conjugate; (c) forming a test composition comprising a sample of the purified conjugate and a nucleic acid binding fluorophore selected for having a fluorescence intensity that increases when the fluorophore bound to nucleic acid; and (d) measuring the fluorescence of the test composition to determine an amount of nucleic acid probe in the purified conjugate.

BRIEF DESCRIPTION OF THE FIGURES

FIG. 1(a) shows the use of an anchoring reagent to bind to and stabilize a detection complex comprising a capture reagent, an analyte of interest, and a detection reagent including a nucleic acid probe. The nucleic acid probe is extended to bind to the anchoring reagent. In FIG. 1(b), the anchoring reagent includes an oligonucleotide sequence that includes a region complementary to a portion of the extended sequence that forms on the detection reagent. FIG. 1(c) shows a specific embodiment in which two detection reagents are used to bind the analyte, each including a nucleic acid probe. The probes on the detection reagents are subjected to an amplification process that enables the hybridization of one extended probe to the anchor oligonucleotide sequence.

FIG. 4(a) also includes an amplification reagent that includes an anchoring oligonucleotide sequence that is complementary to a sequence of the amplicon that forms as the assay method progresses.

FIGS. 5 and 6(a)-(b) illustrate alternative methods of generating an amplicon that can be amplified by rolling circle amplification.

FIG. 7 illustrates an alternative embodiment in which a portion of each of the proximity probes in the sandwich complex is temporarily protected by short strands of RNA hybridized to each segment. Those strands are enzymatically removed to allow the proximity probes to hybridize to one another and the chain to be extended.

FIG. 10(a)-(b) show fluorescence microscopy images with (a) and without (b) the use of an anchoring reagent.

FIGS. 14(a)-(c) show the results of an assay for HIVp24 including an analyte concentration step.

FIG. 26 shows (a) for six different nucleic acid-sensitive fluorescent dyes (left) the relative fluorescence signals after binding to free oligonucleotides vs. oligonucleotides conjugated to an antibody; (center) the percent of signal from the antibody-oligonucleotide conjugate associated with interaction of the dye with the protein and (right) the signal to background ratio obtained during measurement of 100 ng of conjugate; and (b) the fluorescence signal measured using the SYBR Green I dye for three antibody-oligonucleotide conjugates as a function of the concentration of oligonucleotide (and the comparison of these signals to those obtained with unconjugated oligonucleotide).

FIG. 32 compares the performance of different Circ oligonucleotide constructs in an amplified ECL assay for an analyte.

DETAILED DESCRIPTION OF THE INVENTION

Figure 1A:
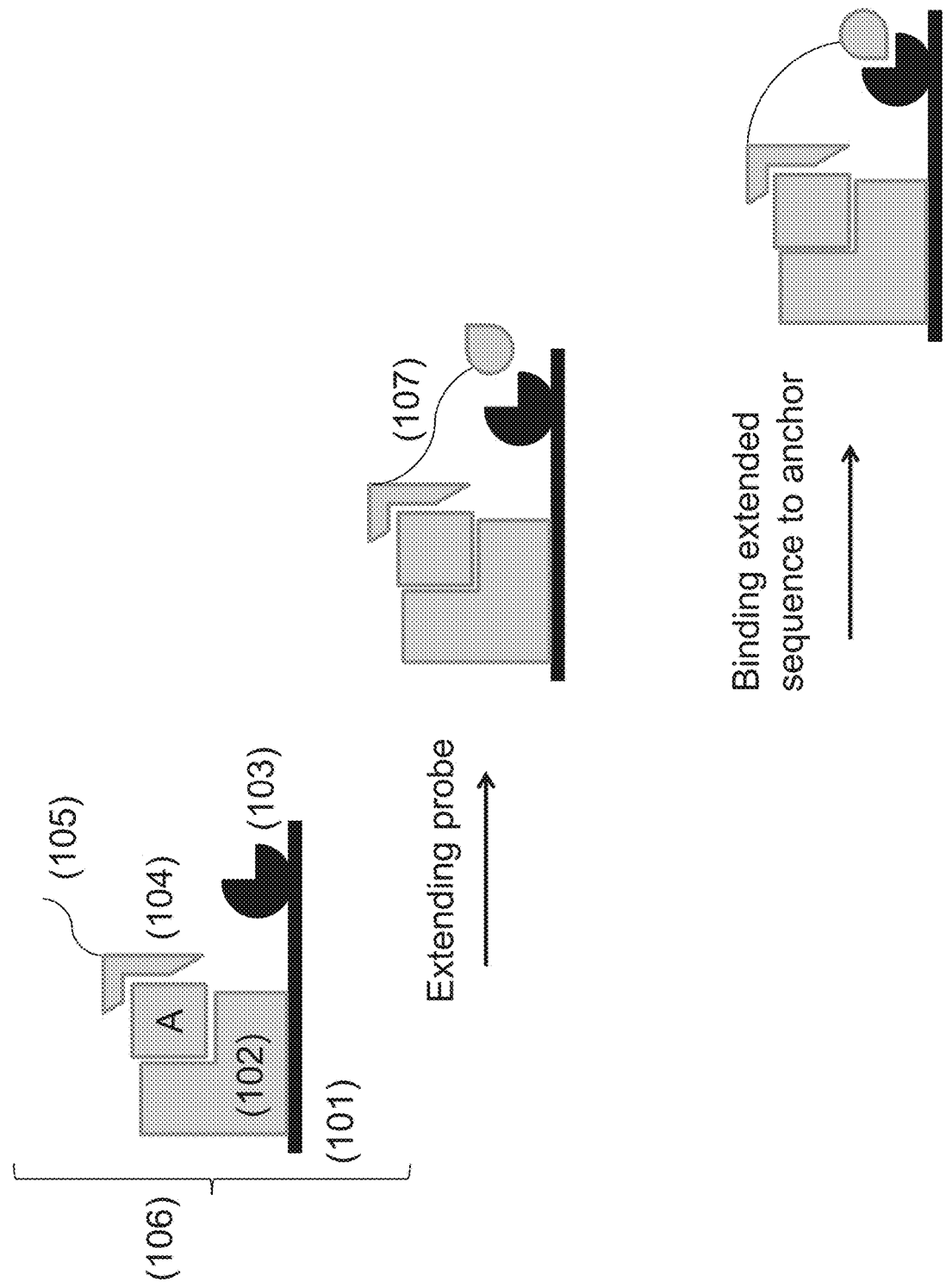
FIG. 1(a)-(c) illustrate the use of an anchoring reagent in an immunoassay.

Unless otherwise defined herein, scientific and technical terms used in connection with the present invention shall have the meanings that are commonly understood by those of ordinary skill in the art. Further, unless otherwise required by context, singular terms shall include pluralities and plural terms shall include the singular. The articles "a" and "an" are used herein to refer to one or to more than one (i.e., to at least one) of the grammatical object of the article. By way of example, "an element" means one element or more than one element.

As used herein, the term "about" is used to indicate that a value includes the inherent variation of error for the device, or the method being employed to determine the value.

As used herein, "between" is a range inclusive of the ends of the range. For example, a number between x and y explicitly includes the numbers x and y, and any numbers that fall within x and y.

As used herein, "kit" refers to a set of components that are provided or gathered to be used together, for example, to create a composition, to manufacture a device, or to carry out a method. A kit can include one or more components. The components of a kit may be provided in one package or in multiple packages, each of which can contain one or more of the components. A listed component of a kit, may in turn, also be provided as a single physical part or as multiple parts to be combined for the kit use. For example, an instrument component of a kit may be provided fully assembled or as multiple instrument parts to be assembled prior to use. Similarly, a liquid reagent component of a kit may be provided as a complete liquid formulation in a container, as one or more dry reagents and one or more liquid diluents to be combined to provide the complete liquid formulation, or as two or more liquid solutions to be combined to provide the complete liquid formulation. As is known in the art, kit components for assays are often shipped and stored separately due to having different storage needs, e.g., storage temperatures of 4° C. versus −70° C.

In the context of analytes measured in an assay, or a class of reagents used in an assay, the term "plurality" means more than one structurally and/or functionally different analyte or reagent (e.g., capture antibody A and capture antibody B), rather than just more than one copy of the analyte or reagent (e.g., capture antibody A and another copy of capture antibody A). For example, the term "plurality of immobilized antigens," means that more than one structurally or functionally different antigen is immobilized, and does not describe a situation where there are multiple copies of only one single antigen. However, use of the term "plurality" in this context does not preclude the possibility that multiple copies are present of any of the plurality of analytes or reagents. For example, a plurality of immobilized antigens could refer to immobilized antigens that comprise one or more copies of Antigen A and one or more copies of Antigen B.

As used herein, the term "polypeptide" is intended to encompass a singular "polypeptide" as well as plural "polypeptides," and refers to a molecule composed of monomers (amino acids) linearly linked by amide bonds (i.e., peptide bonds). The term "polypeptide" refers to any chain or chains of amino acids, and does not refer to a specific length of the product. Thus, peptides, dipeptides, tripeptides, oligopeptides, "protein," "amino acid chain," or any other term used to refer to a chain or chains of amino acids, are included within the definition of "polypeptide," and the term "polypeptide" may be used instead of or interchangeably with any of these terms. The term "polypeptide" is also intended to refer to the products of post-expression modifications of the polypeptide, including without limitation glycosylation, acetylation, phosphorylation, amidation, derivatization by known protecting/blocking groups, proteolytic cleavage, or modification by non-naturally occurring amino acids. A polypeptide may be derived from a natural biological source or produced by recombinant technology, but is not necessarily translated from a designated nucleic acid sequence. It may be generated in any manner, including by chemical synthesis. In the context of polypeptides, a "linear sequence" or a "sequence" is an order of amino acids in a polypeptide in an amino to carboxyl terminal direction in which residues that neighbor each other in the sequence are contiguous in the primary structure of the polypeptide.

A "binding reagent" or "binding substance" refers to reagent or substance characterized by an ability to bind to another substance (which may be referred to as the "binding partner"). Binding reagents, binding substances and binding partners of the invention include "antigen-binding substances", a term that refers to antibodies, antibody fragments, antibody derivatives, antibody analogues, antibody variants, engineered antibodies and other substances that bind to antigens in a manner similar to antibodies. Antigen-binding substances include substances that comprise at least one heavy or light chain complementarity determining region (CDR) of an antibody. Antigen-binding substances include substances that comprise at least two CDRs from one or more antibodies. Antigen-binding substances include substances that comprise at least three CDRs from one or more antibodies. Antigen-binding substances include substances that comprise at least four CDRs from one or more antibodies. Antigen-binding substances include substances that comprise at least five CDRs from one or more antibodies. Antigen-binding substances include substances that comprise at least six CDRs from one or more antibodies.

Antigen-binding substances derived from antibodies or other antigen-binding substances may include such as adding, removing or replacing one or more antibodies in the antibody sequence to improve the affinity and/or specificity of the antibody for its desired target (for example, through the use of established methods for "affinity maturation" of antibodies), and/or to improve other characteristics of the reagent (for example, to improve stability or to reduce interactions with potentially interfering components in samples such as complement, rheumatoid factor or anti-species antibodies). In an embodiment, an antigen-binding substance is the Fab portion of an antibody, reducing the potential interference of Fc binding components of a sample. In an embodiment for measuring an analyte in a sample from a specific species, an antigen-binding substance is a modified form of an antibody designed to match an antibody class of that species (for example, a mouse antibody may be humanized for use in an assay conducted on human samples, to avoid interference from human anti-mouse antibodies (i.e., human antibodies targeting mouse antibodies) that are often present in human samples.

As used herein, "human" or "fully human" antibodies include antibodies having the amino acid sequence of a human immunoglobulin and include antibodies isolated from human immunoglobulin libraries or from animals transgenic for one or more human immunoglobulins and that do not express endogenous immunoglobulins, as described infra and, for example, in U.S. Pat. No. 5,939,598. "Human" or "fully human" antibodies also include antibodies comprising at least the variable domain of a heavy chain, or at least the variable domains of a heavy chain and a light chain, where the variable domain(s) have the amino acid sequence of human immunoglobulin variable domain(s). "Humanized" antibodies are antibodies from other species, whose constant and framework sequences have been modified to try match a class of human antibodies, while maintaining the ability to bind the target antigen of the original antibody.

The terms "antibody" and "immunoglobulin" are used interchangeably herein. An antibody or immunoglobulin comprises at least the variable domain of a heavy chain, and normally comprises at least the variable domains of a heavy chain and a light chain. Basic immunoglobulin structures in vertebrate systems are relatively well understood. See, e.g., Harlow et al. (1988) Antibodies: A Laboratory Manual (2nd ed.; Cold Spring Harbor Laboratory Press).

The term "immunoglobulin" comprises various broad classes of polypeptides that can be distinguished biochemically. Those skilled in the art will appreciate that heavy chains produced by an animal species may classified in different classes, such as gamma, mu, alpha, delta, or epsilon, and these classes may be further divisible into subclasses (e.g., gamma1-gamma4). It is the nature of this chain that determines the "class" of the antibody as IgG, IgM, IgA IgG, or IgE, respectively. The immunoglobulin subclasses (isotypes) e.g., IgG1, IgG2, IgG3, IgG4, IgA1, etc. are well characterized and are known to confer functional specialization. Modified versions of each of these classes and isotypes are readily discernable to the skilled artisan in view of the instant disclosure and, accordingly, are within the scope of the instant invention. All immunoglobulin classes are clearly within the scope of the present invention. The following discussion will generally be directed to the IgG class of immunoglobulins. Most forms of IgG produced in mammals comprise two identical light chain polypeptides of molecular weight approximately 23,000 Daltons, and two identical heavy chain polypeptides of molecular weight 53,000-70,000. The four chains are typically joined by disulfide bonds in a "Y" configuration wherein the light chains bracket the heavy chains starting at the mouth of the "Y" and continuing through the variable region. The exact molecular weights may vary from species to species and between subclasses. Some species, such as camelid species, may also produce IgG forms without light chains.

Light chains may also be produced in different classifiable forms such as the kappa (Vκ) or lambda (Vλ) forms. Each heavy chain class may be bound with either a kappa or lambda light chain. In general, the light and heavy chains are covalently bonded to each other, and the "tail" portions of the two heavy chains are bonded to each other by covalent disulfide linkages or non-covalent linkages. In the heavy chain, the amino acid sequences run from an N-terminus at the forked ends of the Y configuration to the C-terminus at the bottom of each chain.

Both the light and heavy chains are divided into regions of structural and functional homology. The terms "constant" and "variable" are used functionally. In this regard, it will be appreciated that the variable domains of both the light (Vκ or Vλ—collectively "VL") and heavy (VH) chain portions determine antigen recognition and specificity. Conversely, the constant domains of the light chain (CL) and the heavy chain (CH1, CH2 or CH3) confer important biological properties such as secretion, transplacental mobility, Fc receptor binding, complement binding, and the like. By convention the numbering of the constant region domains increases as they become more distal from the antigen binding site or amino-terminus of the antibody. The N-terminal portion is a variable region and at the C-terminal portion is a constant region; the CH3 and CL domains typically comprise the carboxy-terminus of the heavy and light chain, respectively.

As indicated above, the variable region allows the antibody to selectively recognize and specifically bind epitopes on antigens. That is, the VL domain and VH domain, or subset of the complementarity determining regions (CDRs) within these variable domains, of an antibody combine to form the variable region that defines a three-dimensional antigen binding site. This quaternary antibody structure forms the antigen binding site present at the end of each arm of the Y. More specifically, the antigen binding site is typically defined by three CDRs on each of the VH and VL chains. As used herein, the terms HCDR1, HCDR2, HCDR3 refer to VH CDR1, VH CDR2, VH CDR3, respectively. Likewise, as used herein, the terms LCDR1, LCDR2, LCDR3, refer to VL CDR1, VL CDR2, and VL CDR3, respectively. In some instances, e.g., certain immunoglobulins derived from camelid species or engineered based on camelid immunoglobulins, a complete immunoglobulin may consist of heavy chains only, with no light chains. See, e.g., Hamers-Casterman et al., Nature 363:446-448 (1993).

In naturally occurring antibodies, the six "complementarity determining regions" or "CDRs" typically present in each antigen binding domain are short, non-contiguous sequences of amino acids that are specifically positioned to form the antigen binding domain as the antibody assumes its three-dimensional configuration in an aqueous environment. The remainder of the amino acids in the antigen binding domains, referred to as "framework" regions, show less inter-molecular variability. The framework regions largely adopt a sheet conformation and the CDRs form loops that connect, and in some cases form part of, the β-sheet structure. Thus, framework regions act to form a scaffold that provides for positioning the CDRs in correct orientation by inter-chain, non-covalent interactions. The antigen binding domain formed by the positioned CDRs defines a surface complementary to the epitope on the immunoreactive antigen. This complementary surface promotes the non-covalent binding of the antibody to its cognate epitope. The amino acids comprising the CDRs and the framework regions, respectively, can be readily identified for any given heavy or light chain variable domain by one of ordinary skill in the art, since they have been precisely defined (see below).

In the case where there are two or more definitions of a term that is used and/or accepted within the art, the definition of the term as used herein is intended to include all such meanings unless explicitly stated to the contrary. A specific example is the use of the term "complementarity determining region" ("CDR") to describe the non-contiguous antigen combining sites found within the variable region of both heavy and light chain polypeptides. This region has been described by Kabat et al. (1983) U.S. Dept. of Health and Human Services, "Sequences of Proteins of Immunological Interest," by Chothia and Lesk, J. Mol. Biol. 196:901-917 (1987), and updated recently by Kunik et al., Nucl. Acids Res. 40:W521-W524 (2012), which are incorporated herein by reference, where the definitions include overlapping or subsets of amino acid residues when compared against each other. Nevertheless, application of any definition to refer to a CDR of an antibody or variants thereof is intended to be within the scope of the term as defined and used herein. The exact residue numbers that encompass a particular CDR will vary depending on the sequence and size of the CDR. Those skilled in the art can routinely determine which residues comprise a particular CDR given the variable region amino acid sequence of the antibody.

Kabat et al. also defined a numbering system for variable domain sequences that is applicable to any antibody. One of ordinary skill in the art can unambiguously assign this system of "Kabat numbering" to any variable domain sequence, without reliance on any experimental data beyond the sequence itself. As used herein, "Kabat numbering" refers to the numbering system set forth by Kabat et al. (1983) U.S. Dept. of Health and Human Services, "Sequence of Proteins of Immunological Interest."

Kunik et al., Nucl. Acids Res. 40:W521-W524 (2012) disclosed an online tool, Paratome, for systematic identification of antigen-binding regions in antibodies based on sequence or structure. Usually the Paratome-based analysis matches with Kabat numbering, but may also include residues adjacent to conventional CDRs.

Antibodies or antigen-binding fragments, variants, or derivatives thereof of the invention include, but are not limited to, polyclonal, monoclonal, multispecific, human, humanized, primatized, chimeric antibodies, single-chain antibodies, epitope-binding fragments, e.g., Fab, Fab' and F(ab')$_2$, Fd, Fvs, single-chain Fvs (scFv), disulfide-linked Fvs (sdFv), fragments comprising either a VL or VH domain, fragments produced by a Fab expression library, and anti-idiotypic (anti-Id) antibodies. scFv constructs are known in the art and are described, e.g., in U.S. Pat. No. 5,892,019. Immunoglobulins or antibodies of the invention can be of any type IgG, IgE, IgD, IgA, and IgY), class (e.g., IgG1, IgG2, IgG3, IgG4, IgA1, and IgA2, etc.), or subclass of immunoglobulin molecule. Many approaches for producing antibodies and other antigen-binding substances are well known in the art and include production from cultures of B-cells, from cultures of hybridoma cells, from cultures or transiently or permanently transfected host cell lines, from bacteria, from yeast, from plant cells and from insect cells.

As used herein, the term "heavy chain portion" includes amino acid sequences derived from an immunoglobulin heavy chain. A polypeptide comprising a heavy chain portion comprises at least one of: a CH1 domain, a hinge (e.g., upper, middle, and/or lower hinge region) domain, a CH2 domain, a CH3 domain, or a variant or fragment thereof. For example, a binding polypeptide for use in the invention may comprise a polypeptide chain comprising a CH1 domain; a polypeptide chain comprising a CH1 domain, at least a portion of a hinge domain, and a CH2 domain; a polypeptide chain comprising a CH1 domain and a CH3 domain; a polypeptide chain comprising a CH1 domain, at least a portion of a hinge domain, and a CH3 domain, or a polypeptide chain comprising a CH1 domain, at least a portion of a hinge domain, a CH2 domain, and a CH3 domain. In another embodiment, a polypeptide of the invention comprises a polypeptide chain comprising a CH3 domain. Further, a binding polypeptide for use in the invention may lack at least a portion of a CH2 domain (e.g., all or part of a CH2 domain). As set forth above, it will be understood by one of ordinary skill in the art that these domains (e.g., the heavy chain portions) may be modified such that they vary in amino acid sequence from the naturally occurring immunoglobulin molecule.

In certain antibodies, or antigen-binding fragments, variants, or derivatives thereof disclosed herein, the heavy chain portions of one polypeptide chain of a multimer are identical to those on a second polypeptide chain of the multimer. Alternatively, heavy chain portion-containing monomers of the invention are not identical. For example, each monomer may comprise a different target binding site, forming, for example, a bispecific antibody.

As used herein, the term "light chain portion" includes amino acid sequences derived from an immunoglobulin light chain, e.g., a kappa or lambda light chain. Preferably, the light chain portion comprises at least one of a VL or CL domain.

An "antigen binding substance," defined above, may be described or specified in terms of the epitope(s) or portion(s) of a substance that it recognizes or specifically binds. The portion of a target polypeptide that specifically interacts with the antigen binding domain of an antibody is an "epitope," or an "antigenic determinant." A target polypeptide may comprise a single epitope, but typically comprises at least two epitopes, and can include any number of epitopes, depending on the size, conformation, and type of antigen. Furthermore, it should be noted that an "epitope" on a target polypeptide may be or may include non-polypeptide elements, e.g., an epitope may include a carbohydrate side chain.

The minimum size of a peptide or polypeptide epitope for an antigen binding substance is thought to be about four to five amino acids. Peptide or polypeptide epitopes preferably contain at least seven, more preferably at least nine and most preferably between at least about 15 to about 30 amino acids. Since a CDR can recognize an antigenic peptide or polypeptide in its tertiary form, the amino acids comprising an epitope need not be contiguous, and in some cases, may not even be on the same peptide chain. A peptide or polypeptide epitope recognized by the antigen binding molecule of the present invention may contain a sequence of at least 4, at least 5, at least 6, at least 7, more preferably at least 8, at least 9, at least 10, at least 15, at least 20, at least 25, or between about 15 to about 30 contiguous or non-contiguous amino acids.

By "antigen," it is meant a substance that is capable of specifically or preferentially binding an antibody-binding substance such as an antibody or antigen-binding fragment thereof.

In the context of antibodies (and, by analogy, other antigen binding substances), "preferentially binds," means that the antibody specifically binds to an epitope more readily than it would bind to a reference epitope (which could be a related, similar, homologous, or analogous epitope). Thus, an antibody that "preferentially binds" to a given epitope would more readily bind to that epitope than to a reference epitope, even though such an antibody may cross-react with the reference epitope.

In the context of antibodies (and, by analogy, other antigen binding substances), "specifically binds," means that an antibody binds to an epitope via its antigen binding domain, and that the binding entails complementarity between the antigen binding domain and the epitope. According to this definition, an antibody is said to "specifically bind" to an epitope when preferentially binds to that epitope, via its antigen binding domain, relative to a random, unrelated epitope.

By way of non-limiting example, an antibody may be considered to preferentially bind a first epitope relative to a second epitope if under experimental conditions (for example, the conditions for carrying out an assay) the amount that binds to the first epitope relative to the amount that binds to the second epitope (expressed as a ratio) is greater than 1, 10, 100, 1,000 or 10,000. In another non-limiting example, an antibody may be considered to preferentially bind a first epitope relative to a second epitope if the equilibrium dissociation constant ($K_D$) for binding to the first epitope relative to the antibody's $K_D$ for a second epitope (expressed as a ratio) is less than 1, 0.1, 0.01, 0.001 or 0.0001. In another non-limiting example, an antibody may be considered to preferentially bind a first epitope relative to a second epitope if the association rate constant (also referred to as the on rate or $k_{on}$) for binding to the first epitope relative to the antibody's $k_{on}$ for a second epitope (expressed as a ratio) is greater than 1, 10, 100, 1,000 or 10,000. In another non-limiting example, an antibody may be considered to preferentially bind a first epitope relative to a second epitope if the dissociation rate constant (also referred to as the off rate or $k_{off}$) for dissociation from the first epitope relative to the antibody's $k_{off}$ for a second epitope (expressed as a ratio) is less than 1, 0.1, 0.01, 0.001 or 0.0001.

When comparing the preference of two antibodies for a first epitope relative to a second epitope, the antibody having the stronger preference for the first epitope can be said to be more specific for the first epitope. The strength of the preferences may be determined, for example, by the ratios of the amount of binding to the two epitopes under selected experimental conditions, by the ratios of the $K_D$ values, by the ratios of the $k_{on}$ values, and/or by the ratios of the $k_{off}$ values (these ratios determined as described in the last paragraph).

In general, assay sensitivity and robustness is improved by using high affinity and slow off-rate antibodies. In embodiments, an antibody or other antigen-binding substance disclosed herein binds a target antigen with a $K_D$ less than or equal to 10 nM, 1 nM, 500 pM, 200 pM, 100 pM, 30 pM or 10 pM. In embodiments, an antibody or other antigen-binding substance disclosed herein binds a target polypeptide with a $K_D$ less than or equal to 10 nM, 1 nM, 500 pM, 200 pM, 100 pM, 30 pM or 10 pM. In embodiments, an antibody or other antigen-binding substance disclosed herein dissociates from a target antigen with a $k_{off}$ of less than or equal to $5\times10^{-2}$ sec$^{-1}$, $10^{-2}$ sec$^{-1}$, $5\times10^{-3}$ sec$^{-1}$ or $10^{-3}$ sec$^{-1}$. In embodiments, an antibody or other antigen-binding substance of the invention disclosed herein dissociates from a target polypeptide with a $k_{off}$ less than or equal to $5\times10^{-4}$ sec$^{-1}$, $10^{-4}$ sec$^{-1}$, $5\times10^{-5}$ sec$^{-1}$, or $10^{-5}$ sec$^{-1}$, $5\times10^{-4}$ sec$^{-1}$, $10^{-5}$ sec$^{-1}$, $5\times10^{-7}$ sec$^{-1}$ or $10^{-7}$ sec$^{-1}$.

The antigen-binding substances of the invention may be "multispecific," bispecific, trispecific, or of greater multispecificity, meaning that it recognizes and binds to two or more different epitopes present on one or more different antigens (e.g., proteins) at the same time. Thus, whether an antigen-binding substance is "monospecific" or "multispecific," e.g., "bispecific," refers to the number of different epitopes with which a binding polypeptide reacts. Multispecific antibodies may be specific for different epitopes of a target or may be specific for a target polypeptide as well as for a heterologous epitope, such as a heterologous polypeptide.

As previously indicated, the subunit structures and three-dimensional configuration of the constant regions of the various immunoglobulin classes are well known. As used herein, the term "VH domain" includes the amino terminal variable domain of an immunoglobulin heavy chain and the term "CH1 domain" includes the first (most amino terminal) constant region domain of an immunoglobulin heavy chain. The CH1 domain is adjacent to the VH domain and is amino terminal to the hinge region of an immunoglobulin heavy chain.

As used herein, the term "hinge region" includes the portion of a heavy chain that joins the CH1 domain to the CH2 domain. This hinge region comprises approximately 25 residues and is flexible, thus allowing the two N-terminal antigen binding regions to move independently. Hinge regions can be subdivided into three distinct domains: upper, middle, and lower hinge domains (Roux et al., J. Immunol. 161:4083 (1998)).

As used herein the term "disulfide bond" includes the covalent bond formed between two sulfur atoms. The amino acid cysteine comprises a thiol group that can form a disulfide bond or bridge with a second thiol group. In most naturally occurring IgGs, the CH1 and CL regions are linked by a disulfide bond and the two heavy chains are linked by two disulfide bonds at positions corresponding to 239 and 242 using the Kabat numbering system (position 226 or 229, EU numbering system).

As used herein, the terms "linked," "fused," or "fusion" are used interchangeably. These terms refer to the joining together of two or more elements or components, by whatever means including chemical conjugation or recombinant means. An "in-frame fusion" refers to the joining of two or more polynucleotide open reading frames (ORFs) to form a continuous longer ORF, in a manner that maintains the correct translational reading frame of the original ORFs. Thus, a recombinant fusion protein is a single protein containing two or more segments that correspond to polypeptides encoded by the original ORFs (which segments are not normally so joined in nature). Although the reading frame is thus made continuous throughout the fused segments, the segments may be physically or spatially separated by, for example, an in-frame linker sequence. For example, polynucleotides encoding the CDRs of an immunoglobulin variable region may be fused, in-frame, but be separated by a polynucleotide encoding at least one immunoglobulin framework region or additional CDR regions, as long as the "fused" CDRs are co-translated as part of a continuous polypeptide.

The term "oligonucleotide," as used herein refers to short polymers of nucleic acids such as DNA or RNA. In embodiments, oligonucleotides are about 5 to about 150 nucleotides in length. Oligonucleotides may be designed to specifically hybridize to DNA or RNA sequences, for example, as probes for detecting specific sequences that are complementary to the oligonucleotides. Oligonucleotides may be single-stranded or double-stranded. Oligonucleotides described herein may be produced by any manner, including chemical synthesis.

The term "oligonucleotide" may include structural analogs that include non-naturally occurring chemical structures. In embodiments, the oligonucleotide comprises a modification at its 5' terminus or 3' terminus, an internal modification, or a combination thereof. Methods of modifying nucleotides and/or nucleic acid are known in the field. Examples of oligonucleotide modifications include, but are not limited to, attachment modifications that can be used to attach the oligonucleotide to another substance or to a surface; fluorophores and fluorescence quenchers; modified bases; phosphorylation modification, e.g., when the oligonucleotide is being used as a ligase substrate; spacers, e.g., to create distance in the oligonucleotide between a nucleic acid sequence and a reactive functional group; and phosphorothioate bonds, e.g., to increase resistance of the oligonucleotide to nuclease degradation. Exemplary modifications are provided below in Table A.

TABLE A

Oligonucleotide Modifications

| Modification Type | Examples |
| --- | --- |
| Amino Modifier | 5' Amino Modifier C6 (5AmMC6), 5' Amino Modifier C12 (5AmMC12), Amino Modifier C6 dT (5AmMC6T, iAmMC6T, 3AmMC6T), 3' Amino Modifier (3AmMO), UNILINK ™ Amino Modifier (5UniAmM, iUniAmM) |
| Biotinylation | biotin (5Biosg, 3Bio), biotin-azide (5BioK, iBiodUK), biotin dT (5BiodT, iBiodT, 3BiodT), biotin-TEG (5BioTEG, 3BioTEG), 5' dual biotin (52-Bio), 5' photo-cleavable biotin (5PCBio), desthiobiotin-TEG (5deSBioTEG, ideSBioTEG, 3deSBioTEG) |
| Thiol | 3' Thiol Modifier C3 S-S (3ThioMC3-D), dithiol (5DTPA, iDTPA, 3DTPA), 5' Thiol Modifier C6 S-S (5ThioMC6-D) |
| Alkyne | 5' hexynyl (5Hexynyl), 5-Octadiynyl (55OctdU, i5OctdU, 35OctdU) |
| Spacer | C3 spacer (5SpC3, iSpC3, 3SpC3), hexanediol (3C6), 1'2'-dideoxyribose dSpacer (5dSp, idSp, 3dSp), photo-cleavable spacer (5SpPC, iSpPC), Spacer 9 (5Sp9, iSp9, 3Sp9), Spacer 18 (5Sp18, iSp18, 3Sp18) |
| Other | 5' ACRYDITE ™ (5Acryd), 5' adenylation (5rApp), an azide NHS ester (5AzideN, iAzideN, 3AzideN), 3' cholesterol-TEG (3CholTEG), digoxigenin NHS ester (5DigN, 3DigN), 5' I-Linker (5ILink12), phosphorylation (5Phos, 3Phos), 6-FAM azide (56-FAMK, i6-FAMK), 6-FAM NHS ester (56-FAMN, i6-FAMN), 5-TAMRA azide (55-TAMK, i5-TAMK) |

In embodiments, the modification comprises biotin, streptavidin, avidin, amino group, thiol group, aldehyde group, hydrazide group, azide group, alkyne group, maleimide group and/or iodoacetanmide group.

In one example, a nucleotide and/or nucleic acid may include a chemical modification that links it to another substance such as a label, or provides a reactive functional group that can be linked to another substance such as a label, for example, through the use of amine or thiol-modified nucleotide bases, phosphates or sugars. The term "reactive functional group" refers to an atom or associated group of atoms that can undergo a further chemical reaction, for example, to form a covalent bond with another functional group. Examples of reactive functional groups include, but are not limited to, amino, thiol, hydroxy, and carbonyl groups. In one aspect, the reactive functional group includes a reactive thiol group. Labels that can be linked to nucleotides or nucleic acids through these chemical modifications include, but are not limited to, detectable moieties such as biotin, haptens, fluorophores, and electrochemiluminescent (ECL) labels.

In another aspect, a nucleotide in an oligonucleotide can be modified to prevent enzymatic or chemical extension of nucleic acid chains into which it is incorporated, for example, by replacing the ribose or deoxyribose group with dideoxyribose. In another example, the backbone components that link together the nucleotide bases (e.g., the sugar and/or phosphate groups) can be modified or replaced, for example, through the use of peptide nucleic acids (PNAs) or by the incorporation of ribose analogues such as those found in 2'-O-methyl-substituted RNA, locked nucleic acids, bridged nucleic acids and morpholino nucleic acids. These "backbone" analogues may be present in one, some or all of the backbone linkages in a nucleic acid and/or oligonucleotide and may provide certain advantages such as hybridization products with improved binding stability and/or stability of the linkages to nucleases. In another example of nucleotide and nucleic acid structural analogues, unnatural nucleotide bases may be included. The unnatural (also referred to as "non-canonical" base) may hybridize with a natural (canonical) base or it may hybridize with another unnatural base.

A "probe" in the context of nucleic acids generally refers to an oligonucleotide (typically between 5 and 50 bases) that includes a sequence that may be complementary to another nucleic acid sequence. In some applications, a probe that is hybridized to a complementary region in a target sequence can enable prime extension of the probe by a polymerase, acting as a starting point for replication of adjacent single stranded regions on the target sequence (in such cases, the probe may also be referred to as a "primer").

A "nucleic acid probe," as used herein, includes an oligonucleotide that (i) is modified with one or more reactive moieties that can be used to react, and thereby link, the oligonucleotide to another substance or (ii) is linked to another substance (for example, through a reaction as described in clause (i)). In embodiments, the nucleic acid probe is linked to a detection reagent. In embodiments, the nucleic acid probe is linked to a polypeptide. In embodiments, the nucleic acid probe is linked to an antibody or other antigen-binding substance. In embodiments, the reactive moiety is a reactive functional group. In embodiments, the reactive functional group is an alkene, a strained alkene, an alkyne, a halide, an alcohol, a thiol, an amine, a phosphate, an aldehyde, a ketone, a carboxylic acid, a carboxylate, an amide, an ester, a thioester, an acyl phosphate, an acid halide, a nitrile, an acid anhydride, a hydrazine, a tetrazine, or an azide. In embodiments, the reactive moiety is a member of a binding reagent—binding partner pair, e.g., biotin or streptavidin. In embodiments, the nucleic acid probe comprises a sequence complementary to a template oligonucleotide for amplification. In embodiments, the nucleic acid probe binds to a circular template oligonucleotide for rolling circle amplification (RCA) of the circular template oligonucleotide. In embodiments, the RCA generates an extended sequence. In embodiments, the nucleic acid probe is a primer for RCA.

A "labeled probe" refers to a compound that comprises an oligonucleotide and a detectable moiety (also referred to as a "label"). Detectable moiety (or label) refers to a chemical group or moiety that has a detectable physical property or is capable of causing a chemical group or moiety to exhibit a detectable physical property, including, for example, an enzyme that catalyzes conversion of a substrate into a detectable product. A label can be detected by spectroscopic, photochemical, biochemical, immunochemical, electrical, optical, chemical, or other methods. Examples of labels include, but are not limited to, radioisotopes, enzymes, substrates, fluorescent molecules, chemiluminescent moieties, electrochemiluminescent moieties, magnetic particles, and bioluminescent moieties. In another aspect, the label is a compound that is a member of a binding pair, in which a first member of the binding pair (which can be referred to as a "primary binding reagent") is attached to a substrate, for example, an oligonucleotide, and the other member of the binding pair (which can be referred to as a "secondary binding reagent") has a detectable physical property. Non-limiting examples of binding pairs include biotin and streptavidin, or avidin; complementary oligonucleotides; and antibody/antigen binding pairs. In embodiments, the "labeled probe" comprises an oligonucleotide and an electrochemiluminescent moiety. In embodiments, the oligonucleotide of the labeled probe comprises a complementary sequence to an extended sequence of the methods described herein. In embodiments, the labeled probe binds to the extended sequence, and the detectable label functions to enable measurement of the amount of extended sequence. In embodiments of the methods described herein, measuring labeled probes, i.e., the amount of extended sequence, determines the quantity of analyte in a sample.

"Complementary" refers to nucleic acid molecules or a sequence of nucleic acid molecules that bind (or "hybridize") to each other by the formation of hydrogen bonds, for example, according to the Watson-Crick base-pairing model. For example, hybridization can occur between two complementary DNA molecules (DNA-DNA hybridization), two RNA molecules (RNA-RNA hybridization), or between complementary DNA and RNA molecules (DNA-RNA hybridization). Hybridization can occur between a short nucleotide sequence that is complementary to a portion of a longer nucleotide sequence. Hybridization can occur between sequences that do not have 100% "sequence complementarity" (i.e., sequences where less than 100% of the nucleotides align based on a base-pairing model such as the Watson-Crick base-pairing model), although sequences having less sequence complementarity are less stable and less likely hybridize than sequences having greater sequence complementarity. In one aspect, the nucleotides of the complementary sequences have 100% sequence complementarity based on the Watson-Crick model. In another aspect, the nucleotides of the complementary sequences have at least about 90%, 95%, 97%, or 99% sequence complementarity based on the Watson-Crick model.

Two nucleic acids are "hybridizable" or "hybridized", respectively, if they are capable of hybridizing or have hybridized. Whether or not two complementary sequences hybridize can depend on the stringency of the hybridization conditions, which can vary depending on conditions such as temperature, solvent, ionic strength and other parameters (approaches for creating stringent hybridization conditions are well known and exemplified in Sambrook et al., *Molecular Cloning: A Laboratory Manual, Second Edition*, Cold Spring Harbor Laboratory Press, Cold Spring Harbor (1989), particularly Chapter 11 and Table 11.1 therein). The stringency of the hybridization conditions can be selected to provide selective formation or maintenance of a desired hybridization product of two complementary nucleic acid sequences, in the presence of other potentially cross-reacting or interfering sequences. Stringent conditions are sequence-dependent—typically longer complementary sequences specifically hybridize at higher temperatures than shorter complementary sequences. Generally, stringent hybridization conditions are between about 5° C. to about 10° C. lower than the thermal melting point ($T_m$) (i.e., the temperature at which 50% of the sequences hybridize to a substantially complementary sequence) for a specific nucleotides sequence at a defined ionic strength, concentration of chemical denaturants, pH and concentration of the hybridization partners. Generally, nucleotide sequences having a higher percentage of G and C bases hybridize under more stringent conditions than nucleotide sequences having a lower percentage of G and C bases. Generally, stringency can be increased by increasing temperature, increasing pH, decreasing ionic strength, and/or increasing the concentration of chemical nucleic acid denaturants (such as formamide, dimethylformamide, dimethylsulfoxide, ethylene glycol, propylene glycol and ethylene carbonate). Stringent hybridization conditions typically include salt concentrations or ionic strength of less than about 1 M, 500 mM, 200 mM, 100 mM or 50 mM; hybridization temperatures above about 20° C., 30° C., 40° C., 60° C. or 80° C.; and chemical denaturant concentrations above about 10%, 20%, 30% 40% or 50%. Because many factors can affect the stringency of hybridization, the combination of parameters may be more significant than the absolute value of any parameter alone.

Exemplary hybridization conditions include buffered solutions (for example phosphate, tris or HEPES buffered solutions, having between around 20 and 200 mM of the buffering component) at pHs between around 6.5 to 8.5, and having an ionic strength between about 20 and 200 mM, at a temperature between about 15 to 40° C. For example, the buffer may include a salt at a concentration of from about 10 mM to about 1 M, from about 20 mM to about 500 mM, from about 30 mM to about 100 mM, from about 40 mM to about 80 mM, or about 50 mM. Exemplary salts include NaCl, KCl, $(NH_4)_2SO_4$, $Na_2SO_4$, and $CH_3COONH_4$. One specific example is 50 M Tris-HCl, pH 7.4 at room temperature (roughly 18 to 25° C.). Another specific example is 66 mM potassium acetate, 50 mM potassium chloride, 10 mM magnesium acetate, 33 mM Tris buffer, pH 8.2 at 22° C. to 37° C. (or around 27° C.).

The terms "sequence identity" or "% identity" in the context of nucleic acid sequences or amino acid sequences refers to the percentage of residues in the compared sequences that are the same when the sequences are aligned over a specified comparison window. In some embodiments, only specific portions of two or more sequences are aligned to determine sequence identity. In some embodiments, only specific domains of two or more sequences are aligned to determine sequence similarity. A comparison window can be a segment of at least 10 to over 1000 residues, at least 20 to about 1000 residues, or at least 50 to 500 residues in which the sequences can be aligned and compared. Methods of alignment for determination of sequence identity are well-known and can be performed using publicly available databases such as BLAST. "Percent identity" or "% identity" when referring to amino acid sequences can be determined by methods known in the art. For example, in some embodiments, "percent identity" of two amino acid sequences is determined using the algorithm of Karlin and Altschul, *Proceedings of the National Academy of Sciences USA* 87: 2264-2268 (1990), modified as in Karlin and Altschul, *Proceedings of the National Academy of Sciences USA* 90: 5873-5877 (1993). Such an algorithm is incorporated into the BLAST programs, e.g., BLAST+ or the NBLAST and XBLAST programs described in Altschul et al., *Journal of Molecular Biology*, 215: 403-410 (1990). BLAST protein searches can be performed with programs such as, e.g., the XBLAST program, score=50, wordlength=3 to obtain amino acid sequences homologous to the protein molecules of the disclosure. Where gaps exist between two sequences, Gapped BLAST can be utilized as described in Altschul et al., *Nucleic Acids Research* 25(17): 3389-3402 (1997). When utilizing BLAST and Gapped BLAST programs, the default parameters of the respective programs (e.g., XBLAST and NBLAST) can be used.

In some embodiments, polypeptides or nucleic acid molecules have 70%, at least 70%, 75%, at least 75%, 80%, at least 80%, 85%, at least 85%, 90%, at least 90%, 95%, at least 95%, 97%, at least 97%, 98%, at least 98%, 99%, or at least 99% or 100% sequence identity with a reference polypeptide or nucleic acid molecule, respectively (or a fragment of the reference polypeptide or nucleic acid molecule). In some embodiments, polypeptides or nucleic acid molecules have about 70%, at least about 70%, about 75%, at least about 75%, about 80%, at least about 80%, about 85%, at least about 85%, about 90%, at least about 90%, about 95%, at least about 95%, about 97%, at least about 97%, about 98%, at least about 98%, about 99%, at least about 99% or about 100% sequence identity with a reference polypeptide or nucleic acid molecule, respectively (or a fragment of the reference polypeptide or nucleic acid molecule).

Hybridization occurs when two nucleic acids contain complementary sequences, although depending on the stringency of the hybridization, mismatches between bases are possible. In embodiments, a sequence that is capable of hybridizing to the complement of a second sequence is substantially similar to the second sequence. In embodiments, a sequence capable of hybridizing to the complement of a second sequence has 70%, at least 70%, 75%, at least 75%, 80%, at least 80%, 85%, at least 85%, 90%, at least 90%, 95%, at least 95%, 97%, at least 97%, 98%, at least 98%, 99%, or at least 99% or 100% sequence identity with the second sequence.

The present invention includes immunoassay methods that comprise (i) anchoring the detection complex formed between the target analyte and one or more analyte binding reagents used in the assay; and/or (ii) amplifying the signal from labeled detection complexes. Anchoring may be used to stabilize complexes involving low binding affinity interactions and/or high molecular weight label(s) or labeling site(s). Signal amplification can be achieved by attaching an extended probe to the binding complex that contains multiple labels or detection labeling sites, thereby amplifying the detectable signal for each individual detection complex. In a preferred embodiment, the method includes attaching an extended probe that includes multiple labels or detection labeling sites to the detection complex, and anchoring the complex to the surface to ensure that the complex is retained on the surface. This modified assay method can be used to detect extremely low numbers of binding events, even individual analyte-binding reagent complexes. The basic approach is not limited to immunoassays and can be used to carry out binding assays using other classes of binding reagents.

In embodiments, the present invention provides binding assays using a surface-bound anchoring reagent to adhere a detection complex including the analyte of interest to the surface and to stabilize the detection complex. This approach may be used to overcome low binding affinities between reagents that form the detection complex and/or prevent the complex from dissociating from the surface prior to subsequent processing. The use of an anchoring reagent in a binding assay is illustrated in FIG. 1(*a*). The surface (101) includes a capture reagent (102) that binds analyte A, and an anchoring reagent (103). In one or more steps, the analyte is bound to the capture reagent and a detection reagent (104) that also binds the analyte, wherein the detection reagent is linked to a nucleic acid probe (105). The analyte can be bound to the capture and detection reagents simultaneously or substantially simultaneously, or the analyte can be bound to each of the capture and detection reagents sequentially (in either order). Therefore, a complex (106) is formed on the surface that includes the capture reagent, the analyte, and the detection reagent. The probe is extended to form an extended sequence (107) that includes an anchoring region that binds the anchoring reagent. The extended sequence is bound to the anchoring reagent and the amount of extended sequence bound to the surface is measured.

The skilled artisan in the field of binding assays will readily appreciate the scope of capture reagents and companion binding partners that may be used in the present methods. A non-limiting list of such pairs include (in either order) receptor/ligand pairs, antibodies/antigens, natural or synthetic receptor/ligand pairs, hapten/antibody pairs, antigen/antibody pairs, epitope/antibody pairs, mimotope/antibody pairs, aptamer/target molecule pairs, hybridization partners, and intercalator/target molecule pairs. In one embodiment, the binding assays employ antibodies or other receptor proteins as capture and/or detection reagents for an analyte of interest. The term "antibody" includes intact antibody molecules (including hybrid antibodies assembled by in vitro re-association of antibody subunits), antibody fragments and recombinant protein constructs comprising an antigen binding domain of an antibody (as described, e.g., in Porter, R. R. and Weir, R. C. *J. Cell Physiol.*, 67 (Suppl); 51-64 (1966) and Hochman, I. Inbar, D. and Givol, D. *Biochemistry* 12: 1130 (1973)), as well as antibody constructs that have been chemically modified, e.g., by the introduction of a detectable label.

Likewise, the anchoring reagent and the corresponding anchoring member or region can include any suitable binding pair, e.g., receptor/ligand pairs, antibodies/antigens, natural or synthetic receptor/ligand pairs, hapten/antibody pairs, antigen/antibody pairs, epitope/antibody pairs, mimotope/antibody pairs, aptamer/target molecule pairs, hybridization partners, intercalator/target molecule pairs, and the use of a surface and anchoring reagent bound by electrostatic charge. For example, the anchoring reagent can be an oligonucleotide sequence, aptamer, aptamer ligand, antibody, antigen, ligand, receptor, hapten, epitope, or a mimotope, and the corresponding anchoring region includes a complementary oligonucleotide sequence, aptamer ligand, aptamer, antigen, antibody, receptor, ligand, or antibody, respectively. In one specific embodiment, the anchoring region is an oligonucleotide sequence and the anchoring reagent comprises a DNA-binding protein. Alternatively, if the anchoring region is a double stranded oligonucleotide sequence, the anchoring reagent can include an intercalator. In an additional embodiment, the anchoring region can include one or more modified oligonucleotide bases and the corresponding anchoring reagent includes one or more moieties that bind to the modified bases on the anchoring region. For example, the modified bases may include a hapten or ligand and the corresponding anchoring reagent includes one or more antibodies or ligands specific for the hapten or ligand, respectively. Moreover, the anchoring region can include a plurality of labeled nucleotide bases that can be used to detect the detection complex.

In a specific embodiment depicted in FIG. 1(*b*), the surface-bound anchoring reagent includes an oligonucleotide that is used to anchor the detection complex to the surface. The anchoring oligonucleotide sequence binds to a complementary oligonucleotide sequence that is attached to the detection complex. In this embodiment, the surface (108) includes a capture reagent (109) that binds analyte, A, and an anchoring reagent (110) comprising an anchoring oligonucleotide sequence (111). In one or more steps, the analyte is bound to the capture reagent and a detection reagent (112) that also binds analyte, wherein the detection reagent is linked to a nucleic acid probe (113). As described above in reference to FIG. 1(*a*), the analyte can be bound to the capture and detection reagents simultaneously or substantially simultaneously, or the analyte can be bound to each of the capture and detection reagents sequentially (in either order). Therefore, a complex (114) is formed on the surface that includes the binding reagent, the analyte and the detection reagent. The probe is extended to form an extended sequence (115) that includes an anchoring sequence complement that is complementary to the anchoring sequence. The anchoring sequence is hybridized to the anchoring sequence complement and the amount of extended sequence bound to the surface is measured. The extended sequence may also include a detection sequence, in which case detection probes complementary to the detection sequence may be added and bound to the extended sequence and the labels measured to determine the amount of the extended sequence on the surface.

A specific embodiment of the method depicted in FIG. 1(*b*)—wherein an anchoring reagent is used to adhere the detection complex to the surface and a probe attached to the detection complex is extended to generate an extended region that binds to the anchoring reagent—further comprises binding the nucleic acid probe on the detection reagent with (i) a circular oligonucleotide that is then subjected to rolling circle amplification to generate an amplicon that binds to the anchoring reagent or (ii) a linear oligonucleotide whose ends bind to the nucleic acid probe and are ligated to form a circular oligonucleotide that is then subjected to rolling circle amplification to generate an amplicon that binds to the anchoring reagent. The surface includes a capture reagent and an anchoring reagent. In one or more steps, the analyte is bound to the capture reagent, a detection reagent comprising a nucleic acid probe, thereby forming a detection complex on the surface. The detection complex is contacted with either (i) a circular oligonucleotide comprising a sequence complementary to the nucleic acid probe or (ii) a linear oligonucleotide with a first end sequence and a second end sequence to non-overlapping regions of the nucleic acid probe. The circular or linear oligonucleotide is hybridized to the nucleic acid probe and, if the linear oligonucleotide was used, the end sequences of the linear oligonucleotide are ligated to from a circular target sequence that is hybridized to the nucleic acid probe. The nucleic acid probe is extended by rolling circle hybridization to generate an extended sequence comprising a binding reagent that binds the anchoring reagent and the amount of extended sequence bound to the surface is measured. The extended sequence may also include one or more detection sequences which are complementary to labeled detection probes that are hybridized to the amplicon and used to measure the amount of amplicon bound to the surface. In an alternate embodiment, the extension process incorporates labeled nucleotide bases into the extended sequence which are used to detect the amplicon on the surface directly, without the addition of one or more labeled probes complementary to the amplicon. Production of extended sequences that are complementary to the sequences of the anchor oligonucleotides and/or detection probes, can be achieved by incorporating into the circular or linear oligonucleotide sequences from the anchor and/or detection probes.

The detection complex can include one or more detection reagents, e.g., to enhance the specificity of an assay for an analyte. The use of multiple detection reagents can enhance the specificity of an assay if, for example, the assay is designed to emit a detectable signal if each of the detection reagents are in proximity to the analyte or if the signal from a single detection reagent bound to the analyte is distinguishable from the signal emitted from multiple detection reagents bound to the analyte. One embodiment of such an assay is shown in FIG. 1(*c*). The surface (116) includes a capture reagent (117) that binds analyte A and an anchoring reagent (118) including an anchoring oligonucleotide sequence (119). In one or more steps, the analyte is bound to the capture reagent and each of the two (or more) detection reagents (120 and 121, respectively) that bind the analyte, wherein each of the first and second detection reagents are linked to a nucleic acid probe (122 and 123, the first and second nucleic acid probes, respectively). The analyte can be bound to the capture and detection reagents simultaneously or substantially simultaneously, or in a sequential, step-wise manner. Therefore, a complex (124) is formed on the surface that includes the capture reagent, the analyte, and the first and second detection reagents. Using an extension process that requires the first and second probes to be in proximity to one another, the first probe is extended to form an extended sequence (125) comprising an anchoring sequence complement that is complementary to the anchoring sequence. In the penultimate step, the anchoring sequence is hybridized to the anchoring sequence complement and the amount of extended sequence bound to the surface is measured.

Figure 1B:
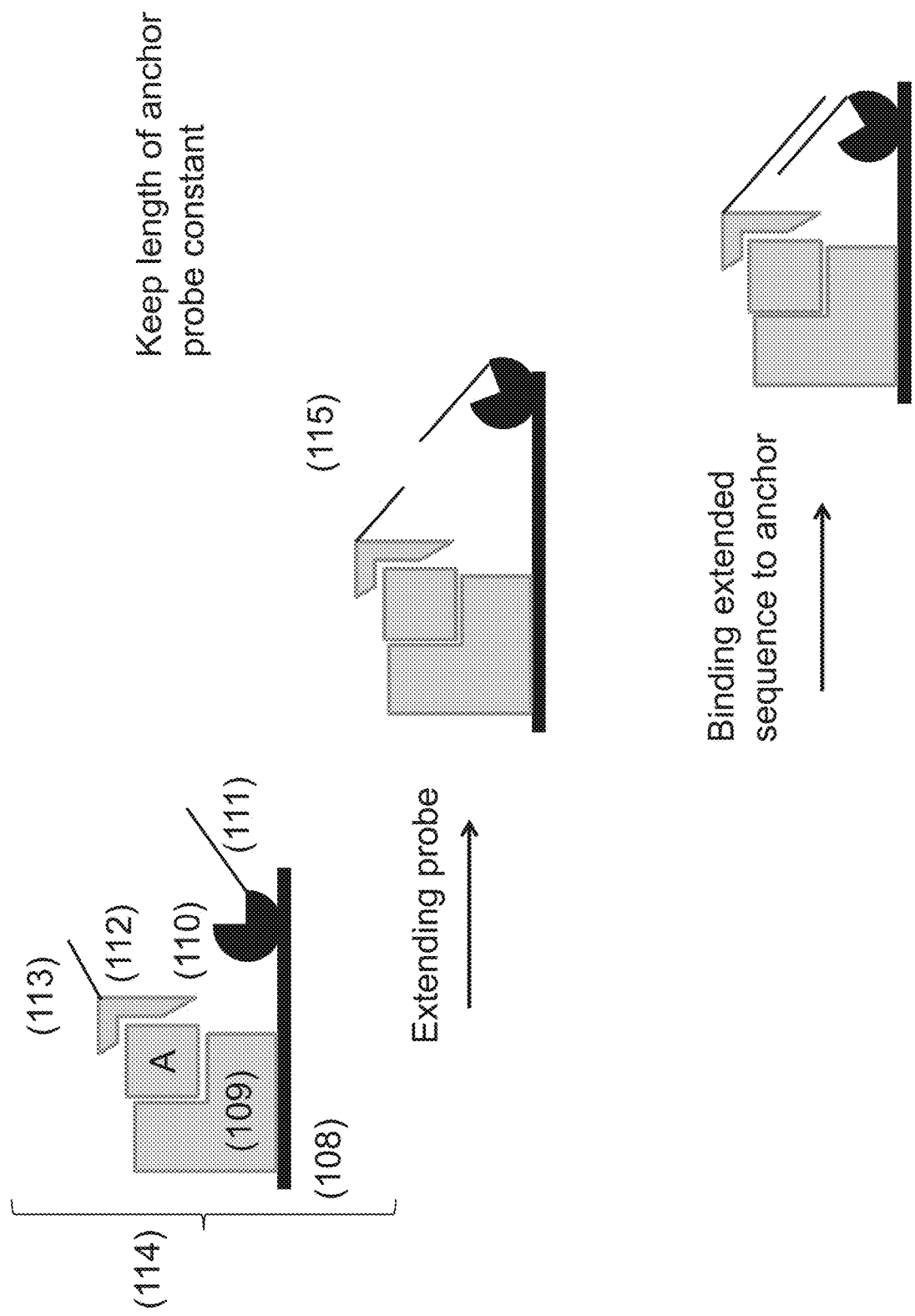
Figure 1C:
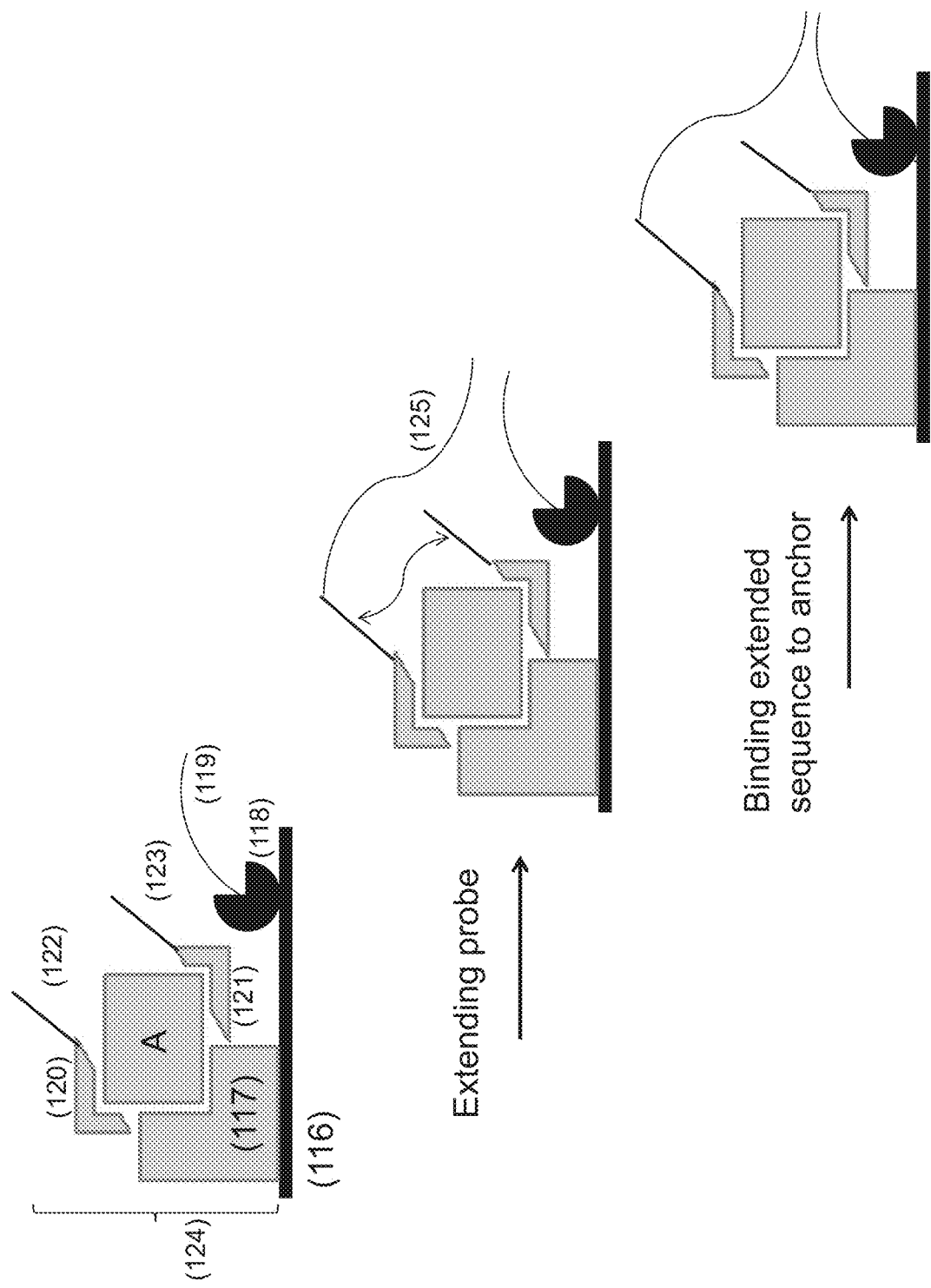
Figure 2A:
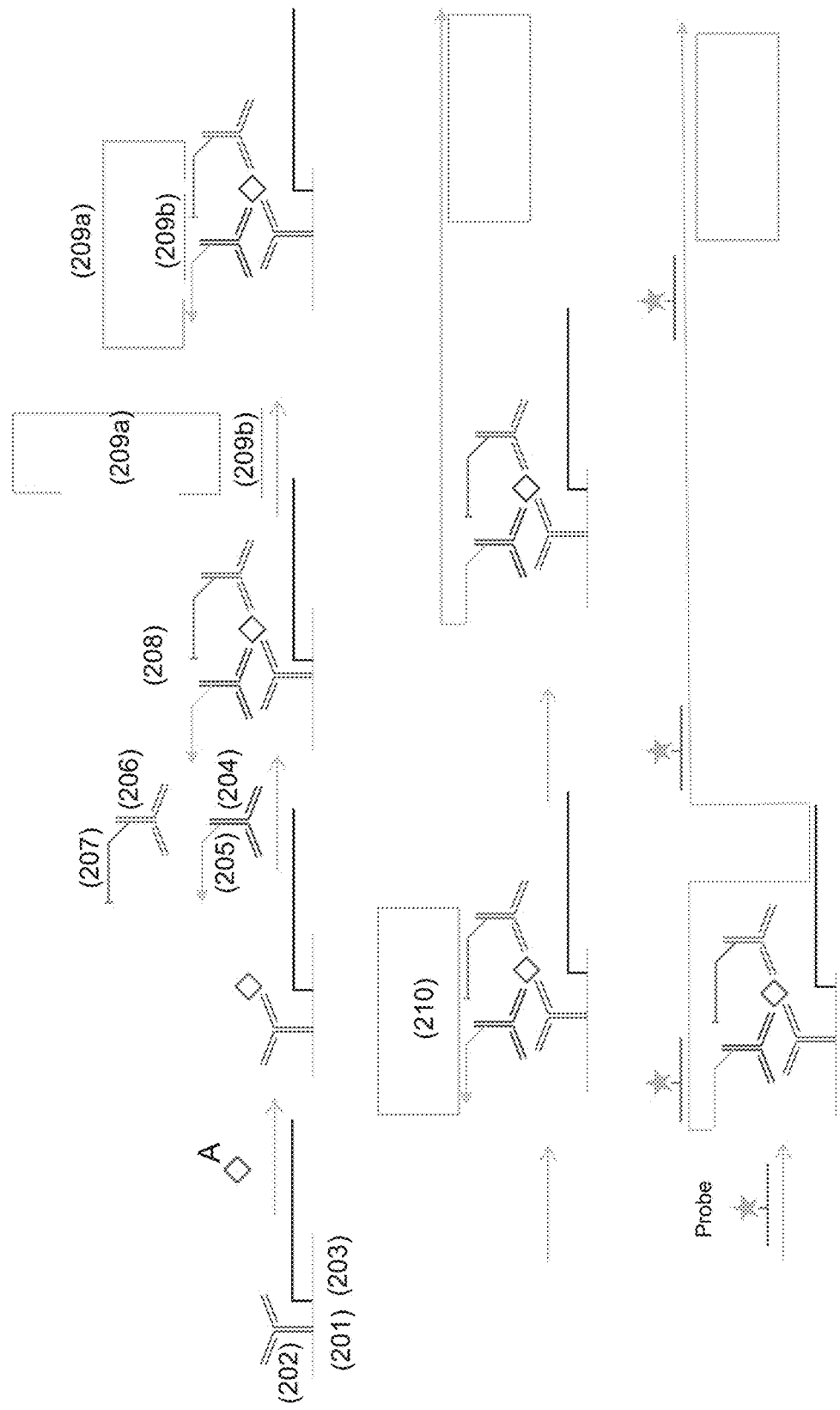
FIG. 2(a) shows a specific embodiment in which the immune complex formed on a surface bearing an anchoring reagent is subjected to a PLA-RCA process to incorporate a plurality of detectable species in the extended sequence attached to the immune complex.
Figure 2C:
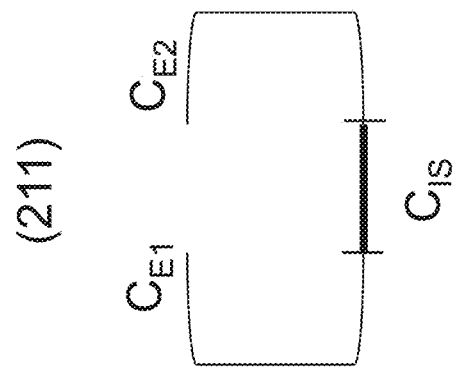
FIG. 2(b) and 2(c) are two alternative configurations of connection oligonucleotides that can be employed in the method of the invention.
Figure 2B:
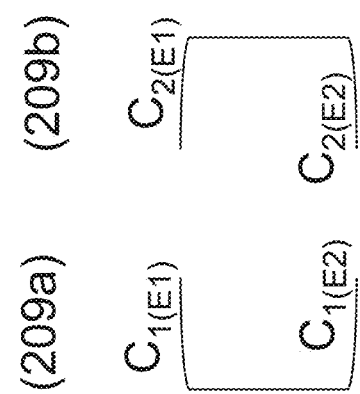

A specific embodiment of the method depicted in FIG. 1(*c*) is shown in FIG. 2(*a*), wherein an anchoring reagent is used to adhere the detection complex to the surface and a probe attached to the detection complex is extended to generate an extended region that binds to the anchoring reagent. In this embodiment, the complex is detected using two detection reagents bound to proximity probes. The method further comprises joining the detection reagents with a connector sequence that is then ligated to form a circular target sequence, and subjected to rolling circle amplification to generate an amplicon that binds to the anchoring reagent. The surface (201) includes a capture reagent (202) and an anchoring reagent (203). In one or more steps, the analyte is bound to the capture reagent, a first detection reagent (204) comprising a first proximity probe (205), and a second detection reagent (206) comprising a second proximity probe (207), thereby forming a detection complex (208) on the surface. The detection complex is contacted with two connector sequences (209*a* and 209*b*) that each include an end sequence complementary to non-overlapping regions of the first proximity probe and an end sequence complementary to non-overlapping regions of the second proximity probe. The connector sequences are hybridized to the first and second proximity probes, and the end sequences of the connector oligonucleotides are ligated to from a circular target sequence (210) that is hybridized to both the first and second proximity probes. The second proximity probe is extended by rolling circle hybridization to generate an amplicon comprising a binding reagent that binds the anchoring reagent and the amount of amplicon bound to the surface is measured. The first proximity probe may be capped, or otherwise modified, to prevent extension of the first probe. (In an alternative embodiment, the first proximity probe is extended and the second proximity probe can be capped or otherwise modified to prevent extension.) In the embodiment depicted in FIG. 2(a), the amplicon also includes two or more detection sequences which are complementary to labeled detection probes that are hybridized to the amplicon and used to measure the amount of amplicon bound to the surface. In an alternate embodiment (not depicted in FIG. 2(a)), the extension process incorporates labeled nucleotide bases into the amplicon which are used to detect the amplicon on the surface directly, without the addition of one or more labeled probes complementary to the amplicon. FIG. 2(b) is a schematic representation of the components of the connector sequences showing first and second connector oligonucleotides (209a and 209b, respectively), wherein a first end of the first connector ($C_{1(E1)}$) and a first end of the second connector ($C_{2(E1)}$) are complementary to two non-overlapping regions of the first proximity probe, and a second end of the first connector ($C_{1(E2)}$) and a second end of the second connector ($C_{2(E2)}$) are complementary to two non-overlapping regions of the second proximity probe. The first and second connectors are hybridized to the first and second proximity probes and the first and second connectors are ligated to form a circular target sequence that is hybridized to both the first and second proximity probes.

FIG. 2(c) shows an alternate embodiment of the connector. The connector sequence 211 includes an interior sequence ($C_{IS}$) complementary to the second proximity probe and two end sequences ($C_{E1}$ and $C_{E2}$, respectively) complementary to non-overlapping regions of the first proximity probe. In this embodiment, only one ligation event is needed to form a circular target sequence for rolling circle amplification (i.e., ligation of ends $C_{E1}$ and $C_{E2}$ hybridized to the first proximity probe), however, since priming/extension is from the second proximity probe, the requirement for proximity of the two proximity probes is maintained. Preferably, the first proximity probe is capped, or otherwise modified, to prevent extension of the first probe.

Thereafter, the second proximity probe is extended by rolling circle amplification of the circular target sequence to generate an amplicon comprising a binding region that binds to the anchoring reagent and the amount of amplicon bound to the surface is measured.

The sequences of the first and second proximity probes can be designed by methods known to those skilled in the art. For example, each of the probes are approximately 20-50 bases in length, preferably between 25-40 bases in length, and most preferably between about 30-35 bases in length. The first and second proximity probes also include sequences complementary to one or more connector sequences or portions thereof used in the process as described herein. In one embodiment, the detection complex is contacted with two connector sequences (209a and 209b) that each include an end sequence complementary to non-overlapping regions of the first proximity probe and an end sequence complementary to non-overlapping regions of the second proximity probe. Therefore, in this embodiment, the first and second proximity probe each include non-overlapping regions complementary to end sequences of the connectors. Alternatively, only one connector may be used and the connector sequence (211) includes an interior sequence ($C_{IS}$) complementary to the second proximity probe and two end sequences ($C_{E1}$ and $C_{E2}$, respectively) complementary to non-overlapping regions of the first proximity probe. Therefore, in this embodiment, the first proximity probe includes non-overlapping regions complementary to two end sequences of the connector, $C_{E1}$ and $C_{E2}$, respectively, and the second proximity probe includes a sequence complementary to an interior sequence of the connector ($C_{IS}$). The first proximity probe may be capped, or otherwise modified, to prevent extension of the first probe. (In an alternative embodiment, the first proximity probe is extended and the second proximity probe can be capped or otherwise modified to prevent extension.)

Therefore, the embodiments illustrated in FIGS. 1-2 demonstrate that a binding assay can be modified to incorporate an anchoring reagent and/or the signal from a detection complex can be amplified. In a preferred embodiment, an anchoring reagent and signal amplification methods are employed in a binding assay. In embodiments that include the use of an anchoring reagent, the concentration of anchoring reagent present on the surface is 0.2-200 ug/mL, specifically, 1.0-50 ug/mL, and more specifically, 3.0-10 ug/mL. Alternatively, only one or the other method may be used to achieve an enhanced binding assay. The invention, therefore, includes assays with signal amplification methods as described in FIGS. 1-2, with the anchoring reagent omitted.

In those embodiments in which the anchoring reagent includes an anchoring sequence that is directly or indirectly bound (e.g., through binding reactions) to the surface, methods established in the art for immobilizing oligonucleotides can be employed to generate the anchoring reagent including covalent and non-covalent attachment methods. The anchoring reagent can be directly immobilized on solid phases, or it can be indirectly immobilized through secondary binding reagents, such as targeting reagents as described below. For example, an anchoring reagent may be linked to or comprise a targeting reagent that binds to an immobilized targeting reagent complement on the solid phase. The binding of a targeting reagent to its complement may be direct (for example, the targeting reagent may be streptavidin and the complement may be biotin) or indirect through a bridging agent (e.g., the targeting reagent and complement may be biotin, and the bridging reagent may be a multivalent biotin binding receptor such as streptavidin). In one embodiment, a targeting agent and its complement comprise a first oligonucleotide and a complementary oligonucleotide, a receptor-ligand pair, an antigen-antibody pair, a hapten-antibody pair, an epitope-antibody pair, a mimotope-antibody pair, an aptamer-target molecule pair, hybridization partners, or an intercalator-target molecule pair. The targeting agents and complements used in a multiplexed assay for more than one analyte are selected such that the targeting agents and complements associated with a capture or detection reagent for an analyte measured by the assay are substantially non-cross-reactive with the targeting agents and complements associated with the capture or detection reagents for the other analytes measured by the assay. For example, the binding of a binding reagent to its associated binding domain (through its associated targeting agent and targeting agent complement) should be substantially greater than its binding to binding domains associated with other analytes (and presenting different targeting agent complements). Preferably the cross-reactivity for the binding of capture or detection reagents for an analyte to binding domains associated with other analytes relative to the binding to the correct binding domain is <1%, more preferably <0.1% and more preferably <0.01%. In a preferred embodiment, the targeting agent/targeting agent complement comprise a pair of oligonucleotides including complementary sequences and the targeting agent and its complement are contacted under conditions sufficient to hybridize the targeting agent to its complement.

When targeting agents are used, there is some flexibility as to when the anchoring reagent used in an assay method is immobilized on a solid phase. In one embodiment, the anchoring reagent is provided to the user pre-immobilized on a solid phase through a targeting agent—targeting agent complement interaction. In another embodiment, an anchoring reagent linked to a targeting agent and a solid phase supporting an immobilized targeting agent complement are provided as separate components. The assay method therefore further comprises the step of immobilizing the anchoring reagent on the solid phase by binding the targeting agent to its complement (directly or through the use of a bridging agent). This step may be carried out prior to, concurrently with, or subsequent to the steps associated with formation of a detection complex.

Figure 3:
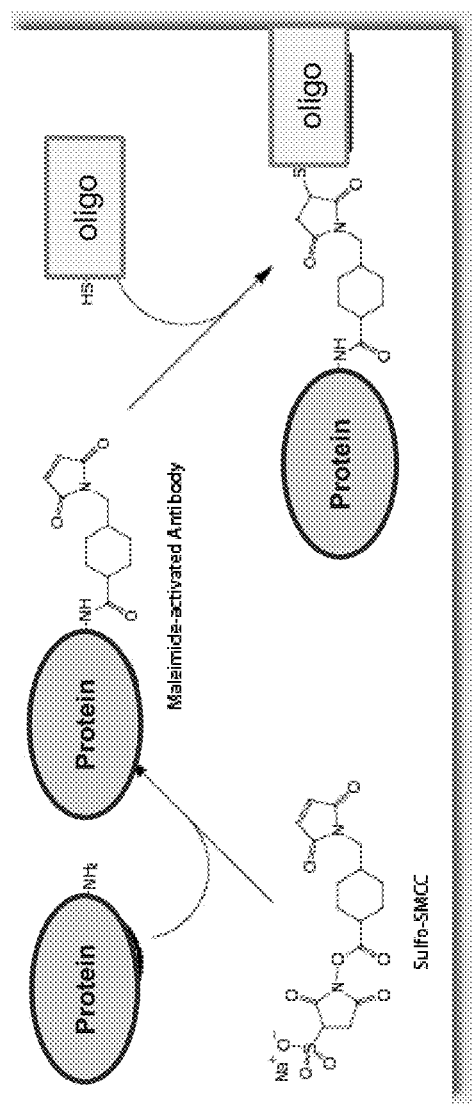
FIG. 3 shows one method of attaching an oligonucleotide to a protein.

In one embodiment, the anchoring reagent comprises a protein linked or otherwise bound to the anchoring sequence. In this embodiment, any protein can be used that can be immobilized on a surface (covalently or non-covalently) and modified by an anchoring oligonucleotide. Non-limiting examples include streptavidin, avidin, or bovine serum albumin (BSA). In a preferred embodiment, the anchoring reagent comprises BSA. The protein can be modified by an anchoring oligonucleotide and attached to a surface using known methods, e.g., as illustrated in FIG. 3, using sulfosuccinimidyl-4-(N-maleimidomethyl)cyclohexane-1-carboxylate (Sulfo-SMCC), a well-established heterobifunctional cross-linking agent. Reaction of the N-hydroxysuccinimide (NHS) group of SMCC with bovine serum albumin (BSA) labels the BSA with thiol-reactive maleimide groups. The maleimide groups are, in turn, reacted with thiol-modified oligonucleotides to form BSA-oligonucleotide conjugates that are linked through stable thioether bonds. In one specific example, arrays are formed by printing a series of the BSA-oligonucleotide conjugates on graphitic carbon surfaces, preferably screen printed carbon ink electrodes. Alternatively, if the protein is avidin or streptavidin, the anchoring sequence can be linked to biotin and joined to immobilized avidin or streptavidin through biotin-avidin or biotin-streptavidin interactions.

The anchoring oligonucleotide attached to the anchoring reagent can be any sequence that will hybridize to the extended sequence (or amplicon) that develops during the extension process. The anchoring oligonucleotide may also comprise a non-complementary region (for example a poly (A) sequence) that is used as a linker sequence between the surface and the complementary (hybridizing) region to extend the complementary region away from the surface. In one embodiment, a hybridization sequence is selected to regions of the amplicon that are not associated with binding to the proximity or detection probes (the "inert" regions). In a more specific embodiment, the hybridization sequence is complementary to the full length of the inert region of the amplicon is included (preferably, about 25 nucleotides in length), alone or in combination with a poly(A) arm of e.g., up to 30 nucleotides in length. Preferably, the anchoring oligonucleotide is selected from: (i) (full length complement to the inert region of the amplicon, 25 nucleotides in length)-(20 nucleotide poly (A) arm); or (ii) (complement to a portion of the inert region of the amplicon, 15 nucleotides in length)-(30 nucleotide poly (A) arm).

In one embodiment, a proximity ligation amplification (PLA) is carried out to extend the second proximity probe. As described above in reference to FIGS. 2(a)-(c), the complex comprising the two proximity probes is contacted with one or more connector oligonucleotides (209a-209b or 211) and ligation of hybridized connector sequences forms a circular oligonucleotide that is then used to extend the second proximity probe by rolling circle amplification (RCA) of the circle. Suitable probe designs and amplification conditions for proximity ligation amplification are well established in the art. A unique aspect of the present invention is the inclusion in one of the connector of the same sequence as is used in the anchoring reagent. During extension of the second proximity probe, the extended region thereby includes the complement of the anchoring sequence, which hybridizes to the anchoring reagent, thereby stabilizing the sandwich complex and preventing dissociation of the second proximity probe. The extended second proximity probe may contain detectable labels (e.g., by inclusion of labeled nucleotides during the RCA extension reaction) that can be measured to determine the amount of analyte on the surface. Alternatively, a plurality of labeled probes comprising detectable labels are added and hybridized to the extended second proximity probe, and the amount of analyte bound to the surface is measured.

Any suitable amplification technique can be used to generate the extended sequence (or amplicon), including but not limited to, PCR (Polymerase Chain Reaction), LCR (Ligase Chain Reaction), SDA (Strand Displacement Amplification), 3SR (Self-Sustained Synthetic Reaction), and isothermal amplification methods, e.g., helicase-dependent amplification and rolling circle amplification (RCA). In a preferred embodiment, RCA is used because it has significant advantages in terms of sensitivity, multiplexing, dynamic range and scalability. Techniques for RCA are known in the art (see, e.g., Baner et al, Nucleic Acids Research, 26:5073 5078, 1998; Lizardi et al., Nature Genetics 19:226, 1998; Schweitzer et al. Proc. Natl. Acad. Sci. USA 97:10113 119, 2000; Faruqi et al., BMC Genomics 2:4, 2000; Nallur et al., Nucl. Acids Res. 29:e118, 2001; Dean et al. Genome Res. 11:1095 1099, 2001; Schweitzer et al., Nature Biotech. 20:359 365, 2002; U.S. Pat. Nos. 6,054,274, 6,291,187, 6,323,009, 6,344,329 and 6,368,801). Several different variants of RCA are known, including linear RCA (LRCA) and exponential RCA (ERCA). RCA generates many thousands of copies of a circular template, with the chain of copies attached to the original target DNA, allowing for spatial resolution of target and rapid amplification of the signal. RCA facilitates (i) detection of single target molecules; (ii) amplification of signals from proteins as well as DNA and RNA; (iii) identifying the location of molecules that have been amplified on a solid surface; (iv) measurement of many different targets simultaneously; and (v) analysis of one or more targets in solution or solid phase. The spatial localization of RCA products with the detection complex is especially advantageous when conducting multiplexed binding assays in an array or particle based format.

Figure 4A:
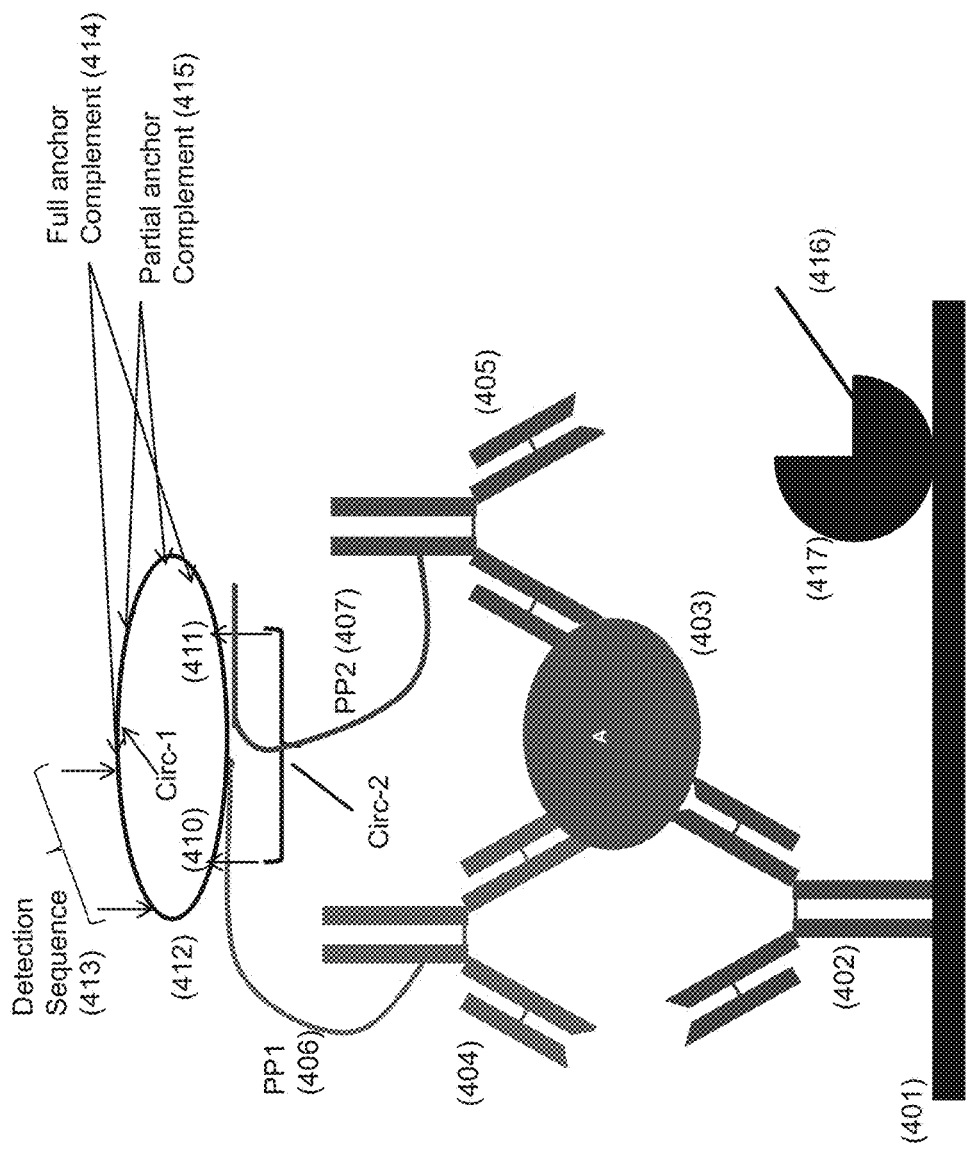
FIG. 4(a) illustrates a preferred embodiment of the invention in which a surface bound complex is formed between a capture reagent, the analyte, and two detection reagents, each attached to a first and second proximity probe, respectively, which are ligated to connector probes to form a circular DNA template that is amplified by rolling circle amplification.
Figure 4B:
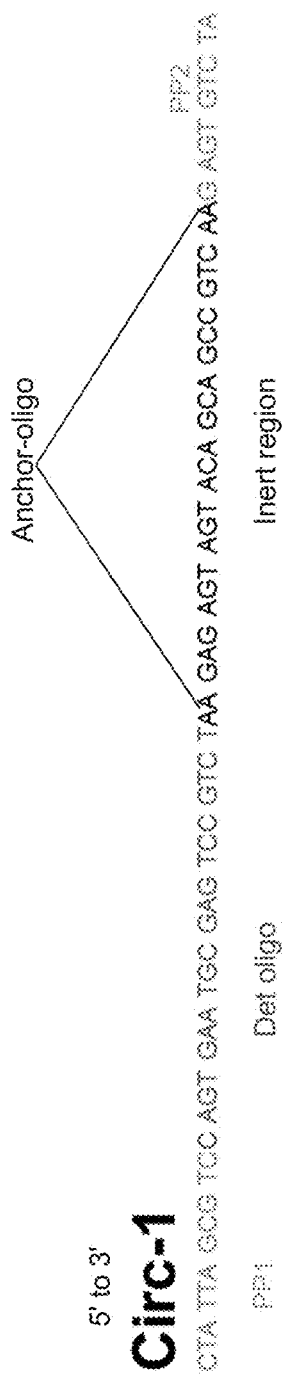
FIG. 4(b) shows an exemplary sequence of the first circular DNA template Circ-1, a detection oligonucleotide sequence, the inert region of the amplicon, and a portion PP2, which is designed to hybridize to the second proximity probe. An alternative embodiment is depicted in FIG. 4(c).
Figure 4C:
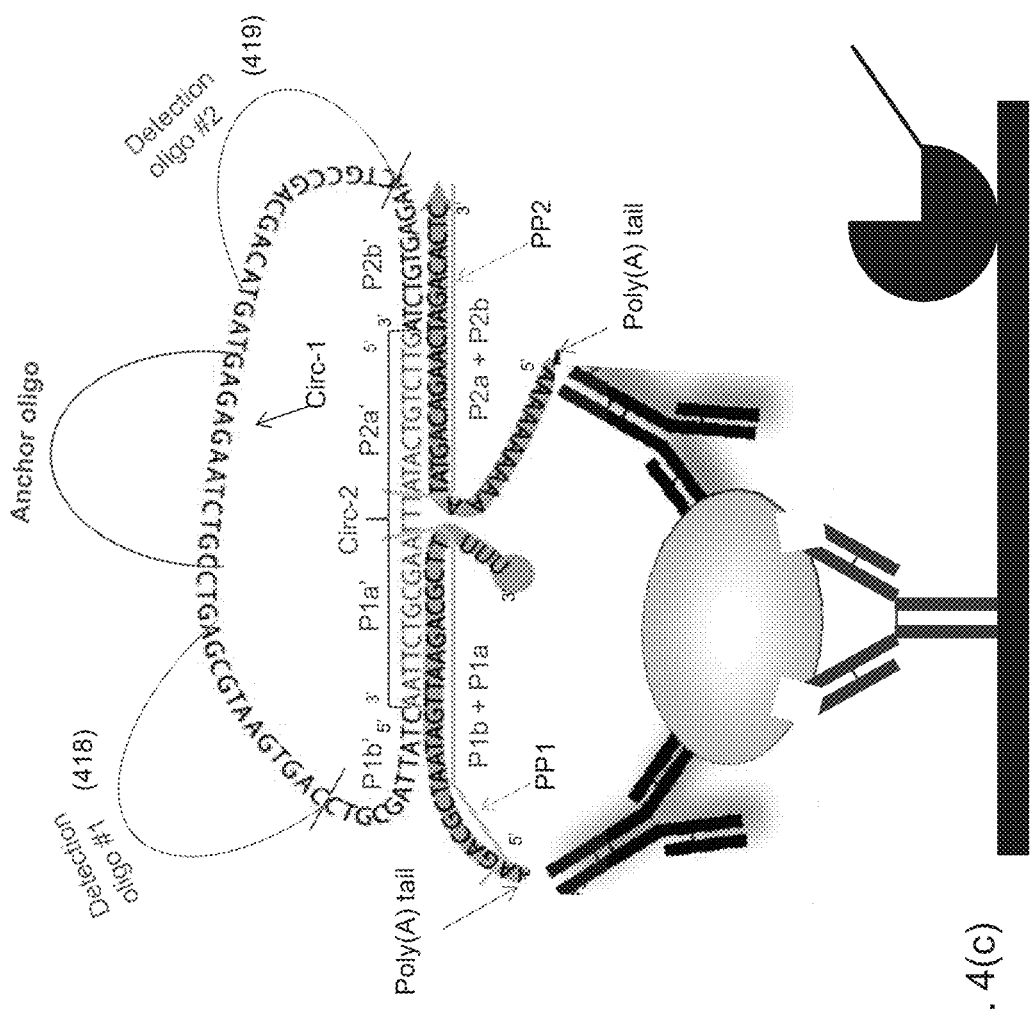

A specific embodiment of the invention is depicted in FIG. 4(a) in which both an anchoring reagent and a signal amplification process are used. A complex is formed on a surface (401) between a capture reagent (402), the analyte (403) and two detection reagents (304 and 305), each including a first and second proximity probe (406 and 407), respectively. First and second connector oligonucleotides (Circ-1 (408) and Circ-2 (409), respectively in FIG. 4(a)) are added, which when both proximity probes are present in the complex, each hybridize to and bridge the two proximity probes. The bound connector probes are ligated at ligations sites 1 and 2 (410 and 411), respectively to form a circular DNA template (412). The circular DNA template is amplified by rolling circle amplification to extend the second proximity probe and, thereby, generate an amplicon comprising one or more detection sequences (413) and an anchoring oligonucleotide sequence complement (414) (including a partial anchoring sequence complement (415)). The anchoring oligonucleotide sequence (416) (attached to a capture moiety (417)) and its complement hybridize, a plurality of detection probes are hybridized to the plurality of detection probe sequences, and the amount of analyte bound to the surface is measured (not shown but illustrated in FIG. 1(a)). FIG. 4(b) shows an exemplary sequence of the first circular DNA template Circ-1 (408) (which is designed to hybridize to the first proximity probe (PP1)), a detection oligonucleotide sequence, the inert region of the amplicon (which can be used in whole or in part to bind to the anchoring oligonucleotide sequence), and a portion PP2 (which is designed to hybridize to the second proximity probe). An additional embodiment is depicted in FIG. 4(c), in which the circular DNA template is amplified by rolling circle amplification to generate an amplicon comprising a plurality of detection sequences (418 and 419, respectively). In a further embodiment, the anchoring oligonucleotide sequence (416), attached to capture moiety 417, can act as a primer, with a free 3' end. In this embodiment, the second proximity probe includes a sequence that is complementary to the detection sequence (413).

In one embodiment, the assay format described herein makes use of detection reagents coupled to detection sequences at the 5' end with the 3' ends exposed to facilitate ligation to the connector probes to form a circular DNA template which is then amplified by rolling circle amplification to extend the second proximity probe (PP2). In this embodiment, PP1 is potentially independently available for extension by the polymerase but this issue can be addressed by adding modified bases to prevent priming by the polymerase. Alternatively, the ligation template, PP1, can be directly coupled via its 3' end to the detection reagent preventing this oligonucleotide from participating as a primer for DNA polymerase, even if it is degraded.

Figure 5:
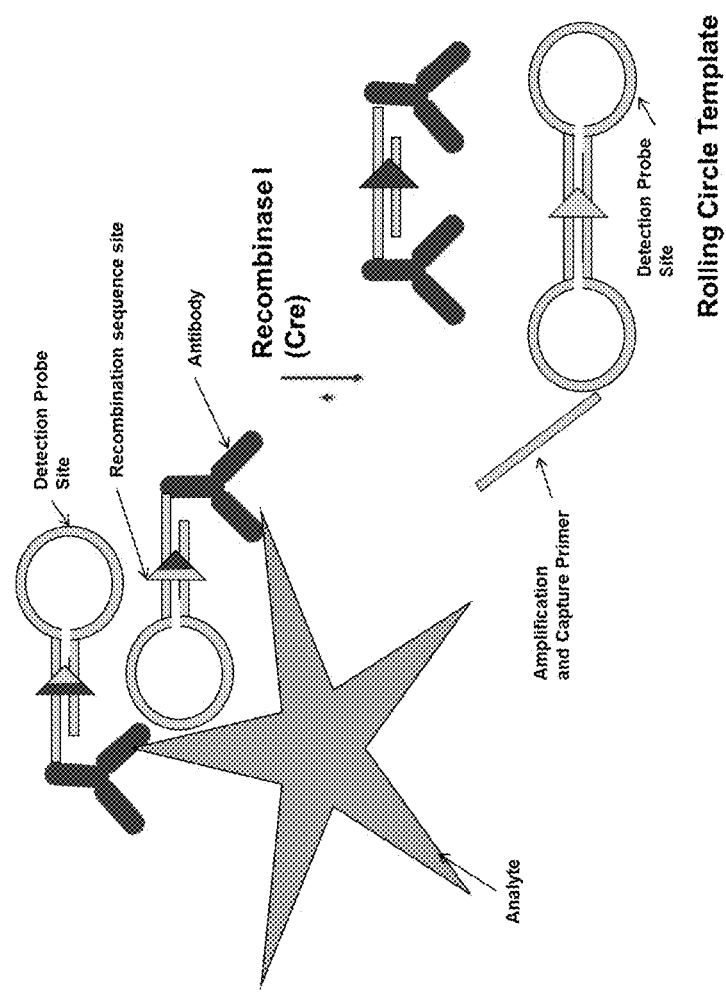

Another approach to generating a target sequence that is amplified by RCA or any suitable amplification method is illustrated in FIG. 5. In this embodiment, each of the proximity probes can fold into a looped hairpin structure. The formation of these hairpin structures generates a single stranded loop and double stranded portion containing a recombination signal. Recombinase is added drive the recombination of the two hairpin structures to form a circular DNA template, which is subsequently subjected to RCA as described above. The amplicon is labeled and optionally anchored to an anchoring reagent and analyte is detected. The key element of this embodiment is the ability of recombinases to catalyze the site specific recombination of DNA containing sequence specific recombination sites. For example, Cre Recombinase from the bacteriophage P1 catalyzes recombination at sites containing loxP sites and other non-limiting examples include but are not limited to Flippase (flp, from Yeast), Hin (*Salmonella*), and Tre, an engineered (evolved) version of Cre. This alternative approach does not require the addition of additional components such as oligonucleotide templates, ATP and dNTPs. In this embodiment, the loxP (recombination) sites are preferably modified to be non-symmetrical, resulting in a shift in the normal equilibrium towards the formation of the desired recombined product. This is illustrated in FIG. 5, with the light/dark shading of the recombination sites.

Moreover, FIG. 6(a) illustrates yet another method to generate a target sequence that is amplified by RCA or any suitable amplification method. Each of the proximity probes attached to the detection reagents include a loxP site that enables site specific recombination between the two oligonucleotides by Cre recombinase, resulting in the formation of a new oligonucleotide sequence that is composed of the 5' portion of one proximity probe and the 3' portion of the other proximity probe, that flank the lox P sites. The newly created target sequence can be subsequently amplified by any suitable method, labeled, optionally anchored, and detected as described above. FIG. 6(a) illustrates this embodiment using the T7 RNA polymerase promoter as the operable element for amplification. It will also be understood that other RNA polymerase sites such as T3 and SP6 linked at either the 3 or 5' portions of the proximity probes, are equally suitable for use in this method. In this embodiment, the loxP (recombination) sites are preferably modified to be non-symmetrical, resulting in a shift in the normal equilibrium towards the formation of the desired recombined product. As shown in FIG. 6(b), the method can also be used to generate a circular DNA template that can be used in RCA.

The invention includes a method for detecting an analyte comprising binding the analyte to a capture reagent on a surface and two detection reagents to form a detection complex. The method comprises measuring the detection complex, wherein the measuring method preferentially measures complexes comprising both detection reagents, relative to complexes comprising only one of the two detection reagents. In one embodiment, the method comprises forming the complex then cross-linking the detection reagents and detecting the cross-linked reagents. Any suitable cross-linking chemistry can be used to join components of the detection complex. For example, the first and second detection reagents can include reactive moieties that are reacted with and joined by the addition of a multifunctional cross-linking agent that links to the reactive moieties. In this embodiment, the reactive moieties and cross-linking agent can include an amine, thiol, hydrazide, aldehyde, ester, iodoacetamide, maleimide, click chemistry reagents, and combinations thereof. In another embodiment, the first and second detection reagents may include binding moieties and the cross-linking agent is a multivalent binding partner of the binding moieties. Several non-limiting examples of this embodiment include: (a) the first and second detection reagents are antibodies of an animal species and the cross-linking agent is a multivalent anti-species antibody targeting antibodies of the animal species; (b) the first and second detection reagents comprise biotin and the cross-linking agent is streptavidin (or vice versa); (c) the first and second detection reagents are linked to streptavidin and the cross-linking agent is a polymer comprising a plurality of biotin molecules (or vice versa); or (d) the first and second detection reagents comprise first and second nucleic acid probes, respectively, and the cross-linking agent is an oligonucleotide that comprises a sequence complementary to the first nucleic acid probe and a separate sequence complementary to the second nucleic acid probe.

In a specific embodiment, an analyte of interest in a sample can be detected by binding the analyte to an immobilized capture reagent, a first detection reagent and a second detection reagent to form a complex, wherein the first detection reagent comprises a first detectable label and a first nucleic acid probe, and the second detection reagent comprises a second detectable label and a second nucleic acid probe. In this embodiment, the first and second detection reagents are cross-linked by (i) hybridizing the first probe to the second probe, (ii) hybridizing the first and second probes to a third nucleic acid having regions complementary to the first and second probes, or (iii) ligating the first and second probes.

The cross-linked products can be detected once they are bound to the surface, or optionally, the cross-linked products can be released from the surface into an eluent and detected. In this regard, only those individual cross-linked products in the eluent that include both the first and second detectable labels are counted. Any suitable detection method can be employed to detect the presence of labels in the eluent. In a preferred embodiment, the label is a fluorescent molecule and labeled cross-linked products present in the eluent are counted by single molecule fluorescence detection, e.g., fluorescence correlation spectroscopy, and/or fluorescence cross-correlation spectroscopy. In this embodiment, single molecule fluorescence detection comprises flowing the eluent through a capillary, focusing a light source on a volume within the capillary to create an interrogation zone and observing the interrogation zone with a light detector to detect the passage of fluorescent molecules through the interrogation zone. The detection method may further comprise detecting a first fluorescence signal associated with the first label and a second fluorescence signal associated with the second label, and counting detection events when both signals detected from the interrogation zone. Alternatively, one label is a fluorescence resonance energy transfer (FRET) donor and the other label is a FRET acceptor and the detection method may further comprise exciting FRET donors in the interrogation zone and detecting fluorescence signals from the FRET acceptor.

In a specific embodiment, an analyte in a sample can be detected by binding the analyte to an immobilized capture reagent, a first detection reagent and a second detection reagent to form a complex, wherein the first detection reagent comprises a first nucleic acid probe, the second detection reagent comprises a second nucleic acid probe; extending the second nucleic acid probe to form an extended sequence comprising a detectable label, the extension being dependent on the co-localization of the first and second nucleic acid probes in the complex; releasing the extended sequence from the surface into an eluent; and counting individual extended sequences in the eluent. The extending step can include binding the probe to a template nucleic acid sequence and extending the probe by polymerase chain reaction. Alternatively, the extending step comprises binding the first probe to a template nucleic acid sequence, forming a circular nucleic acid template, and extending the circular template by rolling circle amplification. The extending step can also comprise binding the first probe to a template nucleic acid sequence, binding the second probe to the template sequence, and ligating the first and second probes.

In the methods of the invention employing capture reagents, the capture reagents can be directly immobilized on solid phases or they can be indirectly immobilized through secondary binding reagents, such as targeting reagents as described below. For example, a capture reagent may be linked to or comprise a targeting reagent that binds to an immobilized targeting reagent complement on the solid phase. The binding of a targeting reagent to its complement may be direct (for example, the targeting reagent may be streptavidin and the complement may be biotin) or indirect through a bridging agent (e.g., the targeting reagent and complement may be biotin, and the bridging reagent may be a multivalent biotin binding receptor such as streptavidin). In one embodiment, a targeting agent and its complement comprise a first oligonucleotide and a complementary oligonucleotide, a receptor-ligand pair, an antigen-antibody pair, a hapten-antibody pair, an epitope-antibody pair, a mimotope-antibody pair, an aptamer-target molecule pair, hybridization partners, or an intercalator-target molecule pair. The targeting agents and complements used in an assay are selected such that the targeting agents and complements associated with a capture or detection reagent for an analyte measured by the assay are substantially non-cross-reactive with the targeting agents and complements associated with the capture or detection reagents for the other analytes measured by the assay. For example, the binding of a binding reagent to its associated binding domain (through its associated targeting agent and targeting agent complement) should be substantially greater than its binding to binding domains associated with other analytes (and presenting different targeting agent complements). Preferably the cross-reactivity for the binding of capture or detection reagents for an analyte to binding domains associated with other analytes relative to the binding to the correct binding domain is <1%, more preferably <0.1% and more preferably <0.01%. In a preferred embodiment, the targeting agent/targeting agent complement comprise a pair of oligonucleotides including complementary sequences and the targeting agent and its complement are contacted under conditions sufficient to hybridize the targeting agent to its complement.

When targeting agents are used, there is some flexibility as to when the capture reagent used in an assay method is immobilized on a solid phase. In one embodiment, the capture reagent is provided to the user pre-immobilized on a solid phase through a targeting agent—targeting agent complement interaction. In another embodiment, a capture reagent linked to a targeting agent and a solid phase supporting an immobilized targeting agent complement are provided as separate components. The assay method therefore further comprises the step of immobilizing the capture reagent on the solid phase by binding the targeting agent to its complement (directly or through the use of a bridging agent). This step may be carried out prior to, concurrently with, or subsequent to the steps associated with formation of a detection complex.

In a specific embodiment, multi-functional targeting agents can be used in the assay methods and components described herein. A multi-functional targeting agent can include (a) a first segment designed to bind to a capture reagent via a first segment complement (i.e., the capture reagent includes a targeting agent complement that is complementary to the first segment of the multi-functional targeting agent), and (b) a second segment designed to bind to the amplicon (i.e., the second segment of the multi-functional targeting agent serves as the anchoring reagent on the surface). Therefore, in this embodiment, a surface includes the multi-functional targeting agent which is contacted with a capture reagent that binds to the targeting agent via a linkage between the first segment and the first segment complement. The 3-AB RCA/PLA assay proceeds as described herein, and the amplicon binds to the anchor segment of the multi-functional targeting agent prior to the measuring step. This method can be used to insure a 1:1 ratio of capture agent to anchoring reagent is employed in the assay method.

A wide variety of surfaces are suitable for use in the methods of the present invention including conventional surfaces from the art of binding assays. Surfaces may be made from a variety of different materials including polymers (e.g., polystyrene and polypropylene), ceramics, glass, composite materials (e.g., carbon-polymer composites such as carbon-based inks). Suitable surfaces include the surfaces of macroscopic objects such as an interior surface of an assay container (e.g., test tubes, cuvettes, flow cells, microfluidic channels, capillaries (e.g., ELLA glass nano-reactors from BioTechne), FACS cell sorter, cartridges, wells in a multi-well plate, etc.), slides, assay chips (such as those used in gene or protein chip measurements), pins or probes, beads, filtration media, lateral flow media (for example, filtration membranes used in lateral flow test strips), etc.

Suitable surfaces also include particles (including but not limited to colloids or beads) commonly used in other types of particle-based assays e.g., magnetic, polypropylene, and latex particles, materials typically used in solid-phase synthesis e.g., polystyrene and polyacrylamide particles, and materials typically used in chromatographic applications e.g., silica, alumina, polyacrylamide, polystyrene. The materials may also be a fiber such as a carbon fibril. Microparticles may be inanimate or alternatively, may include animate biological entities such as cells, viruses, bacterium and the like. A particle used in the present method may be comprised of any material suitable for attachment to one or more capture or detection reagents, and that may be collected via, e.g., centrifugation, gravity, filtration or magnetic collection. A wide variety of different types of particles that may be attached to capture or detection reagents are sold commercially for use in binding assays. These include non-magnetic particles as well as particles comprising magnetizable materials which allow the particles to be collected with a magnetic field. In one embodiment, the particles are comprised of a conductive and/or semiconductive material, e.g., colloidal gold particles. The microparticles may have a wide variety of sizes and shapes. By way of example and not limitation, microparticles may be between 5 nanometers and 100 micrometers. Preferably microparticles have sizes between 20 nm and 10 micrometers. The particles may be spherical, oblong, rod-like, etc., or they may be irregular in shape.

The particles used in the present method may be coded to allow for the identification of specific particles or subpopulations of particles in a mixture of particles. The use of such coded particles has been used to enable multiplexing of assays employing particles as solid phase supports for binding assays. In one approach, particles are manufactured to include one or more fluorescent dyes and specific populations of particles are identified based on the intensity and/or relative intensity of fluorescence emissions at one or more wave lengths. This approach has been used in the Luminex XMAP systems (see, e.g., U.S. Pat. No. 6,939,720) and the BECTON DICKINSON Cytometric Bead Array systems. Alternatively, particles may be coded through differences in other physical properties such as size, shape, imbedded optical patterns and the like. One or more particles provided in a mixture or set of particles may be coded to be distinguishable from other particles in the mixture by virtue of particle optical properties, size, shape, imbedded optical patterns and the like.

In a specific embodiment, the methods of the invention can be used in a multiplexed format by binding a plurality of different analytes to a plurality of capture reagents for those analytes, the capture analytes being immobilized on coded bead, such that the coding identifies the capture reagent (and analyte target) for a specific bead. The method may further comprise counting the number of beads that have a bound analyte (using the detection approaches described herein).

Alternatively or additionally, the detection complex and/or capture reagents can be bound, directly or indirectly, to different discrete binding domains on one or more solid phases, e.g., as in a binding array wherein the binding domains are individual array elements, or in a set of beads wherein the binding domains are the individual beads, such that discrete assay signals are generated on and measured from each binding domain. If capture reagents for different analytes are immobilized in different binding domains, the different analytes bound to those domains can be measured independently. In one example of such an embodiment, the binding domains are prepared by immobilizing, on one or more surfaces, discrete domains of capture reagents that bind analytes of interest. Optionally, the surface(s) may define, in part, one or more boundaries of a container (e.g., a flow cell, well, cuvette, etc.) which holds the sample or through which the sample is passed. In a preferred embodiment, individual binding domains are formed on electrodes for use in electrochemical or electrochemiluminescence assays. Multiplexed measurement of analytes on a surface comprising a plurality of binding domains using electrochemiluminescence has been used in the Meso Scale Diagnostics, LLC, MULTI-ARRAY® and SECTOR® Imager line of products (see, e.g., U.S. Pat. Nos. 7,842,246 and 6,977,722, the disclosures of which are incorporated herein by reference in their entireties).

Still further, the detection complex and/or capture reagents can be bound, directly or indirectly, to an electrode surface, which optionally includes different discrete binding domains, as described above. The electrode surface can be a component of a multi-well plate and/or a flow cell. Electrodes can comprise a conductive material, e.g., a metal such as gold, silver, platinum, nickel, steel, iridium, copper, aluminum, a conductive allow, or the like. They may also include oxide coated metals, e.g., aluminum oxide coated aluminum. The electrode can include a working and counter electrodes which can be made of the same or different materials, e.g., a metal counter electrode and carbon working electrode. In one specific embodiment, electrodes comprise carbon-based materials such as carbon, carbon black, graphitic carbon, carbon nanotubes, carbon fibrils, graphite, graphene, carbon fibers and mixtures thereof. In one embodiment, the electrodes comprise elemental carbon, e.g., graphitic, carbon black, carbon nanotubes, etc. Advantageously, they may include conducting carbon-polymer composites, conducting particles dispersed in a matrix (e.g. carbon inks, carbon pastes, metal inks, graphene inks), and/or conducting polymers. One specific embodiment of the invention is an assay module, preferably a multi-well plate, having electrodes (e.g., working and/or counter electrodes) that comprise carbon, e.g., carbon layers, and/or screen-printed layers of carbon inks.

The invention includes methods for detecting and counting individual detection complexes. In a specific embodiment, the surface can comprise a plurality of capture reagents for one or more analyte molecules that are present in a sample and the plurality of capture reagents are distributed across a plurality of resolvable binding regions positioned on the surface. Under the conditions used to carry out and analyze a measurement, a "resolvable binding region" is the minimal surface area associated with an individual binding event that can be resolved and differentiated from another area in which an additional individual binding event is occurring. Therefore, the method consists of binding the one or more analyte molecules to one or more capture reagents on the surface, determining the presence or absence of an analyte molecule in a plurality of resolvable binding regions on the surface, and identifying the number of resolvable binding regions that contain an analyte molecule and/or the number of analyte domains that do not contain an analyte molecule.

The resolvable binding regions can be optically interrogated, in whole or in part, i.e., each individual resolvable binding region can be individually optically interrogated and/or the entire surface comprising a plurality of resolvable binding regions can be imaged and one or more pixels or groupings of pixels within that image can be mapped to an individual resolvable binding region. A resolvable binding region may also be a microparticle within a plurality of microparticles. The resolvable binding regions exhibiting changes in their optical signature can be identified by a conventional optical detection system. Depending on the detected species (e.g., type of fluorescence entity, etc.) and the operative wavelengths, optical filters designed for a particular wavelength can be employed for optical interrogation of the resolvable binding regions. In embodiments where optical interrogation is used, the system can comprise more than one light source and/or a plurality of filters to adjust the wavelength and/or intensity of the light source. In some embodiments, the optical signal from a plurality of resolvable binding regions is captured using a CCD camera. Other non-limiting examples of camera imaging systems that can be used to capture images include charge injection devices (CIDs), complementary metal oxide semiconductors (CMOSs) devices, scientific CMOS (sCMOS) devices, and time delay integration (TDI) devices, as will be known to those of ordinary skill in the art. In some embodiments, a scanning mirror system coupled with a photodiode or photomultiplier tube (PMT) can be used for imaging.

The measuring step of the method can comprise imaging an optical signal from the surface (or a portion thereof) to generate an image that consists of a plurality of pixels, wherein each resolvable binding region maps to one or more pixels or groups of pixels in the image. Image analysis to identify pixels or sets of pixels having a signal indicative of a binding event (detection complex) can be accomplished using art recognized methods, for example, the wealth of image analysis algorithms and software available to identify and count labeled biological structures in fluorescence microscopy images. In one embodiment, after filtering the image to remove large-scale signal gradients, the image is converted to a binary image using a segmentation threshold. Resolvable binding regions are found by identifying contiguous regions of above-threshold intensity. Binding domains are categorized as binding events if they meet size and intensity requirements.

In one embodiment, the resolvable binding regions are elements of an array. In a preferred embodiment, the array is an array of micro-wells or nanowells, e.g., individual depressions or wells of a unitary substrate. Preferably, the volume of the wells is less than 100 nL, preferably less than 50 nL. In one embodiment, the volume of the wells ranges from approximately 10 aL-100 pL. Optionally, the wells may be configured to hold a microparticle.

In one embodiment, at least 50% of the resolvable binding regions positioned on a substrate and addressed during an assay contain either zero or one analyte molecule. Preferably, at least 80%, more preferably at least 95%, and most preferably at least 99% of the resolvable binding regions contain either zero or more analyte molecule. The concentration of analyte molecules in the sample is determined at least in part using a calibration curve, a Poisson distribution analysis and/or a Gaussian distribution analysis of the number of binding regions that contain at least one or one analyte molecule. In a specific embodiment, the surface comprises a plurality of particles each including a plurality of capture reagents for an analyte molecule and the plurality of particles is distributed across a plurality of resolvable binding regions (e.g., an array of micro- or nano-wells). Therefore, the method includes: (i) binding one or more analyte molecules to one or more capture reagents on the surface, (ii) distributing the plurality of particles across an array of resolvable binding regions; and (iii) determining the presence or absence of an analyte molecule in each resolvable binding regions, so as to identify the number of binding domains that contain an analyte molecule and/or the number of binding domains that do not contain an analyte molecule.

It may also be advantageous to detect an analyte in a confined volume using one or more of the methods of the present invention. In these embodiments, an analyte molecule in a sample is bound to a pair of detection reagents, each bearing distinguishable labels, and analytes are partitioned across a plurality of locations, e.g., wells or reaction vessels (referred to herein as "reaction vessels"), on a substrate, e.g., a plate, dish, chip, optical fiber, grid, etc., so that the majority of reaction vessels contain one or fewer analytes. This method enables the user to detect the analyte molecule by counting the number of reaction vessels that contain each of the distinguishable labels attached to the analyte. In some cases, the plurality of reaction vessels addressed is a portion or essentially all of the total quantity of reaction vessels which may contain at least one analyte molecule (e.g., either associated with at least one analyte molecule or not associated with any analyte molecules). Reference is made to the following published U.S. Patent Applications: U.S. Patent Application No. 20070259448; U.S. Patent Application No. 20070259385; U.S. Patent Application No. 20070259381; and International Patent Application No. PCT/US07/019184; and International Patent Application No. PCT/US09/005428. The disclosures of each of these publications are incorporated herein by reference. At least a portion of the reaction vessels may be addressed and a measure indicative of the number/percentage of the reaction vessels containing at least one analyte molecule or particle may be made. In some cases, based upon the number/percentage, a measure of the concentration of analyte molecules in the fluid sample may be determined.

In a specific embodiment that enables the detection of an analyte molecule in a confined volume, analytes in a sample can be detected by binding the analytes to first and second detection reagents to form detection complexes. Each detection complex includes an analyte, a first detection reagent, and a second detection reagent, and the first detection reagent and the second detection reagent have first and second detectable labels, respectively. The detection complexes can be formed simultaneously, substantially simultaneously, or sequentially. The detection complexes are partitioned across a plurality of reaction vessels so that the majority of reaction vessels contain one or fewer detection complexes, and the number of analyte molecules is detected by counting the number of reaction vessels that contain each of the first and second detectable labels. Preferably, the detection complexes are partitioned across the plurality of reaction vessels so that the likelihood of detecting an unbound first detection reagent and an unbound second detection reagent in the same vessel is less than about 1 in 10, preferably less than about 1 in 100, more preferably less than about 1 in 1000, and most preferably less than about 1 in 10,000. The detection complexes are partitioned across a plurality of reaction vessels, i.e., divided or separated into parts or portions, e.g., manually by aliquoting a portion of detection complexes across a plurality of reaction vessels, and/or by flowing a solution comprising detection complexes across a plurality of reaction vessels so that detection complexes are separated into individual reaction vessels on a support.

In a further embodiment, analytes in a sample can be detected by (a) binding the analytes to surface-bound capture reagents and first and second detection reagents to form detection complexes, wherein (i) each detection complex includes a capture reagent, an analyte, a first detection reagent, and a second detection reagent, and (ii) the first detection reagent has a first detectable label and the second detection reagent has a second detectable label. The detection complexes can be formed by any order of addition of components, e.g., by simultaneously or substantially simultaneously bringing the components together, or sequentially adding each component to build the detection complex in a step-wise fashion. The detection complexes are partitioned across a plurality of reaction vessels so that the majority of reaction vessels contain one or fewer analytes, and the number of analyte molecules is detected by counting the number of reaction vessels that contain the first and second detectable labels. The method can be conducted with or without washing after each step and prior to the detection step.

The surface can be a particle and optionally, a plurality of capture reagents are immobilized on a particle or a plurality of particles. In this embodiment, the partitioning step can be conducted in a number of ways: (i) the capture reagents are immobilized on a plurality of particles and the partitioning of analytes is achieved by binding the analytes to the capture reagents and partitioning the particles into the plurality of reaction vessels; or (ii) the capture reagents are immobilized on a plurality of particles and the partitioning of analytes is achieved by partitioning the particles into a plurality of reaction vessels then binding the analytes to the capture reagents.

The plurality of reaction vessels can also comprise water droplets dispersed in a water-in-oil emulsion. Emulsions can be made with droplets of diameters up to 100 um and volumes of nearly 1 nL. The high capacity, i.e., greater than $10^{10}$ droplets in 1 mL of emulsion, the ease of preparing emulsions and their high stability over a broad range of conditions render them an ideal means of compartmentalizing biochemical assays. Each water droplet functions as an independent reaction vessel and detection complexes, optionally attached to a particle, can be partitioned across a plurality of water droplets.

Alternatively, the surface is a location within one of the reaction vessels, e.g., if the reaction vessels are wells of a plate, then the surface can be a domain or region within one of the wells of the plate. In this embodiment, the capture reagents can be immobilized on the domains or regions of the plurality of reaction vessels and the partitioning step is achieved by binding the analyte molecules to the capture reagents. In another embodiment, the plurality of reaction vessels includes regions with targeting moieties immobilized thereto, the capture reagents comprise targeting moiety complements, and the partitioning step is achieved by binding the targeting moiety complements to the target moieties positioned in the plurality of reaction vessels.

In an additional or alternative embodiment, the binding assays described herein can also include a pre-concentration step to improve assay performance, for example, by increasing the concentration of analyte in the sample and/or by reducing the concentration of extraneous materials that may be present in the sample which may hinder the performance of the assay. This can be done by (a) contacting a sample including the analyte of interest with a solid phase, e.g., particle, linked to a first binding reagent that binds the analyte, thereby forming a complex comprising the analyte bound to said first binding reagent; (b) collecting the complex; (c) separating unbound components of the sample from the complex; (d) and releasing the complex. This method of concentrating the analyte can be performed before the binding assays described herein are performed in order to remove impurities that might hinder assay performance. In this regard, reference is made to U.S. Application Publication No. US 2010/0261292, the disclosure of which is incorporated herein by reference.

In particular, the concentration step involves subjecting the sample comprising the analyte under conditions sufficient to form an analyte complex that includes the analyte bound to a first detection reagent, wherein the first detection reagent is linked to a first nucleic acid probe. Thereafter, the analyte complex formed at the conclusion of the concentration step is bound to (i) a capture reagent on a surface comprising the capture reagent for the analyte, and an anchoring reagent comprising an anchoring oligonucleotide sequence; and (ii) a second detection reagent for the analyte that is linked to a second nucleic acid probe; thereby forming a complex on the surface comprising the capture reagent, the analyte and the first and second detection reagents. The surface bound complex is subject to an extension process that requires the first and second probes to be in proximity, extending the second probe to form an extended sequence comprising an anchoring sequence complement that is complementary to the anchoring sequence. The anchoring sequence is then hybridized to the anchoring sequence complement; and the amount of extended sequence bound to the surface is measured. In a specific embodiment, the concentrating step further comprises: (i) contacting the sample including the analyte with a solid phase linked to a targeting agent complementary to at least a portion of the first nucleic acid probe, thereby forming a concentration complex comprising the analyte bound to the solid phase via a binding reaction between the first nucleic acid probe and the targeting agent; (ii) collecting the concentration complex; (iii) separating unbound components of the sample from the concentration complex; and (iv) releasing the concentration complex to separate the solid phase from the analyte to form the analyte complex.

Collection, as used herein, refers to the physical localization of a material in a mixture. Collection includes the localization of a material through binding reactions or adsorption. For example, a material in a mixture may be collected on a solid phase by adsorption of the material on the solid phase or by binding of the material to binding reagents on the solid phase. Collection is not, however, limited to localization at a solid phase and may also include techniques in the art for localizing materials at a location/volume within a larger fluid volume, for example, localization of materials through the use of optical tweezers (which use light to manipulate microscopic objects as small as a single atom, wherein the radiation pressure from a focused laser beam is able to trap small particles), electric or magnetic fields, focused flow, density gradient centrifugation, etc.

Certain embodiments of the invention include the collection of microparticles or materials that are bound to microparticles. Suitable collection methods include the many methods known in the art of microparticle-based assays that achieve localization of microparticles from a suspension. These include sedimentation under gravity or by centrifugation, filtration onto a filter or porous membrane, localization (of magnetizable particles) by application of a magnetic field, binding or adsorption of the particles to a macroscopic solid phase, use of optical tweezers, etc.

Release, as used herein, refers to delocalization of a previously collected material. Materials that are held at a localized position through chemical bonds or through specific or non-specific binding interactions may be allowed to delocalize by breaking the bond or interaction so that the materials may diffuse or mix into the surrounding media. There are many well-established cleavable chemical linkers that may be used that provide a covalent bond that may be cleaved without requiring harsh conditions. For example, disulfide containing linkers may be cleaved using thiols or other reducing agents, cis-diol containing linkers may be cleaved using periodate, metal-ligand interactions (such as nickel-histidine) may be cleaved by changing pH or introducing competing ligands. Similarly, there are many well-established reversible binding pairs that may be employed (including those that have been identified in the art of affinity chromatography). By way of example, the binding of many antibody-ligand pairs can be reversed through changes in pH, addition of protein denaturants or chaotropic agents, addition of competing ligands, etc. Other suitable reversible binding pairs include complementary nucleic acid sequences, the hybridization of which may be reversed under a variety of conditions including changing pH, decreasing salt concentration, increasing temperature above the melting temperature for the pair and/or adding nucleic acid denaturants (such as formamide). Such reversible binding pairs may be used as targeting agents (as described above), e.g., a first targeting agent may be linked to a first binding reagent that binds an analyte, a second targeting agent may be linked to a solid phase, and a binding interaction of the first and second targeting agents may be used to reversibly immobilize the first binding reagent on the solid phase.

Release also includes physical delocalization of materials by, for example, mixing, shaking, vortexing, convective fluid flow, mixing by application of magnetic, electrical or optical forces and the like. Where microparticles or materials bound to microparticles have been collected, such physical methods may be used to resuspend the particles in a surrounding matrix. Release may simply be the reverse of a previous collection step (e.g., by any of the mechanisms described above) or collection and release could proceed by two different mechanisms. In one such example, collection of materials (such as an analyte or a complex comprising an analyte) bound to a particle can be achieved by physical collection of the particle. The materials are then released by cleaving a bond or reversing a binding reaction holding the material on the particle. In a second such example, materials (such as an analyte of a complex comprising an analyte are collected on a surface through a binding interaction with a binding reagent that is linked to the surface. The material is then released by breaking a bond or a second binding interaction linking the binding reagent to the surface.

Collection followed by release may be used to concentrate and/or purify analytes in a sample. By collecting in a first volume and releasing into a second smaller volume, an analyte in a sample can be concentrated. Through concentration, it is often possible to significantly improve the sensitivity of a subsequent measurement step. By collecting from a sample and removing some or all of the uncollected sample, potential assay interferents in the sample may be reduced or eliminated. Optionally, removal of the unbound sample may include washing a collected material with and releasing the collected material into defined liquid reagents (e.g., assay or wash buffers) so as to provide a uniform matrix for subsequent assay steps.

Figure 16:
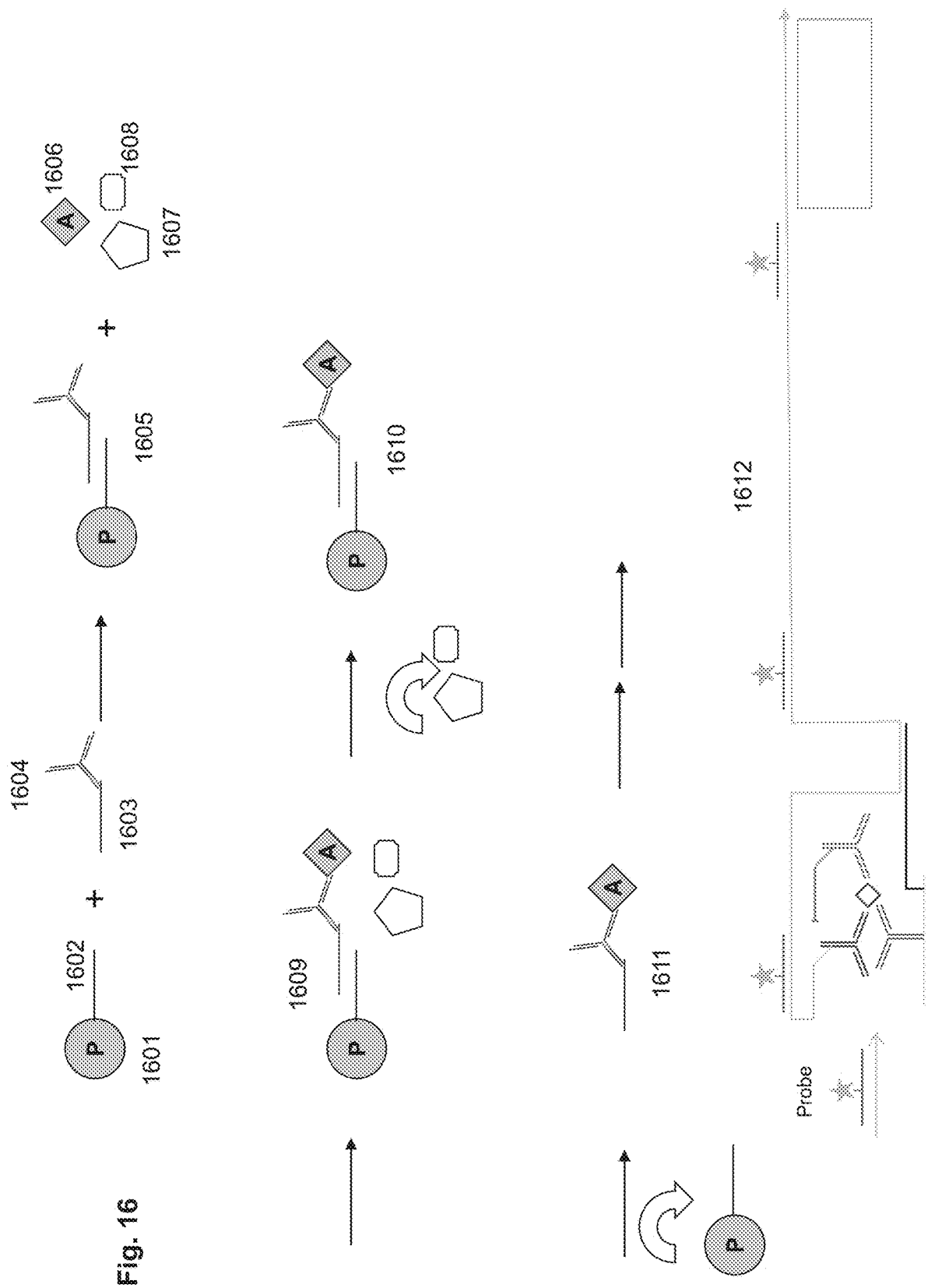
FIG. 16 is a schematic representation of an assay method as described herein including an analyte concentration step.

As illustrated in FIG. 3(a) of US 2010/0261292, which is incorporated herein by reference, the method includes contacting a sample comprising a target analyte with a particle linked to a first binding reagent that binds the target analyte, wherein the first binding reagent is linked to a first targeting agent and the particle is linked to a second targeting agent, and the first binding reagent and the particle are linked via a binding reaction between the first and second targeting agents to form a complex comprising said target analyte bound to said first binding reagent. The complex is then collected and unbound components in the sample are separated from the complex. The complex is released and the released complex is contacted with a second binding reagent bound to a solid phase, wherein the second binding reagent binds to the complex. This specific embodiment is illustrated in FIG. 16. A particle (1601) is modified to include a capture oligonucleotide sequence, 1602, which is complementary, at least in part, to the sequence of a proximity probe, 1603, which is bound to a detection antibody, 1604. The particle is mixed with the proximity probe to hybridize the capture sequence to the probe sequence to form a complex, 1605. The complex is then mixed with a sample comprising analyte, 1606, and optionally, one or more contaminants, 1607-1608. The analyte is bound to the detection antibody (1609) and the contaminants are removed (1610). The particle is removed under suitable conditions from the complex including bound analyte to form a concentrated solution of analyte bound to proximity probe (1611), which may be used as described herein in an immunoassay in which an additional proximity probe is bound to the analyte and a 3-antibody complex is subjected to RCA-PLA to detect the presence of analyte in the sample (1612), e.g., as described in FIG. 2(a) and the accompanying description.

Figure 17:
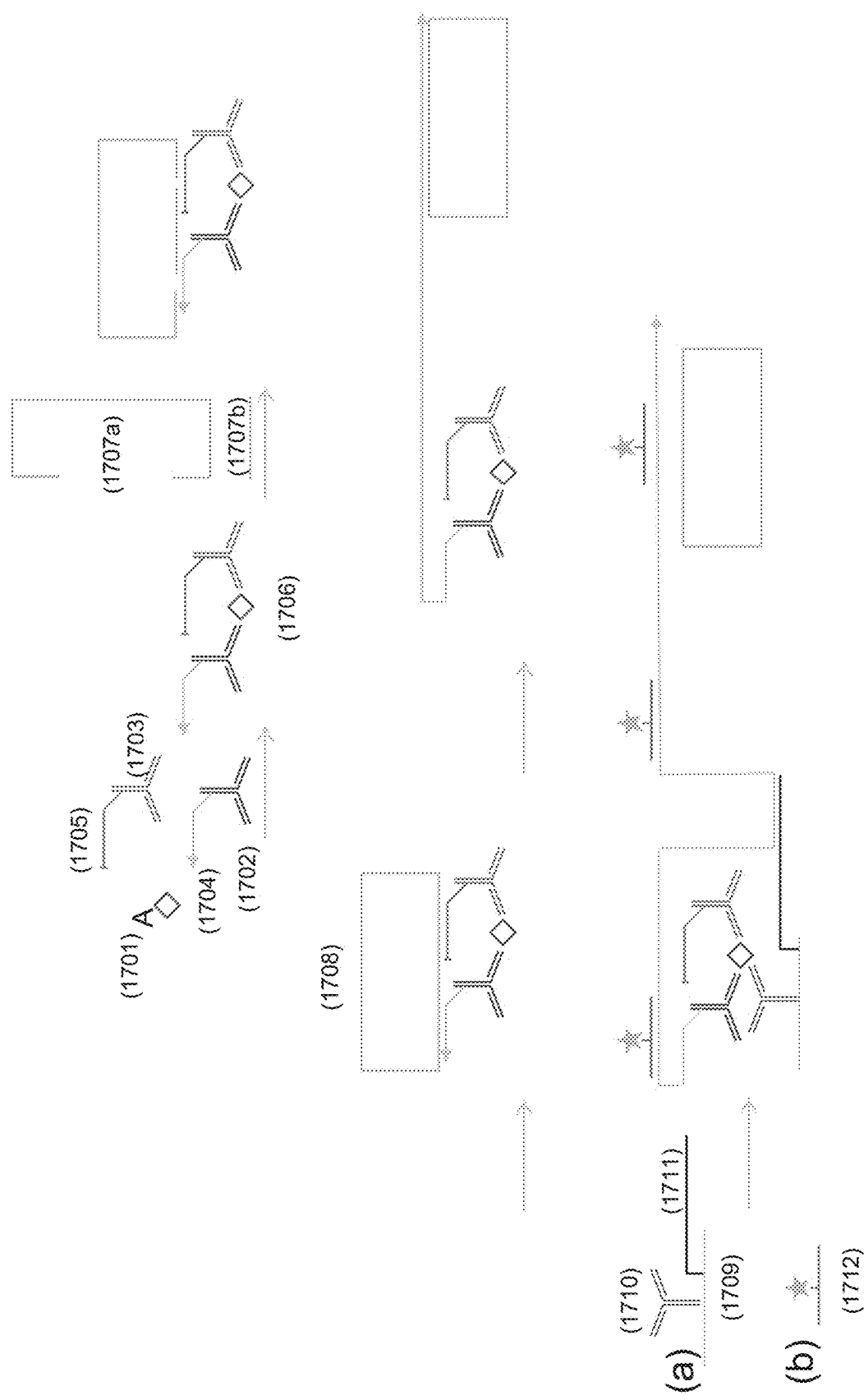
FIG. 17 is a schematic representation of an assay method as described herein wherein the amplicon is formed in solution prior to being bound to a surface via a capture reagent and/or anchoring reagent.

In another embodiment, an immunoassay complex between detection antibodies and analyte is formed in solution, followed by amplification, and then the amplified product is adhered to a particle via capture reagent and/or anchor. Optionally, the amplified product can be filtered and then captured on a particle via a capture reagent and/or anchor. This method is illustrated in FIG. 17. The analyte, A (1701) is bound to the detection antibodies (1702 and 1703, respectively) each bound to proximity probes (1704 and 1705, respectively) and a detection complex is formed comprising analyte bound to each of the detection antibodies (1706). The detection complex is contacted with two connector sequences (1707a and 1707b) that each include an end sequence complementary to non-overlapping regions of the first proximity probe and an end sequence complementary to non-overlapping regions of the second proximity probe. The connector sequences are hybridized to the first and second proximity probes, and the end sequences of the connector oligonucleotides are ligated to from a circular target sequence (1708) that is hybridized to both the first and second proximity probes. The second proximity probe is extended by rolling circle hybridization to generate an amplicon comprising a binding reagent that is complementary to an anchoring reagent. The amplicon is contacted with the surface (1709) including the capture reagent (1710) and anchoring reagent (1711) and the amount of amplicon bound to the surface is measured via labeling using a plurality of labeled probes (1712).

Labeled Probes

In embodiments, the present disclosure provides a labeled probe that comprises an oligonucleotide and at least one electrochemiluminescent moiety. In embodiments, the present disclosure provides a labeled probe that comprises an oligonucleotide and at least two electrochemiluminescent moieties. In embodiments, the electroluminescent moiety is an electrochemiluminescent label. In embodiments, the labeled probe is used in the methods and assays described herein to measure the amount of extended sequence. In embodiments, the extended sequence is an amplification product (or amplicon) of an RCA process. In embodiments, the labeled probe comprises an oligonucleotide that is complementary to a detection sequence in an extended sequence. In embodiments, a plurality of labeled probes is used to measure the amount of extended sequence bound to the surface in the methods described herein. In embodiments, measuring the labeled probes determines the quantity of analyte in a sample.

Detectable luminescent labels such as fluorophores are known to have self-quenching effects. Self-quenching is the reduction in luminescence intensity of one label by another, which typically increases with high label concentrations or with high labeling densities. Thus, multiple luminescent labels in close proximity is generally avoided in order to reduce self-quenching effects. Therefore, it was surprisingly discovered by the inventors that the labeled probes of the invention, although containing structures that hold multiple electrochemiluminescent labels in close proximity, still provided efficient generation of ECL from the labels and improved signals relative to probes with just one label. Thus, in embodiments, labeled probes of the present disclosure comprise more than one electrochemiluminescent labels. In embodiments, the labeled probe comprises from 2 to 10 electrochemiluminescent labels. In embodiments, the labeled probe comprises from 2 to 5 electrochemiluminescent labels. In embodiments, the labeled probe comprises three electrochemiluminescent labels. In embodiments, the labeled probe comprises 1, 2, 3, 4, 5, 6, 7, 8, 9, or 10 electrochemiluminescent labels.

In embodiments, the present disclosure provides labeled probes comprising an oligonucleotide and multiple electrochemiluminescent labels. The probes may include (i) one or more (or two or more) labels linked to modified nucleotide bases of the oligonucleotide, (ii) a labeled moiety having one or more (or two or more) labels, the moiety being linked to the 5' end of the oligonucleotide, (iii) a labeled moiety having one or more (or two or more) labels, the moiety being linked to the 3' end of the oligonucleotide or (iv) a combination of two or more of (i), (ii) and (iii).

In embodiments, the present disclosure provides a labeled probe of Formula I:

the electrochemiluminescent capability of the labeled probe. In embodiments, the nucleotide base is a naturally-occurring nucleotide base. In embodiments, the nucleotide base is a synthetic nucleotide base. In embodiments, the nucleotide base is a purine or pyrimidine. In embodiments, the nucleotide base is adenine, cytosine, guanine, thymine, or uracil. In embodiments, the nucleotide base is xanthine, hypoxanthine, 2,6-diaminopurine, 6,8-diaminopurine, 5,6-dihydrouracil, 5-methylcytosine, 5-hydroxymethylcytosine, isoguanine, or isocytosine.

The R of Formula I can be any suitable electrochemiluminescent label. Suitable electrochemiluminescent labels include electrochemiluminescent organometallic complexes of ruthenium, osmium, iridium, rhenium and the lanthanide metals. Suitable electrochemiluminescent labels include electrochemiluminescent organometallic complexes of these metals containing bipyridine or phenanthroline ligands (substituted or unsubstituted). Examples of suitable electrochemiluminescent labels can be found in U.S. Pat. Nos. 5,714,089, 6,316,607, 6,808,939, 9,499,573, 6,468,741, 6,479,233, and 6,136,268. In embodiments, the electrochemiluminescent label is

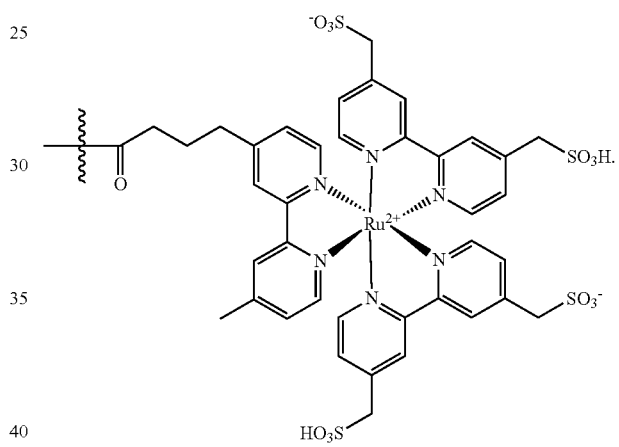

Formula I wherein B is a nucleotide base, R is an electrochemiluminescent label, $L^1$ is a linking group, $L^2$ is a linking group, j is an integer between 0 and 11, k is an integer between 0 and 1, m is an integer between 0 and 11, and n is an integer between 0 and 5.

The nucleotide base B of Formula I is any nucleotide base, as long as the nucleotide base does not interfere with In embodiments, $L^1$ and $L^2$ are independently alkyl, haloalkyl, aryl, aralkyl, heteroaryl, heteroaralkyl, cycloalkyl, cycloalkylalkyl, heteroalkylsubstituted cycloalkyl, heterosubstituted cycloalkyl, heteroalkyl, cyanoalkyl, heterocyclyl, heterocyclylalkyl, alkenyl, alkynyl, phenyl, or combinations thereof, having zero or one or more carbon chains, optionally substituted by heteroatoms. In embodiments, $L^1$ and $L^2$ are independently alkyl linkers having zero or one or more carbon chains, optionally substituted by heteroatoms. In embodiments, the one or more heteroatoms are independently nitrogen, sulfur, phosphate, or oxygen. In embodiments, $L^1$ is from about 1 to about 20 carbons and/or heteroatoms in length. In embodiments, $L^1$ is from about 4 to about 15 carbons and/or heteroatoms in length. In embodiments, $L^1$ is about 4, about 5, about 6, about 7, about 8, about 9, about 10, about 11, about 12, about 13, about 14, or about 15 carbons and/or heteroatoms in length. In embodiments, $L^2$ is from about 1 to about 30 carbons and/or heteroatoms in length. In embodiments, $L^2$ is from about 7 to about 26 carbons and/or heteroatoms in length. In embodiments, $L^2$ is about 7, about 8, about 9, about 10, about 11, about 12, about 13, about 14, about 15, about 16, about 17, about 18, about 19, about 20, about 21, about 22, about 23, about 24, about 25, or about 26 carbons and/or heteroatoms in length.

As used herein, "between" is a range inclusive of the ends of the range. For example, an integer between 0 and 11 explicitly includes the integers 0 and 11, and any integers that fall within 0 and 11, i.e., 1, 2, 3, 4, 5, 6, 7, 8, 9, and 10. An integer between 0 and 5 explicitly includes the integers 0 and 5, and any integers that fall within 0 and 5, i.e., 1, 2, 3, and 4.

In embodiments, R comprises ruthenium complex $RP^1P^2P^3$, wherein each of $P^1$, $P^2$, and $P^3$ is independently a bipyridine, a substituted bipyridine, a phenanthroline, or a substituted phenanthroline. In embodiments, the chemiluminescent label R is

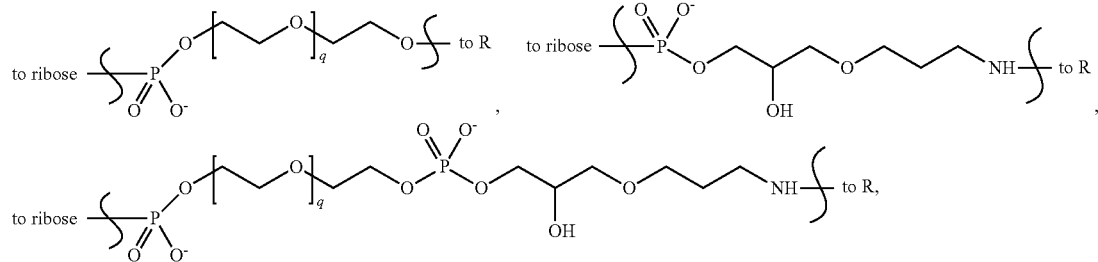

In embodiments, B is a uracil attached to $L^1$ at a 5 position of the uracil.

In embodiments, $L^1$ comprises

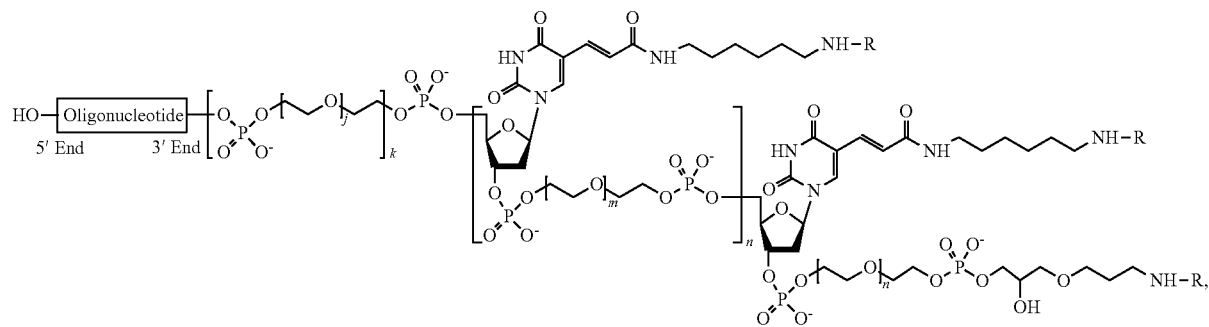

or a combination thereof, wherein p is an integer between 1 and 12.

In embodiments, $L^2$ comprises or a combination thereof, wherein q is an integer between 0 and 11.

In embodiments, the present disclosure provides a labeled probe of Formula II:

Formula II wherein j is an integer between 0 and 11, k is an integer between 0 and 1, m is an integer between 0 and 11, n is an integer between 0 and 5, and R is an electrochemiluminescence label:

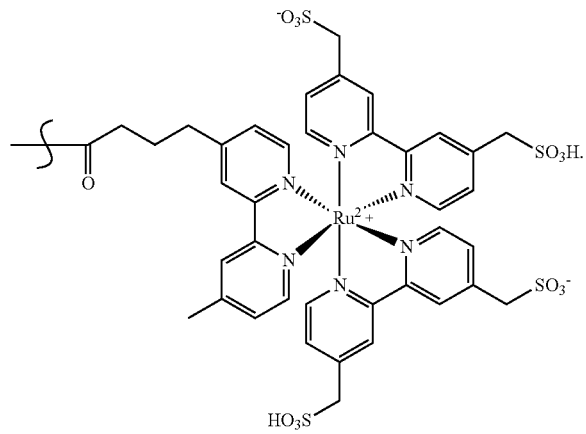

In embodiments, j is an integer between 0 and 5, k is 0, m is an integer between 0 and 5, and n is an integer between 2 and 7. In embodiments, k is 0, j is 0, m is 1, and n is 5.

In embodiments, the oligonucleotide of the labeled probe comprises a sequence having at least 60%, at least 65%, at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or about 100% sequence identity with 5'-CAGTGAATGCGAGTCCGTCT-3' (SEQ ID NO:31). In embodiments, the oligonucleotide of the labeled probe comprises a sequence having at least 85% sequence identity with 5'-CAGTGAATGCGAGTCCGTCT-3' (SEQ ID NO:31). In embodiments, the oligonucleotide of the labeled probe comprises a sequence having at least 88% sequence identity with 5'-CAGTGAATGCGAGTCCGTCT-3' (SEQ ID NO:31). In embodiments, the oligonucleotide of the labeled probe comprises a sequence having at least 90% sequence identity with 5'-CAGTGAATGCGAGTCCGTCT-3' (SEQ ID NO:31). In embodiments, the oligonucleotide of the labeled probe comprises a sequence having at least 95% sequence identity with 5'-CAGTGAATGCGAGTCCGTCT-3' (SEQ ID NO:31). In embodiments, the oligonucleotide of the labeled probe comprises a sequence having at least 98% sequence identity with 5'-CAGTGAATGCGAGTCCGTCT-3' (SEQ ID NO:31). In embodiments, the oligonucleotide of the labeled probe comprises a sequence having at least 99% sequence identity with 5'-CAGTGAATGCGAGTCCGTCT-3' (SEQ ID NO:31).

In embodiments, the oligonucleotide of the labeled probe comprises 5'-CAGTGAATGCGAGTCCGTCT-3' (SEQ ID NO:31). In embodiments, the oligonucleotide of the labeled probe comprises 5'-CAGTGAATGCGAGTCCGTCTAAG-3' (SEQ ID NO:32). In embodiments, the oligonucleotide of the labeled probe comprises one or more modifications described herein. In embodiments, the labeled probe comprises an amino modifier. In embodiments, the labeled probe comprises an internal Amino Modified dT base (iAmMC6T). In embodiments, the labeled probe comprises an internal spacer 18 (iSp18). In embodiments, the labeled probe comprises a 3' Amino Modifier (3AmMO). In embodiments, the oligonucleotide of the labeled probe comprises 5'-CAGTGAATGCGAGTCCGTCTAAG/iAmMC6T/iSp18/iAmMC6T/iSp18/3AmMO/-3' (SEQ ID NO:44 with modifications).

In embodiments, the present disclosure provides a method of measuring electrochemiluminescence comprising: (a) applying a potential to an electrode under conditions in which a complex that is in proximity to the electrode will emit electrochemiluminescence, wherein the complex comprises a target oligonucleotide and a labeled probe provided herein, wherein the labeled probe comprises an oligonucleotide complementary to the target oligonucleotide; and (b) measuring the emitted electrochemiluminescence. Exemplary electrodes and methods of measuring electrochemiluminescence are described herein.

In embodiments, the labeled probe is used in the measuring step of the assays described herein, i.e., measuring the amount of extended sequence bound to the surface. The labeled probe can be used in all methods described herein, e.g., methods using one detection reagent, two detection reagents, or two or more detection reagents. In embodiments, the method of measuring electrochemiluminescence comprises: forming a composition comprising: (i) target nucleic acid comprising a target sequence, and (ii) a labeled probe, wherein the labeled probe comprises an oligonucleotide complementary to the target sequence; incubating the composition under conditions where the labeled probe hybridizes to the target nucleic acid to form a complex; bringing the complex into proximity with an electrode, applying a potential to the electrode under conditions in which the complex will emit electrochemiluminescence, and measuring the emitted electrochemiluminescence.

In embodiments, the labeled probe is used in the detection step of the assays described herein, i.e., measuring the amount of extended sequence bound to the surface. The labeled probe can be used in all methods described herein, e.g., methods using one detection reagent, two detection reagents, or two or more detection reagents.

In embodiments, the target nucleic acid is an extended sequence generated from an RCA reaction as described herein. In embodiments, the target nucleic acid is immobilized on the electrode. In embodiments, the target nucleic acid is immobilized on the electrode, such that formation of the complex brings the complex into proximity to the electrode. In embodiments, target nucleic acid is directly immobilized on the electrode, or it is indirectly immobilized through binding reagents as provided herein. In embodiments, the complex further comprises a binding reagent capable of binding to the target nucleic acid, wherein the binding reagent is immobilized on the electrode. In embodiments, the complex further comprises a binding reagent capable of binding to the target nucleic acid, wherein the binding reagent is immobilized on the electrode, and bringing the complex into proximity with the electrode comprises incubating the composition with the electrode under conditions where the target nucleic acid binds to the binding reagent. In embodiments, the binding reagent is an anchoring reagent. In embodiments, the binding reagent comprises a complementary sequence to the target nucleic acid.

In embodiments, the target nucleic acid is immobilized on a solid phase support. In embodiments, the target nucleic acid is directly immobilized on the solid phase support, or it is indirectly immobilized through binding reagents as provided herein. In embodiments, the binding reagent capable of binding to the target nucleic acid is immobilized on a solid phase support, wherein the solid phase support is immobilized on the electrode. In embodiments, the target nucleic acid is immobilized on a solid phase support, and bringing the complex into proximity with the electrode comprises incubating the composition with the electrode under conditions wherein the target nucleic acid binds to the binding reagent. In embodiments, the binding reagent is immobilized on a solid phase support, and bringing the complex into proximity with the electrode comprises incubating the composition with the solid phase support under conditions where the target nucleic acid binds to the binding reagent, and collecting the solid phase support.

In embodiments, the incubating is for about 9 minutes, 10 minutes, about 20 minutes, about 30 minutes, about 40 minutes, about 50 minutes, about 1 hour, about 2 hours, about 3 hours, about 4 hours, about 5 hours, about 6 hours, about 7 hours, or about 8 hours. In embodiments, the incubating is at about 15° C., about 18° C., about 20° C., about 21° C., about 22° C., about 23° C., about 24° C., about 25° C., about 26° C., about 27° C., about 28° C., about 29° C., or about 30° C. In embodiments, the incubating is at about 15° C. to about 30° C. for about 10 minutes to about 8 hours. In embodiments, the incubating is at about 15° C. to about 30° C. for about 10 minutes to about 8 hours. In embodiments, the incubating is at about 18° C. to about 29° C. for about 20 minutes to about 6 hours. In embodiments, the incubating is at about 20° C. to about 28° C. for about 20 minutes to about 6 hours. In embodiments, the incubating is at about 21° C. to about 26° C. for about 30 minutes to about 4 hours. In embodiments, the incubating is at about 22° C. to about 24° C. for about 40 minutes to about 2 hours. In embodiments, the incubating is at about 23° C. for about 1 hour.

Exemplary solid phase supports are described herein. In embodiments, the binding reagent comprises a complementary sequence to the target oligonucleotide. In embodiments, the solid phase support is a particle, and the particle is collected on the electrode using gravity, centrifugation, filtration, or application of a magnetic field.

In embodiments, the present disclosure provides a kit for measuring electrochemiluminescence comprising a labeled probe provided herein, and an electrode; an ECL read buffer; a nucleic acid polymerase; a nucleic acid ligase; an assay diluent; additional nucleic acid reagents; an assay consumable; or a combination thereof. Examples of additional nucleic acid reagents include buffers and reagents for solubilizing, diluting and/or stabilizing nucleic acids. Examples of assay consumables that can be included in the kit are assay modules designed to contain samples and/or reagents during one or more steps of the assay, pipette tips and other consumables for transferring liquid samples and reagents, covers and seals for assay modules and other consumables used in an assay, racks for holding other assay consumables, labels (including human readable or machine readable formats such as barcodes, RFIDs, etc.) for identifying samples or other assay consumables and media (including paper and electronic media) for providing information about the assay and/or instructions for carrying out the assay.

In embodiments, the kit comprises the electrode, and the electrode is a carbon-based electrode. In embodiments, the kit comprises the assay consumable, and the assay consumable is a multi-well plate assay consumable, and each well of the plate comprises a carbon ink electrode. In embodiments, the kit comprises a multi-well assay plate having a plurality of wells, and the assay plate is used as a container for at least one binding reagent. In embodiments, the binding reagent is immobilized in the plate. A plurality of wells within the plates may have binding reagents immobilized within them. The binding reagent in each of these wells may be the same for all of these wells, for some of these wells, or for none of these wells. In embodiments, a plurality of binding reagents are immobilized as an array of binding reagents in each of these wells. The immobilized binding reagent and/or the array of immobilized binding reagents may be immobilized on electrodes (which may be carbon-based electrodes or, more specifically, carbon ink electrodes) within the wells.

In embodiments, the kit comprises the ECL read buffer, and the ECL read buffer comprises tripropylamine. In embodiments, the kit comprises the ECL read buffer, and the ECL read buffer comprises butyldiethanolamine. Exemplary ECL read buffers are described in, e.g., U.S. 62/787,892, filed Jan. 3, 2019.

Method of Manufacturing Labeled Probes

The present disclosure includes methods of manufacturing the labeled probes described herein. In embodiments, a modified oligonucleotide having two or more alkyl amine moieties is reacted with an excess of an amine-reactive labeling reagent comprising an electrochemiluminescent label. The reaction mixture is then purified to isolate a product where each of the amine moieties is coupled to an electrochemiluminescent label.

In embodiments, the modified oligonucleotide with reactive amine groups has the structure shown in Formula VIII, and the product has the structure shown in Formula I, wherein R is the electrochemiluminescence label. In embodiments, the modified oligonucleotide has the structure shown in Formula IX, and the product has the structure shown in Formula II, wherein R is the electrochemiluminescent label. The other components of the formulas ($L^1$, $L^2$, k, m, etc.) are as described for formulas I and II above.

Formula VIII

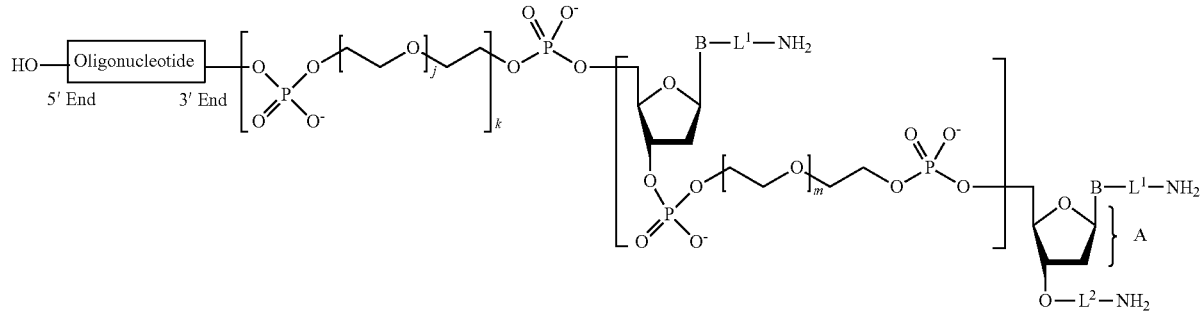

Formula IX

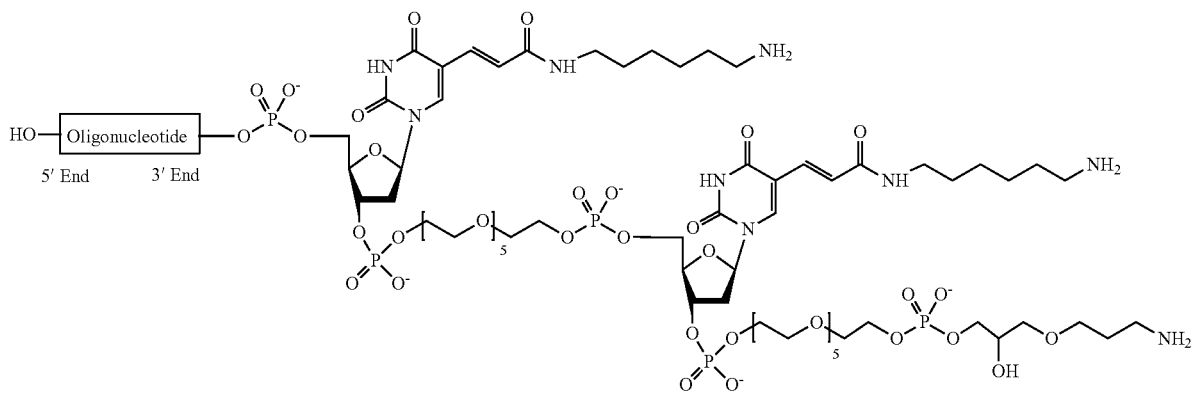

In embodiments, the amine-reactive labeling reagent comprises an active ester form of an electrochemniluminescence label, and reacts with the amine moiety to form an amide bond between the modified oligonucleotide and the label. In embodiments, the active ester is an NHS ester. In embodiments the label is

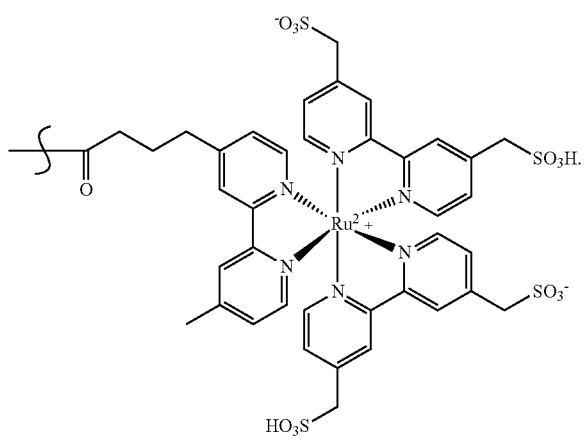

and the amine-reactive labeling reagent is

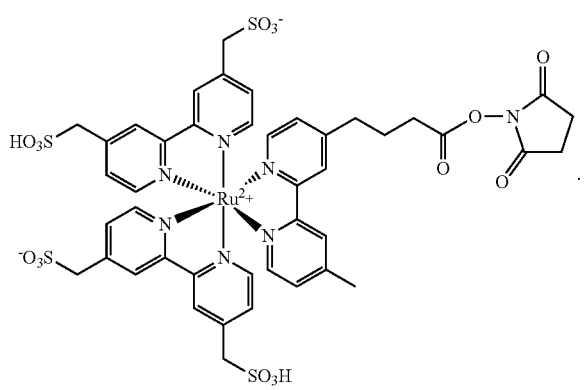

In embodiments, the modified oligonucleotide is prepared by solid phase synthesis. In embodiments, the final product is purified by ion-exchange chromatography. In embodiments, the final product is purified by anion-exchange chromatography. In embodiments, the final product is purified by gel electrophoresis.

Nucleic Acid Probes

In embodiments, the nucleic acid probe linked to the detection reagent is an oligonucleotide that is cross-linked or conjugated to the detection reagent. "Conjugation," "bioconjugation" or variants thereof are used herein to refer to formation of a stable, covalent linkage between two molecules, at least one of which is a biomolecule, e.g., a protein, a polypeptide, a polynucleotide, etc. The linked molecules can be referred to as a "conjugate" or "bioconjugate." In embodiments, the conjugate comprises a nucleic acid probe and a detection reagent.

In embodiments, the nucleic acid probe comprises one or more complementary regions to a template nucleic acid. In embodiments, the template nucleic acid is a template for amplification, e.g., by PCR. In embodiments, the template nucleic acid is a circular nucleic acid template, or one or more linear nucleic acid templates that are ligated to form a circular nucleic acid template, for example, for RCA. In embodiments, the template nucleic acid sequence is a connector oligonucleotide used in electrochemiluminescence measurement methods as described herein. In embodiments, the connector oligonucleotide is a linear oligonucleotide, whose 5' and 3' ends are capable of being ligated to generate a circular nucleic acid template. In embodiments, the connector oligonucleotide comprises a sequence at its 5' end that is complementary to a sequence at its 3' end, such that a ligase can ligate the 5' and 3' ends together to form a circular nucleic acid template. In embodiments, the circular nucleic acid template is a template for rolling circle amplification (RCA). In embodiments, the nucleic acid probe is a primer for the RCA reaction, i.e., extends the circular nucleic acid template to form an extended sequence.

The inventors unexpectedly discovered that shorter nucleic acid probes improved performance of the electrochemiluminescent measurement and assay methods of the invention. The conventional thinking was that a relatively long oligonucleotide would be needed for proper performance. Shorter nucleic acid probes provide the additional advantage of simplifying the conjugation protocol (and, in particular, enabling the use of simpler, less labor-intensive and faster approaches for separating protein-probe conjugates from unconjugated probes), and are also easier and less expensive to synthesize and purify. Thus, in embodiments, the nucleic acid probe of the present disclosure comprises an oligonucleotide of about 10 to about 30 nucleotides in length. In embodiments, the nucleic acid probe comprises an oligonucleotide of about 12 to about 28 nucleotides in length. In embodiments, the nucleic acid probe comprises an oligonucleotide of about 13 to about 26 nucleotides in length. In embodiments, the nucleic acid probe comprises an oligonucleotide of about 14 to about 24 nucleotides in length. In embodiments, the nucleic acid probe comprises an oligonucleotide of about 11 to about 22 nucleotides in length. In embodiments, the nucleic acid probe comprises an oligonucleotide of about 12 to about 21 nucleotides in length. In embodiments, the nucleic acid probe comprises an oligonucleotide of about 13 to about 20 nucleotides in length. In embodiments, the nucleic acid probe comprises an oligonucleotide of about 13 to about 18 nucleotides in length. In embodiments, the nucleic acid probe comprises an oligonucleotide of about 14 to about 19 nucleotides in length. In embodiments, the nucleic acid probe comprises an oligonucleotide of about 10, about 11, about 12, about 13, about 14, about 15, about 16, about 17, about 18, about 19, about 20, about 21, about 22, about 23, about 24, about 25, about 26, about 27, about 28, about 29, or about 30 nucleotides in length. In embodiments, the nucleic acid probe comprises an oligonucleotide of about 14 nucleotides. In embodiments, the nucleic acid probe comprises an oligonucleotide of about 15 nucleotides. In embodiments, the nucleic acid probe comprises an oligonucleotide comprising 5'-GACAGAACTAGACAC-3' (SEQ ID NO:33). In embodiments, the nucleic acid probe comprises an oligonucleotide comprising 5'-ACAGAACTAGACAC-3' (SEQ ID NO:40). In embodiments, the nucleic acid probe comprises an oligonucleotide comprising 5'-GACAGAACTA-GACA-3' (SEQ ID NO:41). In embodiments, the nucleic acid probe comprises an oligonucleotide comprising 5'-TGCACAGCTCGACGC-3' (SEQ ID NO:42). In embodiments, the nucleic acid probe comprises an oligonucleotide, wherein the oligonucleotide is 14 to 24 nucleotides in length and comprises 14 or 15 contiguous nucleotides of 5'-GACAGAACTAGACAC-3' (SEQ ID NO:33).

In embodiments, the nucleic acid probe comprises one or more nucleic acid modifications to allow conjugation to a detection reagent. In embodiments, conjugation of the nucleic acid probe to the detection reagent is accomplished using a heterobifunctional cross-linking agent. In embodiments, the nucleic acid probe comprises a non-naturally occurring 5' modification comprising a reactive functional group. Non-limiting examples of functional groups include, e.g., alkenes and strained alkenes, alkynes, halides, alcohols, thiols, amines, phosphates, aldehydes, ketones, carboxylic acids, carboxylates, amides, esters, thioesters, acyl phosphates, acid halides, nitriles, acid anhydrides, hydrazines, tetrazines, azides, and the like. In embodiments, the reactive functional group is a thiol, an amine, a carboxylic acid, an active ester, a hydrazine, an aldehyde, a ketone, an alkyne, a strained alkene, an azide, or a tetrazine. In embodiments, the reactive functional group is a thiol. In embodiments, the reactive functional group is a tetrazine. In embodiments, the reactive functional group is a vinyl or strained alkene. In embodiments, the reactive functional group is an azide. In embodiments, the reactive functional group is an alkyne or strained alkyne. In embodiments, the reactive functional group is a 4-formylbenzamide. In embodiments, the reactive functional group is a hydrazinonicotinamide.

In embodiments, the non-naturally occurring 5' modification is capable of reacting with a heterobifunctional cross-linking agent of the present disclosure. In embodiments, the non-naturally occurring 5' modification is capable of reacting with a maleimide, an iodoacetamide, or an activated disulfide. In embodiments, the non-naturally occurring 5' modification is capable of reacting with a tetrazine. In embodiments, the non-naturally occurring 5' modification is capable of reacting with a vinyl or strained alkene. In embodiments, the non-naturally occurring 5' modification is capable of reacting with an azide. In embodiments, the non-naturally occurring 5' modification is capable of reacting with an alkyne or strained alkyne. In embodiments, the non-naturally occurring 5' modification is capable of reacting with a hydrazinonicotinamide. In embodiments, the non-naturally occurring 5' modification is capable of reacting with a 4-formylbenzamide.

In embodiments, the non-naturally occurring nucleic acid probe is of Formula III:

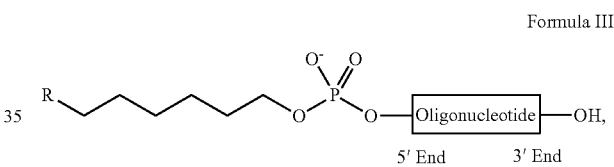

Formula III and comprises a reactive functional group (R), and the reactive functional group is a thiol, an amine, a carboxylic acid, an active ester, a hydrazine, an aldehyde, a ketone, an alkyne, a strained alkene, an azide or a tetrazine. In one embodiment, the reactive functional group is a thiol (—R is —SH).

In embodiments, the non-naturally occurring nucleic acid probe further comprises a non-naturally occurring 5' modification comprising a hapten or biotin. In embodiments, the hapten comprises fluorescein, dinitrophenyl, or digoxigenin. In embodiments, the modification comprises biotin. In embodiments, the modification comprises a thiol. In embodiments, the modification is a 5' Thiol Modifier C6 S-S (5ThioMC6-D).

In embodiments, the non-naturally occurring nucleic acid probe is of Formula IV:

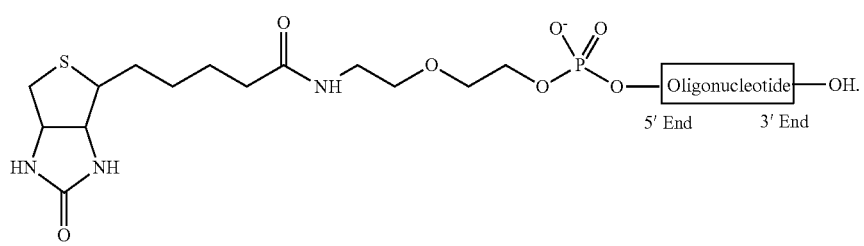

Formula IV

In embodiments, the present disclosure provides a conjugated compound comprising a detection reagent conjugated to the non-naturally occurring nucleic acid probe described herein. In embodiments, the oligonucleotide of the conjugated compound is 14 to 24 nucleotides in length and comprises 14 or 15 contiguous nucleotides of SEQ ID NO:33. In embodiments, the oligonucleotide of the conjugated compound is 14 to 24 nucleotides in length and comprises 14 or 15 contiguous nucleotides of SEQ ID NO:33, and further comprises a non-naturally occurring 5'-modification comprising a reactive functional group. In embodiments, the oligonucleotide of the conjugated compound is 14 to 24 nucleotides in length and comprises 14 or 15 contiguous nucleotides of SEQ ID NO:33, and further comprises a thiol, an amine, a carboxylic acid, an active ester, a hydrazine, an aldehyde, a ketone, an alkyne, a strained alkene, an azide or a tetrazine. In embodiments, the oligonucleotide of the conjugated compound is 14 to 24 nucleotides in length, is of Formula III and comprises 14 or 15 contiguous nucleotides of SEQ ID NO:33:

Formula III

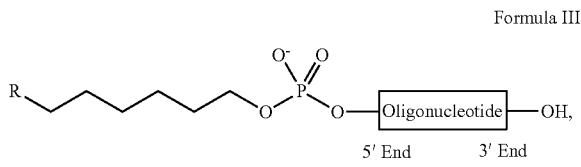

wherein R is a reactive group. In embodiments, the reactive group R is a thiol, an amine, a carboxylic acid, an active ester, a hydrazine, an aldehyde, a ketone, an alkyne, a strained alkene, an azide or a tetrazine. In embodiments, the reactive group R is a thiol (—R is —SH). In embodiments, the nucleic acid probe comprises an oligonucleotide comprising 5'-GACAGAACTAGACAC-3' (SEQ ID NO:33). In embodiments, the nucleic acid probe comprises an oligonucleotide comprising 5'-ACAGAACTAGACAC-3' (SEQ ID NO:40). In embodiments, the nucleic acid probe comprises an oligonucleotide comprising 5'-GACAGAACTAGACA-3' (SEQ ID NO:41). In embodiments, the nucleic acid probe comprises an oligonucleotide comprising 5'-TGCACAGCTCGACGC-3' (SEQ ID NO:42).

In embodiments, the detection reagent of the conjugated compound is a binding reagent. In embodiments, the detection reagent of the conjugated compound is an antigen-binding substance. In embodiments, the detection reagent is an antibody. In embodiments, the oligonucleotide of the non-naturally occurring nucleic acid probe is 10 to 30 nucleotides in length. In embodiments, the oligonucleotide of the non-naturally occurring nucleic acid probe is 14 to 19 nucleotides in length. In embodiments, the oligonucleotide of the non-naturally occurring nucleic acid probe is about 14, about 15, about 16, about 17, about 18, or about 19 nucleotides in length. In embodiments, the oligonucleotide of the non-naturally occurring nucleic acid probe is 14 nucleotides in length. In embodiments, the oligonucleotide of the non-naturally occurring nucleic acid probe is 15 nucleotides in length.

In embodiments, the nucleic acid probe comprises a complementary region to a template nucleic acid sequence. In embodiments, the template nucleic acid sequence is a circular nucleic acid template, or a linear nucleic acid template that can be ligated to form a circular nucleic acid template. In embodiments, the circular nucleic acid template is a template for rolling circle amplification (RCA). In embodiments, the nucleic acid probe is a primer for the RCA reaction, i.e., extends the circular nucleic acid template to form an extended sequence.

In embodiments, the non-naturally occurring oligonucleotides of the present disclosure are shorter than conventional RCA template oligonucleotides. As with nucleic acid probes, shorter template oligonucleotides provide the advantage of being easier and less expensive to synthesize and purify. Shorter template oligonucleotides may also increase assay sensitivity, since more copies of a shorter oligonucleotide may be amplified in an RCA reaction per unit time compared with a longer oligonucleotide. In embodiments, the present disclosure provides a non-naturally occurring oligonucleotide of about 40 to about 100 nucleotides in length and comprises at its 5' end sequence 5'-GTTCTGTC-3' and at its 3' end sequence 5'-GTGTCTA-3'. The 5' end sequence and 3' end sequence of an oligonucleotide can also be referred to as 5' terminal sequence and 3' terminal sequence, respectively. In embodiments, the non-naturally occurring oligonucleotide comprises 5'-CAGTGAATGCGAGTCCGTCTAAG-3' (SEQ ID NO:34) and 5'-AAGAGAGTAGTACAGCA-3' (SEQ ID NO:35). In embodiments, the non-naturally occurring oligonucleotide is about 50 to about 78 nucleotides in length. In embodiments, the non-naturally occurring oligonucleotide is about 53 to about 76 nucleotides in length. In embodiments, the non-naturally occurring oligonucleotide is about 50 to about 70 nucleotides in length. In embodiments, the non-naturally occurring oligonucleotide is about 53 to about 61 nucleotides in length. In embodiments, the non-naturally occurring oligonucleotide is about 54 to about 61 nucleotides in length. In embodiments, the non-naturally occurring oligonucleotide is 61 nucleotides in length. In embodiments, the non-naturally occurring oligonucleotide comprises about 53, about 54, about 55, about 56, about 57, about 58, about 59, about 60, about 61, about 62, about 63, about 64, about 65, about 66, about 67, about 68, about 69, about 70, about 71, about 72, about 73, about 74, about 75, or about 76 nucleotides and comprises at its 5' end sequence 5'-GTTCTGTC-3' and at its 3' end sequence 5'-GTGTCTA-3'. In embodiments, the oligonucleotide further comprises a 5' terminal phosphate group. In embodiments, the oligonucleotide comprises at its 5' end sequence 5'-GTTCTGTC-3' and at its 3' end sequence 5'-GTGTCTA-3'.

In embodiments, the oligonucleotide consists of 5'-GTTCTGTCATATITCAGTGAATGCGAGTCCGTCTAAGAGAGTAGTACAGCAAGAG TGTCTA-3' (SEQ ID NO:36). In embodiments, the oligonucleotide consists of 5'-GCTGTGCAATATTCAGTGAATGCGAGTCCGTCTAAGAGAGTAGTACAGCAAGA GCGTCGA-3' (SEQ ID NO:43). In embodiments, the oligonucleotide further comprises a 5' terminal phosphate group. In embodiments, the oligonucleotide is a linear oligonucleotide that can be ligated to form a circular oligonucleotide, e.g., a circular RCA template.

Oligonucleotide Sequences

Table B is a summary of the oligonucleotide sequences provided herein.

TABLE B

Oligonucleotides Sequences

| SEQ ID NO: | Description and Sequence |
|---|---|
| 1 | thiol-modified proximity probe 1 (wherein U = 2' O-methyl-RNA)<br>SH-AAA AAA AAA AGA CGC TAA TAG TTA AGA CGC TTU UU |
| 2 | thiol-modified proximity probe 2<br>SH-AAA AAA AAA ATA TGA CAG AAC TAG ACA CTC TT |
| 3 | anchoring oligo<br>5'- AAGAGAGTAGTACAGCAGCCGTCAAAAAAAAAAAA-/3ThioMC3-D/-3' |
| 4 | circularization oligo 1<br>Phosphate-CTA TTA GCG TCC AGT GAA TGC GAG TCC GTC TAA GAG AGT AGT AGA GCA GCC GTC AAG AGT GTC TA |
| 5 | circularization oligo 2<br>Phosphate-GTT CTG TCA TAT TTA AGC GTC TTA A |
| 6 | detection probe<br>CAG TGA ATG CGA GTC CGT CT |
| 7 | detection probe<br>5'-/5Biosg/ACATCGGTAGTT-3' |
| 8 | proximity probe 1<br>/5ThioMC6-D/aaaaaaaaaaaCACTAAGCTGTTAGTCCATTACCGmUmUmU |
| 9 | proximity probe 2<br>/5ThioMC6-D/aaaaaaaaaaaGCTGGAGGTTCAGACGATTTTGCG |
| 10 | circularization oligo 1<br>/5Phos/AACAGCTTAGTGACATCGGTAGTTAACAGATTGATCTTGACACATCGGTAGTTCGCAAAATCGTC |
| 11 | circularization oligo 2<br>/5Phos/TGAACCTCCAGCTTTCGGTAATGGACT |
| 12 | anchoring oligo<br>5'ACAGATTGATCTTGAAAA AAA AAA AAA AAA AA/3ThioMC3-D/ |
| 13 | proximity probe 1<br>/5ThioMC6-D/aaaaaaaaaaaAGAGTCCAGAGGCAAAGCGTGAATmUmUmU |
| 14 | proximity probe 2<br>/5ThioMC6-D/aaaaaaaaaaaGATAAGGAAGGGGCCTTAGCGACA |
| 15 | circularization oligo 1<br>/5Phos/CCTCTGGACTCTACATCGGTAGTTTGGAACATTTTATTCTAACATCGGTAGTTTGTCGCTAAGGC |
| 16 | circularization oligo 2<br>/5Phos/CCCTTCCTTATCTTTATTCACGCTTTG |
| 17 | anchoring oligo<br>5'GGAACATTTTATTCTAAA AAA AAA AAA AAA AA/3ThioMC3-D/ |
| 18 | proximity probe 1<br>/5ThioMC6-D/aaaaaaaaaaaAACAACTCCGATTGCTTGCTTCTTmUmUmU |
| 19 | proximity probe 2<br>/5ThioMC6-D/aaaaaaaaaaaTAGCCCTACGTGCCCTGCATAGAC |
| 20 | circularization oligo 1<br>/5Phos/ATCGGAGTTGTTACATCGGTAGTTCGCGCAGGTCGGGAATTACATCGGTAGTTGTCTATGCAGGG |
| 21 | circularization oligo 2<br>/5Phos/CACGTAGGGCTATTTAAGAAGCAAGCA |
| 22 | anchoring oligo<br>5'GCGCAGGTCGGGAATAAA AAA AAA AAA AAA AA/3ThioMC3-D/ |
| 23 | proximity probe 1<br>/5ThioMC6-D/AAAAAAAAAAAGACGCTAATAGTTAAGACGCTTmUmUmU |

TABLE B-continued

Oligonucleotides Sequences

| SEQ ID NO: | Description and Sequence |
|---|---|
| 24 | capture oligo 1<br>Aagcgtcttaactatt |
| 25 | capture oligo 2<br>Aagcgtcttaact |
| 26 | capture oligo 3<br>Aagcgtcttaac |
| 27 | capture oligo 4<br>Aagcgtcttaa |
| 28 | capture oligo 5<br>Aagcgtctta |
| 29 | capture oligo 6<br>Aagcgtctt |
| 30 | capture oligo 7<br>Aagcgtct |
| 31 | labeled probe<br>5'-CAGTGAATGCGAGTCCGTCT-3' |
| 32 | labeled probe<br>5'-CAGTGAATGCGAGTCCGTCTAAG-3' |
| 33 | nucleic acid probe<br>5'-GACAGAACTAGACAC-3' |
| 34 | template/connector oligo<br>5'-CAGTGAATGCGAGTCCGTCTAAG-3' |
| 35 | template/connector oligo/anchoring oligo<br>5'-AAGAGAGTAGTACAGCA-3' |
| 36 | template/connector oligo<br>5'-GTTCTGTCATATTTCAGTGAATGCGAGTCCGTCTAAGAGAGTAGTA<br>CAGCAAGAGTGTCTA-3' |
| 37 | anchoring oligo<br>5'-AAGAGAGTAGTACAGCAGCCGTCAA-3' |
| 38 | poly-A linker<br>AAAAAAAAA |
| 39 | probe binding sequence<br>TAT GAC AGA ACT AGA CAC TCT T |
| 40 | nucleic acid probe<br>5'-ACAGAACTAGACAC-3' |
| 41 | nucleic acid probe<br>5'-GACAGAACTAGACA-3' |
| 42 | high GC nucleic acid probe<br>TGCACAGC-TCGACGC<br>with modifications<br>5'-/5ThioMC6-D/TGCACAGCTCGACGC |
| 43 | high GC circularization oligo<br>GCTGTGCAATATTTCAGTGAATGCGAGTCCGTCTAAGAGAGTAGTA<br>CAGCAAGAGCGTCGA<br>with modifications<br>/5Phos/GCTGTGCAATATTTCAGTGAATGCGAGTCCGTCTAAGAGAGT<br>AGTACAGCAAGAGCGTCGA |

TABLE B-continued

Oligonucleotides Sequences

SEQ
ID
NO: Description and Sequence 44 labeled probe with modifications
5'-CAGTGAATGCGAGTCCGTCTAAG/iAmMC6T/iSp18/iAmMC6T/iSp18/
3AmMO/-3'

45 anchoring oligo with modifications
5'-/5AmMC6/AAGAGAGTAGTACAGCAGCCGTCAA/3AmMC6T/3'(SEQ ID NO:
45)

Any of the oligonucleotides provided in Table B can comprise one or more modifications. Modification of oligonucleotides is described herein. In embodiments, an oligonucleotide in Table B comprises one or more modifications for attachment to another substance, such as a label, a protein, or a surface. In embodiments, an oligonucleotide in Table B comprises biotin, streptavidin, avidin, amino group, thiol group, aldehyde group, hydrazide group, azide group, alkyne group, maleimide group and/or iodoacetamide group. In embodiments, an oligonucleotide in Table B comprises one or more of the modifications in Table A.

In embodiments, an oligonucleotide in Table B comprises 5' Amino Modifier C6 (5AmMC6), 5' Amino Modifier C12 (5AmMC12), Amino Modifier C6 dT (5AmMC6T, iAmMC6T, 3AmMC6T), 3' Amino Modifier (3AmMO), UNILINK™ Amino Modifier (5UniAmM, iUniAmM), biotin (5Biosg, 3Bio), biotin-azide (5BioK, iBiodUK), biotin dT (5BiodT, iBiodT, 3BiodT), biotin-TEG (5BioTEG, 3BioTEG), 5' dual biotin (52-Bio), 5' photo-cleavable biotin (5PCBio), desthiobiotin-TEG (5deSBioTEG, ideSBioTEG, 3deSBioTEG), 3 Thiol Modifier C3 S-S (3ThioMC3-D), dithiol (5DTPA, iDTPA, 3DTPA), 5' Thiol Modifier C6 S-S (5ThioMC6-D), 5' hexynyl (5Hexynyl), 5-Octadiynyl (55OctdU, i5OctdU, 35OctdU), C3 spacer (5SpC3, iSpC3, 3SpC3), hexanediol (3C6), 1'2'-dideoxyribose dSpacer (5dSp, idSp, 3dSp), photo-cleavable spacer (5SpPC, iSpPC), Spacer 9 (5Sp9, iSp9, 3Sp9), Spacer 18 (5Sp18, iSp18, 3Sp18), 5' ACRYDITE™ (5Acryd), 5' adenylation (5rApp), an azide NHS ester (5AzideN, iAzideN, 3AzideN), 3' cholesterol-TEG (3CholTEG), digoxigenin NHS ester (5DigN, 3DigN), 5' I-Linker (5ILink12), phosphorylation (5Phos, 3Phos), 6-FAM azide (56-FAMK, i6-FAMK), 6-FAM NHS ester (56-FAMN, i6-FAMN), 5-TAMRA azide (55-TAMK, i5-TAMK), or a combination thereof.

Methods of Conjugating Polypeptides to Oligonucleotides

In embodiments, the present disclosure provides methods of conjugating a nucleic acid probe to a detection reagent to form a conjugate, and methods of analyzing the conjugation efficiency. The present disclosure therefore provides simple and quantitative methods for labeling and quantitating the coupling efficiency of nucleic acid probes to detection reagents (e.g., antibodies). Previous methods that involve detecting a fluorescent label incorporated into the nucleic acid probe have significant drawbacks, such as non-specific binding and increased background signal. Such drawbacks are because, for example, fluorescent labels are typically bulky, hydrophobic residues. Such problems pose a particular challenge in ultra-sensitive assays such as the methods described herein. The present method removes such problems associated with using large molecules, such as fluorescent labels, for quantitating the coupling efficiency.

In embodiments, the efficiency of conjugation between the nucleic acid probe and detection reagent is determined using a compound that fluoresces when bound to nucleic acid, such that the nucleic acid probe component of the conjugate can be quantitated. In embodiments, after removing unreacted nucleic acid probe from the conjugate reaction, the conjugate is first quantitated using an assay that specifically measures the amount of detection reagent, and then quantitated using an assay that specifically measures the amount of the nucleic acid probe component (by combining the conjugate and the fluorescent compound). Comparison of the fluorescence signal with control samples, e.g., calibration oligonucleotides, can further determine whether there is minimum sufficient conjugation (i.e., a fluorescence signal above a low control), or whether there is insufficient removal of unreacted nucleic acid probe (i.e., a fluorescence signal that is above a high control).

In embodiments, the present disclosure provides a method of conjugating a nucleic acid probe to a non-nucleic acid detection reagent to form a conjugate, comprising: (a) reacting a detection reagent and a nucleic acid probe to form a conjugate; (b) using a size separation device to separate the conjugate from unreacted nucleic acid probe to form purified conjugate; (c) forming a test composition comprising a sample of the purified conjugate and a nucleic acid binding fluorophore selected for having a fluorescence intensity that increases when the fluorophore bound to nucleic acid, e.g., single or double stranded; and (d) measuring the fluorescence of the test composition to determine the amount of oligonucleotide in the conjugate.

In embodiments, the fluorophore's fluorescence intensity increases when the fluorophore is bound to single-stranded nucleic acid. In embodiments, the fluorophore's fluorescence intensity increases when the fluorophore is bound to double-stranded nucleic acid. In embodiments, the fluorophore is QUANT-IT, OLIGREEN dye, QUANTI-IT RIBOGREEN dye, QUANTIFLUOR ssDNA dye, SYBR GREEN I dye or SYBR GREEN II dye. In embodiments, the fluorophore is SYBR Green I dye.

In embodiments, the size separation device is configured to separate conjugates comprising an oligonucleotide and a detection reagent from unreacted nucleic acid probe. In embodiments, the size separation device for separating the conjugate from unreacted nucleic acid probe is a dialysis device, an ultrafiltration device, or a size exclusion column and the separation device has a molecular weight cut-off suitable for separating oligonucleotides with a molecular weight of about 5,000 Daltons or less from conjugate with a molecular weight of greater than 50,000 Daltons. In embodiments, the size separate device is a column comprising a size exclusion chromatography matrix. Non-limiting examples of size exclusion chromatography matrices include SEPHADEX, SEPHAROSE, SEPHACRYL, ECONO-COLUMN, ECONO-PAC, BIO-SPIN, MICRO BIO-SPIN, and the like, wherein each of the listed types of matrices include different bead sizes configured to separate different sizes of compounds in a sample. In embodiments, the size exclusion chromatography matrix comprises SEPHADEX G100 beads. In embodiments, the size exclusion column is a gravity column, a spin column, a pump column, or a vacuum-based column.

In embodiments, the method of conjugating a nucleic acid probe to a detection reagent further comprises forming at least one calibration composition comprising a known quantity of a calibrated oligonucleotide and the fluorophore, and measuring the fluorescence. In embodiments, determining the amount of oligonucleotide in the purified conjugate comprises comparing the fluorescence measured from the test composition to the fluorescence measured with the one or more calibration compositions. In embodiments, the method of conjugating a nucleic acid probe to a detection reagent further comprises measuring the concentration of detection reagent in the purified conjugate. In embodiments, the detection reagent concentration is measured using a protein assay. A variety of suitable protein assays are known in the art. Examples include methods based on protein-metal chelation (e.g., the biuret method, the BCA method, the Lowry method), methods based on protein-dye interactions (e.g., the Bradford (Coumassie) method, the Quanti-iT method and Qubit method) and methods based on reaction of protein amino groups with amine-reactive dyes (e.g., the CBQCAt method)—see, for example, the Protein Assay Technical Handbook from ThermoFisher Scientific, 2017). In embodiments, the concentration of detection reagent is measured using a BCA protein assay. In embodiments, the method further comprises calculating the average number of bound oligonucleotides per detection reagent in the purified conjugate. In embodiments, the detection reagent of is a binding reagent. In embodiments, the detection reagent is an antigen-binding substance.

Typical conjugation methods involve reacting a first component of the conjugate with a cross-linking agent, purifying the reaction product of the first component and the cross-linking agent, then reacting the reaction product with a second reaction component. However, the intermediate purification step may be undesirable in some circumstances, such as when there is only a limited amount of the conjugate components, and/or when the reactions are performed in small volumes. The intermediate purification step may also be burdensome for the overall workflow. In embodiments of the methods described herein, a nucleic acid probe is efficiently conjugated with a detection reagent using a cross-linking agent, without the need for purifying the reaction product of the detection reagent and the cross-linking agent prior to the reaction of the cross-linking agent with the nucleic acid probe, presenting an improvement over prior methods. The intermediate purification step can be eliminated due to the molar ratios of the reactants.

In embodiments, the present disclosure provides a method of conjugating a nucleic acid probe to a non-nucleic acid detection reagent to form a conjugate, comprising contacting the detection reagent and the nucleic acid probe with a heterobifunctional cross-linking agent under conditions where the detection reagent reacts with a first reactive group of the cross-linking agent and the nucleic acid probe reacts with a second reactive group of the cross-linking agent to form the conjugate, wherein the heterobifunctional cross-linking agent comprises (i) a first reactive group capable of reacting with the detection reagent to attach the cross-linking agent to the detection reagent and (ii) a second reactive group capable of reacting with the nucleic acid probe to attach the cross-linking agent to the nucleic acid probe, while being substantially unreactive to the detection reagent, wherein the method does not include purification of the reaction product of the detection reagent and the cross-linking agent, prior to the reaction of the cross-linking agent with the nucleic acid probe.

In embodiments, the method comprises incubating the detection reagent, the cross-linking agent, and the nucleic acid probe under conditions where the detection reagent reacts with the first reactive group of the cross-linking agent, and the nucleic acid probe reacts with the second reactive group of the cross-linking agent, so as to attach the detection reagent and the nucleic acid probe to the cross-linking agent and form the conjugate. In embodiments, the incubating is for about 10 minutes to about 8 hours. In embodiments, the incubating is for about 20 minutes to about 6 hours. In embodiments, the incubating is for about 30 minutes to about 4 hours. In embodiments, the incubating is for about 40 minutes to about 2 hours. In embodiments, the incubating is for about 1 hour. In embodiments, the incubating is for about 10 minutes, about 20 minutes, about 30 minutes, about 40 minutes, about 50 minutes, about 1 hour, about 2 hours, about 3 hours, about 4 hours, about 5 hours, about 6 hours, about 7 hours, or about 8 hours.

In embodiments, the incubating is at about 15° C. to about 30° C. In embodiments, the incubating is at about 18° C. to about 29° C. In embodiments, the incubating is at about 20° C. to about 28° C. In embodiments, the incubating is at about 21° C. to about 26° C. In embodiments, the incubating is at about 22° C. to about 24° C. In embodiments, the incubating is at about 23° C. In embodiments, the incubating is at about 15° C., about 18° C., about 20° C., about 21° C., about 22° C., about 23° C., about 24° C., about 25° C., about 26° C., about 27° C., about 28° C., about 29° C., or about 30° C. In embodiments, the incubating is at about 15° C. to about 30° C. for about 10 minutes to about 8 hours. In embodiments, the incubating is at about 18° C. to about 29° C. for about 20 minutes to about 6 hours. In embodiments, the incubating is at about 20° C. to about 28° C. for about 20 minutes to about 6 hours. In embodiments, the incubating is at about 21° C. to about 26° C. for about 30 minutes to about 4 hours. In embodiments, the incubating is at about 22° C. to about 24° C. for about 40 minutes to about 2 hours. In embodiments, the incubating is at about 23° C. for about 1 hour.

In embodiments, the present disclosure provides a method of conjugating a nucleic acid probe to a non-nucleic acid detection reagent to form a conjugate, comprising: (a) contacting the detection reagent with a heterobifunctional cross-linking agent under conditions where the detection reagent reacts with a first reactive group of the cross-linking agent to form a first composition, wherein the heterobifunctional cross-linking agent comprises (i) a first reactive group capable of reacting with the detection reagent to attach the cross-linking agent to the detection reagent and (ii) a second reactive group capable of reacting with the nucleic acid probe to attach the cross-linking agent to the nucleic acid probe, while being substantially unreactive to the detection reagent; (b) contacting the first composition with the nucleic acid probe under conditions where the second reactive group in the cross-linking agent reacts with the nucleic acid probe to form the conjugate, wherein the method does not include purification of the reaction product of the detection reagent and the cross-linking agent, prior to the reaction of the cross-linking agent with the nucleic acid probe.

In embodiments, the method comprises incubating the first composition under conditions where the detection reagent reacts with the first reactive group of the cross-linking agent so as to attach the detection reagent to the cross-linking agent to form an activated detection reagent, forming a second composition comprising the activated detection reagent and the nucleic acid probe, and incubating the second composition under conditions where the nucleic acid probe reacts with the second reactive group of the cross-linking agent to form the conjugate.

In embodiments, the incubating is for about 10 minutes to about 8 hours. In embodiments, the incubating is for about 20 minutes to about 6 hours. In embodiments, the incubating is for about 30 minutes to about 4 hours. In embodiments, the incubating is for about 40 minutes to about 2 hours. In embodiments, the incubating is for about 1 hour. In embodiments, the incubating is for about 10 minutes, about 20 minutes, about 30 minutes, about 40 minutes, about 50 minutes, about 1 hour, about 2 hours, about 3 hours, about 4 hours, about 5 hours, about 6 hours, about 7 hours, or about 8 hours.

In embodiments, the incubating is at about 15° C. to about 30° C. In embodiments, the incubating is at about 18° C. to about 29° C. In embodiments, the incubating is at about 20° C. to about 28° C. In embodiments, the incubating is at about 21° C. to about 26° C. In embodiments, the incubating is at about 22° C. to about 24° C. In embodiments, the incubating is at about 23° C. In embodiments, the incubating is at about 15° C., about 18° C., about 20° C., about 21° C., about 22° C., about 23° C., about 24° C., about 25° C., about 26° C., about 27° C., about 28° C., about 29° C., or about 30° C. In embodiments, the incubating is at about 15° C. to about 30° C. for about 10 minutes to about 8 hours. In embodiments, the incubating is at about 18° C. to about 29° C. for about 20 minutes to about 6 hours. In embodiments, the incubating is at about 20° C. to about 28° C. for about 20 minutes to about 6 hours. In embodiments, the incubating is at about 21° C. to about 26° C. for about 30 minutes to about 4 hours. In embodiments, the incubating is at about 22° C. to about 24° C. for about 40 minutes to about 2 hours. In embodiments, the incubating is at about 23° C. for about 1 hour.

In embodiments, the methods further comprise using a size separation device to separate the conjugate from unconjugated nucleic acid probe. In embodiments, the methods further comprise: using a size separation device to separate the conjugate from unreacted nucleic acid probe to generate purified conjugate; forming a test composition comprising the purified conjugate and a nucleic acid binding fluorophore selected for having a fluorescence intensity that increases when the fluorophore bound to nucleic acid; and measuring the fluorescence of the test composition to determine the amount of nucleic acid probe in the purified conjugate. In embodiments, the fluorophore's fluorescence intensity increases when the fluorophore is bound to single-stranded nucleic acid. In embodiments, the fluorophore's fluorescence intensity increases when the fluorophore is bound to double-stranded nucleic acid. In embodiments, the fluorophore is QUANT-IT, OLIGREEN dye, QUANTI-IT RIBOGREEN dye, QUANTIFLUOR ssDNA dye, SYBR GREEN I dye or SYBR GREEN II dye. In embodiments, the fluorophore is SYBR Green I dye. In embodiments, the number of nucleic acid probes is measured per conjugate, comprising measuring the concentration of conjugated oligonucleotide in the purified conjugate and the amount of detection reagent in the purified conjugate. In embodiments, the detection reagent is a protein, e.g., an antigen-binding substance.

In embodiments, the method of conjugating a nucleic acid probe to a detection reagent further comprises forming at least one calibration composition comprising a known quantity of a calibration oligonucleotide and the fluorophore, and measuring the fluorescence. In embodiments, determining the amount of oligonucleotide in the purified conjugate comprises comparing the fluorescence measured from the test composition to the fluorescence measured with the one or more calibration compositions. In embodiments, the method of conjugating a nucleic acid probe to a detection reagent further comprises using a protein assay to measure the concentration of detection reagent in the purified conjugate. In embodiments, the concentration of detection reagent is measured using a BCA protein assay. In embodiments, the method further comprises calculating the average number of bound oligonucleotides per detection reagent in the purified conjugate. In embodiments, the detection reagent of the conjugated compound is a binding reagent. In embodiments, the detection reagent is an antigen-binding substance. In embodiments, the detection reagent is a non-nucleic acid detection reagent.

In embodiments, multiple oligonucleotide calibration standards at different concentrations are tested using the oligonucleotide assay to generate a calibration curve of fluorescence vs. oligonucleotide concentration. The fluorescence of a test sample of conjugate is then compared to the calibration curve to determine the concentration of oligonucleotide in the sample, for instance. This comparison is done graphically or mathematically, in embodiments, for example, by fitting the calibration points to a mathematical model and using the model to backfit fluorescence values from test samples to determine the oligonucleotide concentrations in the samples. Alternatively, a more qualitative assessment of conjugation level is used. For example, a single concentration of an oligonucleotide calibration standard (a low control sample) is tested at a level equal to the minimum acceptable concentration of oligonucleotide in the conjugate: in this case, a simple comparison of the fluorescence signal of the conjugate sample to the fluorescence of the low control can be used to determine if the conjugate has an acceptable level of labeling (fluorescence of conjugate≥fluorescence of low control) or not (fluorescence of conjugate<fluorescence of low control). Similarly, another oligonucleotide calibration standard (a high control sample) having a level above the maximum expected concentration of oligonucleotide in the conjugate could also be tested; in this case, a comparison of the fluorescence signal of the conjugate to the fluorescence signal can be used to determine if the conjugate was over-labeled or if the purification step did not adequately remove unconjugated oligonucleotide (fluorescence of conjugate>fluorescence of high control). In embodiments, the range of acceptable oligonucleotide concentrations (minimum to maximum expressed as molecules of oligonucleotide per molecules of conjugate) is 1 to 8, 1 to 6, 2 to 5, 2 to 4, 3 to 4, 1 to 2, or around 1, around 2, or around 3.

In embodiments, the first reactive group of the cross-linking agent comprises an amine-reactive moiety. The amino-reactive moiety may be reactive with the free amino group of a polypeptide, e.g., at the N-terminus of a polypeptide, or at a lysine residue in the polypeptide. In embodiments, the first reactive group comprises an active ester (i.e., an ester —C(O)OR, wherein the leaving group HOR is selected so that the ester reacts rapidly with nucleophilic substances HNuc to form the conjugate —C(O)Nuc with a relatively high rate constant for reaction with nucleophiles). In embodiments, the active ester is selected to react readily (for example in a time scale of less than a day) with a nucleophile on a protein (for example lysine amines on a protein) to form the conjugate (e.g., by formation of an amide bond) under mild conditions (for example, pHs in the range of 6 to 9 and temperatures between 0 and 40° C.). In embodiments, the first reactive group is an ester where the leaving group is N-hydroxysuccinimide, N-hydroxysulfosuccinimide, hydroxybenzotriazole (HOBt), 1-hydroxy-7-azabenzotriazole (HOAt), or pentafluorophenol. In embodiments, the first reactive group comprises an N-hydroxysuccinimide ester or an N-hydroxysulfosuccinimide ester. In embodiments, N-hydroxysuccinimide or N-hydroxysulfosuccinimide is first reacted with a carboxylic acid to form an N-hydroxysulfosuccinimide ester or N-hydroxysulfosuccinimide ester prior to reacting with the detection reagent.

In embodiments, the second reactive group of the cross-linking agent comprises a maleimide, an iodoacetamide, an activated disulfide, a thiol, an amine, a carboxylic acid, an active ester, a hydrazine, an aldehyde, a ketone, an alkyne, a strained alkene, an azide, or a tetrazine. In embodiments, the nucleic acid probe comprises a thiol moiety and the second reactive group comprises a maleimide, an iodoacetamide or an activated disulfide moiety; the nucleic acid probe comprises an alkene or strained alkene moiety and the second reactive group comprises a tetrazine moiety; the nucleic acid probe comprises a tetrazine moiety and the second reactive group comprises a vinyl or strained alkene moiety; the nucleic acid probe comprises an alkyne or strained alkyne moiety and the second reactive group comprises an azide moiety; the nucleic acid probe comprises an azide moiety and the second reactive group comprises an alkyne or strained alkyne moiety; the nucleic acid probe comprises a 4-formylbenzamide moiety and the second reactive group comprises a hydrazinonicotinamide moiety; or the nucleic acid probe comprises a hydrazinonicotinamide moiety and the second reactive group comprises a 4-formylbenzamide moiety. In embodiments, the nucleic acid probe comprises a thiol, and the second reactive group is a thiol-reactive group.

In embodiments, the second reactive group comprises a maleimide, an iodoacetamide or an activated disulfide moiety. In embodiments, the second reactive group comprises a maleimide or iodoacetamide moiety. In embodiments, the second reactive group comprises a tetrazine moiety. In embodiments, the second reactive group comprises a vinyl or strained alkene moiety. In embodiments, the second reactive group comprises an azide moiety. In embodiments, the second reactive group comprises an alkyne or strained alkyne moiety. In embodiments, the second reactive group comprises a hydrazinonicotinamide moiety. In embodiments, the second reactive group comprises a 4-formylbenzamide moiety. In embodiments, the second reactive group is a thiol-reactive group.

In embodiments, the nucleic acid probe comprises a thiol, the first reactive group is an amine-reactive group, the second reactive group is a thiol-reactive group, and the heterobifunctional cross-linking agent is a compound of Formula V:

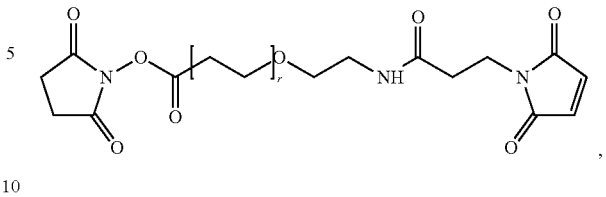

Formula V wherein r is an integer between 0 and 24. In embodiments, r is an integer between 1 and 20. In embodiments, r is an integer between 2 and 15. In embodiments, r is an integer between 3 and 10. In embodiments, r is 4.

In embodiments, the cross-linking agent is a homobifunctional cross-linking agent. In embodiments, the homobifunctional cross-linking reagent comprises first and second reactive groups, wherein the first and second reactive groups are the same functional group. In embodiments, the first and second reactive groups each comprises a maleimide, an iodoacetamide or an activated disulfide moiety. In embodiments, the first and second reactive groups each comprises a maleimide or iodoacetamide moiety. In embodiments, the first and second reactive groups each comprises a tetrazine moiety. In embodiments, the first and second reactive groups each comprises a vinyl or strained alkene moiety. In embodiments, the first and second reactive groups each comprises an azide moiety. In embodiments, the first and second reactive groups each comprises an alkyne or strained alkyne moiety. In embodiments, the first and second reactive groups each comprises a hydrazinonicotinamide moiety. In embodiments, the first and second reactive groups each comprises a 4-formylbenzamide moiety. In embodiments, the first and second reactive groups each is a thiol-reactive group.

In embodiments, the present disclosure provides a method of conjugating a nucleic acid probe to a non-nucleic acid detection reagent to form a conjugate, comprising contacting the detection reagent with a homobifunctional cross-linking agent, wherein the homobifunctional cross-linking agent comprises (i) a first reactive group capable of reacting with the detection reagent to attach the cross-linking agent to the detection reagent and (ii) a second reactive group capable of reacting with the nucleic acid probe to attach the cross-linking agent to the nucleic acid probe, wherein the first and second reactive groups are the same functional group; removing unreacted cross-linking agent; then contacting the detection reagent attached to the cross-linking agent with the nucleic acid probe.

In embodiments, the present disclosure provides a method of conjugating a nucleic acid probe to a non-nucleic acid detection reagent to form a conjugate, comprising contacting the nucleic acid probe with a homobifunctional cross-linking agent, wherein the homobifunctional cross-linking agent comprises (i) a first reactive group capable of reacting with the detection reagent to attach the cross-linking agent to the detection reagent and (ii) a second reactive group capable of reacting with the nucleic acid probe to attach the cross-linking agent to the nucleic acid probe, wherein the first and second reactive groups are the same functional group; removing unreacted cross-linking agent; then contacting the nucleic acid probe attached to the cross-linking agent with the detection reagent.

In embodiments, the nucleic acid probe comprises 14 or 15 contiguous nucleotides of 5'-GACAGAACTAGACAC-3' (SEQ ID NO:33). In embodiments, the nucleic acid probe comprises an oligonucleotide comprising 5'-GACAGAACTAGACAC-3' (SEQ ID NO:33). In embodiments, the nucleic acid probe comprises an oligonucleotide comprising 5'-ACAGAACTAGACAC-3' (SEQ ID NO:40). In embodiments, the nucleic acid probe comprises an oligonucleotide comprising 5'-GACAGAACTAGACA-3' (SEQ ID NO:41). In embodiments, the nucleic acid probe comprises an oligonucleotide comprising 5'-TGCACAGCTCGACGC-3' (SEQ ID NO:42). In embodiments, the nucleic acid probe comprises a 5' modification. In embodiments, the nucleic acid probe is modified at the 5' terminus with the thiol moiety. In embodiments, the nucleic acid probe is a compound of Formula IIIA:

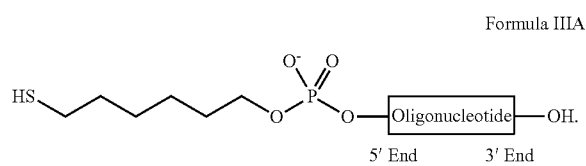

Formula IIIA

In embodiments, the oligonucleotide of the nucleic acid probe comprises 5'-GACAGAACTAGACAC-3' (SEQ ID NO:33). In embodiments, the oligonucleotide of the nucleic acid probe comprises 5'-ACAGAACTAGACAC-3' (SEQ ID NO:40). In embodiments, the oligonucleotide of the nucleic acid probe comprises 5'-GACAGAACTAGACA-3' (SEQ ID NO:41). In embodiments, the nucleic acid probe comprises an oligonucleotide comprising 5'-TGCACAGCTCGACGC-3' (SEQ ID NO:42).

In embodiments, the size separation device is configured to separate conjugates comprising an oligonucleotide and a detection reagent from unreacted nucleic acid probe. In embodiments, the size separation device for separating the conjugate from unreacted nucleic acid probe is a dialysis device, an ultrafiltration device, or a size exclusion column and the separation device has a molecular weight cut-off suitable for separating oligonucleotides with a molecular weight of about 5,000 Daltons or less from conjugate with a molecular weight of greater than 50,000 Daltons. In embodiments, the size separate device is a column comprising a size exclusion chromatography matrix. Non-limiting examples of size exclusion chromatography matrices include SEPHADEX, SEPHAROSE, SEPHACRYL, ECONO-COLUMN, ECONO-PAC, BIO-SPIN, MICRO BIO-SPIN, and the like, wherein each of the listed types of matrices include different bead sizes configured to separate different sizes of compounds in a sample. In embodiments, the size exclusion chromatography matrix comprises SEPHADEX G100 beads. In embodiments, the size exclusion column is a gravity column, a spin column, a pump column, or a vacuum-based column. In embodiments, the detection reagent is an antigen-binding substance. In embodiments, the detection reagent is a non-nucleic acid detection reagent.

In embodiments, the molar ratio of one or more components in the conjugation reaction is controlled to enable reproducible conjugations achieving a desired number of attached oligonucleotides per conjugate, without the need for an intermediate purification step. In embodiments, the cross-linking reagent is in molar excess relative to the quantity of detection reagent, and the quantity of nucleic acid probe is in molar excess relative to the quantity of cross-linking agent. In embodiments, the quantity of cross-linking agent is added at around 1.5, 2, 3, 4, 5, 6, 7, 8, 9, 10, 11, 12, 13, 14, or 15 times molar excess relative to the quantity of detection reagent. In embodiments, the quantity of cross-linking agent is added at a molar excess (relative to the detection reagent) of between around 1.5 and 15, 2 and 12, 3 and 10, or 4 and 8. In embodiments, the quantity of cross-linking agent is in at least 10 times molar excess relative to the quantity relative to the quantity of detection reagent. In embodiments, the quantity of cross-linking agent is in at least six times molar excess relative to the quantity of detection reagent. In embodiments, the quantity of cross-linking agent is in at least five times molar excess relative to the quantity of detection reagent. In embodiments, the quantity of cross-linking agent is in at least four times molar excess relative to the quantity of detection reagent. In embodiments, the molar quantity of nucleic acid probe is at least 1.1 times the molar quantity of cross-linking agent. In embodiments, the molar quantity of nucleic acid probe is at least 1.1 times, at least 1.2 times, at least 1.3 times, at least 1.4 times, at least 1.5 times, at least 1.6 times, at least 1.7 times, at least 1.8 times, at least 1.9 times, or at least 2.0 times the molar quantity of cross-linking agent. In embodiments, the method results in at least 80%, at least 85%, at least 90%, at least 95%, at least 96%, at least 97%, at least 98%, at least 99%, or about 100% of the detection reagent conjugated to nucleic acid probe. In embodiments, the method results in at least 95% of the detection reagent conjugated to nucleic acid probe.

In embodiments, more than one nucleic acid probe is conjugated to a detection reagent using the methods provided herein. In embodiments, the average number of nucleic acid probes coupled to each detection reagent in the conjugate is about 2 or greater. In embodiments, the average number of nucleic acid probes coupled to each detection reagent in the conjugate is between about 1 to about 20. In embodiments, the average number of nucleic acid probes coupled to each detection reagent in the conjugate is between about 2 to about 15. In embodiments, the average number of nucleic acid probes coupled to each detection reagent in the conjugate is between about 2 to about 7. In embodiments, the average number of nucleic acid probes coupled to each detection reagent in the conjugate is between about 3 to about 6. In embodiments, the average number of nucleic acid probes coupled to each detection reagent in the conjugate is between about 2 to about 4. In embodiments, the average number of nucleic acid probes coupled to each detection reagent in the conjugate is between about 3 to about 4. In embodiments, the average number of nucleic acid probes coupled to each detection reagent in the conjugate is about 1, about 2, about 3, about 4, about 5, about 6, about 7, about 8, about 9, about 10, about 11, about 12, about 13, about 14, about 15, about 16, about 17, about 18, about 19, about 20, or greater than 20.

Thus, in embodiments, the conjugate comprises a detection reagent and about 1, about 2, about 3, about 4, about 5, about 6, about 7, about 8, about 9, about 10, about 11, about 12, about 13, about 14, about 15, about 16, about 17, about 18, about 19, about 20, or greater than 20 nucleic acid probes.

In embodiments, the detection reagent is a protein and a conjugate is a compound of Formula VI:

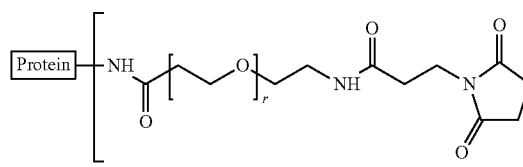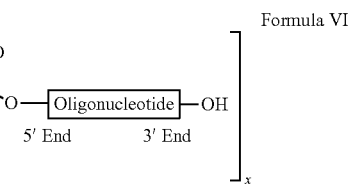

Formula VI wherein r is an integer between 0 and 24, x is an integer between 1 and 20, and —NH— is an amino group originating from the protein. In embodiments, the oligonucleotide of the nucleic acid probe comprises 14 to 15 contiguous oligonucleotides of 5'-GACAGAACTAGACAC-3' (SEQ ID NO:33). In embodiments, the nucleic acid probe comprises an oligonucleotide comprising 5'-GACAGAACTAGACAC-3' (SEQ ID NO:33). In embodiments, the nucleic acid probe comprises an oligonucleotide comprising 5'-ACAGAACTAGACAC-3' (SEQ ID NO:40). In embodiments, the nucleic acid probe comprises an oligonucleotide comprising 5'-GACAGAACTAGACA-3' (SEQ ID NO:41). In embodiments, the nucleic acid probe comprises an oligonucleotide comprising 5'-TGCACAGCTCGACGC-3' (SEQ ID NO:42). In embodiments, r is between 1 and 20. In embodiments, r is between 2 and 15. In embodiments, r is between 3 and 10. In embodiments, r is 4. In embodiments, r is 1, 2, 3, 4, 5, 6, 7, 8, 9, 10, 11, 12, 13, 14, 15, 16, 17, 18, 19, 20, 21, 22, 23, or 24. In embodiments, x is 1, 2, 3, 4, 5, 6, 7, 8, 9, 10, 11, 12, 13, 14, 15, 16, 17, 18, 19, or 20. In embodiments, x is 1. In embodiments, x is 2.

In embodiments, the conjugate of Formula VI is produced by a method comprising: (a) forming a conjugate comprising a detection reagent and a nucleic acid probe, comprising (i) reacting a detection reagent with an NHS ester moiety in a heterobifunctional cross-linking agent to form an activated detection reagent; (ii) reacting a maleimide moiety in the heterobifunctional cross-linking agent with a thiol-containing oligonucleotide of a nucleic acid probe to form the conjugate; (iii) removing unreacted nucleic acid probe, wherein the cross-linker is a compound of Formula VII:

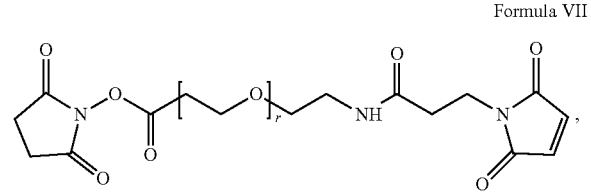

Formula VII wherein r is an integer between 0 and 24.

As used with the methods described herein, the detection reagent of the conjugate can be any detection reagent provided herein. For example, the detection reagent can be an antibody, antigen, ligand, receptor, hapten, epitope, mimotope, or aptamer. The detection reagents suitably used in the conjugation methods are not limited to the detection reagents of the assays described in the present application. Thus, in the context of conjugation, the detection reagent of the conjugate is not limited to use in the assay methods herein. In the context of conjugation methods and the conjugate itself, the detection reagent can consequently be used in any other suitable and appropriate applications, e.g., additional assay methods not explicitly described herein.

Kits for Conjugating Polypeptides to Oligonucleotides

In embodiments, the present disclosure provides kits for conjugating a nucleic acid probe to a non-nucleic acid detection reagent to form a conjugate, comprising: (a) a heterobifunctional cross-linking agent comprising (i) a first reactive group capable of reacting with the detection reagent to attach the cross-linking agent to the detection reagent, and (ii) a second reactive group capable of reacting with the nucleic acid probe to attach the cross-linking agent to the nucleic acid probe, while being substantially unreactive to the detection reagent; (b) a first size separation device capable of separating the conjugate from unreacted nucleic acid probe; and (c) a nucleic acid binding fluorophore, wherein the fluorophore's fluorescence intensity increases when the fluorophore is bound to nucleic acid. In embodiments, the fluorophore's fluorescence intensity increases when the fluorophore is bound to single stranded nucleic acid.

In embodiments, the first reactive group of the cross-linking agent comprises an amine-reactive moiety. The amino-reactive moiety may be reactive with the free amino group of a polypeptide, e.g., at the N-terminus of a polypeptide, or at a lysine residue in the polypeptide. In embodiments, the first reactive group comprises an active ester (i.e., an ester —C(O)OR, wherein the leaving group HOR is selected so that the ester reacts rapidly with nucleophilic substances HNuc to form the conjugate —C(O)Nuc with a relatively high rate constant for reaction with nucleophiles). In embodiments, the active ester is selected to react readily (for example in a time scale of less than a day) with a nucleophile on a protein (for example lysine amines on a protein) to form the conjugate (e.g., by formation of an amide bond) under mild conditions (for example, pHs in the range of 6 to 9 and temperatures between 0 and 40° C.). In embodiments, the first reactive group is an ester where the leaving group is N-hydroxysuccinimide, N-hydroxysulfosuccinimide, N-hydroxysulfosuccinimide, hydroxybenzotriazole (HOBt), 1-hydroxy-7-azabenzotriazole (HOAt), or pentafluorophenol. In embodiments, the first reactive group comprises an N-hydroxysuccinimide ester or an N-hydroxysulfosuccinimide ester. In embodiments, the N-hydroxysuccinimide or N-hydroxysulfosuccinimide is first reacted with a carboxylic acid to form an N-hydroxysulfosuccinimide ester or N-hydroxysulfosuccinimide ester prior to reacting with the detection reagent.

In embodiments, the second reactive group of the cross-linking agent comprises a maleimide, an iodoacetamide, an activated disulfide, a thiol, an amine, a carboxylic acid, an active ester, a hydrazine, an aldehyde, a ketone, an alkyne, a strained alkene, an azide, or a tetrazine. In embodiments, the nucleic acid probe comprises a thiol moiety and the second reactive group comprises a maleimide, an iodoacetamide or an activated disulfide moiety; the nucleic acid probe comprises an alkene or strained alkene moiety and the second reactive group comprises a tetrazine moiety; the nucleic acid probe comprises a tetrazine moiety and the second reactive group comprises a vinyl or strained alkene moiety; the nucleic acid probe comprises an alkyne or strained alkyne moiety and the second reactive group comprises an azide moiety; the nucleic acid probe comprises an azide moiety and the second reactive group comprises an alkyne or strained alkyne moiety; the nucleic acid probe comprises a 4-formylbenzamide moiety and the second reactive group comprises a hydrazinonicotinamide moiety; or the nucleic acid probe comprises a hydrazinonicotinamide moiety and the second reactive group comprises a 4-formylbenzamide moiety. In embodiments, the nucleic acid probe comprises a thiol, and the second reactive group is a thiol-reactive group.

In embodiments, the second reactive group comprises a maleimide, an iodoacetamide or an activated disulfide moiety. In embodiments, the second reactive group comprises a maleimide or iodoacetamide moiety. In embodiments, the second reactive group comprises a tetrazine moiety. In embodiments, the second reactive group comprises a vinyl or strained alkene moiety. In embodiments, the second reactive group comprises an azide moiety. In embodiments, the second reactive group comprises an alkyne or strained alkyne moiety. In embodiments, the second reactive group comprises a hydrazinonicotinamide moiety. In embodiments, the second reactive group comprises a 4-formylbenzamide moiety. In embodiments, the second reactive group is a thiol-reactive group.

In embodiments, the nucleic acid probe comprises a thiol, the first reactive group is an amine-reactive group, the second reactive group is a thiol-reactive group, and the heterobifunctional cross-linking agent is a compound of Formula V:

Formula V

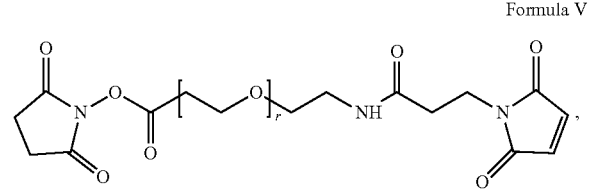

wherein r is an integer between 0 and 24. In embodiments, r is an integer between 1 and 20. In embodiments, r is an integer between 2 and 15. In embodiments, r is an integer between 3 and 10. In embodiments, r is 4.

In embodiments, the kit further comprises the nucleic acid probe. In embodiments, the nucleic acid probe comprises 14 or 15 contiguous nucleotides of 5'-GACAGAACTAGACAC-3' (SEQ ID NO:33). In embodiments, the nucleic acid probe comprises an oligonucleotide comprising 5'-GACAGAACTAGACAC-3' (SEQ ID NO:33). In embodiments, the nucleic acid probe comprises an oligonucleotide comprising 5'-ACAGAACTAGACAC-3' (SEQ ID NO:40). In embodiments, the nucleic acid probe comprises an oligonucleotide comprising 5'-GACAGAACTAGACA-3' (SEQ ID NO:41). In embodiments, the nucleic acid probe comprises an oligonucleotide comprising 5'-TGCACAGCTCGACGC-3' (SEQ ID NO:42). In embodiments, the nucleic acid probe comprises a 5' modification. In embodiments, the nucleic acid probe is modified at the 5' terminus with the thiol moiety. In embodiments, the nucleic acid probe is a compound of Formula IIIA:

Formula IIIA

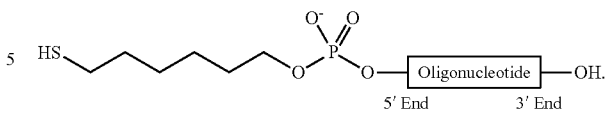

In embodiments, the oligonucleotide of the nucleic acid probe comprises 14 or 15 contiguous nucleotides of 5'-GACAGAACTAGACAC-3' (SEQ ID NO:33). In embodiments, the nucleic acid probe comprises an oligonucleotide comprising 5'-GACAGAACTAGACAC-3' (SEQ ID NO:33). In embodiments, the nucleic acid probe comprises an oligonucleotide comprising 5'-ACAGAACTAGACAC-3' (SEQ ID NO:40). In embodiments, the nucleic acid probe comprises an oligonucleotide comprising 5'-GACAGAACTAGACA-3' (SEQ ID NO:41). In embodiments, the nucleic acid probe comprises an oligonucleotide comprising 5'-TGCACAGCTCGACGC-3' (SEQ ID NO:42).

In embodiments, the first size separation device is configured to separate conjugates comprising an oligonucleotide and a detection reagent from unreacted nucleic acid probe. In embodiments, the first size separation device for separating the conjugate from unreacted nucleic acid probe is a dialysis device, an ultrafiltration device, or a size exclusion column and the separation device has a molecular weight cut-off suitable for separating oligonucleotides with a molecular weight of about 5,000 Daltons or less from conjugate with a molecular weight of greater than 50,000 Daltons. In embodiments, the first size separate device is a column comprising a size exclusion chromatography matrix. Non-limiting examples of size exclusion chromatography matrices include SEPHADEX, SEPHAROSE, SEPHACRYL, ECONO-COLUMN, ECONO-PAC, BIO-SPIN, MICRO BIO-SPIN, and the like, wherein each of the listed types of matrices include different bead sizes configured to separate different sizes of compounds in a sample. In embodiments, the size exclusion chromatography matrix comprises SEPHADEX G100 beads. In embodiments, the size exclusion column is a gravity column, a spin column, a pump column, or a vacuum-based column.

In embodiments, the fluorophore is QUANT-IT, OLIGREEN dye, QUANTI-IT RIBOGREEN dye, QUANTIFLUOR ssDNA dye, SYBR GREEN I dye or SYBR GREEN II dye. In embodiments, the fluorophore is SYBR Green I dye.

In embodiments, the kit further comprises a calibration oligonucleotide. In embodiments, the concentration of the calibration oligonucleotide is provided with the kit. In embodiments, the calibration oligonucleotide binds to the fluorophore. In embodiments, varying concentrations of the calibration oligonucleotide is used with the fluorophore to generate a calibration curve correlating fluorescence intensity with oligonucleotide concentration.

In embodiments, the kit further comprises a second size separation device for desalting detection reagents prior to conjugation. As used herein, "desalt," "desalting" or variants thereof refers to the process of exchanging the low molecular weight components of the solution (or buffer) in which a particular high molecular weight compound is stored, and is also called "buffer exchange." In embodiments, the second size separation device is configured to desalt the detection reagent from a buffer suitable for storage (e.g., storage of the detection reagent at 4° C., –20° C., or –80° C.) into a buffer suitable for the conjugation reaction to a nucleic acid probe. In embodiments, the second size separation device is a dialysis device, an ultrafiltration device, or a size exclusion column and the separation device has a molecular weight cut-off suitable for separating molecules with a molecular weight of about 5,000 Daltons or less from detection reagents with a molecular weight of greater than 50,000 Daltons. In embodiments, the second size separate device is a desalting column comprising a size exclusion chromatography matrix. Non-limiting examples of size exclusion chromatography matrices include SEPHADEX, SEPHAROSE, SEPHACRYL, ECONO-COLUMN, ECONO-PAC, BIO-SPIN, MICRO BIO-SPIN, and the like, wherein each of the listed types of matrices include different bead sizes configured to separate different sizes of compounds in a sample. In embodiments, the desalting is a gravity column, a spin column, a pump column, or a vacuum-based column.

In embodiments, the detection reagent is an antigen-binding substance. In embodiments, the detection reagent is a non-nucleic acid detection reagent. In embodiments, the kit components are in a single package. In embodiments, the kit components are in one or more vials, packages, or containers.

As used with the kits described herein, the detection reagent of the conjugate can be any detection reagent provided herein. For example, the detection reagent can be an antibody, antigen, ligand, receptor, hapten, epitope, mimotope, or aptamer. The detection reagents suitably used with the conjugation kits are not limited to the detection reagents of the assays described in the present application. Thus, in the context of conjugation, the detection reagent of the conjugate is not limited to use in the assay methods herein. In the context of conjugation methods and the conjugate itself, the detection reagent can consequently be used in any other suitable and appropriate applications, e.g., additional assay methods not explicitly described herein.

Detection Methods Using Two Antibodies

In embodiments, the present disclosure provides a method of detecting an analyte of interest in a sample using two antibodies, specifically, one capture antibody and one detection antibody. While a three-antibody (3-Ab) format may provide some advantages in terms of specificity, the two-antibody (2-Ab) assay format is simpler to develop, requires fewer reagents, which may be an advantage if there are limited available reagents for a target, and may be more suitable for targets that do not have three orthogonal epitopes available for binding due to small size, the presence of non-immunogenic sequences, or the presence of highly variable sequences.

Challenges of a 2-Ab assay include determining the plate format and coating concentration, feasibility, sequences of the various oligonucleotides used in the assay, capture antibody and anchoring oligonucleotide coating concentration, method for conjugating a detection antibody and nucleic acid probe, methods of evaluating conjugation efficiency, purification technique, buffer components, etc. The compositions and methods of the present disclosure overcomes such challenges.

In embodiments, the present disclosure provides a method of detecting an analyte of interest in a sample, comprising: binding the analyte to (i) a capture reagent on a surface comprising the capture reagent for the analyte, wherein the surface is coated with streptavidin and the capture reagent comprises biotin; and (ii) a single detection reagent for the analyte comprising a nucleic acid probe; thereby forming a complex on the surface comprising the capture reagent, the analyte and the detection reagent; extending the nucleic acid probe to form an extended sequence; and measuring the amount of extended sequence bound to the surface using a labeled probe.

In embodiments, the present disclosure provides a method of detecting an analyte of interest in a sample, comprising: binding the analyte to (i) a capture reagent on a surface comprising the capture reagent for the analyte, and an anchoring reagent, wherein the surface is coated with streptavidin and the capture reagent and the anchoring reagent comprise biotin; and (ii) a single detection reagent for the analyte comprising a nucleic acid probe; thereby forming a complex on the surface comprising the capture reagent, the analyte and the detection reagent; extending the nucleic acid probe to form an extended sequence comprising an anchoring region that binds the anchoring reagent; binding the extended sequence to the anchoring reagent; and measuring the amount of extended sequence bound to the surface using a labeled probe.

In embodiments, the present disclosure provides a method of measuring an analyte comprising: (a) binding the analyte to (i) a capture reagent in a binding domain on a surface and (ii) a conjugate comprising a detection reagent and a nucleic acid probe; thereby forming a complex in the binding domain comprising the capture reagent, the analyte and the conjugate; (b) extending the nucleic acid probe of the conjugate to form an extended sequence comprising a detection sequence complement that is complementary to an oligonucleotide of a labeled probe; (c) binding the labeled probe comprising the oligonucleotide to the extended sequence; and (d) measuring the amount of labeled probe bound to the binding domain, wherein the labeled probe is a labeled probe according to the present disclosure.

In embodiments, the present disclosure provides a method of measuring an analyte comprising: (a) binding the analyte to (i) a capture reagent in a binding domain on a surface, wherein the binding domain further comprises an anchoring reagent comprising an anchoring oligonucleotide and (ii) a conjugate comprising a detection reagent and a nucleic acid probe; thereby forming a complex in the binding domain comprising the capture reagent, the analyte and the conjugate; (b) extending the nucleic acid probe of the conjugate to form an extended sequence comprising an anchoring oligonucleotide complement that is complementary to the anchoring oligonucleotide and a detection sequence complement that is complementary to an oligonucleotide of a labeled probe; (c) binding the labeled probe comprising the oligonucleotide to the extended sequence; and (d) measuring the amount of labeled probe bound to the binding domain, wherein the labeled probe is a labeled probe according to the present disclosure.

In embodiments, the present disclosure provides a method of measuring an analyte comprising: (a) binding the analyte to (i) a capture reagent in a binding domain on a surface and (ii) a conjugate comprising a detection reagent and a nucleic acid probe comprising an oligonucleotide with a first probe sequence and an adjacent second probe sequence; thereby forming a complex in the binding domain comprising the capture reagent, the analyte and the conjugate; (b) binding the nucleic acid probe in the complex to a connector oligonucleotide, wherein the connector oligonucleotide comprises a 5' terminal sequence complementary to the first probe sequence, a 3' terminal sequence complementary to the second probe sequence, and a sequence capable of hybridizing to a complement of a detection oligonucleotide of a labeled probe; (c) ligating the connector oligonucleotide to form a circular template oligonucleotide; (d) extending the nucleic acid probe by rolling circle amplification to form an extended sequence; (e) binding the labeled probe comprising the detection oligonucleotide to the extended sequence; and (f) measuring the amount of labeled probe bound to the binding domain; wherein the labeled probe is a labeled probe according to the present disclosure.

In embodiments, the present disclosure provides a method of measuring an analyte comprising: (a) binding the analyte to (i) a capture reagent in a binding domain on a surface, wherein the binding domain further comprises an anchoring reagent having an anchoring oligonucleotide and (ii) a conjugate comprising a detection reagent and a nucleic acid probe comprising an oligonucleotide with a first probe sequence and an adjacent second probe sequence; thereby forming a complex in the binding domain comprising the capture reagent, the analyte and the conjugate; (b) binding the nucleic acid probe in the complex to a connector oligonucleotide, wherein the connector oligonucleotide comprises a 5' terminal sequence complementary to the first probe sequence, a 3' terminal sequence complementary to the second probe sequence, a first internal sequence capable of hybridizing to a complement of the anchoring oligonucleotide and a second internal sequence capable of hybridizing to a complement of a detection oligonucleotide of a labeled probe; (c) ligating the connector oligonucleotide to form a circular template oligonucleotide; (d) extending the nucleic acid probe by rolling circle amplification to form an extended sequence; (e) binding the labeled probe comprising the detection oligonucleotide to the extended sequence; and (f) measuring the amount of labeled probe bound to the binding domain; wherein the labeled probe is a labeled probe according to the present disclosure.

In embodiments, the invention provides a method of measuring an analyte comprising forming a complex between a detection reagent and the analyte in solution, followed by amplification, e.g., by RCA, wherein the amplified product binds to the surface via a capture reagent and/or an anchoring reagent. In embodiments, the surface is a particle. In embodiments, the surface is an electrode. Optionally, the amplified product is filtered before binding to the surface via a capture reagent and/or anchoring reagent.

In embodiments, the method of measuring an analyte comprises: (a) in solution binding the analyte to (i) a capture reagent comprising a targeting reagent and (ii) a conjugate comprising a detection reagent and a nucleic acid probe, thereby forming a complex in solution comprising the capture reagent, the analyte, and the conjugate; (b) extending the nucleic acid probe of the conjugate to form an extended sequence comprising a detection sequence complement that is complementary to an oligonucleotide of a labeled probe; (c) binding the capture reagent to a binding domain on a surface comprising a targeting reagent complement that is complementary to the targeting reagent; (d) binding the labeled probe comprising the oligonucleotide to the extended sequence; and (e) measuring the amount of labeled probe bound to the binding domain, wherein the labeled probe is a labeled probe according to the present disclosure.

In embodiments, the method of measuring an analyte comprises: (a) in solution binding the analyte to (i) a capture reagent and (ii) a conjugate comprising a detection reagent and a nucleic acid probe; thereby forming a complex in solution comprising the capture reagent, the analyte and the conjugate; (b) extending the nucleic acid probe of the conjugate to form an extended sequence comprising an anchoring oligonucleotide complement that is complementary to an anchoring oligonucleotide and a detection sequence complement that is complementary to an oligonucleotide of a labeled probe; (c) binding the extended sequence to an anchoring oligonucleotide in a binding domain on a surface; (d) binding the labeled probe comprising the oligonucleotide to the extended sequence; and (e) measuring the amount of labeled probe bound to the binding domain, wherein the labeled probe is a labeled probe according to the present disclosure.

In embodiments, the method of measuring an analyte comprises: (a) in solution binding the analyte to a conjugate comprising a detection reagent and a nucleic acid probe comprising an oligonucleotide with a first probe sequence and an adjacent second probe sequence, thereby forming a complex in solution comprising the analyte and the conjugate; (b) binding the nucleic acid probe in the complex to a connector oligonucleotide, wherein the connector oligonucleotide comprises a 5' terminal sequence complementary to the first probe sequence, a 3' terminal sequence complementary to the second probe sequence, and a sequence capable of hybridizing to a complement of a detection oligonucleotide of a labeled probe; (c) ligating the connector oligonucleotide to form a circular template oligonucleotide; (d) extending the nucleic acid probe by rolling circle amplification to form an extended sequence comprising an anchoring oligonucleotide complement that is complementary to the anchoring oligonucleotide and a detection sequence complement that is complementary to an oligonucleotide of a labeled probe; (e) binding the extended sequence to an anchoring reagent in a binding domain on a surface; (f) binding the labeled probe comprising the detection oligonucleotide to the extended sequence; and (g) measuring the amount of labeled probe bound to the binding domain; wherein the labeled probe is a labeled probe according to the present disclosure.

In embodiments, the present disclosure provides a method of measuring an analyte comprising: (a) binding the analyte to (i) a capture reagent in a binding domain on a surface and (ii) a conjugate of Formula VI:

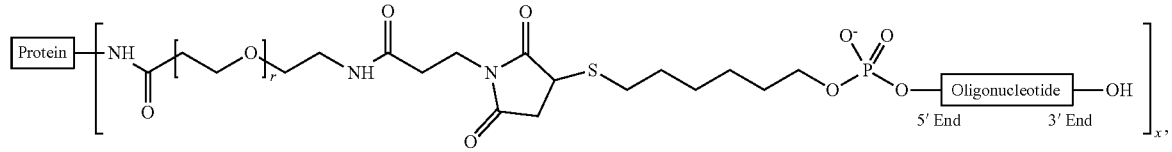

Formula VI wherein r is an integer between 0 and 24, x is an integer between 1 and 20, and —NH— is an amino group originating from the protein; thereby forming a complex in the binding domain comprising the capture reagent, the analyte and the conjugate; (b) extending the nucleic acid probe of the conjugate to form an extended sequence; and (c) measuring the amount of extended sequence bound to the binding domain.

In embodiments, the present disclosure provides a method of measuring an analyte comprising: (a) binding the analyte to (i) a capture reagent in a binding domain on a surface, wherein the binding domain further comprises an anchoring oligonucleotide and (ii) a conjugate of Formula VI:

Formula VI

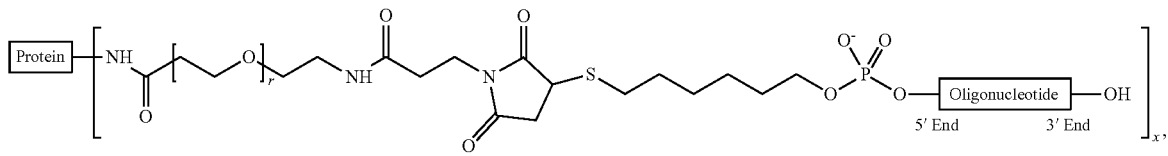

wherein r is an integer between 0 and 24, x is an integer between 1 and 20, and Protein-NH— is the conjugated form of an amino group originating from the protein; thereby forming a complex in the binding domain comprising the capture reagent, the analyte and the conjugate; (b) extending the nucleic acid probe of the conjugate to form an extended sequence comprising an anchoring oligonucleotide complement that is complementary to the anchoring oligonucleotide; and (c) measuring the amount of extended sequence bound to the binding domain.

In embodiments, the protein is a detection reagent. In embodiments, r is between 1 and 20. In embodiments, r is between 2 and 15. In embodiments, r is between 3 and 10. In embodiments, r is 4. In embodiments, r is 1, 2, 3, 4, 5, 6, 7, 8, 9, 10, 11, 12, 13, 14, 15, 16, 17, 18, 19, 20, 21, 22, 23, or 24. In embodiments, x is 1, 2, 3, 4, 5, 6, 7, 8, 9, 10, 11, 12, 13, 14, 15, 16, 17, 18, 19, or 20. In embodiments, x is on average between around 2 to 4, or around 3.

In embodiments, the present disclosure provides a method of measuring an analyte comprising: (a) binding the analyte to (i) a capture reagent in a binding domain on a surface and (ii) a conjugate of Formula VI:

Formula VI

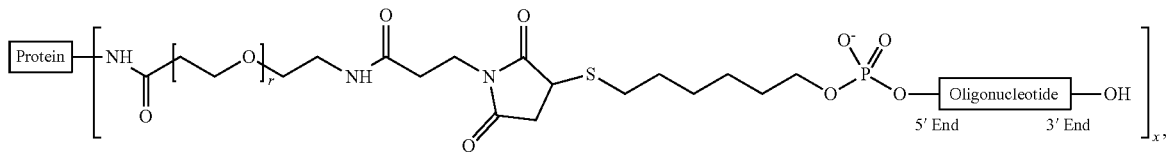

wherein "protein" is the detection reagent, r is an integer between 0 and 24, x is an integer between 1 and 20, and protein-NH— is the conjugated form of an amino group originating from the protein; wherein the conjugate comprises a detection reagent and a nucleic acid probe comprising an oligonucleotide with a first probe sequence and an adjacent second probe sequence; thereby forming a complex in the binding domain comprising the capture reagent, the analyte and the conjugate; (b) binding the nucleic acid probe in the complex to a connector oligonucleotide, wherein the connector oligonucleotide comprises a 5' terminal sequence complementary to the first probe sequence, a 3' terminal sequence complementary to the second probe sequence and an internal sequence capable of hybridizing to a complement of a detection oligonucleotide of a labeled probe; (c) ligating the connector oligonucleotide to form a circular template oligonucleotide; (d) extending the nucleic acid probe by rolling circle amplification to form an extended sequence; (e) binding the labeled probe comprising the detection oligonucleotide to the extended sequence; and (f) measuring the amount of labeled probe bound to the binding domain.

In embodiments, the present disclosure provides a method of measuring an analyte comprising: (a) binding the analyte to (i) a capture reagent in a binding domain on a surface, wherein the binding domain further comprises an anchoring oligonucleotide comprising an anchoring oligonucleotide and (ii) a conjugate of Formula VI:

Formula VI

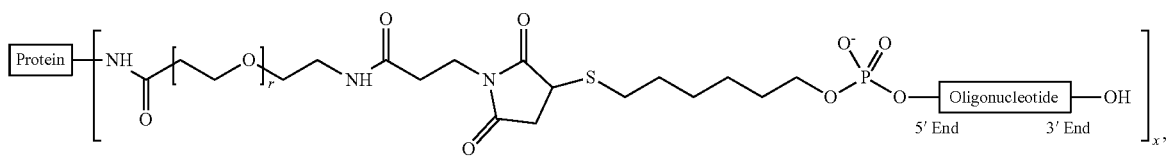

wherein "protein" is the detection reagent, r is an integer between 0 and 24, x is an integer between 1 and 20, and protein-NH— is the conjugated form of an amino group originating from the protein; wherein the conjugate comprises a detection reagent and a nucleic acid probe comprising an oligonucleotide with a first probe sequence and an adjacent second probe sequence; thereby forming a complex in the binding domain comprising the capture reagent, the analyte and the conjugate; (b) binding the nucleic acid probe in the complex to a connector oligonucleotide, wherein the connector oligonucleotide comprises a 5' terminal sequence complementary to the first probe sequence, a 3' terminal sequence complementary to the second probe sequence, a first internal sequence capable of hybridizing to a complement of the anchoring oligonucleotide, and a second internal sequence capable of hybridizing to a complement of a detection oligonucleotide of a labeled probe; (c) ligating the connector oligonucleotide to form a circular template oligonucleotide; (d) extending the nucleic acid probe by rolling circle amplification to form an extended sequence; (e) binding the labeled probe comprising the detection oligonucleotide to the extended sequence; and (f) measuring the amount of labeled probe bound to the binding domain.

In embodiments, the protein is a detection reagent. In embodiments, r is between 1 and 20. In embodiments, r is between 2 and 15. In embodiments, r is between 3 and 10. In embodiments, r is 4. In embodiments, r is 1, 2, 3, 4, 5, 6, 7, 8, 9, 10, 11, 12, 13, 14, 15, 16, 17, 18, 19, 20, 21, 22, 23, or 24. In embodiments, x is 1, 2, 3, 4, 5, 6, 7, 8, 9, 10, 11, 12, 13, 14, 15, 16, 17, 18, 19, or 20. In embodiments, x is on average between around 2 and 4, or around 3. In embodiments, the conjugate comprises an oligonucleotide comprising the first and second probe sequences. In embodiments, the conjugate is produced by methods provided herein.

In embodiments, the present disclosure provides a method of measuring an analyte comprising: (a) binding the analyte to (i) a capture reagent in a binding domain on a surface and (ii) a conjugate comprising a detection reagent and a nucleic acid probe comprising an oligonucleotide with a first probe sequence and an adjacent second probe sequence; thereby forming a complex in the binding domain comprising the capture reagent, the analyte and the conjugate; (b) binding the nucleic acid probe in the complex to a connector oligonucleotide, wherein the connector oligonucleotide comprises a 5' terminal sequence complementary to the first probe sequence, and a 3' terminal sequence complementary to the second probe sequence; (c) ligating the connector oligonucleotide to form a circular template oligonucleotide; (d) extending the nucleic acid probe by rolling circle amplification to form an extended sequence; (e) measuring the amount of extended sequence bound to the binding domain; wherein the sum of the lengths of the first and second probe sequences is 14 to 24 nucleotides.

In embodiments, the present disclosure provides a method of measuring an analyte comprising: (a) binding the analyte to (i) a capture reagent in a binding domain on a surface, wherein the binding domain further comprises an anchoring reagent having an anchoring oligonucleotide and (ii) a conjugate comprising a detection reagent and a nucleic acid probe comprising an oligonucleotide with a first probe sequence and an adjacent second probe sequence; thereby forming a complex in the binding domain comprising the capture reagent, the analyte and the conjugate; (b) binding the nucleic acid probe in the complex to a connector oligonucleotide, wherein the connector oligonucleotide comprises a 5' terminal sequence complementary to the first probe sequence, a 3' terminal sequence complementary to the second probe sequence, and an internal sequence capable of hybridizing to a complement of the anchoring oligonucleotide; (c) ligating the connector oligonucleotide to form a circular template oligonucleotide; (d) extending the nucleic acid probe by rolling circle amplification to form an extended sequence; (e) measuring the amount of extended sequence bound to the binding domain; wherein the sum of the lengths of the first and second probe sequences is 14 to 24 nucleotides.

In embodiments, the present disclosure provides a method of measuring an analyte comprising: (a) binding the analyte to (i) a capture reagent in a binding domain on a surface and (ii) a conjugate comprising a detection reagent, and a nucleic acid probe comprising an oligonucleotide with a first probe sequence and a second probe sequence; thereby forming a complex in the binding domain comprising the capture reagent, the analyte and the conjugate; (b) binding the nucleic acid probe in the complex to a connector oligonucleotide, wherein the connector oligonucleotide comprises a 5' terminal sequence complementary to the first probe sequence, a 3' terminal sequence complementary to the second probe sequence and an internal sequence capable of hybridizing to a complement of a detection oligonucleotide of a labeled probe; (c) ligating the connector oligonucleotide to form a circular template oligonucleotide; (d) extending the nucleic acid probe by rolling circle amplification to form an extended sequence; (e) binding the labeled probe comprising the detection oligonucleotide to the extended sequence; and (f) measuring the amount of labeled probe bound to the binding domain; wherein the sum of the lengths of the first and second probe sequences is 14 to 24 nucleotides.

In embodiments, the present disclosure provides a method of measuring an analyte comprising: (a) binding the analyte to (i) a capture reagent in a binding domain on a surface, wherein the binding domain further comprises an anchoring reagent having an anchoring oligonucleotide and (ii) a conjugate comprising a detection reagent, and a nucleic acid probe comprising an oligonucleotide with a first probe sequence and a second probe sequence; thereby forming a complex in the binding domain comprising the capture reagent, the analyte and the conjugate; (b) binding the nucleic acid probe in the complex to a connector oligonucleotide, wherein the connector oligonucleotide comprises a 5' terminal sequence complementary to the first probe sequence, a 3' terminal sequence complementary to the second probe sequence, a first internal sequence capable of hybridizing to a complement of the anchoring oligonucleotide and a second internal sequence capable of hybridizing to a complement of a detection oligonucleotide of a labeled probe; (c) ligating the connector oligonucleotide to form a circular template oligonucleotide; (d) extending the nucleic acid probe by rolling circle amplification to form an extended sequence; (e) binding the labeled probe comprising the detection oligonucleotide to the extended sequence; and (f) measuring the amount of labeled probe bound to the binding domain; wherein the sum of the lengths of the first and second probe sequences is 14 to 24 nucleotides.

In embodiments, the nucleic acid probe comprises an oligonucleotide of about 10 to about 30 nucleotides in length. In embodiments, the nucleic acid probe comprises an oligonucleotide of about 12 to about 28 nucleotides in length. In embodiments, the nucleic acid probe comprises an oligonucleotide of about 13 to about 26 nucleotides in length. In embodiments, the nucleic acid probe comprises an oligonucleotide of about 14 to about 24 nucleotides in length. In embodiments, the nucleic acid probe comprises an oligonucleotide of about 11 to about 22 nucleotides in length. In embodiments, the nucleic acid probe comprises an oligonucleotide of about 12 to about 21 nucleotides in length. In embodiments, the nucleic acid probe comprises an oligonucleotide of about 13 to about 20 nucleotides in length. In embodiments, the nucleic acid probe comprises an oligonucleotide of about 14 to about 18 nucleotides in length.

In embodiments, the sum of the length of the first and second probe sequences is about 10 to about 30 nucleotides. In embodiments, the sum of the length of the first and second probe sequences is about 12 to about 28 nucleotides. In embodiments, the sum of the length of the first and second probe sequences is about 13 to about 26 nucleotides. In embodiments, the sum of the length of the first and second probe sequences is about 14 to about 24 nucleotides. In embodiments, the sum of the length of the first and second probe sequences is about 11 to about 22 nucleotides. In embodiments, the sum of the length of the first and second probe sequences is about 12 to about 21 nucleotides. In embodiments, the sum of the length of the first and second probe sequences is about 13 to about 20 nucleotides. In embodiments, the sum of the length of the first and second probe sequences is about 14 to about 18 nucleotides.

In embodiments, the nucleic acid probe comprises an oligonucleotide of about 10, about 11, about 12, about 13, about 14, about 15, about 16, about 17, about 18, about 19, about 20, about 21, about 22, about 23, about 24, about 25, about 26, about 27, about 28, about 29, or about 30 nucleotides in length. In embodiments, the nucleic acid probe comprises an oligonucleotide of about 14 nucleotides in length. In embodiments, the nucleic acid probe comprises an oligonucleotide of about 15 nucleotides in length. In embodiments, the nucleic acid probe comprises an oligonucleotide comprising 14 or 15 contiguous nucleotides of 5'-GACAGAACTAGACAC-3' (SEQ ID NO:33). In embodiments, the nucleic acid probe comprises an oligonucleotide, wherein the oligonucleotide is 14 to 24 nucleotides in length and comprises 14 or 15 contiguous nucleotides of 5'-GACAGAACTAGACAC-3' (SEQ ID NO:33). In embodiments, the nucleic acid probe comprises an oligonucleotide comprising 5'-GACAGAACTAGACAC-3' (SEQ ID NO:33). In embodiments, the nucleic acid probe comprises an oligonucleotide comprising 5'-ACAGAACTAGACAC-3' (SEQ ID NO:40). In embodiments, the nucleic acid probe comprises an oligonucleotide comprising 5'-GACAGAACTAGACA-3' (SEQ ID NO:41). In embodiments, the nucleic acid probe comprises an oligonucleotide comprising 5'-TGCACAGCTCGACGC-3' (SEQ ID NO:42).

In embodiments, the first and second probe sequences have a combined length of about 10, about 11, about 12, about 13, about 14, about 15, about 16, about 17, about 18, about 19, about 20, about 21, about 22, about 23, about 24, about 25, about 26, about 27, about 28, about 29, or about 30 nucleotides. In embodiments, the first and second probe sequences have a combined length of about 14 nucleotides. In embodiments, the first and second probe sequences have a combined length of about 15 nucleotides. In embodiments, the first and second probes sequences in combination comprise 14 or 15 contiguous nucleotides of the sequence 5'-GACAGAACTAGACAC-3' (SEQ ID NO:33). In embodiments, the first and second probe sequences in combination are between 14 to 24 nucleotides in length and comprise 14 or 15 contiguous nucleotides of the sequence 5'-GACAGAACTAGACAC-3' (SEQ ID NO:33). In embodiments, the first and second probe sequences in combination comprises the sequence 5'-GACAGAACTAGACAC-3' (SEQ ID NO:33). In embodiments, the first and second probe sequences in combination comprise the sequence 5'-ACAGAACTAGACAC-3' (SEQ ID NO:40). In embodiments, the first and second probe sequences in combination comprise the sequence 5'-GACAGAACTAGACA-3' (SEQ ID NO:41). In embodiments, the first and second probe sequences in combination comprises the sequence 5'-TGCACAGCTCGACGC-3' (SEQ ID NO:42).

In embodiments, the nucleic acid probe comprises a non-naturally occurring 5' modification comprising a reactive functional group. Non-limiting examples of functional groups include, e.g., alkenes and strained alkenes, alkynes, halides, alcohols, thiols, amines, phosphates, aldehydes, ketones, carboxylic acids, carboxylates, amides, esters, thioesters, acyl phosphates, acid halides, nitriles, acid anhydrides, hydrazines, tetrazines, azides, and the like. In embodiments, the reactive functional group is a thiol, an amine, a carboxylic acid, an active ester, a hydrazine, an aldehyde, a ketone, an alkyne, a strained alkene, an azide, or a tetrazine. In embodiments, the reactive functional group is a thiol. In embodiments, the reactive functional group is a tetrazine. In embodiments, the reactive functional group is a vinyl or strained alkene. In embodiments, the reactive functional group is an azide. In embodiments, the reactive functional group is an alkyne or strained alkyne. In embodiments, the reactive functional group is a 4-formylbenzamide. In embodiments, the reactive functional group is a hydrazinonicotinamide.

In embodiments, the non-naturally occurring 5' modification is capable of reacting with a heterobifunctional crosslinking agent of the present disclosure. In embodiments, the non-naturally occurring 5' modification is capable of reacting with a maleimide, an iodoacetamide, or an activated disulfide. In embodiments, the non-naturally occurring 5' modification is capable of reacting with a tetrazine. In embodiments, the non-naturally occurring 5' modification is capable of reacting with a vinyl or strained alkene. In embodiments, the non-naturally occurring 5' modification is capable of reacting with an azide. In embodiments, the non-naturally occurring 5' modification is capable of reacting with an alkyne or strained alkyne. In embodiments, the non-naturally occurring 5' modification is capable of reacting with a hydrazinonicotinamide. In embodiments, the non-naturally occurring 5' modification is capable of reacting with a 4-formylbenzamide.

In embodiments, the nucleic acid probe is of Formula IIIA:

Formula IIIA

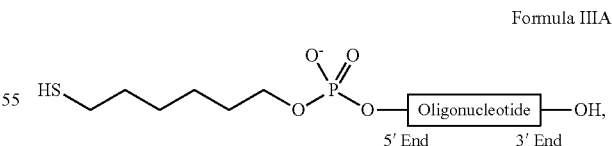

and comprises a reactive functional group, and the reactive functional group is a thiol, an amine, a carboxylic acid, an active ester, a hydrazine, an aldehyde, a ketone, an alkyne, a strained alkene, an azide or a tetrazine.

In embodiments, the nucleic acid probe further comprises a non-naturally occurring 5' modification comprising a hapten or biotin. In embodiments, the hapten comprises fluorescein, dinitrophenyl, or digoxigenin. In embodiments, the modification comprises biotin.

In embodiments, the nucleic acid probe is of Formula IV:

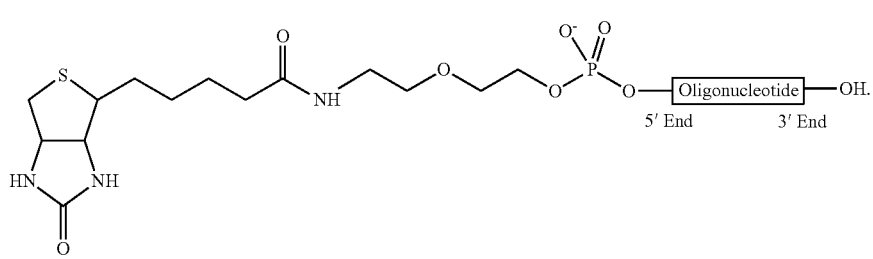

Formula IV

In embodiments, the nucleic acid probe comprises one or more sequences that are complementary to one or more sequences on a template nucleic acid sequence. In embodiments, the template nucleic acid sequence is a circular nucleic acid template, or a linear nucleic acid template that can be ligated (once hybridized to the nucleic acid probe) to form a circular nucleic acid template. In embodiments, the circular nucleic acid template is a template for rolling circle amplification (RCA). In embodiments, the nucleic acid probe is a primer for the RCA reaction, i.e., extends the circular nucleic acid template to form an extended sequence.

In embodiments, the labeled probe comprises an oligonucleotide and an electrochemiluminescent moiety. In embodiments, the labeled probe comprises one or more electrochemiluminescent labels. In embodiments, the labeled probe comprises an oligonucleotide and multiple electrochemiluminescent labels. In embodiments, the labeled probe comprises (i) one or more (or two or more) labels linked to modified nucleotide bases of the oligonucleotide, (ii) a labeled moiety having one or more (or two or more) labels, the moiety being linked to the 5' end of the oligonucleotide, (iii) a labeled moiety having one or more (or two or more) labels, the moiety being linked to the 3' end of the oligonucleotide or (iv) a combination of two or more of (i), (ii) and (iii). In embodiments, the labeled probe is of Formula I:

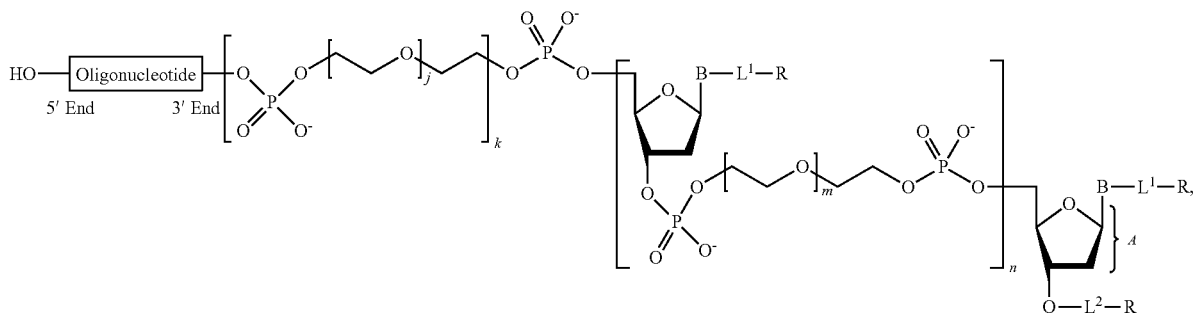

Formula I wherein B is a nucleotide base, R is an electrochemiluminescent label, $L^1$ is a linking group, $L^2$ is a linking group, j is an integer between 0 and 11, k is an integer between 0 and 1, m is an integer between 0 and 11, and n is an integer between 0 and 5.

In embodiments, R comprises ruthenium complex $RP^1P^2P^3$, wherein each of $P^1$, $P^2$, and $P^3$ is independently a bipyridine, a substituted bipyridine, a phenanthroline, or a substituted phenanthroline. In embodiments, the chemiluminescent label R is

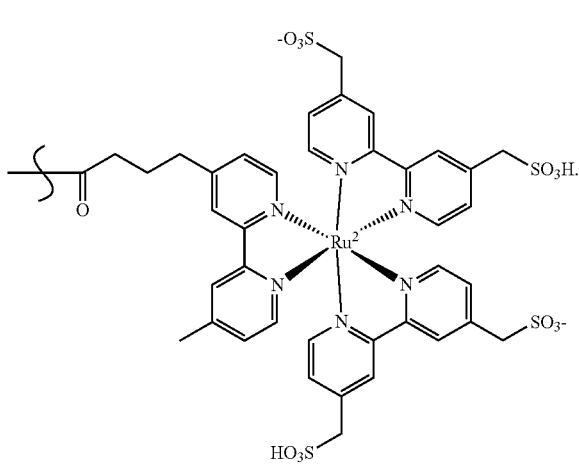

In embodiments, B is a uracil attached to $L^1$ at a 5 position of the uracil.

In embodiments, $L^1$ comprises

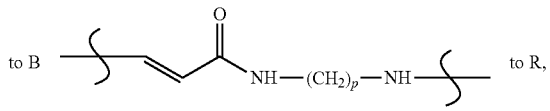

-continued

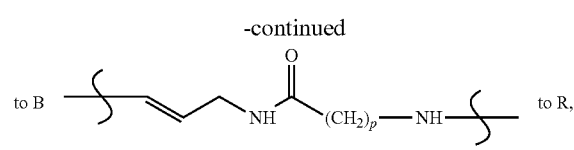

or a combination thereof, wherein p is an integer between 1 and 12.

In embodiments, L² comprises

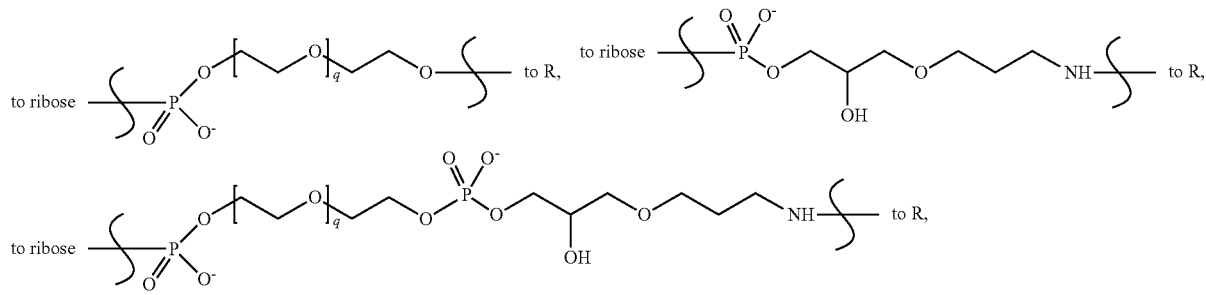

or a combination thereof, wherein q is an integer between 0 and 11.

In embodiments, the present disclosure provides a labeled probe of Formula II:

least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, Formula II

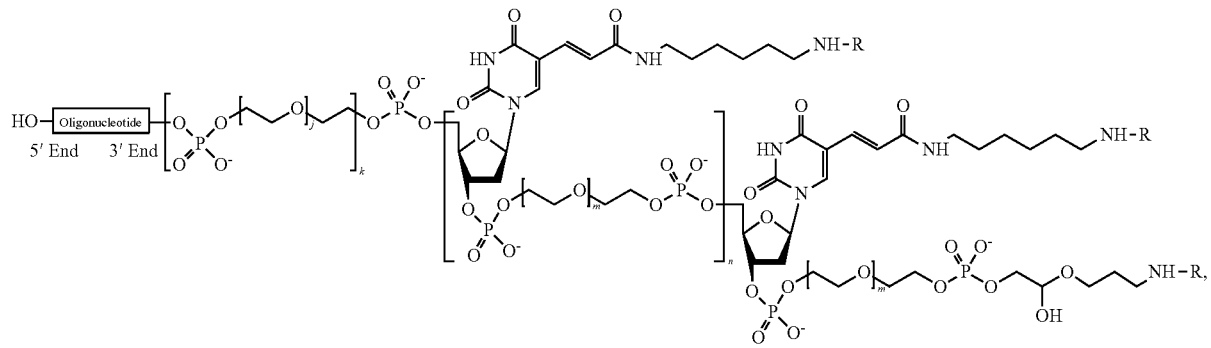

wherein j is an integer between 0 and 11, k is an integer between 0 and 1, m is an integer between 0 and 11, n is an integer between 0 and 5, and R is an electrochemiluminescence label:

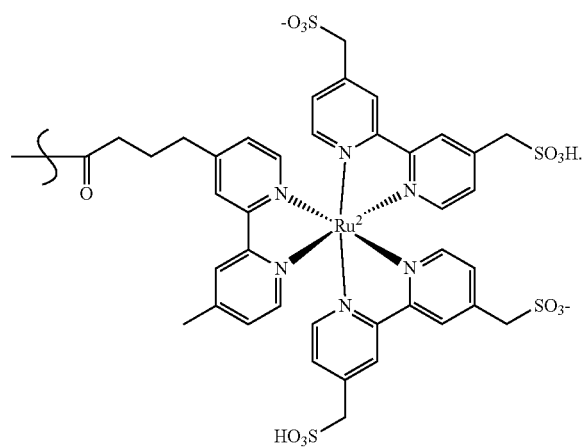

In embodiments, j is an integer between 0 and 5, k is 0, m is an integer between 0 and 5, and n is an integer between 2 and 7. In embodiments, k is 0, j is 0, m is 1, and n is 5.

In embodiments, the oligonucleotide of the labeled probe comprises a sequence having at least 60%, at least 65%, at least 96%, at least 97%, at least 98%, at least 99%, or about 100% sequence identity with 5'-CAGT-GAATGCGAGTCCGTCT-3' (SEQ ID NO:31). In embodiments, the oligonucleotide of the labeled probe comprises a sequence having at least 85% sequence identity with 5'-CAGTGAATGCGAGTCCGTCT-3' (SEQ ID NO:31). In embodiments, the oligonucleotide of the labeled probe comprises a sequence having at least 88% sequence identity with 5'-CAGTGAATGCGAGTCCGTCT-3' (SEQ ID NO:31). In embodiments, the oligonucleotide of the labeled probe comprises a sequence having at least 90% sequence identity with 5'-CAGTGAATGCGAGTCCGTCT-3' (SEQ ID NO:31). In embodiments, the oligonucleotide of the labeled probe comprises a sequence having at least 95% sequence identity with 5'-CAGTGAATGCGAGTCCGTCT-3' (SEQ ID NO:31). In embodiments, the oligonucleotide of the labeled probe comprises a sequence having at least 98% sequence identity with 5'-CAGTGAATGCGAGTCCGTCT-3' (SEQ ID NO:31). In embodiments, the oligonucleotide of the labeled probe comprises a sequence having at least 99% sequence identity with 5'-CAGTGAATGCGAGTCCGTCT-3' (SEQ ID NO:31).

In embodiments, the oligonucleotide of the labeled probe comprises 5'-CAGTGAATGCGAGTCCGTCT-3' (SEQ ID NO:31). In embodiments, the oligonucleotide of the labeled probe comprises 5'-CAGTGAATGCGAGTCCGTCTAAG-3' (SEQ ID NO:32). In embodiments, the oligonucleotide of the labeled probe comprises one or more modifications described herein. In embodiments, the labeled probe comprises an amino modifier. In embodiments, the labeled probe comprises an internal Amino Modified dT base (iAmMC6T). In embodiments, the labeled probe comprises an internal spacer 18 (iSp18). In embodiments, the labeled probe comprises a 3' Amino Modifier (3AmMO). In embodiments, the oligonucleotide of the labeled probe comprises 5'-CAGTGAATGCGAGTCCGTCTAAG/iAmMC6T/ iSp18/iAmMC6T/iSp18/3AmMO/–3' (SEQ ID NO:44 with modifications).

In embodiments, the nucleic acid probe is complementary to a portion of a connector oligonucleotide. In embodiments, the first and second probe sequences are each complementary to different portions of a connector oligonucleotide. In embodiments, the connector oligonucleotide is a linear oligonucleotide. In embodiments, the connector oligonucleotide is a template oligonucleotide for amplification. In embodiments, the connector oligonucleotide is ligated to form a circular template oligonucleotide for RCA. In embodiments, the 5' terminal sequence of the connector oligonucleotide is complementary to one of the first or second probe sequences, and the 3' terminal sequence of the connector oligonucleotide is complementary to the other of the first or second probe sequences.

In embodiments, a first internal sequence of the connector oligonucleotide is capable of hybridizing to a complement of the anchoring oligonucleotide of the anchoring reagent. In embodiments, the first internal sequence of the connector oligonucleotide has 70%, at least 70%, 75%, at least 75%, 80%, at least 80%, 85%, at least 85%, 90%, at least 90%, 95%, at least 95%, 97%, at least 97%, 98%, at least 98%, 99%, or at least 99% or 100% sequence identity with the anchoring oligonucleotide. In embodiments, an extended sequence amplified from the connector oligonucleotide comprises a sequence complementary to the anchoring oligonucleotide.

In embodiments, a second internal sequence of the connector oligonucleotide is capable of hybridizing to a complement of an oligonucleotide (the detection oligonucleotide) of the labeled probe. In embodiments, the second internal sequence of the connector oligonucleotide has 70%, at least 70%, 75%, at least 75%, 80%, at least 80%, 85%, at least 85%, 90%, at least 90%, 95%, at least 95%, 97%, at least 97%, 98%, at least 98%, 99%, or at least 99% or 100% sequence identity with the detection oligonucleotide of the labeled probe. In embodiments, an extended sequence amplified from the connector oligonucleotide comprises a sequence complementary to the detection oligonucleotide of the labeled probe.

In embodiments, the connector oligonucleotide is about 53 to about 76 nucleotides in length and comprises at its 5' end sequence 5'-GTTCTGTC-3' and at its 3' end sequence 5'-GTGTCTA-3'. The 5' end sequence and 3' end sequence of an oligonucleotide can also be referred to as 5' terminal sequence and 3' terminal sequence, respectively. In embodiments, the connector oligonucleotide comprises 5'-CAGTGAATGCGAGTCCGTCTAAG-3' (SEQ ID NO:34) and 5'-AAGAGAGTAGTACAGCA-3' (SEQ ID NO:35). In embodiments, the connector oligonucleotide is about 40 to about 100 nucleotides in length. In embodiments, the connector oligonucleotide is about 50 to about 78 nucleotides in length. In embodiments, the connector oligonucleotide is about 53 to about 76 nucleotides in length. In embodiments, the connector oligonucleotide is about 50 to about 70 nucleotides in length. In embodiments, the connector oligonucleotide is about 53 to about 61 nucleotides in length. In embodiments, the connector oligonucleotide is about 54 to about 61 nucleotides in length. In embodiments, the connector oligonucleotide is about 61 nucleotides in length. In embodiments, the connector oligonucleotide is about 53, about 54, about 55, about 56, about 57, about 58, about 59, about 60, about 61, about 62, about 63, about 64, about 65, about 66, about 67, about 68, about 69, about 70, about 71, about 72, about 73, about 74, about 75, or about 76 nucleotides in length and comprises at its 5' end sequence 5'-GTTCTGTC-3' and at its 3' end sequence 5'-GTGTCTA-3'. In embodiments, the connector oligonucleotide further comprises a 5' terminal phosphate group. In embodiments, the connector oligonucleotide comprises at its 5' end sequence 5'-GTTCTGTC-3' and at its 3' end sequence 5'-GTGTCTA-3'. In embodiments, the connector oligonucleotide comprises a 5' terminal phosphate.

In embodiments, the connector oligonucleotide consists of 5'-GTTCTGTCATATITCAGTGAATGCGAGTCCG-TCTAAGAGAGTAGTACAGCAAGAG TGTCTA-3' (SEQ ID NO:36). In embodiments, the oligonucleotide consists of 5'-GCTGTGCAATATTCAGTGAATGCGAGTCCGTCTA-AGAGAGTAGTACAGCAAGA GCGTCGA-3' (SEQ ID NO:43). In embodiments, the connector oligonucleotide further comprises a 5' terminal phosphate group. In embodiments, the connector oligonucleotide is a linear oligonucleotide that can be ligated to form a circular oligonucleotide, e.g., a circular RCA template.

In embodiments, the anchoring oligonucleotide of the present disclosure is shorter than conventional anchoring oligonucleotides. As with nucleic acid probes and template oligonucleotides, shorter anchoring oligonucleotides provide the advantage of being easier and less expensive to synthesize and purify. Shorter anchoring oligonucleotides may also increase assay sensitivity by reducing non-specific binding from binding reagents that may be present in the sample, for example, anti-DNA antibodies that may be present in blood samples. In embodiments, the anchoring reagent comprises an anchoring oligonucleotide, and the anchoring oligonucleotide is about 10 to about 30 nucleotides in length. In embodiments, the anchoring oligonucleotide is about 15 to about 28 nucleotides in length. In embodiments, the anchoring oligonucleotide is about 17 to about 25 nucleotides in length. In embodiments, the anchoring oligonucleotide is about 17, about 18, about 19, about 20, about 21, about 22, about 23, about 24, or about 25 nucleotides in length. In embodiments, the anchoring oligonucleotide comprises 5'-AAGAGAGTAGTACAGCA-3' (SEQ ID NO:35). In embodiments, the anchoring oligonucleotide consists of 5'-AAGAGAGTAGTA-CAGCAGCCGTCAA-3' (SEQ ID NO:37). In embodiments, the anchoring reagent comprises an amino modifier. In embodiments, the amino modifier is 5' Amino Modifier C6 (5AmMC6). In some embodiments, the amino modifier is 3' Amino Modified dT base (3AmMC6T). In embodiments, the anchoring reagent comprises 5'-/5AmMC6/ AAGAGAGTAGTACAGCAGCCGTCAA/3AmMC6T/3' (SEQ ID NO:45 with modifications).

In embodiments, the anchoring reagent is attached to the surface before, during or after binding the analyte to the capture reagent. Thus, in embodiments comprising kits, the anchoring reagent may be provided separately from the surface and then immobilized on the surface, wherein the surface comprises the capture reagent immobilized thereon. In embodiments, the anchoring reagent is immobilized on the surface after the capture reagent has been immobilized on the surface and before addition of the sample comprising the analyte. In embodiments, the anchoring reagent is immobilized onto the surface during addition of the sample comprising the analyte to the surface comprising immobilized capture reagent. In embodiments, the anchoring reagent is immobilized onto the surface after formation of the complex comprising the analyte, the capture reagent and the detection reagent. In embodiments, the anchoring reagent is added to the surface at the same time as the detection reagent. In embodiments, the anchoring reagent is added to the surface prior to the extending step. In embodiments, a washing step precedes addition of the anchoring reagent to the surface. In embodiments where the anchoring reagent is added after the sample comprising the analyte is added to the surface, and a wash step is performed before the anchoring reagent is added, the wash step removes potential interferences, e.g., due to sample-DNA interactions such as analyte-DNA interactions or anti-DNA reactivities (e.g., with anti-DNA antibodies), DNA binding proteins, or DNA or RNA in samples. In embodiments, the anchoring reagent and the capture reagent comprise different targeting reagents, and the surface comprises targeting reagent complements capable of binding to the different targeting reagents. In some embodiments, the targeting reagent complement is an antibody, and the anchoring reagent comprises an antigen capable of binding to the antibody targeting reagent complement. For example, the anchoring reagent can comprise a dinitrophenol (DNP), and the surface can comprise an anti-DNP antibody.

In embodiments, the capture reagent and/or detection reagent is a protein. In embodiments, the capture reagent and/or detection reagent is an antigen-binding substance. In embodiments, the capture reagent and/or detection reagent is an antibody. In embodiments, the capture reagent and the detection reagent are antigen-binding substances. In embodiments, the capture reagent and the detection reagent are antibodies.

Selection of the capture and detection reagents, for example, capture and detection antibodies, and performance thereof will be dependent on the antibody characteristics including affinity, purity, degradation, aggregation, off-rate, and non-specific binding to other analytes and antibodies. High affinity binding antibodies characterized to have low levels of degradation and aggregation may be preferred.

Sensitivity, specificity, and format of the assay may be affected by selection of a capture antibody and a detection antibody, each of which must recognize a different non-overlapping epitope on the analyte. Typically the most comprehensive way to identify antibody pairs is to test each combination of antibody as the capture antibody and as the detection antibody.

For many assays, it is preferable that both the capture antibody and detection antibody are monoclonal antibodies, each recognizing a unique epitope. Monoclonal antibodies are typically easier to reproduce from lot to lot and can be produced in large quantities leading to increased longevity of the assay. Selection of two monoclonal antibodies may not be possible due to reagent availability or desired sensitivity. In embodiments, when both a monoclonal antibody and a polyclonal antibody are used, it is preferable to use the monoclonal antibody as the capture antibody and the polyclonal antibody as the detection antibody.

A potential advantage of using a polyclonal antibody is that it may contain multiple antibodies that recognize different epitopes, leading to higher avidity. When a polyclonal antibody is not affinity purified, it contains non-specific antibodies that could lead to non-specificity issues or reduced assay performance. An affinity purified polyclonal antibody has greater specificity than one purified by Protein A or G, but it may still exhibit lot-to-lot variability because each lot may be a different mixture of antibodies. When using a polyclonal antibody as a capture antibody, it could contain a population of antibodies that share or block the detection antibody epitope, leading to reduced signals or sensitivity.

In embodiments of the methods, the anchoring reagent and the capture reagent each comprises a targeting reagent capable of binding to a targeting reagent complement, the binding domain comprises the targeting reagent complement immobilized thereon, and the method further comprises binding the anchoring reagent and capture reagent to the binding domain. Methods of immobilizing reagents into binding domains through the use of targeting reagents and targeting reagent complements, the use of these methods to form arrays, the use of these arrays in assays, and exemplary targeting reagents and targeting reagent complements are described in U.S. Pat. No. 10,189,023. Methods of immobilizing capture reagents and anchoring reagents to a surface directly or indirectly, e.g., through the use of targeting reagents, are described herein. In embodiments, the targeting reagent and targeting reagent complement are two members of a binding partner pair selected from avidin-biotin, streptavidin-biotin, antibody-hapten, antibody-antigen, antibody-epitope tag, nucleic acid-complementary nucleic acid, aptamer-aptamer target, and receptor-ligand. In embodiments, the targeting reagent is biotin and the targeting reagent complement is streptavidin.

Suitable surfaces for use in the present invention are provided herein, and include surfaces used as solid phase supports in the art of binding assays. In embodiments, the surface is a particle. In embodiments, the surface is a bead. Non-limiting examples of particles and beads are provided herein, and include beads used in Bead-Array assay formats (such as those sold under the LUMINEX trademark) and magnetic beads (such as those used in Roche ELECSYS electrochemiluminescence assays). In embodiments, the surface comprises a well of a multi-well plate. In embodiments, the surface comprises a plurality of distinct binding domains. In embodiments, the surface comprises an electrode. In embodiments, the electrode is a carbon ink electrode. In embodiments, the surface comprises an electrode and the detection step of the method comprises applying a potential to the electrode and measuring electrochemiluminescence. In embodiments, applying a potential to the electrode generates an electrochemiluminescence signal.

Multiplex Methods

In embodiments, the present disclosure provides methods for measuring a plurality of analytes. In embodiments, the method comprises repeating one or more steps of the methods of measuring an analyte provided herein, to measure one or more additional analytes, wherein each analyte binds to a different capture reagent in a different binding domain on the same surface or on different surfaces.

In embodiments, the labeled probe for each analyte of the one or more additional analytes is a compound of Formula I:

Formula I

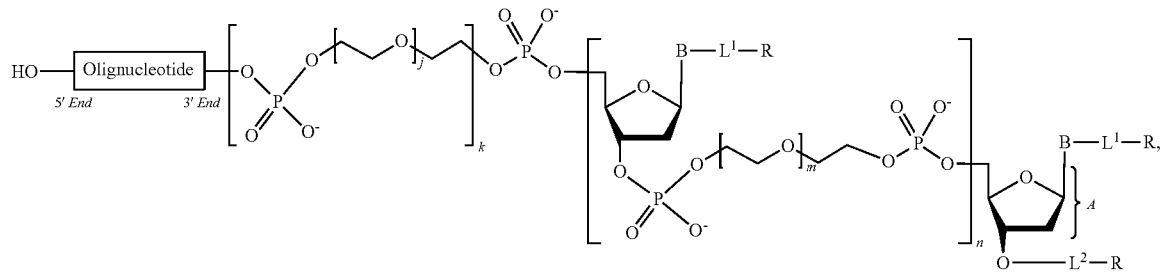

wherein B is a nucleotide base, R is an electrochemiluminescent label, L is a linking group, $L^2$ is a linking group, j is an integer between 0 and 11, k is an integer between 0 and 1, m is an integer between 0 and 11, and n is an integer between 0 and 5.

In embodiments, R comprises ruthenium complex $RP^1P^2P^3$, wherein each of $P^1$, $P^2$, and $P^3$ is independently a bipyridine, a substituted bipyridine, a phenanthroline, or a substituted phenanthroline. In embodiments, the chemiluminescent label R is

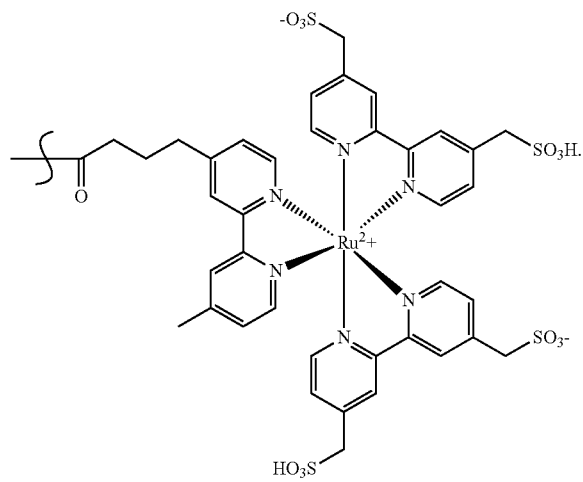

In embodiments, B is a uracil attached to $L^1$ at a 5 position of the uracil.

In embodiments, $L^1$ comprises

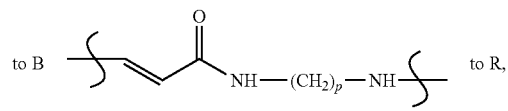

or a combination thereof, wherein p is an integer between 1 and 12.

In embodiments, $L^2$ comprises

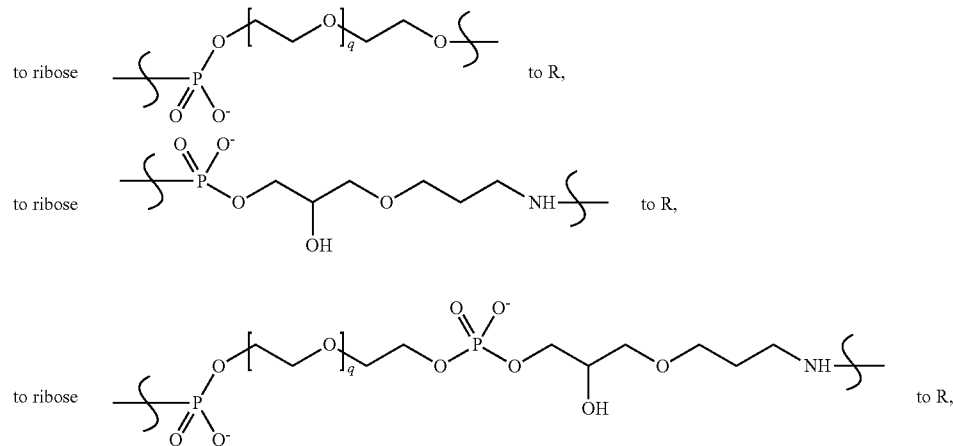

or a combination thereof, wherein q is an integer between 0 and 11.

In embodiments, the present disclosure provides a labeled probe of Formula II:

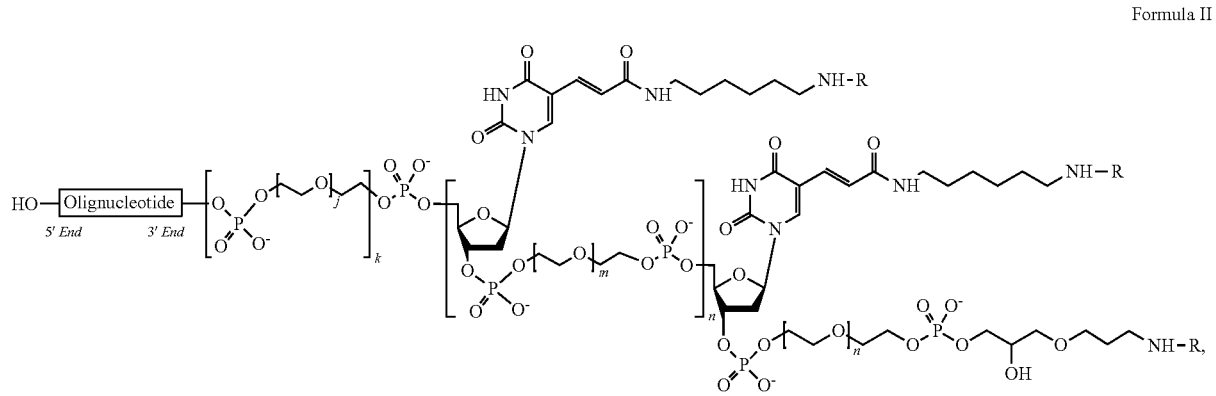

Formula II wherein j is an integer between 0 and 11, k is an integer between 0 and 1, m is an integer between 0 and 11, n is an integer between 0 and 5, and R is an electrochemiluminescence label:

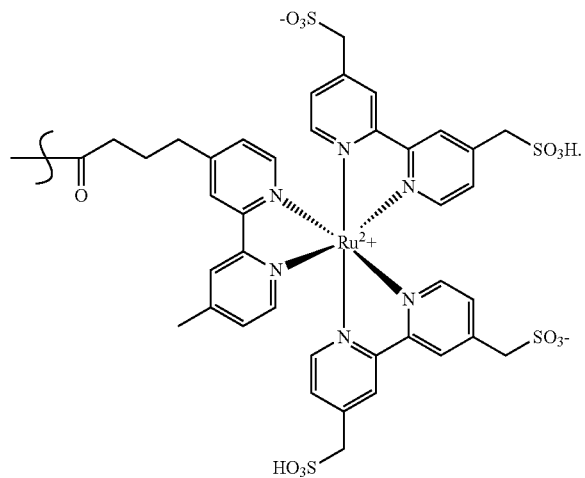

In embodiments, j is an integer between 0 and 5, k is 0, is an integer between 0 and 5, and n is an integer between 2 and 7. In embodiments, k is 0, j is 0, m is 1, and n is 5.

In embodiments, the labeled probe used for each analyte comprises the same oligonucleotide. In embodiments, the oligonucleotide consists of 5'-CAGTGAATGCGAGTCCGTCT-3' (SEQ ID NO:31).

In embodiments, the oligonucleotide of the labeled probe comprises a sequence having at least 60%, at least 65%, at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or about 100% sequence identity with 5'-CAGTGAATGCGAGTCCGTCT-3' (SEQ ID NO:31). In embodiments, the oligonucleotide of the labeled probe comprises a sequence having at least 85% sequence identity with 5'-CAGTGAATGCGAGTCCGTCT-3' (SEQ ID NO:31). In embodiments, the oligonucleotide of the labeled probe comprises a sequence having at least 88% sequence identity with 5'-CAGTGAATGCGAGTCCGTCT-3' (SEQ ID NO:31). In embodiments, the oligonucleotide of the labeled probe comprises a sequence having at least 90% sequence identity with 5'-CAGTGAATGCGAGTCCGTCT-3' (SEQ ID NO:31). In embodiments, the oligonucleotide of the labeled probe comprises a sequence having at least 95% sequence identity with 5'-CAGTGAATGCGAGTCCGTCT-3' (SEQ ID NO:31). In embodiments, the oligonucleotide of the labeled probe comprises a sequence having at least 98% sequence identity with 5'-CAGTGAATGCGAGTCCGTCT-3' (SEQ ID NO:31). In embodiments, the oligonucleotide of the labeled probe comprises a sequence having at least 99% sequence identity with 5'-CAGTGAATGCGAGTCCGTCT-3' (SEQ ID NO:31).

In embodiments, the oligonucleotide of the labeled probe comprises 5'-CAGTGAATGCGAGTCCGTCT-3' (SEQ ID NO:31). In embodiments, the oligonucleotide of the labeled probe comprises 5'-CAGTGAATGCGAGTCCGTCTAAG-3' (SEQ ID NO:32). In embodiments, the oligonucleotide of the labeled probe comprises one or more modifications described herein. In embodiments, the labeled probe comprises an amino modifier. In embodiments, the labeled probe comprises an internal Amino Modified dT base (iAmMC6T). In embodiments, the labeled probe comprises an internal spacer 18 (iSp18). In embodiments, the labeled probe comprises a 3' Amino Modifier (3AmMO). In embodiments, the oligonucleotide of the labeled probe comprises 5'-CAGTGAATGCGAGTCCGTCTAAG/iAmMC6T/iSp18/iAmMC6T/iSp18/3AmMO/-3' (SEQ ID NO:44 with modifications).

In embodiments, the connector oligonucleotide for each analyte of the one or more additional analytes further comprises a 5' terminal phosphate group. In embodiments, the connector oligonucleotide for each analyte is 53 to 61 nucleotides in length. In embodiments, the connector oligonucleotide used for each analyte has the same sequence. In embodiments, the connector oligonucleotide is about 53 to about 76 nucleotides in length and comprises at its 5' end sequence 5'-GTCTGTC-3' and at its 3' end sequence 5'-GTGTCTA-3'. The 5' end sequence and 3' end sequence of an oligonucleotide can also be referred to as 5' terminal sequence and 3' terminal sequence, respectively. In embodiments, the connector oligonucleotide comprises 5'-CAGTGAATGCGAGTCCGTCTAAG-3' (SEQ ID NO:34) and 5'-AAGAGAGTAGTACAGCA-3' (SEQ ID NO:35). In embodiments, the connector oligonucleotide is about 40 to about 100 nucleotides in length. In embodiments, the connector oligonucleotide is about 50 to about 78 nucleotides in length. In embodiments, the connector oligonucleotide is about 53 to about 76 nucleotides in length. In embodiments, the connector oligonucleotide is about 50 to about 70 nucleotides in length. In embodiments, the connector oligonucleotide is about 53 to about 61 nucleotides in length. In embodiments, the connector oligonucleotide is about 54 to about 61 nucleotides in length. In embodiments, the connector oligonucleotide is about 61 nucleotides in length. In embodiments, the connector oligonucleotide is about 53, about 54, about 55, about 56, about 57, about 58, about 59, about 60, about 61, about 62, about 63, about 64, about 65, about 66, about 67, about 68, about 69, about 70, about 71, about 72, about 73, about 74, about 75, or about 76 nucleotides in length and comprises at its 5' end sequence 5'-GTTCTGTC-3' and at its 3' end sequence 5'-GTGTCTA-3'. In embodiments, the connector oligonucleotide further comprises a 5' terminal phosphate group. In embodiments, the connector oligonucleotide comprises at its 5' end sequence 5'-GTCTGTC-3' and at its 3' end sequence 5'-GTGTCTA-3'. In embodiments, the connector oligonucleotide comprises a 5' terminal phosphate.

In embodiments, the connector oligonucleotide consists of 5'-GTTCTGTCATATITCAGTGAATGCGAGTCC-GTCTAAGAGAGTAGTACAGCAAGAG TGTCTA-3' (SEQ ID NO:36). In embodiments, the oligonucleotide consists of 5'-GCTGTGCAATATTCAGTGAATGCGA-GTCCGTCTAAGAGAGTAGTACAGCAAGA GCGTC-GA-3' (SEQ ID NO:43). In embodiments, the connector oligonucleotide further comprises a 5' terminal phosphate group. In embodiments, the connector oligonucleotide is a linear oligonucleotide that can be ligated to form a circular oligonucleotide, e.g., a circular RCA template.

In embodiments, the nucleic acid probe used for each analyte of the one or more additional analytes is 14 to 19 nucleotides in length. In embodiments, the nucleic acid probe used for each analyte of the one or more additional analytes is 14 nucleotides in length. In embodiments, the nucleic acid probe used for each analyte of the one or more additional analytes is 15 nucleotides in length. In embodiments, the nucleic acid probe is less than 24 nucleotides in length. In embodiments, the nucleic acid probe is less than 19 nucleotides in length. In embodiments, the nucleic acid probe is less than 15 nucleotides in length. In embodiments, the nucleic acid probe comprises an oligonucleotide of about 10 to about 30 nucleotides in length. In embodiments, the nucleic acid probe comprises an oligonucleotide of about 12 to about 28 nucleotides in length. In embodiments, the nucleic acid probe comprises an oligonucleotide of about 13 to about 26 nucleotides in length. In embodiments, the nucleic acid probe comprises an oligonucleotide of about 14 to about 24 nucleotides in length. In embodiments, the nucleic acid probe comprises an oligonucleotide of about 11 to about 22 nucleotides in length. In embodiments, the nucleic acid probe comprises an oligonucleotide of about 12 to about 21 nucleotides in length. In embodiments, the nucleic acid probe comprises an oligonucleotide of about 13 to about 20 nucleotides in length. In embodiments, the nucleic acid probe comprises an oligonucleotide of about 14 to about 18 nucleotides in length. In embodiments, the nucleic acid probe comprises an oligonucleotide of about 10, about 11, about 12, about 13, about 14, about 15, about 16, about 17, about 18, about 19, about 20, about 21, about 22, about 23, about 24, about 25, about 26, about 27, about 28, about 29, or about 30 nucleotides in length. In embodiments, the nucleic acid probe comprises an oligonucleotide comprising 14 or 15 contiguous nucleotides of 5'-GACAGAACTAGACAC-3' (SEQ ID NO:33). In embodiments, the nucleic acid probe comprises an oligonucleotide, wherein the oligonucleotide is 14 to 19 nucleotides in length and comprises 14 or 15 contiguous nucleotides of 5'-GACAGAACTAGACAC-3' (SEQ ID NO:33). In embodiments, the nucleic acid probe comprises an oligonucleotide comprising 5'-GACAGAACTAGACAC-3' (SEQ ID NO:33). In embodiments, the nucleic acid probe comprises an oligonucleotide comprising 5'-ACAGAACTA-GACAC-3' (SEQ ID NO:40). In embodiments, the nucleic acid probe comprises an oligonucleotide comprising 5'-GACAGAACTAGACA-3' (SEQ ID NO:41). In embodiments, the nucleic acid probe comprises an oligonucleotide comprising 5'-TGCACAGCTCGACGC-3' (SEQ ID NO:42).

In embodiments, the conjugate used for each analyte of the one or more additional analytes has the same nucleic acid probe sequence. In embodiments, the nucleic acid probe comprises 14 or 15 contiguous nucleotides of 5'-GACAGAACTAGACAC-3' (SEQ ID NO:33). In embodiments, the nucleic acid probe comprises an oligonucleotide comprising 5'-GACAGAACTAGACAC-3' (SEQ ID NO:33). In embodiments, the nucleic acid probe comprises an oligonucleotide comprising 5'-ACAGAACTA-GACAC-3' (SEQ ID NO:40). In embodiments, the nucleic acid probe comprises an oligonucleotide comprising 5'-GACAGAACTAGACA-3' (SEQ ID NO:41). In embodiments, the nucleic acid probe comprises an oligonucleotide comprising 5'-TGCACAGCTCGACGC-3' (SEQ ID NO:42).

In embodiments, an anchoring reagent is provided comprising an anchoring oligonucleotide, and the anchoring oligonucleotide for each analyte of the one or more additional analytes is 17 to 25 nucleotides in length. In embodiments, the anchoring reagent comprises an anchoring oligonucleotide, and the anchoring oligonucleotide is about 10 to about 30 nucleotides in length. In embodiments, the anchoring oligonucleotide is about 15 to about 28 nucleotides in length. In embodiments, the anchoring oligonucleotide is about 17 to about 25 nucleotides in length. In embodiments, the anchoring oligonucleotide is about 17, about 18, about 19, about 20, about 21, about 22, about 23, about 24, or about 25 nucleotides in length. In embodiments, the same anchoring oligonucleotide is used for each analyte of the one or more additional analytes. In embodiments, the anchoring oligonucleotide comprises 5'-AAGAGA-GTAGTACAGCA-3' (SEQ ID NO:35). In embodiments, the anchoring oligonucleotide consists of 5'-AAGAGAG-TAGTACAGCAGCCGTCAA-3' (SEQ ID NO:37).

In embodiments, a different detection reagent is used for each analyte. In embodiments, the same detection reagent is used for each analyte. In embodiments, a different capture reagent is used for each analyte. In embodiments, the capture reagent and/or detection reagent comprises a protein. In embodiments, the capture reagent and/or detection reagent comprises an antibody. In embodiments, the capture reagent and/or detection reagent comprises an antigen-binding substance. In embodiments, the capture reagent and the detection reagent are antigen-binding substances. In embodiments, the capture reagent and the detection reagent are antibodies.

In embodiments, the surface comprises a plurality of binding domains, and each analyte forms a complex in a different binding domain of the plurality of binding domains.

In embodiments, the surface is a particle. In embodiments, the surface is a bead. In embodiments, the surface is a plate. In embodiments, the surface is a well in a multi-well array. In embodiments, the surface comprises an electrode. In embodiments, the electrode is a carbon ink electrode. In embodiments, each binding domain for each analyte of the one or more additional analytes is on a separate surface, and the surfaces are beads in a bead array. In embodiments, each binding domain for each analyte of the one or more additional analytes is on a single surface, and the binding domains form the elements of a capture reagent array on the surface. In embodiments, the surface comprises an electrode and the detection step of the method comprises applying a potential to the electrode and measuring electrochemiluminescence. In embodiments, applying a potential to the electrode generates an electrochemiluminescence signal.

In embodiments, the binding of each analyte to its corresponding capture reagent is performed in parallel by contacting the one or more surfaces with a single liquid volume comprising a plurality of analytes. In embodiments, the plurality of analytes includes the analyte and one or more additional analytes. In embodiments, each step of the method is carried out for each analyte in parallel. In embodiments, the method is a simultaneous multiplexed assay. Multiplexed measurement of analytes on a surface are described herein; see also, e.g., U.S. Pat. Nos. 7,842,246 and 6,977,722.

In embodiments, each binding domain comprises a targeting reagent complement capable of binding to a targeting reagent complement and each anchoring reagent and capture reagent comprise a supplemental linking reagent capable of binding to a linking reagent, and the method further comprises immobilizing a capture reagent and anchoring agent in each binding domain by: (1) binding the capture and anchoring reagent through the supplemental linking reagent to a targeting reagent complement connected to the linking reagent; and (2) binding the product of step (1) to the binding domain comprising the targeting reagent complement, wherein (i) each binding domain comprises a different targeting reagent complement, and (ii) each targeting reagent complement selectively binds to one of the targeting reagents.

Accordingly, in embodiments, the surface comprises the targeting reagent complement; the targeting reagent is connected to the linking reagent; and each of the capture reagent and anchoring reagent comprises the supplemental linking reagent Thus, in embodiments, the targeting reagent complement on the surface binds to the targeting reagent, which is connected to the linking reagent, which binds to the supplemental linking reagent on the capture reagent and the anchoring reagent.

In embodiments, the linking reagent has more than one binding site for supplemental linking reagents, and the immobilization of the capture reagent and anchoring reagent further comprises: binding the capture and anchoring reagent through the supplemental linking reagent to a targeting reagent connected to the linking reagent; and binding the product of to the binding domain comprising the targeting reagent complement, wherein, (i) each binding domain comprises a different targeting reagent complement, and (ii) each targeting reagent complement selectively binds to one of the targeting reagents. For example, in the case where the targeting agent is an oligonucleotide, the linking reagent is streptavidin and the supplemental linking agent is biotin, a biotin-labeled oligonucleotide can be bound to a first of the four biotin binding sites of a streptavidin to form the targeting reagent connected to a linking reagent. A biotin-labeled capture reagent (i.e., a capture reagent linked to the supplemental linking agent) can then bind to a remaining biotin binding site on the streptavidin to connect the targeting agent to the capture reagent.

Exemplary targeting reagents and targeting reagent complements are described herein. In embodiments, the targeting reagent and targeting reagent complement are two members of a binding partner pair selected from avidin-biotin, streptavidin-biotin, antibody-hapten, antibody-antigen, antibody-epitope tag, nucleic acid-complementary nucleic acid, aptamer-aptamer target, and receptor-ligand. In embodiments, the targeting reagent is biotin and the targeting reagent complement is streptavidin. In embodiments, the linking reagent and supplemental linking reagent pair is a different binding partner pair than the targeting reagent and targeting reagent complement pair. In embodiments, the linking reagent is avidin or streptavidin, and the supplemental linking reagent is biotin. In embodiments, the targeting reagent and targeting reagent complement are complementary oligonucleotides.

The concentrations of various reagents used in the assays described herein may be selected during assay optimization. In embodiments, the concentration of capture reagent for binding to the surface is between about 0.01 µg/mL to about 0.5 µg/mL; between about 0.1 µg/mL to about 0.4 µg/mL; between about 0.2 µg/mL to about 0.3 µg/mL; or about 0.25 µg/mL. In embodiments, the concentration of capture reagent for binding to the surface is less than 0.25 µg/mL. In embodiments, the concentration of detection reagent for binding to the analyte is between about 0.01 µg/mL to about 0.5 µg/mL; between about 0.05 µg/mL to about 0.3 µg/mL; between about 0.1 µg/mL to about 0.2 µg/mL; or about 0.125 µg/mL. In embodiments, the concentration of detection reagent for binding to the analyte is about 0.125 µg/mL.

The assay methods described herein may have assay steps during which a binding or other type of reaction occurs. For example, methods may comprise one or more of (i) binding an analyte to a capture reagent and a detection conjugate comprising a detection reagent and a nucleic acid probe, (ii) extending the nucleic acid probe to form an extended sequence, (iii) binding the extended sequence to an anchoring oligonucleotide, (iv) binding the extended sequence to a labeled detection probe and (v) measuring the labeled probe. In another example, methods may comprise one or more of (i) binding an analyte to a capture reagent and a detection conjugate comprising a detection reagent and a nucleic acid probe, (ii) binding a connector oligonucleotide to the nucleic acid probe, (iii) ligating the connector sequence to form a circular template, (iv) carrying out rolling circle amplification of the circular template to extend the nucleic acid probe and form an extended sequence, (v) binding the extended sequence to an anchoring oligonucleotide, (vi) binding the extended sequence to a labeled detection probe and (vii) measuring the labeled probe. It will be understood that different reactions within certain stated steps may be carried out sequentially or concurrently (for example the binding of the analyte to the capture reagent and the detection conjugate may carried out at the same time or binding of the analyte to the capture reagent may be carried out first followed by binding to the detection conjugate, or binding of the analyte to the detection reagent may be carried out first followed by binding to the detection conjugate). It will also be understood that certain steps can also be run concurrently (e.g., the extension of the nucleic acid probe and binding of the detection probe may be carried out sequentially or concurrently).

It is also understood that in some cases, the performance of methods comprising binding or other reactions carried out involving materials immobilized on a surface may be improved by carrying out "wash" steps following one or more steps having these types of reactions in order to remove unreacted or remnant materials in solution away from the surface and prevent them from interfering with subsequent reactions at the surface or measurements of the surface. For example, after steps involving binding of an analyte or reagent to a surface, a wash step may be used to remove unbound analyte or reagent from the solution contacting the surface. In another example, after steps involving ligation, extension or amplification of surface bound species, a wash step may be used to remove excess unbound reactants or enzymes from the solution contacting the surface. Wash steps may be carried out, for example, using manual washing methods, or using an automated plate washer (e.g., BIOTEK 405 LS Microplate Washers). When using an automated plate washer for the assays described herein, in embodiments, best results may be obtained by using a low dispense flow rate and by positioning dispense tips at the outer edge of the well (e.g., horizontal dispense offset towards one side of the well). A low flow rate dispense wash may be used after the detection step of the assays provided herein, and all other wash steps may use a default wash program. Alternatively, manual washing may be performed with good reproducibility, provided the wash buffer is completely removed. It is also understood that steps comprising binding or other reactions may require a certain amount of time to progress to the desired extent (the incubation time) and they may be carried out at selected temperatures to provide most efficient or optimum performance. In embodiments, the incubation time to bind analyte to capture reagent on a surface is between around 1 minute and 24 hours, between around 5 minutes and 4 hours, between around 9 minutes and 2 hours, around 9 minutes, around 15 minutes, around 30 minutes around 1 hour or around 2 hours. In embodiments, the incubation temperature for this step is between around 10° C. to 50° C., 15° C. to 40° C., around room temperature, around 25° C., around 27° C., around 30° C. or around 37° C.

In embodiments, the time to binding detection conjugate to analyte (which may be concurrent or sequential with binding of analyte to the capture reagent) is between around 1 minute and 24 hours, between around 5 minutes and 4 hours, between around 9 minutes and 2 hours, around 9 minutes, around 1 hour or around 2 hours. In embodiments, the incubation temperature for this step is between around 10° C. to 50° C., 15° C. to 40° C., around room temperature, around 25° C., around 27° C., around 30° C. or around 37° C.

In embodiments, the times for binding connector oligonucleotide to the nucleic acid probe in the detection conjugate and ligating the connector oligonucleotide to form a circular template oligonucleotide (which may be carried out concurrently or sequentially) are between around 1 minute and 24 hours, between around 5 minutes and 4 hours, between around 9 minutes and 2 hours, around 9 minutes, around 15 minutes, around 30 minutes, around 1 hour or around 2 hours. In embodiments, the incubation temperature for this step is between around 10° C. to 50° C., 15° C. to 40° C., around room temperature, around 25° C., around 27° C., around 30° C. or around 37° C.

In embodiments, the times for extending the nucleic acid probe (for example, by rolling circle amplification), are between around 1 minute and 24 hours, between around 5 minutes and 4 hours, between around 9 minutes and 2 hours, around 9 minutes, around 15 minutes, around 30 minutes, around 1 hour or around 2 hours. In embodiments, the incubation temperature for this step is between around 10° C. to 50° C., 15° C. to 40° C., around room temperature, around 25° C., around 27° C., around 30° C. or around 37° C.

In embodiments, (i) the binding of analyte to the surface and the binding of detection conjugate to analyte are carried out sequentially, each for 1 to 2 hours at room temperature (roughly 18 to 27° C.), each followed by a wash step, (ii) the binding and ligation of the connector oligonucleotide is carried out concurrently for about 30 minutes at room temperature, followed by a wash step, and/or (iii) rolling circle amplification, binding of the detection probe and (if the anchoring oligonucleotide is present) binding to the anchoring oligonucleotide is carried out concurrently over about 1 hour at a set temperature of around 27° C., followed by a wash step.

In one embodiment, the surface is a magnetic bead (e.g., a streptavidin coated magnetic bead) and the assay steps include: (i) binding a biotin-labeled capture reagent and a detection conjugate (comprising a nucleic acid probe) to an analyte to form a complex comprising the capture reagent, analyte and detection conjugate; (ii) capturing the complex on a streptavidin-coated magnetic bead, (iii) binding the nucleic acid probe to a connector oligonucleotide and ligating the connector oligonucleotide to form a circular oligonucleotide template, (iv) extending the nucleic acid probe by rolling circle amplification and binding the detection probe to the amplification product and (v) introducing the bead into a flow cell and capturing the bead on an electrode by application of a magnetic field, applying a potential to the electrode and carrying out an electrochemiluminescence measurement to measure the amount of detection probe on the bead. The bead may be provided with a pre-bound anchoring oligonucleotide, biotin-labeled anchoring oligonucleotide may be added during step (ii) or anchoring oligonucleotide could be bound to the bead in a separate step; in these cases, the method would also include binding the extended probe to the anchoring oligonucleotide. In embodiments, the individual steps are each carried out for a set incubation time (if two or more of the steps are carried out in a concurrent operation then the time for this concurrent operation is the pre-set incubation time). In embodiments, each step or operation is carried out for the same incubation time. In embodiments, this incubation time is about 9 minutes per step or operation. In embodiments, each step or operation is carried out for an incubation time that is a multiple of about 9 minutes. In embodiments, the magnetic bead is washed (for example by collecting the magnetic bead in a tube using a magnet and removing the liquid from the tube) after step (ii), step (iii) and/or step (iv). The bead may also be washed during the operation of collecting it in the flow cell.

In embodiments, the detection step comprises contacting the extended sequence with a labeled probe provided herein. In embodiments, the extended sequence and labeled probe are incubated for between around 1 minute and 24 hours, between around 5 minutes and 4 hours, between around 9 minutes and 2 hours, between around 30 minutes to 90 minutes, around 9 minutes, around 30 minutes, around 1 hour, around 90 minutes, or around 2 hours. In embodiments, the incubation temperature for this step is between around 10° C. to 50° C., 15° C. to 40° C., around room temperature, around 23° C., around 25° C., around 27° C., around 30° C., or around 37° C. In embodiments, the detection step comprises contacting the extended sequence with a labeled probe for about 60 minutes at about 27° C. The detection step can be modified to optimize assay sensitivity and ratio of signal to background. Two parameters may affect these factors the most: (1) temperature and (2) incubation time of the detection step. Generally, both signal and background increases with increasing temperature and incubation time. If a shorter incubation time is desired, it may be optimal to increase the temperature or vary one of the other assay parameters to increase signal. Alternatively, if the assay background is very low and/or more signal is needed, the detection step incubation time and/or temperature can be increased to increase signal and potentially sensitivity. In cases where background signals are too high, a lower temperature may be combined with a shorter incubation time. This may cause specific signal to decrease along with background, but may yield increased signal to background ratio. In embodiments, once the preferred incubation time and temperature are determined, the time and temperature should not be varied between assay runs, in order to improve assay consistency. For example, a thermoshaker or other controlled temperature shaker may be used to achieve consistency in the incubation temperature and time.

Kits for Use in Two-Antibody Assays

In embodiments, the present disclosure provides a kit for conducting an assay comprising: (a) a labeled probe according to the present disclosure; (b) a connector oligonucleotide comprising a 5' terminal nucleotide sequence and a 3' terminal nucleotide sequence, wherein the 5' and 3' terminal nucleotide sequences are capable of hybridizing to a nucleic acid probe, and an internal nucleotide sequence capable of hybridizing to a complement of a detection oligonucleotide of the labeled probe; (c) a nucleic acid ligase; and (d) a nucleic acid polymerase.

In embodiments, the present disclosure provides a kit for conducting an assay comprising: (a) an anchoring reagent comprising an anchoring oligonucleotide; (b) a labeled probe according to the present disclosure; (c) a connector oligonucleotide comprising a 5' terminal nucleotide sequence and a 3' terminal nucleotide sequence, wherein the 5' and 3' terminal nucleotide sequences are capable of hybridizing to a nucleic acid probe, a first internal nucleotide sequence capable of hybridizing to a complement of the anchoring oligonucleotide, and a second internal nucleotide sequence capable of hybridizing to a complement of a detection oligonucleotide of the labeled probe; (d) a nucleic acid ligase; and (e) a nucleic acid polymerase.

In embodiments, the present disclosure provides a kit for conducting an assay comprising: (a) a labeled probe; (b) a connector oligonucleotide comprising a 5' terminal nucleotide sequence, a 3' terminal nucleotide sequence, wherein the 5' and 3' terminal nucleotide sequences are capable of hybridizing to a nucleic acid probe, and an internal nucleotide sequence capable of hybridizing to a complement of a detection oligonucleotide of the labeled probe; (d) a nucleic acid ligase; and (e) a nucleic acid polymerase; wherein the 5' and 3' terminal nucleotide sequences do not overlap with the internal sequence, the sum of the length of the 5' and 3' terminal sequences is 14 to 24 nucleotides in length, and the connector oligonucleotide is 53 to 76 nucleotides in length.

In embodiments, the present disclosure provides a kit for conducting an assay comprising: (a) an anchoring reagent comprising an anchoring oligonucleotide; (b) a labeled probe; (c) a connector oligonucleotide comprising a 5' terminal nucleotide sequence, a 3' terminal nucleotide sequence, wherein the 5' and 3' terminal nucleotide sequences are capable of hybridizing to a nucleic acid probe, a first internal nucleotide sequence capable of hybridizing to a complement of the anchoring oligonucleotide, and a second internal nucleotide sequence capable of hybridizing to a complement of a detection oligonucleotide of the labeled probe; (d) a nucleic acid ligase; and (e) a nucleic acid polymerase; wherein the 5' and 3' terminal nucleotide sequences do not overlap with the first and second internal sequences, the sum of the length of the 5' and 3' terminal sequences is 14 to 24 nucleotides in length, and the connector oligonucleotide is 53 to 76 nucleotides in length.

In embodiments, the nucleic acid probe comprises an oligonucleotide of about 10 to about 30 nucleotides in length. In embodiments, the nucleic acid probe comprises an oligonucleotide of about 12 to about 28 nucleotides in length. In embodiments, the nucleic acid probe comprises an oligonucleotide of about 14 to about 26 nucleotides in length. In embodiments, the nucleic acid probe comprises an oligonucleotide of about 14 to about 24 nucleotides in length. In embodiments, the nucleic acid probe comprises an oligonucleotide of about 11 to about 22 nucleotides in length. In embodiments, the nucleic acid probe comprises an oligonucleotide of about 12 to about 21 nucleotides in length. In embodiments, the nucleic acid probe comprises an oligonucleotide of about 13 to about 20 nucleotides in length. In embodiments, the nucleic acid probe comprises an oligonucleotide of about 14 to about 18 nucleotides in length.

In embodiments, the nucleic acid probe comprises an oligonucleotide of about 10, about 11, about 12, about 13, about 14, about 15, about 16, about 17, about 18, about 19, about 20, about 21, about 22, about 23, about 24, about 25, about 26, about 27, about 28, about 29, or about 30 nucleotides in length. In embodiments, the nucleic acid probe comprises an oligonucleotide of about 14 nucleotides in length. In embodiments, the nucleic acid probe comprises an oligonucleotide of about 15 nucleotides in length. In embodiments, the nucleic acid probe comprises an oligonucleotide comprising 5'-GACAGAACTAGACAC-3' (SEQ ID NO:33). In embodiments, the nucleic acid probe comprises an oligonucleotide, wherein the oligonucleotide is 14 to 24 nucleotides in length and comprises 14 or 15 contiguous nucleotides of 5'-GACAGAACTAGACAC-3' (SEQ ID NO:33). In embodiments, the nucleic acid probe comprises an oligonucleotide comprising 5'-GACAGAACTAGACAC-3' (SEQ ID NO:33). In embodiments, the nucleic acid probe comprises an oligonucleotide comprising 5'-ACAGAACTAGACAC-3' (SEQ ID NO:40). In embodiments, the nucleic acid probe comprises an oligonucleotide comprising 5'-GACAGAACTAGACA-3' (SEQ ID NO:41). In embodiments, the nucleic acid probe comprises an oligonucleotide comprising 5'-TGCACAGCTCGACGC-3' (SEQ ID NO:42).

In embodiments, the labeled probe comprises an oligonucleotide (which may be referred to as the detection oligonucleotide) and an electrochemiluminescent moiety. In embodiments, the labeled probe comprises one or more electrochemiluminescent labels. In embodiments, the labeled probe comprises an oligonucleotide and multiple electrochemiluminescent labels. The labeled probe may include (i) one or more (or two or more) labels linked to modified nucleotide bases of the oligonucleotide, (ii) a labeled moiety having one or more (or two or more) labels, the moiety being linked to the 5' end of the oligonucleotide, (iii) a labeled moiety having one or more (or two or more) labels, the moiety being linked to the 3' end of the oligonucleotide or (iv) a combination of two or more of (i), (ii) and (iii).

In embodiments, the labeled probe is of Formula I:

Formula I

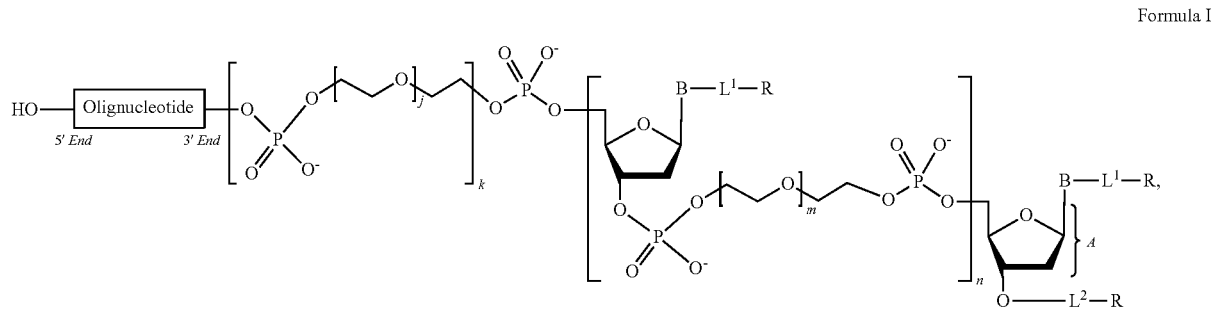

wherein B is a nucleotide base, R is an electrochemiluminescent label, $L^1$ is a linking group, $L^2$ is a linking group, j is an integer between 0 and 11, k is an integer between 0 and 1, m is an integer between 0 and 11, and n is an integer between 0 and 5.

In embodiments, R comprises ruthenium complex $RP^1P^2P^3$, wherein each of $P^1$, $P^2$, and $P^3$ is independently a bipyridine, a substituted bipyridine, a phenanthroline, or a substituted phenanthroline. In embodiments, the chemiluminescent label R is

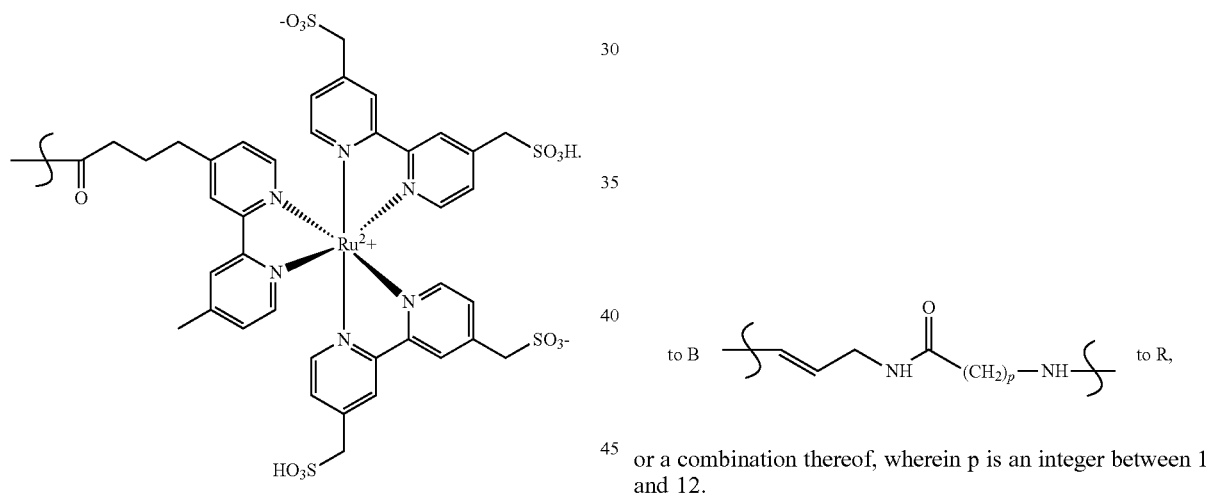

In embodiments, B is a uracil attached to $L^1$ at a 5 position of the uracil.

In embodiments, $L^1$ comprises

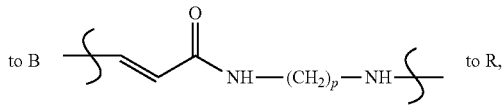

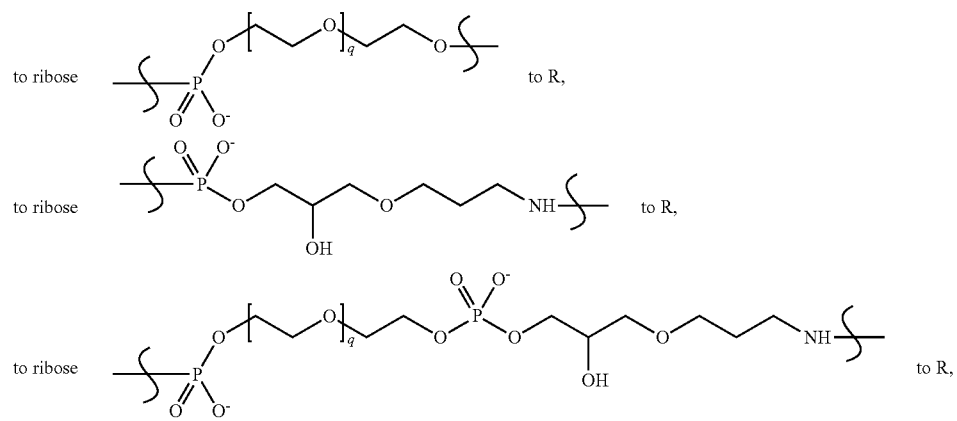

or a combination thereof, wherein p is an integer between 1 and 12.

In embodiments, $L^2$ comprises or a combination thereof, wherein q is an integer between 0 and 11.

In embodiments, the present disclosure provides a labeled probe of Formula II:

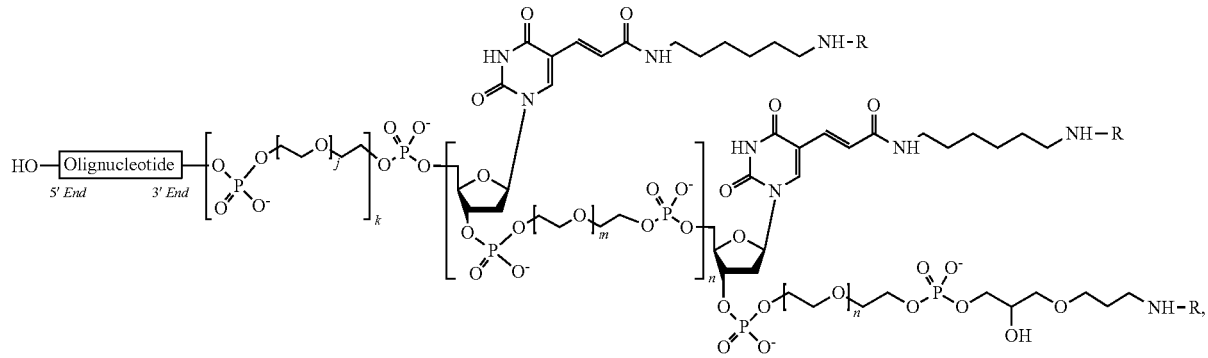

Formula II wherein j is an integer between 0 and 11, k is an integer between 0 and 1, m is an integer between 0 and 11, n is an integer between 0 and 5, and R is an electrochemiluminescence label:

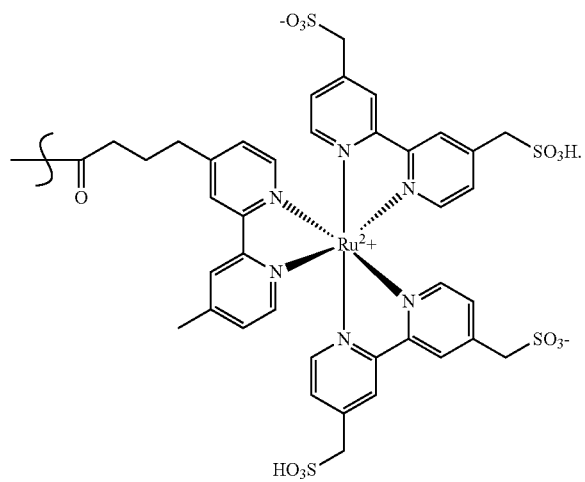

In embodiments, j is an integer between 0 and 5, k is 0, is an integer between 0 and 5, and n is an integer between 2 and 7. In embodiments, k is 0, j is 0, m is 1, and n is 5.

In embodiments, the oligonucleotide of the labeled probe comprises a sequence having at least 60%, at least 65%, at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or about 100% sequence identity with 5'-CAGTGAATGCGAGTCCGTCT-3' (SEQ ID NO:31). In embodiments, the oligonucleotide of the labeled probe comprises a sequence having at least 85% sequence identity with 5'-CAGTGAATGCGAGTCCGTCT-3' (SEQ ID NO:31). In embodiments, the oligonucleotide of the labeled probe comprises a sequence having at least 88% sequence identity with 5'-CAGTGAATGCGAGTCCGTCT-3' (SEQ ID NO:31). In embodiments, the oligonucleotide of the labeled probe comprises a sequence having at least 90% sequence identity with 5'-CAGTGAATGCGAGTCCGTCT-3' (SEQ ID NO:31). In embodiments, the oligonucleotide of the labeled probe comprises a sequence having at least 95% sequence identity with 5'-CAGTGAATGCGAGTCCGTCT-3' (SEQ ID NO:31). In embodiments, the oligonucleotide of the labeled probe comprises a sequence having at least 98% sequence identity with 5'-CAGTGAATGCGAGTCCGTCT-3' (SEQ ID NO:31). In embodiments, the oligonucleotide of the labeled probe comprises a sequence having at least 99% sequence identity with 5'-CAGTGAATGCGAGTCCGTCT-3' (SEQ ID NO:31).

In embodiments, the oligonucleotide of the labeled probe comprises 5'-CAGTGAATGCGAGTCCGTCT-3' (SEQ ID NO:31). In embodiments, the oligonucleotide of the labeled probe comprises 5'-CAGTGAATGCGAGTCCGTCTAAG-3' (SEQ ID NO:32). In embodiments, the oligonucleotide of the labeled probe comprises one or more modifications described herein. In embodiments, the labeled probe comprises an amino modifier. In embodiments, the labeled probe comprises an internal Amino Modified dT base (iAmMC6T). In embodiments, the labeled probe comprises an internal spacer 18 (iSp18). In embodiments, the labeled probe comprises a 3' Amino Modifier (3AmMO). In embodiments, the oligonucleotide of the labeled probe comprises 5'-CAGTGAATGCGAGTCCGTCTAAG/iAmMC6T/iSp18/iAmMC6T/iSp18/3AmMO/-3' (SEQ ID NO:44 with modifications).

In embodiments, the nucleic acid probe comprises first and second nucleic acid probe sequences that are adjacent to each other and each complementary to a portion of a connector oligonucleotide. In embodiments, the connector oligonucleotide is a linear oligonucleotide. In embodiments, the connector oligonucleotide is a template oligonucleotide for amplification. In embodiments, the connector oligonucleotide is ligated to form a circular template oligonucleotide for RCA. In embodiments, the 5' terminal sequence of the connector oligonucleotide is complementary to one of the first or second nucleic acid sequences, and the 3' terminal sequence of the connector oligonucleotide is complementary to the other of the first or second nucleic acid probe sequences. By selection of appropriate 5' and 3' terminal sequences of the connector oligonucleotide and appropriate complementary first and second probe sequences, binding of the connector to the nucleic acid probe will place the blunt ends of the connector in proximity (i.e., the two terminal nucleotides on the connector are hydrogen bonded to adjacent nucleotides on the nucleic acid probe) to enable ligation in the presence of a ligase enzyme to form a circular oligonucleotide template.

In embodiments, the connector oligonucleotide has a first internal sequence and the first internal sequence of the connector oligonucleotide is capable of hybridizing to a complement of the anchoring oligonucleotide of the anchoring reagent. In embodiments, the first internal sequence of the connector oligonucleotide has 70%, at least 70%, 75%, at least 75%, 80%, at least 80%, 85%, at least 85%, 90%, at least 90%, 95%, at least 95%, 97%, at least 97%, 98%, at least 98%, 99%, or at least 99% or 100% sequence identity with the anchoring oligonucleotide. In embodiments, an extended sequence amplified from the connector oligonucleotide comprises a sequence complementary to the anchoring oligonucleotide.

In embodiments, the internal sequence of the connector oligonucleotide (or the second internal sequence of the connector oligonucleotide if a first internal sequence is present) is capable of hybridizing to a complement of an oligonucleotide of the labeled probe. In embodiments, the internal sequence (or second internal sequence) of the connector oligonucleotide has 70%, at least 70%, 75%, at least 75%, 80%, at least 80%, 85%, at least 85%, 90%, at least 90%, 95%, at least 95%, 97%, at least 97%, 98%, at least 98%, 99%, or at least 99% or 100% sequence identity with the oligonucleotide of the labeled probe. In embodiments, an extended sequence amplified from the connector oligonucleotide comprises a sequence complementary to the detection oligonucleotide of the labeled probe.

In embodiments, the connector oligonucleotide is about 53 to about 76 nucleotides in length and comprises at its 5' end sequence 5'-GTTCTGTC-3' and at its 3' end sequence 5'-GTGTCTA-3'. The 5' end sequence and 3' end sequence of an oligonucleotide can also be referred to as 5' terminal sequence and 3' terminal sequence, respectively. In embodiments, the connector oligonucleotide comprises 5'-CAGTGAATGCGAGTCCGTCTAAG-3' (SEQ ID NO:34) and 5'-AAGAGAGTAGTACAGCA-3' (SEQ ID NO:35). In embodiments, the connector oligonucleotide is about 40 to about 100 nucleotides in length. In embodiments, the connector oligonucleotide is about 50 to about 78 nucleotides in length. In embodiments, the connector oligonucleotide is about 53 to about 76 nucleotides in length. In embodiments, the connector oligonucleotide is about 50 to about 70 nucleotides in length. In embodiments, the connector oligonucleotide is about 53 to about 61 nucleotides in length. In embodiments, the connector oligonucleotide is about 54 to about 61 nucleotides in length. In embodiments, the connector oligonucleotide is about 61 nucleotides in length. In embodiments, the connector oligonucleotide is about 53, about 54, about 55, about 56, about 57, about 58, about 59, about 60, about 61, about 62, about 63, about 64, about 65, about 66, about 67, about 68, about 69, about 70, about 71, about 72, about 73, about 74, about 75, or about 76 nucleotides in length and comprises at its 5' end sequence 5'-GTTCTGTC-3' and at its 3' end sequence 5'-GTGTCTA-3'. In embodiments, the connector oligonucleotide further comprises a 5' terminal phosphate group. In embodiments, the connector oligonucleotide comprises at its 5' end sequence 5'-GTTCTGTC-3' and at its 3' end sequence 5'-GTGTCTA-3'. In embodiments, the connector oligonucleotide comprises a 5' terminal phosphate.

In embodiments, the connector oligonucleotide consists of 5'-GTTCTGTCATATTTCAGTGAATGCGAGTCCGTCTAAGAGAGTAGTACAGCAAGAG TGTCTA-3' (SEQ ID NO:36). In embodiments, the oligonucleotide consists of 5'-GCTGTGCAATATTCAGTGAATGCGAGTCCGTCTAAGAGAGTAGTACAGCAAGA GCGTCGA-3' (SEQ ID NO:43). In embodiments, the connector oligonucleotide further comprises a 5' terminal phosphate group. In embodiments, the connector oligonucleotide is a linear oligonucleotide that can be ligated to form a circular oligonucleotide, e.g., a circular RCA template.

In embodiments, the sum of the length of the 5' and 3' terminal sequences is 10 to 30 nucleotides in length. In embodiments, the sum of the length of the 5' and 3' terminal sequences is 12 to 25 nucleotides in length. In embodiments, the sum of the length of the 5' and 3' terminal sequences is 14 to 19 nucleotides in length. In embodiments, the sum of the length of the 5' and 3' terminal sequences is about 10, about 11, about 12, about 13, about 14, about 15, about 16, about 17, about 18, about 19, about 20, about 21, about 22, about 23, about 24, about 25, about 26, about 27, about 28, about 29, or about 30 nucleotides. In embodiments, the sum of the length of the 5' and 3' terminal sequence is about 14 nucleotides. In embodiments, the sum of the length of the 5' and 3' terminal sequence is about 15 nucleotides. In embodiments, the sum of the length of the 5' and 3' terminal sequence is less than 19 nucleotides. In embodiments, the sum of the length of the 5' and 3' terminal sequence is less than 15 nucleotides.

In embodiments, an anchoring reagent is included and the anchoring reagent comprises an anchoring oligonucleotide, and the anchoring oligonucleotide is about 10 to about 30 nucleotides in length. In embodiments, the anchoring oligonucleotide is about 15 to about 28 nucleotides in length. In embodiments, the anchoring oligonucleotide is about 17 to about 25 nucleotides in length. In embodiments, the anchoring oligonucleotide is about 17, about 18, about 19, about 20, about 21, about 22, about 23, about 24, or about 25 nucleotides in length. In embodiments, the anchoring oligonucleotide comprises 5'-AAGAGAGTAGTACAGCA-3' (SEQ ID NO:35). In embodiments, the anchoring oligonucleotide consists of 5'-AAGAGAGTAGTACAGCAGCCGTCAA-3' (SEQ ID NO:37). In embodiments, the anchoring reagent is

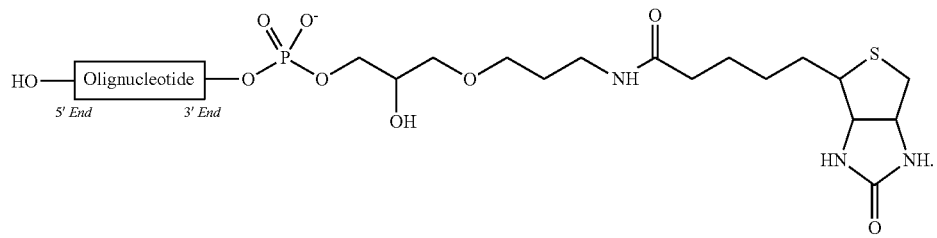

In embodiments, the kit further comprises a nucleic acid probe comprising a first sequence complementary to the 5' terminal sequence of the connector oligonucleotide and an adjacent second sequence complementary to the 3' terminal sequence of the connector oligonucleotide.

In embodiments, the kit further comprises a capture reagent for an analyte, and a detection reagent for the analyte, wherein the capture reagent and the detection reagent are capable of binding to the analyte to form a complex, and the detection reagent is linked to an nucleic acid probe comprising a first sequence complementary to the 5' terminal sequence of the connector oligonucleotide and an adjacent second sequence complementary to the 3' terminal sequence of the connector oligonucleotide.

In embodiments, the kit further comprises a plurality of capture reagents for a plurality of analytes, and one or more detection reagents for the plurality of analytes, wherein, for each analyte, the kit comprises a capture reagent and a detection reagent capable of binding to the analyte to form a complex, and the one or more detection reagents are each linked to a nucleic acid probe comprising a first sequence complementary to the 5' terminal sequence of the connector oligonucleotide and an adjacent second sequence complementary to the 3' terminal sequence of the connector oligonucleotide.

In embodiments, the nucleic acid probe comprises 14 or 15 contiguous nucleotides of the sequence 5'-GACAGAACTAGACAC-3' (SEQ ID NO: 33). In embodiments, the nucleic acid probe comprises the sequence 5'-GACAGAACTAGACAC-3' (SEQ ID NO:33). In embodiments, the nucleic acid probe comprises the sequence 5'-ACAGAACTAGACAC-3' (SEQ ID NO:40). In embodiments, the nucleic acid probe comprises the sequence 5'-GACAGAACTAGACA-3' (SEQ ID NO:41). In embodiments, the nucleic acid probe comprises an oligonucleotide comprising 5'-TGCACAGCTCGACGC-3' (SEQ ID NO:42). In embodiments, the nucleic acid probe comprises a non-naturally occurring 5' modification comprising a reactive functional group. Non-limiting examples of functional groups include, e.g., alkenes and strained alkenes, alkynes, halides, alcohols, thiols, amines, phosphates, aldehydes, ketones, carboxylic acids, carboxylates, amides, esters, thioesters, acyl phosphates, acid halides, nitriles, acid anhydrides, hydrazines, tetrazines, azides, and the like. In embodiments, the reactive functional group is a thiol, an amine, a carboxylic acid, an active ester, a hydrazine, an aldehyde, a ketone, an alkyne, a strained alkene, an azide, or a tetrazine. In embodiments, the reactive functional group is a thiol. In embodiments, the reactive functional group is a tetrazine. In embodiments, the reactive functional group is a vinyl or strained alkene. In embodiments, the reactive functional group is an azide. In embodiments, the reactive functional group is an alkyne or strained alkyne. In embodiments, the reactive functional group is a 4-formylbenzamide. In embodiments, the reactive functional group is a hydrazinonicotinamide.

In embodiments, the non-naturally occurring 5' modification is capable of reacting with a heterobifunctional cross-linking agent of the present disclosure. In embodiments, the non-naturally occurring 5' modification is capable of reacting with a maleimide, an iodoacetamide, or an activated disulfide. In embodiments, the non-naturally occurring 5' modification is capable of reacting with a tetrazine. In embodiments, the non-naturally occurring 5' modification is capable of reacting with a vinyl or strained alkene. In embodiments, the non-naturally occurring 5' modification is capable of reacting with an azide. In embodiments, the non-naturally occurring 5' modification is capable of reacting with an alkyne or strained alkyne. In embodiments, the non-naturally occurring 5' modification is capable of reacting with a hydrazinonicotinamide. In embodiments, the non-naturally occurring 5' modification is capable of reacting with a 4-formylbenzamide.

In embodiments, the non-naturally occurring nucleic acid probe is of Formula IIIA:

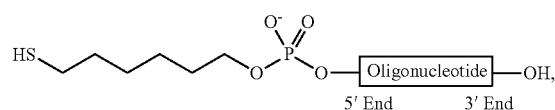

Formula IIIA and comprises a reactive functional group, and the reactive functional group is a thiol, an amine, a carboxylic acid, an active ester, a hydrazine, an aldehyde, a ketone, an alkyne, a strained alkene, an azide or a tetrazine.

In embodiments, the nucleic acid probe further comprises a non-naturally occurring 5' modification comprising a hapten or biotin. In embodiments, the hapten comprises fluorescein, dinitrophenyl, or digoxigenin. In embodiments, the modification comprises biotin.

In embodiments, the nucleic acid probe is of Formula IV:

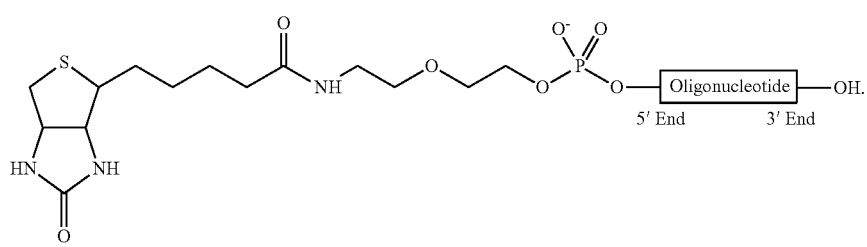

Formula IV

In embodiments, the nucleic acid probe comprises a complementary region to a template nucleic acid sequence. In embodiments, the template nucleic acid sequence is a circular nucleic acid template, or a linear nucleic acid template that can be ligated to form a circular nucleic acid template. In embodiments, the circular nucleic acid template is a template for rolling circle amplification (RCA). In embodiments, the nucleic acid probe is a primer for the RCA reaction, i.e., extends the circular nucleic acid template to form an extended sequence.

In embodiments, the nucleic acid probe is conjugated to a detection reagent. In embodiments, the detection reagent is a protein and the conjugate is a compound of Formula VI:

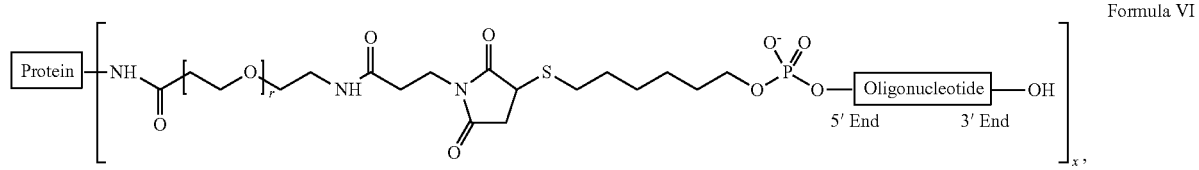

Formula VI wherein r is an integer between 0 and 24, x is an integer between 1 and 20, and —NH— is an amino group originating from the protein. In embodiments, r is between 1 and 20. In embodiments, r is between 2 and 15. In embodiments, r is between 3 and 10. In embodiments, r is 4. In embodiments, r is 1, 2, 3, 4, 5, 6, 7, 8, 9, 10, 11, 12, 13, 14, 15, 16, 17, 18, 19, 20, 21, 22, 23, or 24. In embodiments, x is 1, 2, 3, 4, 5, 6, 7, 8, 9, 10, 11, 12, 13, 14, 15, 16, 17, 18, 19, or 20. In embodiments, x is 1. In embodiments, x is 2.

In embodiments, the capture reagent and/or detection reagent is a protein. In embodiments, the capture reagent and/or detection reagent is an antigen-binding substance. In embodiments, the capture reagent and the detection reagent are proteins. In embodiments, the capture reagent and the detection reagent are antibodies.

In embodiments, the anchoring reagent comprises an anchoring oligonucleotide, and the anchoring oligonucleotide is about 10 to about 30 nucleotides in length. In embodiments, the anchoring oligonucleotide is about 15 to about 28 nucleotides in length. In embodiments, the anchoring oligonucleotide is about 17 to about 25 nucleotides in length. In embodiments, the anchoring oligonucleotide is about 17, about 18, about 19, about 20, about 21, about 22, about 23, about 24, or about 25 nucleotides in length. In embodiments, the anchoring oligonucleotide comprises 5'-AAGAGAGTAGTACAGCA-3' (SEQ ID NO:35). In embodiments, the anchoring oligonucleotide consists of 5'-AAGAGAGTAGTACAGCAGCCGTCAA-3' (SEQ ID NO:37). In embodiments, the anchoring reagent is

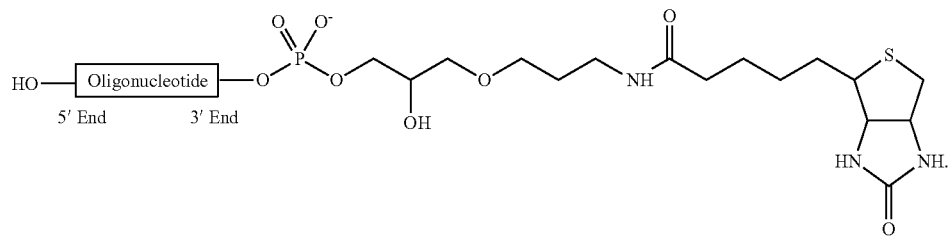

In embodiments, the anchoring reagent further comprises a targeting reagent capable of binding to a targeting reagent complement. In embodiments, the anchoring reagent and capture reagent each comprise a targeting reagent capable of binding to a targeting reagent complement. In embodiments, the kit further comprises a solid phase support having immobilized thereon the targeting reagent complement. Targeting reagents and targeting reagent complements are described herein. In embodiments, the target reagent and targeting reagent complement are two members of a binding partner pair selected from avidin-biotin, streptavidin-biotin, antibody-hapten, antibody-antigen, antibody-epitope tag, nucleic acid-complementary nucleic acid, aptamer-aptamer target, and receptor-ligand. In embodiments, the targeting reagent is avidin or streptavidin, and the targeting reagent complement is biotin. In embodiments, the targeting reagent complement is avidin or streptavidin, and the targeting reagent is biotin.

In embodiments, the solid phase support comprises a surface. Suitable surfaces and solid phase supports for use in the present invention are provided herein, and include surfaces used as solid phase supports in the art of binding assays. In embodiments, the solid phase support is an electrode. In embodiments, the solid phase support is a carbon-based electrode. In embodiments, the kit comprises a multi-well plate assay consumable, and each well of the plate comprises a carbon ink electrode. In embodiments, the solid phase support is a particle. In embodiments, the solid phase support is a bead.

In embodiments, the kit further comprises a solid phase support, and the anchoring reagent is immobilized on the solid phase support. In embodiments, the kit further comprises a solid phase support, and the anchoring reagent and capture reagent are immobilized on the solid phase support. Methods of immobilizing anchoring reagents and capture reagents on surfaces such as solid phase supports are described herein.

In embodiments, the solid phase support comprises a surface. In embodiments, the solid phase support is an electrode. In embodiments, the solid phase support is a carbon-based electrode. In embodiments, the kit comprises a multi-well plate assay consumable, and each well of the plate comprises a carbon ink electrode. In embodiments, the solid phase support is a particle. In embodiments, the solid phase support is a bead.

In embodiments of a kit comprising a plurality of capture reagents, the kit further comprises a solid phase support, and the anchoring reagent and capture reagents are immobilized on the solid phase support to form an array, wherein each array element comprises one of the plurality of capture reagents and the anchoring reagent. In embodiments, the solid phase support comprises a surface. In embodiments, the solid phase support is an electrode. In embodiments, the solid phase support is a carbon-based electrode. In embodiments, the kit comprises a multi-well plate assay consumable, and each well of the plate comprises a carbon ink electrode. In embodiments, the solid phase support is a particle. In embodiments, the solid phase support is a bead.

In embodiments of a kit comprising a plurality of capture reagents, the kit further comprises one or more solid phase supports, and the anchoring reagent and capture reagents are immobilized on the one or more solid phase support to form an array, wherein each array element comprises one of the plurality of capture reagents and the anchoring reagent. In embodiments, the kit comprises a plurality of solid phase supports, and each solid phase support has at least one array element. In embodiments, the kit comprises a plurality of solid phase supports, and each solid phase support has only one array element. In embodiments, the solid phase supports comprise a surface. In embodiments, the solid phase supports are electrodes. In embodiments, the solid phase supports are carbon-based electrodes. In embodiments, the kit comprises a multi-well plate assay consumable, and each well of the plate comprises one of the electrodes. In embodiments, the solid phase supports are particles. In embodiments, the solid phase supports are beads in a bead array.

In embodiments of a kit comprising a plurality of capture reagents, the kit further comprises an array with a plurality of different targeting reagent complements immobilized on one or more solid phase supports, each array element comprising a different targeting reagent complement, and each of the different targeting reagent complements being the binding partner of a different targeting reagent. In embodiments, the capture reagents are connected to one of the different targeting reagents, and each of the capture reagents is connected to a different targeting reagent. Furthermore, the anchoring reagent is divided into a plurality of portions each having at least a copy of the anchoring reagent, and the anchoring reagent in each portion is connected to a different targeting reagent. Thus, in embodiments, the solid phase support comprises a targeting reagent complement, and each of the capture reagent and anchoring reagent comprises a targeting reagent. In embodiments, each capture reagent and anchoring reagent portion may be provided separately, all reagents/portions linked to the same targeting reagent are provided as a mixture and separate from the other reagents, all capture reagents are provided as a mixture and all anchor reagent portions are provided as a mixture, or all capture reagents and anchor reagent portions are provided as one mixture.

In embodiments, the capture reagent comprises a supplemental linking reagent; the anchoring reagent comprises the supplemental linking reagent; the targeting reagents are connected to a linking reagent; and the linking reagent is a binding partner of the supplemental linking reagent. Thus, in embodiments, the solid phase support comprises a targeting reagent complement, which binds to the targeting reagent that is connected to the linking reagent, which binds to the supplemental linking reagent on the capture reagent and anchoring reagent.

Exemplary targeting reagents and targeting reagent complements are described herein. In embodiments, the targeting reagent and targeting reagent complement are two members of a binding partner pair selected from avidin-biotin, streptavidin-biotin, antibody-hapten, antibody-antigen, antibody-epitope tag, nucleic acid-complementary nucleic acid, aptamer-aptamer target, and receptor-ligand. In embodiments, the targeting reagent is biotin and the targeting reagent complement is streptavidin. In embodiments, the linking reagent and supplemental linking reagent pair is a different binding partner pair than the targeting reagent and targeting reagent complement pair. In embodiments, the linking reagent is avidin or streptavidin, and the supplemental linking reagent is biotin. In embodiments, the targeting reagent and targeting reagent complement are complementary oligonucleotides.

In embodiments, the array is on one solid phase support, and the solid phase support is an electrode. In embodiments, the solid phase support is a carbon-based electrode. In embodiments, the kit comprises a multi-well plate assay consumable, and each well of the plate comprises a carbon ink electrode. In some embodiments, the solid phase supports are particles. In embodiments, each element of the array is on a different solid phase support, and the solid phase supports are beads. In embodiments, the linking reagent and supplemental linking reagent are two members of a binding partner pair selected from avidin-biotin, streptavidin-biotin, antibody-hapten, antibody-antigen, antibody-epitope tag, nucleic acid-complementary nucleic acid, aptamer-aptamer target, and receptor-ligand. In embodiments, the linking reagent is biotin and the supplemental linking reagent is streptavidin. In embodiments, the linking reagent is avidin or streptavidin, and the supplemental linking reagent is biotin.

In embodiments, the kits of the present disclosure further comprise one or more of a blocking reagent, a binding assay reaction buffer, a ligase reaction buffer, a polymerase reaction buffer, an ECL read buffer, and/or a unique product identifier. The blocking reagent can be used to decrease assay background signal, prevent non-specific binding, and/or stabilize detection complexes for improved detection. In embodiments, each of the binding assay reaction buffer, the ligase reaction, and/or the polymerase reaction buffer is a Tris buffer, a phosphate buffer, a MOPS buffer, a PIPES buffer, or a HEPES buffer. In embodiments, the binding assay reaction buffer, the ligase reaction buffer, and the polymerase reaction buffer are the same buffer. In embodiments, the binding assay reaction buffer, the ligase reaction, and/or the polymerase reaction buffer has a salt concentration of from about 10 mM to about 1 M, from about 20 mM to about 500 mM, from about 30 mM to about 100 mM, from about 40 mM to about 80 mM, or about 50 mM. In embodiments, the binding assay reaction buffer, the ligase reaction, and/or the polymerase reaction buffer comprises NaCl, KCl, $(NH_4)_2SO_4$, $Na_2SO_4$, or $CH_3COONH_4$. In embodiments, the polymerase reaction buffer has a salt concentration of about 50 mM. In embodiments, the polymerase reaction buffer comprises KCl. In embodiments, the polymerase reaction buffer comprises KCl at a concentration of about 50 mM. In embodiments, the ECL read buffer comprises tripropylamine. In embodiments, the ECL read buffer comprises butyldiethanolamine. In embodiments, the unique product identifier is a "barcode" oligonucleotide sequence, e.g., a short nucleotide (typically between about 5 and about 40 nucleotides in length) that allows a corresponding nucleotide or molecule to be identified.

ADDITIONAL EMBODIMENTS

In embodiments, the methods of detecting and measuring analytes provided herein can be in a competitive assay format. In general terms, a competitive assay, e.g., a competitive immunoassay or a competitive inhibition assay, an analyte and a competitor compete for binding to a binding reagent. In such assays, the analyte is typically indirectly measured by directly measuring the competitor. As used herein, "competitor" refers to a compound capable of binding to the same binding reagent as an analyte, such that the binding reagent, e.g., antigen-binding substance or antibody, can only bind either the analyte or the competitor, but not both. In embodiments, competitive assays are used to detect and measure analytes that are not capable of binding more than one binding reagents, e.g., small molecule analytes or analytes that do not have more than one distinct binding sites. For example, if the binding reagent is an antibody, binding of one antibody to the small analyte creates steric hindrance preventing a second antibody from binding. Examples of analytes suitable for competitive assays are described herein. Further examples of competitive immunoassays include those described in U.S. Pat. Nos. 4,235,601; 4,442,204; and 5,028,535.

In the context of competitive assays, "capture reagent" and "detection reagent" can refer to the binding reagent, e.g., an antigen-binding substance or antibody; or, "capture reagent" and "detection reagent" can be competitors of the analyte. In embodiments of competitive assays, one of the capture or detection reagent is as defined herein, and the other of the capture or detection reagent is a competitor for the analyte, e.g., a modified small molecule, such as a hormone. In embodiments, the competitor comprises a nucleic acid probe of the present disclosure. In embodiments, the competitor has the same structure as the analyte and comprises a label or probe, e.g., a detectable label or nucleic acid probe. In embodiments, the competitor has an analogous structure as the analyte and comprises a label or probe, e.g., a detectable label or nucleic acid probe. In embodiments, the competitor may be very different in composition than the analyte as long as it is capable of competing with the analyte for a binding reagent used in the assay (for example, a nucleic or peptide aptamer that has been selected to bind to the analyte recognition site or pocket in a binding reagent). Such aptamers may be selected using established methods in the art for screening peptides or nucleic acids—for example, by screening random libraries of peptides or nucleic acids—for aptamers with a desired binding activity.

In embodiments, the analyte is (or the analyte and the competitor is each) a hormone. In embodiments, the analyte is (or the analyte and the competitor is each) a hapten. In embodiments, the analyte is (or the analyte and the competitor is each) a metabolite. In embodiments, the analyte is (or the analyte and the competitor is each) an endocrine hormone such as estrogen or testosterone, anti-Müllerian hormone, growth hormone (e.g., human growth hormone or recombinant human growth hormone), or environmental endocrine-disrupting chemicals, such as those disclosed in Tian et al., Chemical and Biological Technologies in Agriculture 5:5 (2018). In embodiments, the analyte is (or the analyte and the competitor is each) a carbohydrate or carbohydrate derivative such as, e.g., a glycoside such as digitoxin or salicin. In embodiments, the analyte is (or the analyte and the competitor is each) a lipid, e.g., cholesterol. In embodiments, the analyte is (or the analyte and the competitor is each) a hapten, e.g., digoxin. In embodiments, the analyte is (or the analyte and the competitor is each) a vitamin, e.g., vitamin A, vitamin B, folate, vitamin C, vitamin D, vitamin E, vitamin K, and the like. In embodiments, the analyte is (or the analyte and the competitor is each) a hapten, e.g., aniline and derivatives thereof, urushiol, hydralazine, halothane, fluorescein, biotin, digoxigenin, and dinitrophenol. In embodiments, the competitor is a capture reagent. In embodiments, the competitor is a detection reagent and comprises a nucleic acid probe.

In embodiments, the competitor is bound to a surface, the analyte and detection reagent (e.g., conjugate comprising a detection antibody and nucleic acid probe) are in solution, and the competitor competes with the analyte for binding to the detection reagent. In such embodiments, the complex on the surface comprising the competitor and detection reagent are detected and measured, and the measured amount of competitor is used to determine the quantity of analyte. In embodiments, the capture reagent is bound to the surface, the analyte and detectably labeled competitor are in solution, and the detectably labeled competitor competes with the analyte for binding to the capture reagent. In such embodiments, the complex on the surface comprising the capture reagent and the detectably labeled competitor are detected and measured, and the measured amount of competitor is used to determine the quantity of analyte. In embodiments, the competitive reactions between the capture reagent, detection reagent and analyte (as described above) are carried out in solution and the capture reagent is subsequently immobilized on a surface (e.g., for example through the use of capture reagents comprising a targeting moiety and surfaces comprising the targeting moiety complement).

In embodiments, the present disclosure provides a method of measuring an analyte comprising: (a) binding the analyte to a first capture reagent in a binding domain on a surface, wherein the binding domain further comprises an anchoring reagent comprising an anchoring oligonucleotide; (b) binding a conjugate comprising a detection reagent and a nucleic acid probe to a second capture reagent in the binding domain to form a complex comprising the second capture reagent and the conjugate, wherein the detection reagent is a competitor of the analyte for binding to the first and second capture reagents; (c) extending the nucleic acid probe of the conjugate in the complex to form an extended sequence comprising an anchoring oligonucleotide complement that is complementary to the anchoring oligonucleotide and a detection sequence complement that is complementary to a detection oligonucleotide of a labeled probe; (d) binding the labeled probe comprising the detection oligonucleotide to the extended sequence; and (e) measuring the amount of labeled probe bound to the binding domain; wherein the labeled probe is a labeled probe according to the present disclosure.

In embodiments, the present disclosure provides a method of measuring an analyte comprising: (a) binding the analyte to a first conjugate comprising a first detection reagent and a nucleic acid probe; (b) binding a capture reagent in a binding domain on a surface to a second conjugate comprising a second detection reagent and a nucleic acid probe to form a complex comprising the capture reagent and the second conjugate, wherein (i) the binding domain further comprises an anchoring reagent comprising an anchoring oligonucleotide, and (ii) the capture reagent is a competitor of the analyte for binding to the first and second detection reagents; (c) extending the nucleic acid probe of the second conjugate in the complex to form an extended sequence comprising an anchoring oligonucleotide complement that is complementary to the anchoring oligonucleotide and a detection sequence complement that is complementary to a detection oligonucleotide of a labeled probe; (d) binding the labeled probe comprising the detection oligonucleotide to the extended sequence; and (e) measuring the amount of labeled probe bound to the binding domain; wherein the labeled probe is a labeled probe according to the present disclosure.

Additionally, the methods described herein can be used for the detection and quantitation of oligomeric analytes. If the target antigen is a homo-oligomer, i.e., an antigen having two or more identical subunits, the detection antibody needs to be labeled independently with both the ligation templating oligonucleotide and the primer oligonucleotide. This can lead to inefficiencies, as two antibodies with only templating oligonucleotides or two antibodies with only priming oligonucleotides can bind and such nonproductive complexes can reduce the sensitivity of this approach. This issue can be aggravated when this approach is applied to the detection of specific oligomeric structures, where additional specific templating oligonucleotides are used to allow for the specific detection of the oligomer. Therefore, the methods described herein can include preformation of a set of detection antibodies configured to efficiently bind a desired oligomer analyte, together with the template for formation of the rolling circle template. This can be achieved using an additional oligonucleotide sequence, e.g., a scaffolding oligonucleotide, which can specifically hybridize to the antibody coupled oligonucleotides so that the antibodies are configured in the detection antibody mixture in oligomeric form, matched to the target antigen oligomer. This preorganization step allows for the optimal binding of the detection antibodies to the target oligomer. Following the binding of the detection antibody to the oligomer antigen, the scaffolding oligonucleotide can be removed via exonuclease degradation or another suitable chemical method or endonuclease treatment. Once the scaffolding oligonucleotide is removed, the proximity ligation rolling circle amplification assay can proceed as described herein.

In an additional embodiment, the assay format described herein further includes one or more control assays. A negative control can be included on a binding domain which includes a capture antibody that does not have a corresponding detection antibody, thereby providing a consistent background signal for all samples. Measurement of signal above a preset threshold value can indicate improper assay processing or the presence of a sample-dependent matrix effect causing non-specific binding of labeled detection probe. Moreover, a specimen control can also be included in the assay for a human target antigen (such as a secreted or intracellular protein) that performs multiple control functions. A positive signal will indicate the presence of human material, and therefore test for sample addition and quality. The human antigen can also serve as a process control for bacterial antigen extraction. For example, an intracellular human analyte can be selected as a specimen control that also requires lysis and extraction to be detected, e.g. Akt. Measurement of a signal below a predefined threshold would indicate that no sample was added, that a failure in the reagents or process occurred, or that substances that interfere with amplification or detection are present. In addition to internal controls, external positive and negative controls can also be used with the method and/or kit. The positive control can comprise a mixture of non-infectious bacterial extracts representing all specific target antigens detected by the multiplexed panel, providing a positive signal for all assays when tested. The negative control comprises a representative matrix without any target proteins.

Examples of samples that may be analyzed by the methods of the present invention include, but are not limited to food samples (including food extracts, food homogenates, beverages, etc.), environmental samples (e.g., soil samples, environmental sludges, collected environmental aerosols, environmental wipes, water filtrates, etc.), industrial samples (e.g., starting materials, products or intermediates from an industrial production process), human clinical samples, veterinary samples and other samples of biological origin. Biological samples that may be analyzed include, but are not limited to, feces, mucosal swabs, physiological samples and/or samples containing suspensions of cells. Specific examples of biological samples include blood, serum, plasma, feces, mucosal swabs, tissue aspirates, tissue homogenates, cell cultures and cell culture supernatants (including cultures of eukaryotic and prokaryotic cells), urine, saliva, sputum, and cerebrospinal sample.

Analytes that may be measured using the methods of the invention include, but are not limited to proteins, toxins, nucleic acids, microorganisms, viruses, cells, fungi, spores, carbohydrates, lipids, glycoproteins, lipoproteins, polysaccharides, drugs, hormones, steroids, nutrients, metabolites and any modified derivative of the above molecules, or any complex comprising one or more of the above molecules or combinations thereof. The level of an analyte of interest in a sample may be indicative of a disease or disease condition or it may simply indicate whether the patient was exposed to that analyte.

In a specific embodiment, the analyte of interest is an exosome, i.e., a small membrane vesicle released by most cell types. The release and subsequent uptake of exosomes is a method of cell-to-cell communication and has a role in the regulation of many physiological and pathological processes. Exosomes have been shown to contain a wide variety of signaling molecules including but not limited to surface-bound and cytosolic proteins, lipids, mRNA, and miRNA, and it has been suggested that the identity and concentration of these species in each exosome can be used to deduce its cellular origin and function. Thus, genomic or proteomic profiling of a patient's total exosome population could provide valuable prognostic information for various pathological conditions, including cancers, infectious disease, kidney and liver disease, and traumatic brain injury, among others.

Exosomes are typically measured in the aggregate by isolating large numbers of them from biological fluids, disrupting their membranes, and assaying the contents by conventional methods such as western blot, PCR, or sequencing. However, the methods and kits of the present invention can be used to characterize exosomes via capture of the exosome(s) on a surface and subsequent detection of target molecules expressed by the exosome. Several proteins have been identified as common among most exosomes, e.g., CD9, CD63, CD81, Hsp70, PDCD6IP, Tsg101, and in one embodiment, these targets can be used individually or in combination to capture the exosome on a surface via binding interactions between one or more capture reagents and one or more common exosome target proteins. In an alternative or additional embodiment, a disease associated marker present on or in the exosome is used to capture the exosome on a surface via a binding interaction between one or more capture reagents and a disease-associated exosome marker. The captured exosome(s) then can be probed using one or more detection reagents, directed either towards one or more of the common exosome proteins, or one or more additional molecular targets present within or on the surface of some fraction of exosomes. When distinct targets are selected for the capture and detection reagents, only those exosomes comprising both targets will be detected allowing additional specificity in identifying or quantifying subpopulations of exosomes. In a specific embodiment, the sample used is a purified exosome preparation.

In a particular embodiment, detection of a particular phenotypically distinct exosome subpopulation can be effected using a pair of detection reagents that only produce a signal when brought into proximity by binding interactions with proximal targets as described herein. In the present embodiment, the proximal targets may be distinct epitopes on the same molecule, they may be different copies of the same molecular species held in proximity within the interior of a single exosome or bound in the membrane of the same exosome, or they may be different interacting species in or on a single exosome, such as two interacting proteins (e.g., tetraspanin-integrin complexes), a protein receptor and ligand (e.g. EFG and EGFR), or an mRNA molecule and an RNA binding protein (e.g. Argonaute 1-4, or GW182). In addition, the use of methods described herein permits the analysis of up to three distinct target molecules that may not be functionally linked, but linked by the presence within a single exosome. Proximity probes used in the PLA/RCA methods described herein can be lengthened to permit ligation and subsequent amplification of target molecules that are positioned further apart on or in the exosome. In one embodiment, a PLA/RCA assay is conducted using specific fluorescent probes for the amplicon. Thereafter, the capture exosomes are labeled with a generic fluorescent reagent, e.g., acridine orange for RNA in the exosome, and the capture exosomes are imaged to determine the correlation between the two fluorescent signatures. The use of a generic fluorescent reagent allows for selection of signals from the desired exosome or a subset thereof, based on size and staining intensity.

In order to probe internal target molecules, (cargo proteins, lipids or RNA molecules) the exosomes can be fixed and permeabilized either prior to or after capture but before adding detection reagents. If permeabilized exosomes are interrogated using the methods described herein, one or both of the detection reagents can comprise an oligonucleotide probe capable of binding to a specific RNA sequence, enabling detection of mRNA, miRNA, and/or interactions between proteins and RNA.

Exosomes can be measured using the methods described herein with or without the use of an anchoring reagent. As described above, the use of an anchoring reagent in a binding assay is illustrated in FIG. 1(a) and if the analyte is an exosome, the surface (101) includes a capture reagent, e.g., directed to a common exosome target protein. In a specific embodiment, the surface also includes an anchoring reagent (103). In one or more steps, the exosome is bound to the capture reagent and a detection reagent (104) that also binds the exosome via the same or a different exosome target protein, wherein the detection reagent is linked to a nucleic acid probe (105). Therefore, a complex is formed on the surface that includes the capture reagent, the exosome, and the detection reagent. The probe is extended to form an extended sequence (107) that includes an anchoring region that binds the anchoring reagent. The extended sequence is bound to the anchoring reagent and the amount of extended sequence bound to the surface is measured.

Likewise, the method illustrated in FIG. 1(b) can also be applied to the detection of exosomes. In a specific embodiment, the detection complex can include one or more detection reagents to enhance the specificity of an assay for the exosome, e.g., as illustrated in FIG. 1(c). In one or more steps, the exosome is bound to the capture reagent and each of the two (or more) detection reagents (120 and 121, respectively) that bind a target protein expressed by the exosome, wherein each of the first and second detection reagents are linked to a nucleic acid probe (122 and 123, the first and second nucleic acid probes, respectively). The exosome can be bound to the capture and detection reagents simultaneously or substantially simultaneously, or in a sequential, step-wise manner. Therefore, a complex (124) is formed on the surface that includes the capture reagent, the exosome, and the first and second detection reagents. Using an extension process that requires the first and second probes to be in proximity to one another, the first probe is extended to form an extended sequence (125) comprising an anchoring sequence complement that is complementary to the anchoring sequence. In the penultimate step, the anchoring sequence is hybridized to the anchoring sequence complement and the amount of extended sequence bound to the surface is measured. Similarly, the methods depicted in each of FIGS. 2(a)-(c) can be used to detect exosomes.

The assays of the present invention may be used to determine the concentration of one or more, e.g., two or more analytes in a sample. Thus, two or more analytes may be measured in the same sample. Panels of analytes that can be measured in the same sample include, for example, panels of assays for analytes or activities associated with a disease state or physiological conditions. Certain such panels include panels of cytokines and/or their receptors (e.g., one or more of TNF-alpha, TNF-beta, IL1-alpha, IL1-beta, IL2, IL4, IL6, IL-10, IL-12, IFN-γ, etc.), growth factors and/or their receptors (e.g., one or more of EGF, VGF, TGF, VEGF, etc.), drugs of abuse, therapeutic drugs, vitamins, pathogen specific antibodies, auto-antibodies (e.g., one or more antibodies directed against the Sm, RNP, SS-A, SS-alpha, J0-1, and Scl-70 antigens), allergen-specific antibodies, tumor markers (e.g., one or more of CEA, PSA, CA-125 II, CA 15-3, CA 19-9, CA 72-4, CYFRA 21-1, NSE, AFP, etc.), markers of cardiac disease including congestive heart disease and/or acute myocardial infarction (e.g., one or more of Troponin T, Troponin I, Troponin C, myoglobin, CKMB, myeloperoxidase, glutathione peroxidase, β-natriuretic protein (BNP), alpha-natriuretic protein (ANP), endothelin, aldosterone, C-reactive protein (CRP), etc.), markers associated with hemostasis (e.g., one or more of Fibrin monomer, D-dimer, thrombin-antithrombin complex, prothrombin fragments 1 and 2, anti-Factor Xa, etc.), markers of acute viral hepatitis infection (e.g., one or more of IgM antibody to hepatitis A virus, IgM antibody to hepatitis B core antigen, hepatitis B surface antigen, antibody to hepatitis C virus, etc.), markers of Alzheimer's Disease (alpha-amyloid, beta-amyloid, Aβ 42, Aβ 40, Aβ 38, Aβ 39, Aβ 37, Aβ 34, tau-protein, etc.), markers of osteoporosis (e.g., one or more of cross-linked Nor C-telopeptides, total deoxypyridinoline, free deoxypyridinoline, osteocalcin, alkaline phosphatase, C-terminal propeptide of type I collagen, bone-specific alkaline phosphatase, etc.), markers of fertility state or fertility associated disorders (e.g., one or more of Estradiol, progesterone, follicle stimulating hormone (FSH), lutenizing hormone (LH), prolactin, hCG, testosterone, etc.), markers of thyroid disorders (e.g., one or more of thyroid stimulating hormone (TSH), Total T3, Free T3, Total T4, Free T4, and reverse T3), and markers of prostate cancer (e.g., one or more of total PSA, free PSA, complexed PSA, prostatic acid phosphatase, creatine kinase, etc.). Certain embodiments of invention include measuring, e.g., one or more, two or more, four or more or 10 or more analytes associated with a specific disease state or physiological condition (e.g., analytes grouped together in a panel, such as those listed above; e.g., a panel useful for the diagnosis of thyroid disorders may include e.g., one or more of thyroid stimulating hormone (TSH), Total T3, Free T3, Total T4, Free T4, and reverse T3).

In a preferred embodiment, the panel includes one or more low abundance analytes in traditional sample matrices, e.g., analytes at a concentration of less than about 100 fg/mL, and preferably, less than about 10 fg/mL. A non-limiting list of analytes that can be included in the panel includes, e.g., IL-17, IL-21, IL-31, Ab-38, Ab-40, Ab-42, Ab-39, Ab-43, Ab-15, Ab-16, Ab-17, Abeta oligomers, C-peptide, IL-13, IL-17A, IL-2, IL-4, IL-5, IL-6, IL-8, IL-12/23p40, IL-12p70, INF-g, PSA, PSAc, Tau, phospho-Tau, TNFa, troponin I, cardiac troponin T, troponin C, VEGF, VEGF-A, VEGF-B, VEGF-C, VEGF-D, EPO, LC3B, albumin, CHO-P, *E. coli* HCP, IgA, IgE, IgG, IgG1, IgG4, IgM, NSO-P, Per-C6, residual protein A, IgG2, IgG3, IgG4, AFP, CA125, Caspase-3 active, CXCL11/I-TAC, ErbB2/HER2, HGFR/o-MET, IFN-beta, MMP1, MMP2, MMP3, MMP9, beta-NGF, TFF3, TIMP1, Kim-1, alpha-2 macroglobulin, D-dimer, ICAM-1, myeloperoxidase, myoglobin, PAI-1, PCSK9, plasminogen, renin/prorenin, tPA, CXCL1/GRO-alpha, CCL2/MCP1, CCL3/MIP-1alpha, CCL4/MIP-1beta, CCL5/Rantes, CRP, CXCL9/MIG, CXCL10/IL-10, G-CSF, GM-CSF, IFN-alpha, IFN-gamma, IL1alpha, IL-1beta, IL2, IL3, IL4, IL5, IL6, IL7, IL8, IL 12(p70), IL13, IL 15, IL 18, IL-22, IL-23, IL-33, c-MET, adiponectin, FGF21, TSLP, GLP-1, growth hormone, IGF1, IGF2, insulin, leptin, prolactin, HIV p24, HB-EGF, AKT, phospho-AKT, and combinations thereof.

In a specific embodiment, the panel includes one or more low abundance analytes in traditional sample matrices, e.g., analytes at a concentration of less than about 100 fg/mL, and preferably, less than about 10 fg/mL, and the panel includes one or more of the following human targets: G-CDF, GM-CSF, IFNgamma, IL-1beta, IL-2, IL-4, IL-5, IL-6, IL-10, IL-12/23p40, IL 12p70, IL-17A, IL21, IL-22, IL-23, IL-31, IL-33, TNFalpha, TSLP, VEGF, complexed PSA, free PSA, Abeta42, Abeta40, Abeta38, tau, cardiac troponin I, cardiac troponin T, HIV p24, C-peptide, and/or FGF21.

In addition, the methods and kit described herein can be used in immunoassays to detect single organism sensitivity to antimicrobial resistance markers (PBP2a/mecA (*S. aureus*, gram-positive), TEM1 (*E. coli*, gram-negative)). These assays can be used to this class of analytes, in both gram-positive and gram-negative bacteria. One or more of the following target proteins involved with antimicrobial resistance to vancomycin, beta-lactam, carbapenem, aminoglycoside and macrolide antibiotics can be included in the assay; erm family, vanA, vanB, aac (6')-aph(2"), KPC, NDM, OXA-48, VIM, OXA-23 like, OXA-40 like, OXA-58 like, ESBL genes of CTX-M-1 and CTX-M-9 families, and combinations thereof. Moreover, one or more of the following proteins can be included in the assay: 50S ribosomal protein L20, 30S ribosomal protein S7, 30S ribosomal protein S2, 50S ribosomal protein L21, 50S ribosomal protein L17, 30S ribosomal protein S4, 50S ribosomal protein L15, 30S ribosomal protein S5, 50S ribosomal protein L16, 30S ribosomal protein S3, 50S ribosomal protein L22, 50S ribosomal protein L4, ribosomal protein L25, 50S ribosomal protein L5, 30S ribosomal protein S2, ribosomal proteins L30, L31 and L32, and combinations thereof. In addition, one or more of the following targets can be evaluated, alone or in combination with one or more of the markers identified herein, e.g., elongation factor EF-TU, ACP, the Acyl carrier protein, RplL, a ribosomal protein GroS (MopB, 65,000), a component of the chaperone system Gro-EL-Gro-ES and GapA, enzyme in glycolysis, and combinations thereof.

Still further, the methods and kits described herein can also be used in immunoassays to detect healthcare associated infections (HAI organisms), including but not limited to *Klebsiella pneumonia, Acinetobacter baumannii, Pseudomonas aeruginosa Enterobacter* species, and extra-intestinal pathogenic *Escherichia coli*. Resistance markers for each of the HAI organisms are provided in the table below:

| Pathogen | Drug Resistance Marker (GenBank ID) |
| --- | --- |
| *Klebsiella pneumoniae* | KPC (KPC-2: AAK70220.1) |
| *Acinetobacter baumannii* | VIM (VIM-1: CCG05854.1) |
| *Pseudomonas aeruginosa* | IMP-1 (AAL17637.1) |
| *Enterobacter* species | OXA-48 (AGD80396.1) |
| extra-intestinal pathogenic *Escherichia coli* | NDM (NDM-1: AHF22464.1) |

Specific outer membrane proteins can be evaluated in the immunoassays described herein:

| Pathogen | Outer Membrane Protein | GenBank Accession # |
| --- | --- | --- |
| *Klebsiella pneumoniae* | lpp | YP_002238023.1 |
|  | ompA | WP_004144094.1 |
| *Enterobacter cloacae* | lpp | YP_003612855.1 |
|  | ompA | WP_023481315.1 |
| *Enterobacter aerogenes* | lpp | YP_004593622.1 |
|  | ompA | YP_007388430.1 |
| *Escherichia coli* | lpp | NP_416192.1 |
|  | ompA | NP_286832.1 |
| *Pseudomonas aeruginosa* | oprF | NP_250468.1 |
| *Acinetobacter baumannii* | omp38 | YP_008889447.1 |

In addition, the methods and kits described herein can be used in an immunoassay to detect one or more of the following classes of biomarkers: cytokines, circulating tumor-specific proteins, proteins associated with one or more infectious diseases, intracellular markers, etc., and combinations thereof.

Still further, the following autoimmune diseases can be identified using the methods and kits described herein by evaluating the presence or absence of one or more of the associated antigens listed below:

| Organ-Specific Diseases | Associated Antigens |
| --- | --- |
| Type 1 Diabetes | Glutamic acid decarboxylase (GAD) |
|  | Insulinoma-2 (IA2A) |
|  | Zinc Transported 8 protein (ZnT8) |
|  | Proinsulin |
|  | Insulin |
| Celiac Disease | Transglutaminase (tTG) |
|  | Gliadin (deamidated) |
|  | Deamidated forms of gliadin peptides (DGP) |
| Addison's Disease | 21-hydroxylase (21-OH) |
|  | 17-hydroxylase (17-OH) |
|  | Cytochrome p450 side chain cleavage enzyme (SCC) |
| Hashimoto's Thyroiditis | Thyroid peroxidase (TPO) |
|  | Thyroglobulin |
| Graves' Hyperthyroidism | Thyrotropin receptor |
| Hypoparathyroidism | Calcium-sensing receptor |
| Primary biliary cirrhosis | Pyruvate dehydrogenase complex (PDC-E2) |
|  | Branched chain 2-oxo-acid dehydrogenase complex (BCOADC-E2) |
|  | 2-oxoglutarate dehydrogenase complex (OGDC-E2) |
|  | Gp120 |
|  | Sp100 |
|  | Nup62 |
| Autoimmune hepatitis Type II | Cytochrome P450 2D6 |
|  | Formiminotransferase Cyclodeaminase |

| Organ-Specific Diseases | Associated Antigens |
| --- | --- |
| Autoimmune gastritis | H+/K+ ATPase |
| Pernicious Anemia | H+/K+ ATPase |
| Alopecia | Tyrosine hydroxylase |
| Vitiligo | Tyrosinase |
|  | SOX-10 |
|  | SOX-9 |

In a particular embodiment, the panel includes one or more low abundance analytes in traditional sample matrices, e.g., analytes at a concentration of less than about 100 fg/mL, and preferably, less than about 10 fg/mL. The panel preferably includes one or more of the following analytes: IL-17, IL-21, IL-31, IL-22, IL-23, IL-33, cardiac troponin T, and combinations thereof. In specific embodiments, the concentration of analyte detected in the sample is within a range of 0.01 fM to 100 fM, 0.03 fM-50 fM, or 0.03 fM-10 fM. In some embodiments, the concentration of analyte molecules in the sample that may be substantially accurately determined is less than about 100 fM, less than about 10 fM, less than about 3 fM, less than about 1 fM, less than about 0.3 fM, less than about 0.1 fM, less than about 0.03 fM, or less. The concentration of analyte molecules in a sample may be considered to be substantially accurately determined if the measured concentration of the analyte molecules in the sample is within about 20% of the actual concentration of the analyte molecules in the sample. In certain embodiments, the measured concentration of the analyte molecules in the sample may be within about 10%, within about 3%, or within about 1% of the actual concentration of the analyte molecules in the sample. The limit of detection for the assay is that concentration that gives a signal that is at least 2.5 standard deviations above the background signal, and preferably the assay can detect approximately 10-10,000 molecules in a sample, or 100-5,000 molecules in a sample, or 100-1000 molecules in a sample.

In a further embodiment, the methods described herein can be used to detect analytes that are in low abundance due to a recent exposure and/or infection. Early diagnosis of various diseases or conditions, e.g., cancer, bacterial infections, e.g., Bacillus anthracis (Anthrax), viral infections, e.g., HIV, hepatitis, HPV, etc., toxin exposure, e.g., ricin, botulinum toxin A, B, or E, etc., is limited by the fact that the limits of detections (LOD) of available technologies, such as ELISA, are higher than the circulating concentrations of low abundance proteins that could indicate the onset of disease. The panel can include one or more low abundance analytes in traditional sample matrices, e.g., analytes at a concentration of less than about 100 fg/mL, or less than about 10 fg/mL. A non-limiting list of analytes that can be included in the panel includes, e.g., HIVgp41, HIVgp120, HIVgp160, HIVp24, HIVp66, HIVp51, HIVp17, HIVp31, Tat, Nef, Viv, hepatitis A, B, C, D, or E antigens, HPV types 16, 18, 31, 33, 35, 39, 45, 51, 52, 56, 58, 59, 68, 73, and/or 82, HPV-E6 and E7 proteins, IL-17, IL-21, IL-31, IL-22, IL-23, IL-33, cardiac troponin T, and combinations thereof. Still further, the panel can also include one or more of the follow analytes that may be in low abundance due to recent disease onset, exposure and/or infection: Ab-38, Ab-40, Ab-42, Ab-39, Ab-43, Ab-15, Ab-16, Ab-17, Abeta oligomers, C-peptide, IL-13, IL-17A, IL-2, IL-4, IL-5, IL-6, IL-8, INF-g, PSA, Tau, phospho-Tau, TNFa, troponin I, cardiac troponin T, troponin C, VEGF, VEGF-A, VEGF-B, VEGF-C, VEGF-D, EPO, LC3B, albumin, CHO-P, E. coli HCP, IgA, IgE, IgG, IgG1, IgG4, IgM, NSO-P, Per-C6, residual protein A, IgG2, IgG3, IgG4, AFP, CA125, Caspase-3 active, CXCL11/I-TAC, ErbB2/HER2, HGFR/o-MET, IFN-beta, MMP1, MMP2, MMP3, MMP9, beta-NGF, TFF3, TIMP1, Kim-1, alpha-2 macroglobulin, D-dimer, ICAM-1, myeloperoxidase, myoglobin, PAI-1, PCSK9, plasminogen, renin/prorenin, tPA, CXCL1/GRO-alpha, CCL2/MCP1, CCL3/MIP-1alpha, CCL4/MIP-1beta, CCL5/Rantes, CRP, CXCL9/MIG, CXCL10/IL-10, G-CSF, GM-CSF, IFN-alpha, IFN-gamma, IL1alpha, IL-1beta, IL-3, IL-7, IL-12 (p70), IL-13, IL-15, IL-18, c-MET, adiponectin, FGF21, GLP-1, growth hormone, IGF1, IGF2, insulin, leptin, prolactin, HB-EGF, AKT, phospho-AKT, and combinations thereof.

The methods of the present invention are designed to allow detection of a wide variety of biological and biochemical agents, as described above. In one embodiment, the methods may be used to detect pathogenic and/or potentially pathogenic virus, bacteria and toxins including biological warfare agents ("BWAs") in a variety of relevant clinical and environmental matrices, including and without limitation, blood, sputum, stool, filters, swabs, etc. A non-limiting list of pathogens and toxins that may be analyzed (alone or in combination) using the methods of the present invention Bacillus anthracis (anthrax), Yersinia pestis (plague), Vibrio cholerae (cholera), Francisella tularensis (tularemia), Brucella spp. (Brucellosis), Coxiella burnetii (Q fever), Listeria, Salmonella, Shigella, V. cholera, Chlamydia trachomatis, Burkholderia pseudomallei, orthopox viruses including variola virus (smallpox), viral encephalitis, Venezuelan equine encephalitis virus (VEE), western equine encephalitis virus (WEE), eastern equine encephalitis virus (EEE), Alphavirus, viral hemorrhagic fevers, Arenaviridae, Bunyaviridae, Filoviridae, Flaviviridae, Ebola virus, staphylococcal enterotoxins, ricin, botulinum toxins (A, B, E), Clostridium botulinum, mycotoxin, Fusarium, Myrotecium, Cephalosporium, Trichoderma, Verticimonosporium, Stachybotrys, glanders, wheat fungus, Bacillus globigii, Serratia marcescens, yellow rain, trichothecene mycotoxins, Salmonella typhimurium, aflatoxin, Xenopsylla cheopis, Diamanus montanus, alastrim, monkeypox, Arenavirus, Hantavirus, Lassa fever, Argentine hemorrhagic fevers, Bolivian hemorrhagic fevers, Rift Valley fever virus, Crimean-Congo virus, Hanta virus, Marburg hemorrhagic fevers, yellow fever virus, dengue fever viruses, influenza (including human and animal strains including H5N1 avian influenza, influenza A, influenza A, H1 specific, influenza A, H3 specific, influenza A, H5 specific, influenza A, 2009-H1N1 specific, influenza B), RSV, human immunodeficiency viruses I and II (HIV I and II), hepatitis A, hepatitis B, hepatitis C, hepatitis (non-A, B or C), Enterovirus, Epstein-Barr virus, Cytomegalovirus, herpes simplex viruses, Chlamydia trachomatis, Neisseria gonorrheae, Trichomonas vaginalis, human papilloma virus, Treponema pallidum, Streptococcus pneumonia, Borellia burgdorferi, Haemophilus influenzae, Mycoplasma pneumoniae, Chlamydophila pneumoniae, Legionella pneumophila, Staphylococcus aureus, Staphylococcus Enterotoxin B (SEB), Abrin, Shiga Toxin 1, Shiga Toxin 2, Moraxella catarrhalis, Streptococcus pyogenes, Clostridium difficile, Neisseria meningitidis, Klebsiella pneumoniae, Mycobacterium tuberculosis, Group A streptococcus, E. Coli O157, coronavirus, Coxsackie A virus, rhinovirus, parainfluenza virus, respiratory syncytial virus (RSV), metapneumovirus, vaccinia, and adenovirus.

The improvements to binding assays described herein can be used to expand the dynamic range of a binding assay, i.e., the range of the concentration of analyte molecules in a fluid sample that may be quantitated by a system or method without dilution or concentration of the sample or change in the assay conditions producing a similar result (e.g., concentration of reagents employed, etc.), and wherein the measured concentration of the analyte molecules may be substantially accurately determined. The concentration of analyte molecules in a fluid sample may be considered to be substantially accurately determined if the measured concentration of the analyte molecules in the fluid sample is within about 10% of the actual (e.g., true) concentration of the analyte molecules in the fluid sample. In certain embodiments, the measured concentration of the analyte molecules in the fluid sample is substantially accurately determined in embodiments where the measured concentration is within about 5%, within about 4%, within about 3%, within about 2%, within about 1%, within about 0.5%, within about 0.4%, within about 0.3%, within about 0.2%, or within about 0.1% of the actual concentration of the analyte molecules in the fluid sample. In some cases, the measure of the concentration determined differs from the true (e.g., actual) concentration by no greater than about 20%, no greater than about 15%, no greater than about 10%, no greater than about 5%, no greater than about 4%, no greater than about 3%, no greater than about 2%, no greater than about 1%, or no greater than about 0.5%. The accuracy of the assay method may be determined, in some embodiments, by determining the concentration of analyte molecules in a fluid sample of a known concentration using the selected assay method and comparing the measured concentration with the actual concentration.

In some embodiments, the systems or methods may be capable of measuring concentrations of analyte molecules in a fluid sample over a dynamic range of more than about 1000 (3 log), about 10,000 (4 log), about 100,000 (5 log), about 350,000 (5.5 log), 1,000,000 (6 log), about 3,500,000 (6.5 log), about 10,000,000 (7 log), about 35,000,000 (7.5 log), about 100,000,000 (8 log), or more.

In some embodiments, the concentration (e.g., unknown concentration) of analyte molecules in the fluid sample that may be substantially accurately determined is less than about 5000 fM (femtomolar), less than about 3000 fM, less than about 2000 fM, less than about 1000 fM, less than about 500 fM, less than about 300 fM, less than about 200 fM, less than about 100 fM, less than about 50 fM, less than about 25 fM, less than about 10 fM, less than about 5 fM, less than about 2 fM, less than about 1 fM, less than about 500 aM (attomolar), less than about 100 aM, less than about 10 aM, less than about 5 aM, less than about 1 aM, less than about 0.1 aM, less than about 500 zM (zeptomolar), less than about 100 zM, less than about 10 zM, less than about 5 zM, less than about 1 zM, less than about 0.1 zM, or less. In some cases, the limit of detection (e.g., the lowest concentration of an analyte molecule which may be determined in solution) is about 100 fM, about 50 fM, about 25 fM, about 10 fM, about 5 fM, about 2 fM, about 1 fM, about 500 aM (attomolar), about 100 aM, about 50 aM, about 10 aM, about 5 aM, about 1 aM, about 0.1 aM, about 500 zM (zeptomolar), about 100 zM, about 50 zM, about 10 zM, about 5 zM, about 1 zM, about 0.1 zM, or less. In some embodiments, the concentration of analyte molecules or particles in the fluid sample that may be substantially accurately determined is between about 5000 fM and about 0.1 fM, between about 3000 fM and about 0.1 fM, between about 1000 fM and about 0.1 fM, between about 1000 fM and about 0.1 zM, between about 100 fM and about 1 zM, between about 100 aM and about 0.1 zM, or less. The upper limit of detection (e.g., the upper concentration of an analyte molecule which may be determined in solution) is at least about 100 fM, at least about 1000 fM, at least about 10 pM (picomolar), at least about 100 pM, at least about 100 pM, at least about 10 nM (nanomolar), at least about 100 nM, at least about 1000 nM, at least about 10 pM, at least about 100 pM, at least about 1000 pM, at least about 10 mM, at least about 100 mM, at least about 1000 mM, or greater. In some embodiments, the concentration of analyte molecules or particles in the fluid sample determined is less than about $50 \times 10^{-15}$ M, or less than about $40 \times 10^{-15}$ M, or less than about $30 \times 10^{-15}$ M, or less than about $20 \times 10^{-15}$ M, or less than about $10 \times 10^{-15}$ M, or less than about, or less than about $1 \times 10^{-15}$ M.

In some embodiments, the concentration of analyte molecules in the sample that may be substantially accurately determined is less than about 100 fM, less than about 10 fM, less than about 3 fM, less than about 1 fM, less than about 0.3 fM, less than about 0.1 fM, less than about 0.03 fM, or less. In some embodiments, the concentration of analyte molecules in the sample that may be substantially accurately determined is between about 5000 fM and about 0.1 fM, between about 3000 fM and about 0.1 fM, between about 1000 fM and about 0.1 fM, between about 1000 fM and about 1 fM, between about 100 fM and about 1 fM, between about 100 fM and about 0.1 fM. The concentration of analyte molecules in a sample may be considered to be substantially accurately determined if the measured concentration of the analyte molecules in the sample is within about 20% of the actual concentration of the analyte molecules in the sample. In certain embodiments, the measured concentration of the analyte molecules in the sample may be within about 10%, within about 3%, or within about 1% of the actual concentration of the analyte molecules in the sample. The accuracy of the assay method may be determined, in some embodiments, by determining the concentration of analyte molecules in a sample of a known concentration using the selected assay method. Preferably the assay can detect approximately 10-10,000 molecules in a sample, preferably, 100-5,000 molecules in a sample, and more preferably, 100-1000 molecules in a sample.

Relative to a conventional sandwich immunoassay technique, as measured, for example, using the same capture antibody and either one of the two detection antibodies and the same label and detection technology, the use of the assay formats described herein can improve detection signals and assay sensitivity by as much as 10-fold, preferably, as much as 50-fold, 100-fold, or as much as 1000-fold. Preferably, the use of the assay formats described herein improve detection signal and assay sensitivity by as much as 100-fold relative to a standard sandwich immunoassay.

One advantageous aspect of the methods of the invention, especially when coupled to a sensitive optical detection technique is that the signal amplification allows for the detection of individual binding event as bright points of light. Quantitation of signal can then be carried out by counting the individual events (which can provide better sensitivity for low analyte concentrations by providing improved discrimination of binding events from background noise) or by integrating over the signal for all binding events (which can provide better dynamic range for measuring high analyte concentrations).

The methods of the present invention may be used in a variety of assay devices and/or formats. The assay devices may include, e.g., assay modules, such as assay plates, cartridges, multi-well assay plates, reaction vessels, test tubes, cuvettes, flow cells, assay chips, lateral flow devices, etc., having assay reagents (which may include targeting agents or other binding reagents) added as the assay progresses or pre-loaded in the wells, chambers, or assay regions of the assay module. These devices may employ a variety of assay formats for specific binding assays, e.g., immunoassay or immunochromatographic assays. Illustrative assay devices and formats are described herein below. In certain embodiments, the methods of the present invention may employ assay reagents that are stored in a dry state and the assay devices/kits may further comprise or be supplied with desiccant materials for maintaining the assay reagents in a dry state. The assay devices preloaded with the assay reagents can greatly improve the speed and reduce the complexity of assay measurements while maintaining excellent stability during storage. The dried assay reagents may be any assay reagent that can be dried and then reconstituted prior to use in an assay. These include, but are not limited to, binding reagents useful in binding assays, enzymes, enzyme substrates, indicator dyes and other reactive compounds that may be used to detect an analyte of interest. The assay reagents may also include substances that are not directly involved in the mechanism of detection but play an auxiliary role in an assay including, but not limited to, blocking agents, stabilizing agents, detergents, salts, pH buffers, preservatives, etc. Reagents may be present in free form or supported on solid phases including the surfaces of compartments (e.g., chambers, channels, flow cells, wells, etc.) in the assay modules or the surfaces of colloids, beads, or other particulate supports.

The methods of the invention can be used with a variety of methods for measuring the amount of an analyte and, in particular, measuring the amount of an analyte bound to a solid phase. Techniques that may be used include, but are not limited to, techniques known in the art such as cell culture-based assays, binding assays (including agglutination tests, immunoassays, nucleic acid hybridization assays, etc.), enzymatic assays, colorimetric assays, etc. Other suitable techniques will be readily apparent to one of average skill in the art. Some measurement techniques allow for measurements to be made by visual inspection, others may require or benefit from the use of an instrument to conduct the measurement.

Methods for measuring the amount of an analyte include label-free techniques, which include but are not limited to i) techniques that measure changes in mass or refractive index at a surface after binding of an analyte to a surface (e.g., surface acoustic wave techniques, surface plasmon resonance sensors, ellipsometric techniques, etc.), ii) mass spectrometric techniques (including techniques like MALDI, SELDI, etc. that can measure analytes on a surface), iii) chromatographic or electrophoretic techniques, iv) fluorescence techniques (which may be based on the inherent fluorescence of an analyte), etc.

Methods for measuring the amount of an analyte also include techniques that measure analytes through the detection of labels which may be attached directly or indirectly (e.g., through the use of labeled binding partners of an analyte) to an analyte. Suitable labels include labels that can be directly visualized (e.g., particles that may be seen visually and labels that generate a measurable signal such as light scattering, optical absorbance, fluorescence, chemiluminescence, electrochemiluminescence, radioactivity, magnetic fields, etc.). Labels that may be used also include enzymes or other chemically reactive species that have a chemical activity that leads to a measurable signal such as light scattering, absorbance, fluorescence, etc. The use of enzymes as labels has been well established in in Enzyme-Linked ImmunoSorbent Assays, also called ELISAs, Enzyme ImmunoAssays or EIAs. In the ELISA format, an unknown amount of antigen is affixed to a surface and then a specific antibody is washed over the surface so that it can bind to the antigen. This antibody is linked to an enzyme, and in the final step a substance is added that the enzyme converts to a product that provides a change in a detectable signal. The formation of product may be detectable, e.g., due a difference, relative to the substrate, in a measurable property such as absorbance, fluorescence, chemiluminescence, light scattering, etc. Certain (but not all) measurement methods that may be used with solid phase binding methods according to the invention may benefit from or require a wash step to remove unbound components (e.g., labels) from the solid phase Accordingly, the methods of the invention may comprise such a wash step.

In those embodiments that employ a pair of detectable labels, those labeled substances are selected based on their ability to be independently detectable and/or the ability of those substances to work in concert to generate a detectable signal when the pair of labels are in proximity to one another, i.e., each bound, directly or indirectly, to the analyte of interest in a detection complex. In one embodiment, the first detectable label is a first enzyme of a coupled enzyme reaction system and the second detectable label is a second enzyme of the couple enzyme reaction system and the method further includes the step of adding one or more substrates of the reaction system, thereby producing a detectable product of the enzyme reaction system. Those reaction vessels that include the detectable product can be distinguished from those reaction vessels that do not. In a preferred embodiment, the detectable product is only produced when the first enzyme and second enzyme are in close proximity, e.g., less than 200 nm, ideally less than 50 nm. In one embodiment, the first enzyme is an oxidase, e.g., a glucose oxidase, the second enzyme is a peroxidase, and the substrates comprise an oxidase substrate, e.g., glucose, and a labeled tyramide, Amplex Red (10-acetyl-3,7-dihydroxyphenoxazine), or luminol derivative (referred to collectively herein as a labeled reactive derivative and in a preferred embodiment, the labeled reactive derivative comprises Amplex Red or luminol). In this embodiment, the first enzyme reacts with a substrate to generate a product that reacts with the second enzyme to generate a second product that reacts with the labeled reactive derivative to generate a detectable species. Preferably, the reactions catalyzed by the first and second enzymes in the detection complex lead to immobilization of the labeled reactive derivative on the surface, which may be measured to determine the number of analyte molecules present on the surface. In one embodiment, the labeled reactive derivative is biotin-tyramide, and the method further comprises adding labeled streptavidin and measuring the labels on the streptavidin.

Yet another proximity-dependent labeling system that can be used in the method is a FRET pair, e.g., the first detectable label is a FRET donor and the detectable label is a FRET acceptor. Fluorescence resonance energy transfer (FRET) is a distance-dependent interaction between the electronic excited states of two dye molecules in which excitation is transferred from a donor molecule to an acceptor molecule without emission of a photon. The efficiency of FRET is dependent on the inverse sixth power of the intermolecular separation, making it useful over distances comparable to the dimensions of biological macromolecules. In this labeling system, the proximity-dependent signal is measured by exciting the FRET donor and measuring emission from the FRET acceptor. Donor and acceptor molecules are preferably in close proximity, e.g., about 10-100 Angstroms, the absorption spectrum of the acceptor preferably overlaps with the fluorescence emission spectrum of the donor, and the donor and acceptor transition dipole orientations should be approximately parallel. A non-limiting list of FRET pairs are provided in Table 1 below.

TABLE 1

FRET Pair Examples

| Donor | Acceptor |
|---|---|
| Fluorescein | Tetramethylrhodamine |
| IAEDANS | Fluorescein |
| EDANS | Dabcyl |
| Fluorescein | Fluorescein |
| BODIPY FL | BODIPY FL |
| Fluorescein | QSY 7 and QSY 9 dyes |

A variety of FRET detection methods exist for light microscopy, e.g., acceptor photobleaching, donor photobleaching, ratio imaging, sensitized emission, and fluorescence lifetime measurements.

Another suitable labeling system that can be used in an embodiment employing a pair of detection labels is a system in which the first and second detectable labels can be measured independently. For example, the first and second detectable labels can be luminescent labels that differ from one another with respect to spectral properties. Alternatively, the first detectable label is a first enzyme that reacts with a first substrate to produce a first signal and the second detectable label is a second enzyme that reacts with a second substrate to produce a different second signal, and the method further comprises adding the first enzyme substrate and the second enzyme substrate and counting the number of reaction vessels in which the first and second signals are generated. The first and second signal can be changes in optical absorbance and/or luminescent signals with different spectral properties.

If the first and second detectable labels include first and second enzymes, they can each be hydrolytic enzymes, e.g., a phosphatase, sulfatase, galactosidase, glucuronidase, or combinations thereof, and therefore, the first and second substrates are selected from phosphate, sulfate, galactoside and glucuronide modified stabilized dioxetanes, 4-methylumbelliferyl, fluorescein, or combinations thereof. Alternatively, the first and second enzymes are selected from horseradish peroxidase, beta-galactosidase, and alkaline phosphatase.

Alternatively, labels used to detect analyte molecules can be fluorescent species that can be used in single molecule fluorescence detection, e.g., fluorescence correlation spectroscopy, and/or fluorescence cross-correlation spectroscopy. Single molecule fluorescence detection comprises flowing an eluent that includes a detectable species through a capillary, focusing a light source on a volume within the capillary to create an interrogation zone and observing the interrogation zone with a light detector to detect the passage of fluorescent molecules through the interrogation zone.

In one embodiment, an analyte(s) of interest in the sample may be measured using electrochemiluminescence-based assay formats, e.g. electrochemiluminescence (ECL) based immunoassays. The high sensitivity, broad dynamic range and selectivity of ECL are important factors for medical diagnostics. Commercially available ECL instruments have demonstrated exceptional performance and they have become widely used for reasons including their excellent sensitivity, dynamic range, precision, and tolerance of complex sample matrices. Species that can be induced to emit ECL (ECL-active species) have been used as ECL labels, e.g., i) organometallic compounds where the metal is from, for example, the noble metals of group VIII, including Ru-containing and Os-containing organometallic compounds such as the tris-bipyridyl-ruthenium (RuBpy) moiety and ii) luminol and related compounds. Species that participate with the ECL label in the ECL process are referred to herein as ECL coreactants. Commonly used coreactants include tertiary amines (e.g., see U.S. Pat. No. 5,846,485), oxalate, and persulfate for ECL from RuBpy and hydrogen peroxide for ECL from luminol (see, e.g., U.S. Pat. No. 5,240,863). The light generated by ECL labels can be used as a reporter signal in diagnostic procedures (Bard et al., U.S. Pat. No. 5,238,808, herein incorporated by reference). For instance, an ECL label can be covalently coupled to a binding agent such as an antibody, nucleic acid probe, receptor or ligand; the participation of the binding reagent in a binding interaction can be monitored by measuring ECL emitted from the ECL label. Alternatively, the ECL signal from an ECL-active compound may be indicative of the chemical environment (see, e.g., U.S. Pat. No. 5,641,623 which describes ECL assays that monitor the formation or destruction of ECL coreactants). For more background on ECL, ECL labels, ECL assays and instrumentation for conducting ECL assays see U.S. Pat. Nos. 5,093,268; 5,147,806; 5,324,457; 5,591,581; 5,597,910; 5,641,623; 5,643,713; 5,679,519; 5,705,402; 5,846,485; 5,866,434; 5,786,141; 5,731,147; 6,066,448; 6,136,268; 5,776,672; 5,308,754; 5,240,863; 6,207,369; 6,214,552 and 5,589,136 and Published PCT Nos. WO99/63347; WO00/03233; WO99/58962; WO99/32662; WO99/14599; WO98/12539; WO97/36931 and WO98/57154, all of which are incorporated herein by reference.

The methods of the invention may be applied to single-plex or multiplex formats where multiple assay measurements are performed on a single sample. Multiplex measurements that can be used with the invention include, but are not limited to, multiplex measurements i) that involve the use of multiple sensors; ii) that use discrete assay domains on a surface (e.g., an array) that are distinguishable based on location on the surface; iii) that involve the use of reagents coated on particles that are distinguishable based on a particle property such as size, shape, color, etc.; iv) that produce assay signals that are distinguishable based on optical properties (e.g., absorbance or emission spectrum) or v) that are based on temporal properties of assay signal (e.g., time, frequency or phase of a signal).

In some embodiments, a measure of the concentration of analyte molecules in the sample may be determined at least in part by comparison of a measured parameter to a calibration standard. For example, the fraction of binding surfaces that comprise an analyte molecule may be compared against a calibration curve to determine a measure of the concentration of the analyte molecule in the sample. The calibration curve may be produced by completing the assay with a plurality of standardized samples of known concentration under the conditions used to analyze the test samples. A reading may be taken for the signal related to the detection/quantification of the analyte molecules for each standardized sample, therefore allowing for the formation of a calibration curve relating the detection of the analyte molecules with a known concentration of the analyte molecule. The assay may then be completed on a sample comprising the analyte molecule in an unknown concentration, and the detection of the analyte molecules from this assay may be plotted on the calibration curve, therefore determining a measure of the concentration of the analyte molecule in the sample.

In the specific case of using an imaging technique to measure an optical signal (such as fluorescence, chemiluminescence or electrochemiluminescence) a binding event can be detected as a bright point source of light. When the surface density of point sources is low (e.g., when the probability of finding a point source in an R×R area—where R is the spatial resolution of the detection system—is less than 10%), it is likely that any observed point source is due to a single binding event. Under these conditions, counting events can provide the most sensitive measurement. As the surface density increases, it becomes increasingly difficult to resolve and count individual binding events. Under these conditions, integrating the optical signal over the binding surface provides a more accurate measurement.

It will be evident to the skilled artisan that the methods described herein can be applied to numerous immunoassay platforms known to those skilled in the art. Various features of the immunoassay platforms may be adjusted to suit the particular platform, but those adjustments are well within the skill of the ordinary artisan. For example, the methods described herein can be applied to a bead-based format that uses coded particles. In such a system, the bead used can be magnetic or non-magnetic and the surface of the beads is modified to include one or more copies of a capture reagent. The detection reagents employed in this system are a pair of detection reagents. In one embodiment, the two detection reagents include distinguishable fluorescent labels. Alternatively, the two detection reagents are modified with nucleic acid probes, as described herein, in which case, the immunoassay method includes an extension process, e.g., RCA-PLA to generate an amplified product indicative of the presence of each detection reagent that can be detected. If the detection reagents include two distinguishable fluorescent labels, the measurement step includes introducing the beads into a flow cell, and if the beads are magnetic, capturing the beads in the flow cell. If the detection reagents are modified with nucleic acid probes, the measurement step includes forming a sandwich complex on the beads, performing RCA-PLA and labeling the amplicon with fluorescently labeled detection probes. The labeled beads are then introduced into the flow cell and if the beads are magnetic, the beads are captured in the flow cell. In each embodiment, the assay can be multiplexed spectrally based on the identification of fluorescently labeled encoded beads. An excitation light source and emission light detector for multi-color detection can be used to detect binding events in each embodiment, quantitation is achieved by counting beads having both detectable labels or those beads that include a detectably labeled extension product, and quantitation is also achieved by integrated intensity, e.g., detection by integrating over the signal for all binding events. Therefore, a kit can be provided for use with the method described above that includes one or more of the following in one or more vials, containers, or compartments: (a) Magnetic or non-magnetic beads with capture reagent; (b) two detection reagents with distinguishable fluorescent labels; and (c) Optional buffers and/or diluents for assay protocol. Another kit that can be used with the method described above can include one or more of the following on one or more vials, containers, or compartments: (a) Magnetic or non-magnetic beads with capture reagent; (b) Two detection reagents modified with nucleic acid probes (optionally, detection reagents are provided separately and proximity probes (1 and 2) are additionally provided with instructions to modify detection reagents with probes); and (c) fluorescently labeled probes; optional reagents required for modification of detection reagents with proximity probes; assay diluent, calibrator, circularization oligonucleotides, ligation mix or components thereof, e.g., ligation buffer, ATP, BSA, Tween 20, T4 DNA ligase; RCA mixture or components thereof, e.g., BSA, buffer, dNTP, Tween 20, Phi29 DNA polymerase.

In another embodiment, the methods described herein can be applied to a flow-cell analyzed, bead-based format. In such a system, the bead used can be magnetic and the surface of the beads is modified to include one or more copies of a capture reagent. The detection reagents employed in this system are a pair of detection reagents modified with nucleic acid probes, as described herein, in which case, the immunoassay method includes an extension process, e.g., RCA-PLA to generate an amplified product indicative of the presence of each detection reagent that can be detected. The measurement step includes forming a sandwich complex on the beads, performing RCA-PLA and labeling the amplicon with ECL-labeled detection probes. The labeled beads are then introduced into the flow cell and the beads are captured in the flow cell. In particular, a magnetic field is applied to draw the magnetic particles, e.g., beads, to the electrode surface, which can comprise various metals, e.g., platinum. A voltage source is used to apply a voltage to an electrode and an emission light detector can be used to detect binding events; quantitation is achieved by counting beads having a detectably labeled extension product, and quantitation is also achieved by integrated intensity, e.g., detection by integrating over the signal for all binding events. A kit that can be used with the method described above can include one or more of the following on one or more vials, containers, or compartments: (a) Magnetic beads with capture reagent; (b) Two detection reagents modified with nucleic acid probes (optionally, detection reagents are provided separately and proximity probes (1 and 2) are additionally provided with instructions to modify detection reagents with probes); and (c) ECL labeled probes; optional reagents required for modification of detection reagents with proximity probes; assay diluent, calibrator, circularization oligonucleotides, ligation mix or components thereof, e.g., ligation buffer, ATP, BSA, Tween 20, T4 DNA ligase; RCA mixture or components thereof, e.g., BSA, buffer, dNTP, Tween 20, Phi29 DNA polymerase.

In a specific embodiment of a flow-cell analyzed, bead-based format, a sample is incubated with a biotinylated monoclonal analyte-specific capture antibody and a mixture of monoclonal analyte-specific antibodies, each conjugated to oligonucleotides, which react to form a sandwich complex. After the addition of streptavidin-coated microparticles, the complex becomes bound to the solid phase via interactions between biotin and streptavidin. A ligation mix is added to the mixture, and the mixture is incubated with the ligation mix, washed to remove excess circularization oligonucleotides, and incubated with RCA mixture. The mixture is washed and a mixture of biotin-labeled detection probes are added. To incorporate a suitable label, e.g., a luminescent, chemiluminescent, or electrochemiluminescence label, e.g., SULFO-TAG, the detection probe is synthesized with a terminal biotin label and pre-bound to SULFO-TAG labeled streptavidin. The reaction mixture is aspirated into the measuring cell where the microparticles are magnetically captured onto the surface of the electrode, e.g., a metal electrode, such as a platinum electrode. Unbound substances are then removed with a suitable wash buffer, e.g., PROCELL (TPA containing buffer). Application of a voltage to the electrode then induces chemiluminescent emission which is measured by a photomultiplier. The application of voltage and measurement of the resultant emission can be done in any suitable flow-cell, e.g., a COBAS and/or ELECSYS instrument (available from Hoffmann-La Roche LTD.).

In yet another embodiment, the methods described herein can be applied to a bead-based format, with capillary flow to digitally count individual molecules. In such a system, the bead used can be magnetic and the surface of the bead is modified to include one or more copies of a capture reagent. The detection reagents employed in this system are a pair of detection reagents that include distinguishable fluorescent labels. The measurement step includes forming a sandwich complex including the capture reagent, analyte, and detection reagents, crosslinking detection reagents, eluting detection reagents and introducing the beads into a flow cell. An excitation light source and emission light detector for multi-color detection can be used to detect binding events, quantitation is achieved by correlating detection of two fluorophores in the flow cell, and quantitation is also achieved by integrated intensity, e.g., detection by integrating over the signal for all binding events. A kit that can be used with the method described above can include one or more of the following on one or more vials, containers, or compartments: (a) Magnetic beads with capture reagent; (b) Two cross-linkable detection reagents with distinguishable fluorescent labels; and (c) Optional buffers and/or diluents for assay protocol.

Moreover, the methods described herein can be applied to a bead-based format that includes the separation of beads into individual nanowells. In such a system, the bead used can be magnetic and the surface of the bead is modified to include one or more copies of a capture reagent. The detection reagents employed in this system are a pair of detection reagents that include distinguishable enzyme labels. The measurement step includes forming a sandwich complex including the capture reagent, analyte, and detection reagents, and adding substrates for the two enzyme labels. The beads are then captured in individual nanowells. The assay can be multiplexed spectrally based on the identification of enzyme products with different spectral properties. An excitation light source and emission light detector for multi-color detection can be used to detect binding events, quantitation is achieved by counting nanowells that contain both enzyme products, and quantitation is also achieved by integrated intensity, e.g., detection by integrating over the signal for all nanowells. A kit that can be used with the method described above can include one or more of the following on one or more vials, containers, or compartments: (a) Magnetic beads with capture reagent; (b) Two detection reagents each modified with distinguishable enzyme labels, e.g., biotinylated detection reagent and a hapten-conjugated detection reagent; (c) Streptavidin-beta galactosidase, anti-hapten conjugated enzyme, resorufin-beta-d-galactopyranoside; (d) array, e.g., QUANTERIX DVD format array; (e) fluorocarbon oil; and (f) optional buffers and/or diluents for assay protocol. In this specific embodiment, the detectable signal is enhanced by combining the use of a nanowell high-sensitivity system with a proximity-based detection system. While this specific embodiment is illustrated using a particular proximity-based detection system, the skilled artisan will appreciate the fact that the other proximity-based detection systems described herein can also be used to enhance the detectable signal in the assay, e.g., FRET donor/acceptor system; luminescent labels that differ from one another with respect to spectral properties; or the use of first and second enzymes that are hydrolytic enzymes, as described above, and the appropriate accompanying substrates.

Still further, the methods described herein can be applied to a bead-array based platform. In such a system, the bead used can be non-magnetic and the surface of the bead is modified to include one or more copies of a capture reagent. The detection reagents employed in this system are a pair of detection reagents that include first and second nucleic acid probes. The measurement step includes forming a sandwich complex including the capture reagent, analyte, and detection reagents, extending one of the probes to form an extended sequence, wherein extension is dependent on co-localization of the first and second probes in the sandwich complex, labeling the extended sequence with a fluorescent probe, and releasing the extended sequence from the surface into an eluent. An excitation light source and emission light detector for multi-color detection can be used to detect binding events, quantitation is achieved by counting individual detectably labeled extension products, and quantitation is also achieved by integrated intensity, e.g., detection by integrating over the signal for all binding events. A kit that can be used with the method described above can include one or more of the following on one or more vials, containers, or compartments: (a) Non-magnetic beads with capture reagent; (b) Two detection reagents modified with nucleic acid probes (optionally, detection reagents are provided separately and proximity probes (1 and 2) are additionally provided with instructions to modify detection reagents with probes); and (c) Fluorescently labeled probes; optional reagents required for modification of detection reagents with proximity probes; assay diluent, calibrator, circularization oligonucleotides, ligation mix or components thereof, e.g., ligation buffer, ATP, BSA, Tween 20, T4 DNA ligase; RCA mixture or components thereof, e.g., BSA, buffer, dNTP, Tween 20, Phi29 DNA polymerase.

The binding assays described herein can be performed using one or more kits including a set of components employed in the assay. For example, a kit used in the detection of an analyte in a sample includes, in one or more vials, containers, or compartments, a surface including a capture reagent for the analyte and an anchoring reagent; and a detection reagent for the analyte that is linked to a nucleic acid probe. Such a kit may include an anchoring reagent comprising an anchoring oligonucleotide sequence.

Another kit that can be used to carry out the methods described herein includes, in one or more vials, containers, or compartments, a surface comprising a capture reagent for the analyte and an anchoring reagent comprising an anchoring oligonucleotide sequence; a first detection reagent linked to a first nucleic acid probe; and a second detection reagent linked to a second nucleic acid probe.

Yet another kit that can be used to perform the binding assays described herein includes, in one or more vials, containers, or compartments, a surface comprising a capture reagent for the analyte and an anchoring reagent; a first detection reagent for the analyte comprising a first proximity probe; a second detection reagent for the analyte comprising a second proximity probe; and a connector sequence comprising (i) an interior sequence complementary to the second proximity probe and (ii) two end sequences complementary to non-overlapping regions of the first proximity probe. Alternatively, a kit may instead include a surface comprising a capture reagent for the analyte, and an anchoring reagent; a first detection reagent for the analyte comprising a first proximity probe; a second detection reagent for the analyte comprising a second proximity probe; and (i) a first connector oligonucleotide and (ii) a second connector oligonucleotide, wherein (x) a first end of the first connector and a first end of the second connector are complementary to two non-overlapping regions of the first proximity probe and (y) a second end of the first connector and a second end of the second connector are complementary to two non-overlapping regions of the first proximity probe. In addition, the anchoring reagents in either or both of these kits can include an anchoring oligonucleotide sequence.

Moreover, the methods described herein can be performed using a kit including, in one or more vials, containers, or compartments, a first detection reagent comprising a first detectable label; a second detection reagent comprising a second detectable label; a plurality of reaction vessels configured to contain one or fewer analyte molecules; and optionally, a surface comprising a capture reagent.

Finally, a kit for the detection of an analyte using the methods described herein can include, in one or more vials, containers, or compartments, a surface comprising an immobilized capture reagent; a first detection reagent having a first detectable label; a second detection reagent having a second detectable label; and a cross-linking agent reactive with the first and second detection reagents. The cross-linking agent can include a multifunctional cross-linking agent that links reactive moieties attached to the detection reagents or a multivalent binding partner of binding moieties attached to the detection reagents. Suitable multi-functional cross-linking agents include but are not limited to, amines, thiols, hydrazides, aldehydes, esters, iodoacetamides, maleimides, click chemistry reagents, and combinations thereof. Likewise, an example of a multivalent binding partner is a multivalent anti-species antibody targeting detection reagents that are antibodies of that animal species. The cross-linking agent can also include streptavidin, avidin, or biotin, when paired with a companion binding partner attached to the detection reagents. The cross-linking agent can also be an oligonucleotide including a sequence complementary to a nucleic acid probe bound, directly or indirectly, to a component of the kit. In a specific embodiment a kit used in the methods described herein includes, in one or more vials, containers, or compartments, a surface comprising an immobilized capture reagent; a first detection reagent having a first detectable label and a first nucleic acid probe; a second detection reagent having a second detectable label and a second nucleic acid probe; and a third nucleic acid having regions complementary to the first and second nucleic acid probes.

The surfaces of the kits described herein can include a plurality of capture reagents for one or more analyte molecules, wherein the capture reagents are distributed across a plurality of resolvable binding regions or reaction vessels positioned on the surface, e.g., in an array, a multi-well plate, or a micro- or nano-well plate. In addition, the surface can also include a plurality of particles each comprising a plurality of capture reagents for an analyte molecule.

The kits described hereinabove can further include one or more of the following: one or more additional reagents, buffers, polymerase, ligase, and/or dNTPs (labeled or unlabeled). In addition, if the one or more detection reagents comprise a detectable label, the kit can also include a co-reactant for the detectable label employed in the kit. Alternatively, if the one or more detection reagents are components of a coupled enzyme reaction system, then each of the detection reagents comprise first and second enzymes and the kit further includes, in one or more containers, vials or compartments, one or more substrates for the coupled enzyme reaction system, and optionally, a labeled component configured to bind to a product of the coupled enzyme reaction system. For example, the first enzyme can be an oxidase, the second enzyme a peroxidase, and the kit further includes an oxidase substrate and a labeled tyramide derivative. In another embodiment, the first and second detectable reagents comprise components of a proximity-dependent detection system, e.g., a FRET donor and a FRET acceptor, or luminescent labels that differ from one another with respect to their spectral properties.

Additional Alternative Embodiments

A further embodiment is illustrated in FIG. 7. A portion of each of the proximity probes in the sandwich immunoassay complex in panel (a) are temporarily protected by short strands of RNA hybridized to each segment. The RNA strands are enzymatically removed so that each of the proximity probes can hybridize to one another and the chain is extended by polymerase extension using biotinylated dNTPs (panel (b)). Each biotinylated base incorporated into the chain is bound to streptavidin labeled with a detectable label (panel (c)).

Figure 8:
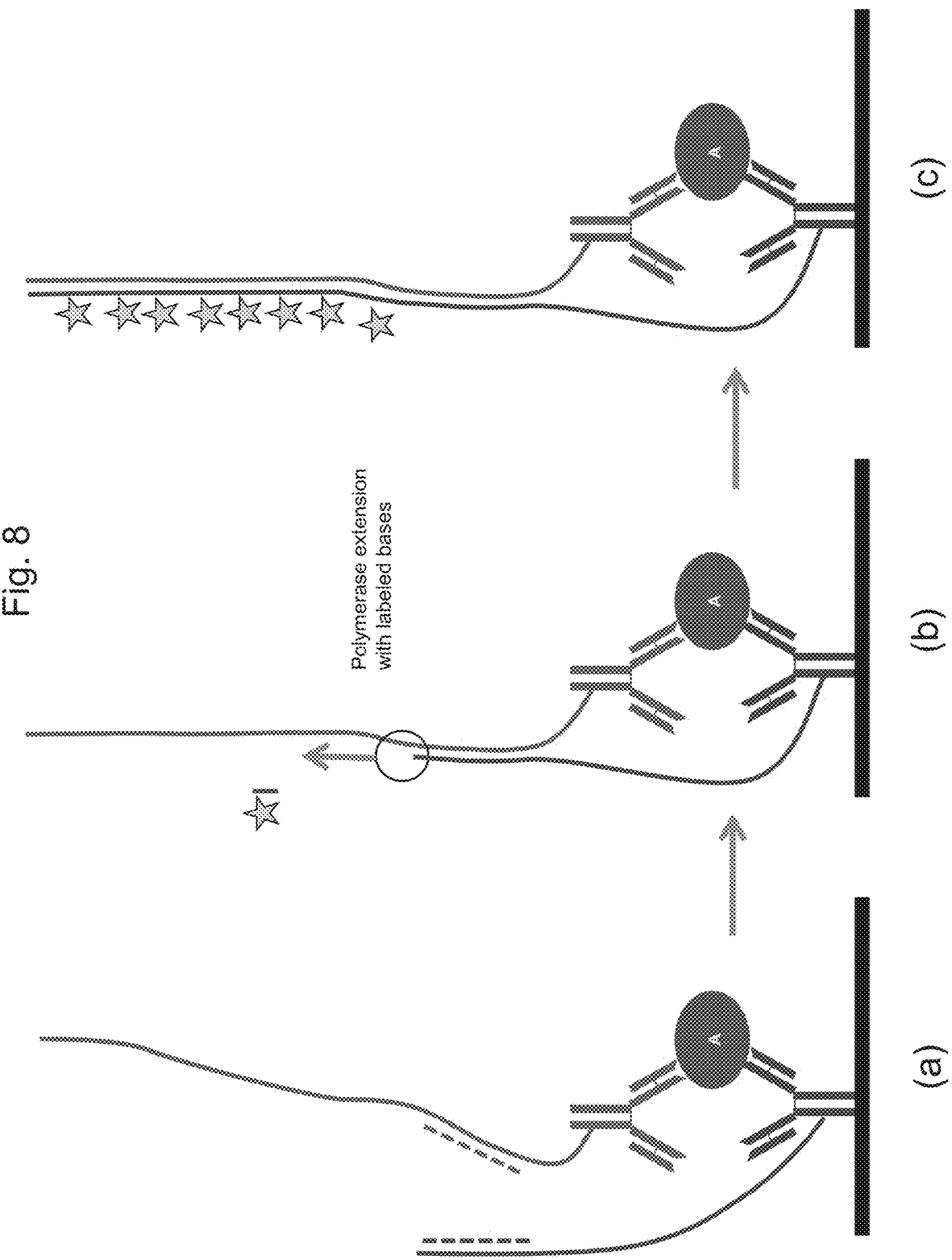
FIG. 8 shows a further embodiment in which proximity probes are attached to the capture reagent and a detection reagent, and a portion of each proximity probe is temporarily protected by short strands of RNA hybridized thereto, as described above in reference to FIG. 8.

Yet another approach is illustrated in FIG. 8. Proximity probes can be attached to the anchoring reagent and a detection reagent (as shown in panel (a)) or each of the proximity probes can be attached to two detection reagents as described hereinabove (not shown). Much like the method illustrated in FIG. 7, a portion of each of the proximity probes are temporarily protected by short strands of RNA hybridized to each segment. The RNA strands are enzymatically removed so that each of the proximity probes can hybridize to one another and the chain is extended by polymerase extension using biotinylated dNTPs (panel (b)). Each biotinylated base incorporated into the chain is bound to streptavidin labeled with a detectable label (panel (c)).

Figure 18:
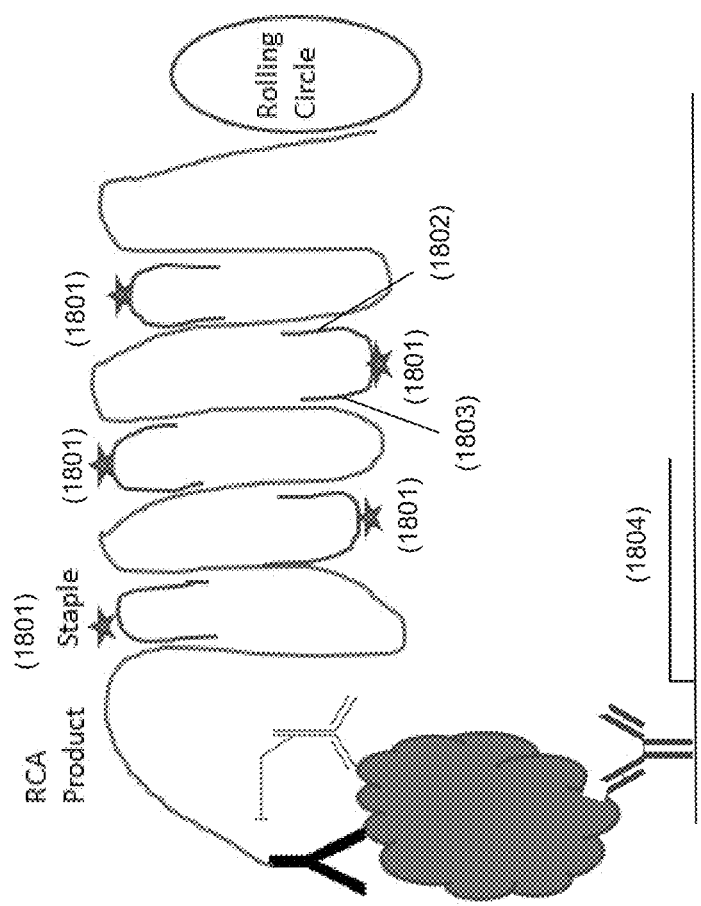
FIG. 18 is a schematic representation of an assay method that incorporates the use of a plurality of staple sequences to adhere to the amplicon, thereby forming a more compact structure on the surface.

An additional embodiment is shown in FIG. 18. In this embodiment, a plurality of short oligonucleotides are used as staple sequences (1801) to hybridize to a portion of the amplicon and thereby fold the product into a compact structure that is easily imaged. Each staple sequence comprises at least two sequences (1802 and 1803, respectively) that are each complimentary to a sequence of the amplicon and when each staple sequence hybridizes to its complement, the amplicon is folded back onto itself as shown in FIG. 18. In addition, the amplicon can also be adhered to the surface via an anchoring interaction with an anchoring reagent (1804) as described herein above. The stapling process can be performed in situ by adding the staple sequences to the reaction mixture during the amplification step. Therefore, as each cycle of amplification is completed, the staple sequences are free to hybridize to the newly formed amplicon and cause it to fold. The staples can also be added after the amplification process is completed, causing the linear amplicon to fold into a coil or flat sheet, depending on the design of the staple sequences and their corresponding complements. The label molecule, e.g., ECL or fluorescence, can be incorporated into the staple sequence (or it may be incorporated into the amplicon as described above). This embodiment would yield a three dimensional structure on the surface, producing smaller features of higher signal density which allows for easier imaging of the amplicons on the surface.

Manual and Automated Embodiments

Methods disclosed herein may be performed manually, using automated technology, or both. Automated technology may be partially automated, e.g., one or more modular instruments, or a fully integrated, automated instrument.

Example automated systems are discussed and described in commonly owned International Patent Appl. Pub. Nos. WO 2018/017156 and WO 2017/015636 and International Patent Appl. Pub. No. WO 2016/164477, each of which is incorporated by reference in its entirety.

Automated systems (modules and fully integrated) on which the methods herein may be carried out may comprise the following automated subsystems: computer subsystem(s) that may comprise hardware (e.g., personal computer, laptop, hardware processor, disc, keyboard, display, printer), software (e.g., processes such as drivers, driver controllers, and data analyzers), and database(s); liquid handling subsystem(s), e.g., sample handling and reagent handling, e.g., robotic pipetting head, syringe, stirring apparatus, ultrasonic mixing apparatus, magnetic mixing apparatus; sample, reagent, and consumable storing and handling subsystem(s), e.g., robotic manipulator, tube or lid or foil piercing apparatus, lid removing apparatus, conveying apparatus such as linear and circular conveyors and robotic manipulators, tube racks, plate carriers, trough carriers, pipet tip carriers, plate shakers; centrifuges, assay reaction subsystem(s), e.g., fluid-based and consumable-based (such as tube and multi well plate); container and consumable washing subsystem(s), e.g., plate washing apparatus; magnetic separator or magnetic particle concentrator subsystem(s), e.g., flow cell, tube, and plate types; cell and particle detection, classification and separation subsystem(s), e.g., flow cytometers and Coulter counters; detection subsystem(s) such as colorimetric, nephelometric, fluorescence, and ECL detectors; temperature control subsystem(s), e.g., air handling, air cooling, air warming, fans, blowers, water baths; waste subsystem(s), e.g., liquid and solid waste containers; global unique identifier (GUI) detecting subsystem(s) e.g., 1D and 2D bar-code scanners such as flat bed and wand types; sample identifier detection subsystem(s), e.g., 1D and 2D bar-code scanners such as flat bed and wand types. Analytical subsystem(s), e.g., chromatography systems such as high-performance liquid chromatography (HPLC), fast-protein liquid chromatography (FPLC), and mass spectrometer can also be modules or fully integrated.

Systems or modules that perform sample identification and preparation may be combined with (or be adjoined to or adjacent to or robotically linked or coupled to) systems or modules that perform detection and that perform assays or that perform both. Multiple modular systems of the same kind may be combined to increase throughput. Modular system(s) may be combined with module(s) that carry out other types of analysis such as chemical, biochemical, and nucleic acid analysis.

The automated system may allow batch, continuous, random-access, and point-of-care workflows and single, medium, and high sample throughput.

The system may comprise, for example, one or more of the following devices: plate sealer (e.g., Zymark), plate washer (e.g., BioTek, TECAN), reagent dispenser and/or automated pipetting station and/or liquid handling station (e.g., TECAN, Zymark, Labsystems, Beckman, Hamilton), incubator (e.g., Zymark), plate shaker (e.g., Q.Instruments, Inheco, Thermo Fisher Scientific), compound library or sample storage and/or compound and/or sample retrieval module. One or more of these devices is coupled to the apparatus of the invention via a robotic assembly such that the entire assay process can be performed automatically. According to an alternate embodiment, containers (e.g., plates) are manually moved between the apparatus and various devices (e.g., stacks of plates).

The automated system may be configured to perform one or more of the following functions: (a) moving consumables such as plates into, within, and out of the detection subsystem, (b) moving consumables between other subsystems, (c) storing the consumables, (d) sample and reagent handling (e.g., adapted to mix reagents and/or introduce reagents into consumables), (e) consumable shaking (e.g., for mixing reagents and/or for increasing reaction rates), (f) consumable washing (e.g., washing plates and/or performing assay wash steps (e.g., well aspirating)), (g) measuring ECL in a flow cell or a consumable such as a tube or a plate. The automated system may be configured to handle individual tubes placed in racks, multiwell plates such as 96 or 384 well plates.

Methods for integrating components and modules in automated systems as described herein are well-known in the art, see, e.g., Sargeant et al., Platform Perfection, Medical Product Outsourcing, May 17, 2010.

In embodiments, the automated system is fully automated, is modular, is computerized, performs in vitro quantitative and qualitative tests on a wide range of analytes and performs photometric assays, ion-selective electrode measurements, and/or electrochemiluminescence (ECL) assays. In embodiments, the system comprises the following hardware units: a control unit, a core unit and at least one analytical module.

In embodiments, the control unit uses a graphical user interface to control all instrument functions, and is comprised of a readout device, such as a monitor, an input device(s), such as keyboard and mouse, and a personal computer using, e.g., a Windows operating system. In embodiments, the core unit is comprised of several components that manage conveyance of samples to each assigned analytical module. The actual composition of the core unit depends on the configuration of the analytical modules, which can be configured by one of skill in the art using methods known in the art. In embodiments, the core unit comprises at least the sampling unit and one rack rotor as main components. Conveyor line(s) and a second rack rotor are possible extensions. Several other core unit components can include the sample rack loader/unloader, a port, a barcode reader (for racks and samples), a water supply and a system interface port. In embodiments, the analytical module conducts ECL assays and comprises a reagent area, a measurement area, a consumables area and a pre-clean area.

EXAMPLES

Example 1. General Protocol for Proximity Ligation and Rolling Circle Amplification A pair of detection antibodies to a target analyte was modified by the addition of proximity probes 1 and 2 as follows: to 200 ug first detection antibody in 100 µL buffer, 1.74 µL 23 mM sulfo-SMCC was added, diluted in 150 mM Phosphate buffer, and incubated at room temperature for 30 minutes. Free sulfo-SMCC was removed by size exclusion chromatography. The final concentration of the detection antibody was 2 mg/mL or slightly lower. Ninety-five (95) µL of 300 µM thiol-modified oligonucleotide (proximity probe 1 and 2) was reduced with 5 µL of 1 mM DTT in 100 mM phosphate buffer, 0.5 mM EDTA, pH 8.4, for 1 hour at room temperature. The sequences of proximity probes 1 and 2 are:

Thiol-modified proximity probe 1: SH-AAA AAA AAA AGA CGC TAA TAG TTA AGA CGC TTU UU (SEQ ID No. 1; wherein the three U resides are 2' O-methyl RNA)

Thiol-modified proximity probe 2: SH-AAA AAA AAA ATA TGA CAG AAC TAG ACA CTC TT (SEQ ID No. 2).

Excess Sulfo-SMCC and DTT were removed, e.g., by using three spin column separates and antibody and DNA were pooled for covalent conjugation. The solution was incubated for 1 hour at room temperature with mixing. Antibody-proximity probe conjugates were purified, e.g., by size exclusion chromatography to remove unconjugated antibodies and oligonucleotides.

An MSD MULTI-SPOT® plate was blocked for 1 hour with appropriate MSD® blocking solution and washed. Each binding domain on the plate included a capture antibody and an anchoring moiety (immobilized as a BSA-oligonucleotide conjugate, the oligonucleotide selected to be specific for a rolling circle amplicon). The sequence of the anchoring oligonucleotide used in this example was 5'-AAGAGAGTAGTACAGCAGCCGTCAAAAAAA-AAAAA-/3ThioMC3-D/-3'(SEQ ID NO: 3). Twenty-five (25) µl each assay diluent and calibrator, or sample (diluted as appropriate) (resulting in 50 µL total volume) was added to each well. The plate was incubated with shaking for 1-3 hours and each well was washed. A solution of detection antibodies labeled with proximity probes 1 and 2, prepared as described above, was added to each well (25 µL per well), and incubated with shaking for 1-2 hours (alternatively, each individual detection antibody can be sequentially added, with each addition followed by a 1 hour incubation). A ligation mix was added to each well including the following components: (i) circularization oligonucleotide 1 (4 nM), circularization oligonucleotide 2 (4 nM), ligation buffer, ATP (1 mM), T4 DNA ligase (0.15 U/µL), wherein the each of the circularization oligonucleotides were:

Circularization oligonucleotide 1: Phosphate-CTA TA GCG TCC AGT GAA TGC GAG TCC GTC TAA GAG AGT AGT AGA GCA GCC GTC AAG AGT GTC TA (SEQ ID No. 4).

Circularization oligonucleotide 2: Phosphate-GTT CTG TCA TAT TA AGC GTC TTA A (SEQ ID No. 5).

The plate was incubated with the ligation mix for 30 minutes at room temperature, washed to remove excess circularization oligonucleotides, and incubated with RCA mixture for 1.5 hour at 37 C, wherein the RCA mixture contained RCA buffer, dNTP (250 µM of each), Phi29 DNA polymerase (0.125 U/ml). The plate was washed and a mixture of detection probes were added and incubated for 30 minutes at 37 C, wherein the detection probe mixture includes: 20 mM Tris, 1 mM SDTA, 250 mM NaCl, 0.01% Triton, BSA (200 ug/ml), Tween 20 (0.05%), detection probes (6.25 nM). The detection probe was the sequence CAG TGA ATG CGA GTC CGT CT (SEQ ID No. 6). To incorporate the electrochemiluminescence label SULFO-TAG (Meso Scale Diagnostics), the detection probe was synthesized with a terminal biotin label and was pre-bound to SULFO-TAG labeled streptavidin. The plate was washed and filled with 150 µl MSD read buffer and read immediately on MSD SECTOR® 6000 Reader (plates and reader supplied by Meso Scale Discovery, Rockville, MD).

Figure 9:
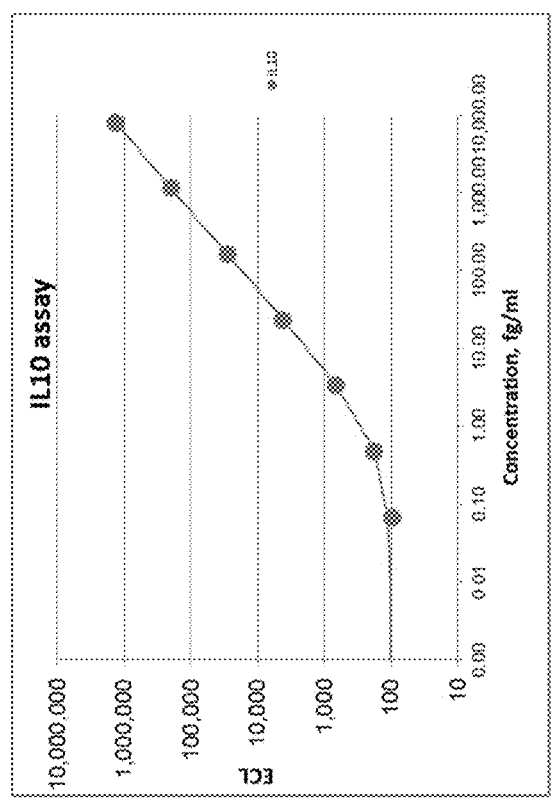
FIG. 9 shows a calibration curve for an IL-10 assay conducted using the method described in Example 1.

This general procedure was used to detect the following analytes: troponin I, Akt (total), phospho-Akt (473), phospho-Akt (308), Influenza A nucleoprotein (NP), IL-12p40, IL-12p70, Abeta1-42, bridging and isotyping Ig assays using TNFalpha model system, bridging and isotyping Ig assays using Hepatitis B surface antigen, and bridging and isotyping Ig assays using Lyme C6. The increases in ECL signal and assay sensitivity relative to a standard sandwich immunoassay varied between assays, but improvements as high as 100-fold were observed. For certain assays tested, e.g., Troponin-I, Akt (total), IL-12p40, IL-12p70, and Abeta1-42, the presence of anchoring moiety improved signal and/or dilution linearity, by preventing the dissociation of the detection complex during the amplification step. A calibration curve for an IL-10 assay conducted according to the procedure described above is shown in FIG. 9. In addition, Table 2 (below) shows the LOD for a set of representative assays conducted according to the procedure described above (column 2, "3-AB RCA/PLA Assay") relative to the LOD for a standard two antibody immunoassay protocol from Meso Scale Diagnostics (MSD), Rockville, MD (column 3, "MSD V-Plex 2-AB Immunoassay protocol").

TABLE 2

| Analyte | 3-AB RCA/PLA Assay LOD (fg/mL) | MSD V-Plex 2-AB Immunoassay protocol (fg/mL) |
|---|---|---|
| IL-1b | 2-5 | 80 |
| IL-2 | 4 | 180 |
| IL-4 | 0.7 | 40 |
| IL-6 | 0.6 | 120 |
| IL-10 | 2 | 60 |

Example 2. Assay Protocol with and without Anchoring Reagent

An MSD 7-spot MULTI-SPOT plate was coated as described above in Example 1 with Troponin I capture antibodies (220 µg/mL) each. Capture antibodies were co-spotted with or without an anchoring moiety, BSA, to which an oligonucleotide specific for an amplicon was covalently attached (5 µg/mL anchor, if present). Twenty five (25) µl each assay diluent, calibrator, or sample (diluted as appropriate) was added to each well (50 µl total). The plate was incubated with shaking for 2 hours and each well was washed. A solution of detection antibodies labeled with proximity probes 1 and 2, prepared as described above, was added to each well (25 µL per well), and incubated with shaking for 1 hour. A ligation mix was added to each well as described above in Example 1. The plate was incubated with the ligation mix for 30 minutes at room temperature, washed to remove excess circularization oligonucleotides, and incubated with RCA mixture for 1.5 hour at 37 C as described above in Example 1. The plate was washed and a mixture of detection probes were added and incubated for 30 minutes at 37 C as described above in Example 1. The plate was washed and filled with 150 µl MSD read buffer and read immediately on MSD SECTOR 6000 Reader. The MSD electrode was removed from the plate top for fluorescence imaging and kept wet with PBS and a cover slip. The surface was viewed on a microscope with a Zyla camera, 20× objective, 2×2 binning, customer filter set, with a 2 second exposure.

As shown in Table 3 (below), ECL values were 4-5 times higher in the presence of the anchoring reagent and the detection limit was three times lower (more sensitive).

TABLE 3

| Cal Conc (pg/ml) | +Anchor | No Anchor |
| --- | --- | --- |
| 500 | 134,705 | 29,818 |
| 50 | 12,713 | 2,486 |
| 5 | 1,121 | 270 |
| 0.5 | 150 | 60 |
| 0.05 | 92 | 43 |
| 0.005 | 40 | 86 |
| 0.0005 | 56 | 30 |
| 0 | 71 | 37 |
| Detection Limit | 0.36 | 1.16 |

FIGS. 10 (a) and (b) show fluorescence microscopy images of plate surfaces with 5 ug/mL anchoring reagent (panel (a)) and without (panel (b)). The image shows bright fluorescent spots associated with individual binding events and confirms that RCA amplification in the presence of the anchor reagent was more efficient at generating observable binding events.

Example 3. Comparison of One Vs. Two Connector Oligonucleotides

Figure 11A:
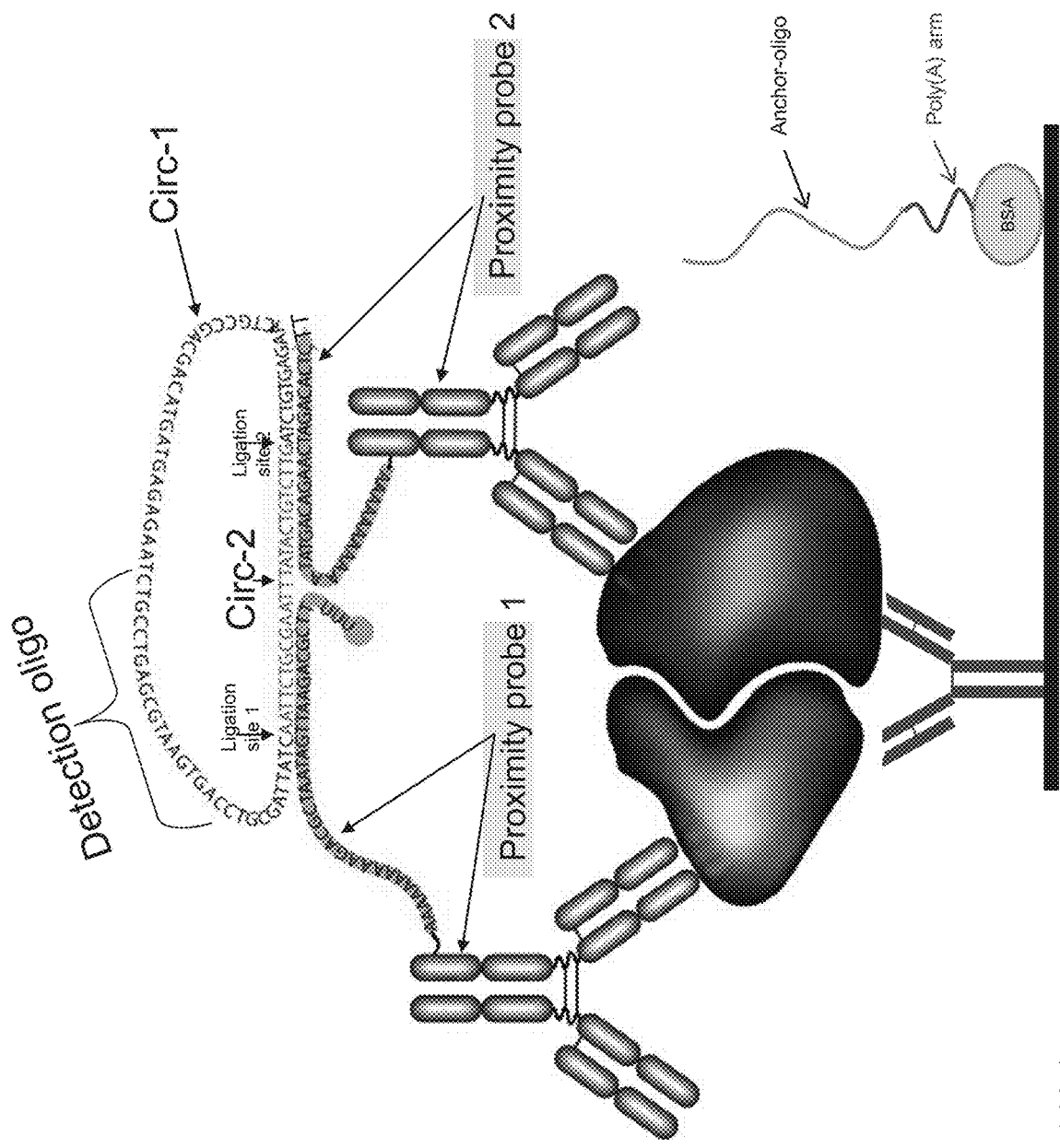
FIG. 11(a) shows the configuration of a single linear connector oligonucleotide sequence including either ligation site 1 or 2 and the use of these connectors in an assay of the invention.
Figure 11B:
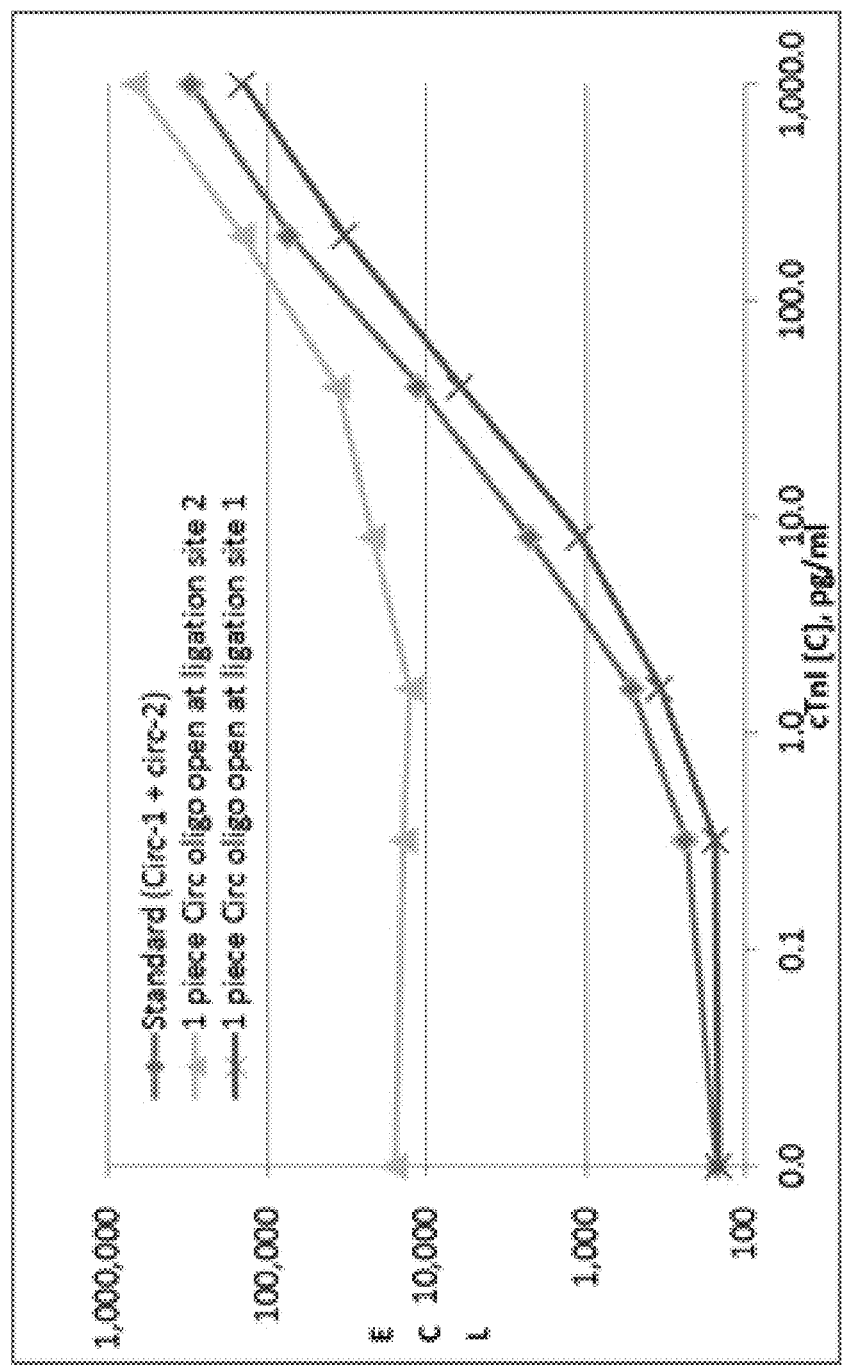
FIG. 11(b) shows comparative performance data for an assay using a combination of Circ-1 and Circ-2 vs. either a single linear connector oligonucleotide sequence including ligation site 1 or a single linear connector oligonucleotide sequence including ligation site 2.

The assay described in Example 2 was repeated using a single linear connector oligonucleotide with one ligation site to form a circular template instead of two connector oligonucleotides with two separate ligation sites. As shown in FIG. 11(a), a single linear connector oligonucleotide was prepared that was open at ligation site 1 or ligation site 2. Both single linear connector oligonucleotides were tested side by side with the combination of oligonucleotides used in Examples 1 and 2, Circ-1 and Circ-2. The protocol described in Example 2 was employed and in addition, the single linear connector oligonucleotides were tested at three concentrations: 125 nM, 62.5 nM, and 31 nM, while the standard assay using the combination of Circ-1 and Circ-2 oligonucleotides were tested at 125 nM. As shown in FIG. 11(b), the two single linear connector oligonucleotides were successfully incorporated into RCA amplification products with roughly the same efficiency as the two-part connector oligonucleotide mix (Circ-1 and Circ-2). The single linear connector oligonucleotide that was open at ligation site 1 had performance comparable to the two-part connector mix, based on signal intensity, non-specific background and overall sensitivity. As expected, the single linear connector oligonucleotide that was open at ligation site 2 had higher non-specific background and lower sensitivity. In this latter case, both ligation and priming was only dependent on the presence of proximity probe #1; therefore some of the specificity benefits of the proximity amplification approach was lost.

Example 4. Three-Antibody Assays Conducted Using Alternative Proximity Probe, Anchor Oligonucleotide, and Connector Sequences An assay was conducted using the protocol outlined in Example 1, using the following alternative sets of reagents:

TABLE 4

| Sequence Description | Sequence |
| --- | --- |
| Alternate Set (a) | |
| Detection oligo | 5'-/5Biosg/ACATCGGTAGTT-3' (SEQ ID NO: 7) |
| Proximity oligo 1 | /5ThioMC6-D/aaaaaaaaaaCACTAAGCTGTTAGTCCATTACCGmUmUmU (SEQ ID NO: 8) |
| Proximity oligo 2 | /5ThioMC6-D/aaaaaaaaaaGCTGGAGGTTCAGACGATTTTGCG (SEQ ID NO: 9) |
| Circ-1 | /5Phos/AACAGCTTAGTGACATCGGTAGTTAACAGATTGATCTTGACACATCGGTAGTTCGCAAAATCGTC (SEQ ID NO: 10) |
| Circ-2 | /5Phos/TGAACCTCCAGCTTTCGGTAATGGACT (SEQ ID NO: 11) |
| Anchor oligo | 5'ACAGATTGATCTTGAAAA AAA AAA AAA AAA AAA AA/3ThioMC3-D/ (SEQ ID NO: 12) |
| Alternate Set (b) | |
| Detection oligo | 5'-/5Biosg/ACATCGGTAGTT-3' (SEQ ID NO: 7) |
| Proximity oligo 1 | /5ThioMC6-D/aaaaaaaaaaAGAGTCCAGAGGCAAAGCGTGAATmUmUmU (SEQ ID NO: 13) |
| Proximity oligo 2 | /5ThioMC6-D/aaaaaaaaaaGATAAGGAAGGGGCCTTAGCGACA (SEQ ID NO: 14) |
| Circ-1 | /5Phos/CCTCTGGACTCTACATCGGTAGTTTGGAACATTTTATTCTAACATCGGTAGTTTGTCGCTAAGGC (SEQ ID NO: 15) |
| Circ-2 | /5Phos/CCCTTCCTTATCTTTATTCACGCTTTG (SEQ ID NO: 16) |
| Anchor oligo | 5'GGAACATTTTATTCTAAA AAA AAA AAA AAA AAA AA/3ThioMC3-D/ (SEQ ID NO: 17) |

TABLE 4-continued

| Sequence Description | Sequence |
|---|---|
| | Alternate Set (c) |
| Detection oligo | 5'-/5Biosg/ACATCGGTAGTT-3' (SEQ ID NO: 7) |
| Proximity oligo 1 | /5ThioMC6-D/aaaaaaaaaaAACAACTCCGATTGCTTGCTTCTTmUmUmU (SEQ ID NO: 18) |
| Proximity oligo 2 | /5ThioMC6-D/aaaaaaaaaaTAGCCCTACGTGCCCTGCATAGAC (SEQ ID NO: 19) |
| Circ-1 | /5Phos/ATCGGAGTTGTTACATCGGTAGTTCGCGCAGGTCGGGAATTACATCGGTAGTTGTCTATGCAGGG (SEQ ID NO: 20) |
| Circ-2 | /5Phos/CACGTAGGGCTATTTAAGAAGCAAGCA (SEQ ID NO: 21) |
| Anchor oligo | 5'GCGCAGGTCGGGAATAAA AAA AAA AAA AAA AAA AA/3ThioMC3-D/ (SEQ ID NO: 22) |

The results in Table 5 below are for a troponin assay in which the concentration of troponin was 500 pg/mL and each well of a MULTI-SPOT plate included one capture spot with anchor oligonucleotide from one of the sets listed in Table 4. The assay used one proximity probe (1) and one proximity probe (2), at the same concentrations as described in Example 1. Non-specific binding for sets (a)-(c) was higher because they had 9 times greater concentration of detection oligonucleotide-SA-STAG compared to that described in Example 1. The higher concentration of detection oligonucleotide-SA-STAG resulted from titration of the pre-bound complex together, rather than titration of SA-STAG alone, as in Example 1.

TABLE 5

| PLA Sets | (a) | (b) | (c) | Example 1 |
|---|---|---|---|---|
| Troponin | 178,560 | 138,540 | 189,166 | 273,261 |
| Zero Troponin | 412 | 314 | 545 | 88 |

Example 5. Three-Antibody Assays Conducted on Additional Immunoassay Platforms (a) Bead-Based Immunoassay Format Using Coded Particles All assay steps are performed in a 96-well filter plate. Remove liquid from the plate with a vacuum manifold (not exceeding 10 In. of Hg). Never turn the plate over. If clogging should occur, use the pointed end of a 15 ml conical tube to gently press the area under the clogged well and then use a 1 ml Pasteur pipette rubber bulb or place thumb over clogged well to dislodge clog by generating pressure. Following final aspiration step, lightly tap bottom of plate on a stack of paper towels and then dab the bottom of the filter plate with a Kimwipe to remove residual liquid/droplets.

Wash Solution Preparation: Prepare 1× Working Wash Solution by diluting the entire contents of the 20× Wash Solution bottle with 285 ml deionized water.

Assay Standard Preparation: Reconstitute the lyophilized standard in 100% Assay Diluent (serum and plasma samples) or 50% Assay Diluent/50% tissue culture media (tissue culture supernatants); Reconstitution Volumes: (i) 1 vial: 1 ml; (ii) 2 vials: 0.5 ml per vial. Rehydrate at room temperature for 8-10 minutes. Gently invert the vial(s) several times and allow the vials to sit an additional 3-5 minutes to ensure complete hydration. If more than 1 standard is used, combine equal volumes of each standard and gently mix. Perform 3-fold serial dilutions of the reconstituted standard to prepare a seven point standard curve.

Analyte Capture:

(1) Vortex (30 sec) and sonicate (30 sec) the 10× Capture Bead stock. In a foil wrapped tube, dilute the 10× Capture Bead stock (2.5 µl per well) in Working Wash Solution (25 µl per well ~2,000 to 5,000 beads/assay). For higher multiplexing adjust the volume of Working Wash Solution to account for the extra volumes of 10× Capture Bead stocks retained.

(2) Pre-wet the standard and sample wells with 200 µl Working Wash Solution.

(3) Vortex (30 sec) and sonicate (30 sec) the diluted Capture Bead solution. Immediately add 25 µl to each assay well followed by 200 µL of 1× Wash Solution. Aspirate and repeat the wash with 200 µL of Working Wash Solution. Tap and dab the bottom of the filter plate as needed.

(4) Add 50 µl Incubation Buffer to all assay wells.

(5) Add 100 µl standard into designated wells. For wells designated for samples, add 50 µl Assay Diluent followed by 50 µl sample. Cover and incubate the plate for 2 hours at room temperature on an orbital plate shaker (500-600 rpm). Cover the assay plate with an opaque lid during all incubations to protect from light. The speed may need to be adjusted depending upon the radius of the orbital shaker.

Analyte Detection (6) Prepare 1× mixture of fluorescently labeled detection antibodies: Dilute the 10× detection antibody mixture (10 µl per well) in diluent (100 µl per well). The mixture includes a pair of detection antibodies specific for the analyte of interest, one labeled with Alexa Fluor 350 (blue fluorescent label) and the other labeled with Alexa Fluor 594 (red fluorescent label) (each of these fluorescent labels are available from Life Technologies, Grand Island, NY, www.lifetechnologies.com). For higher multiplexing, adjust the volume of diluent to account for the extra volumes of 10× antibody mixture stocks required. Aspirate and wash the assay wells twice with 200 µl Working Wash Solution. Add 100 µl diluted detection antibody mixture to each assay well. Cover and incubate the plate for 1 hour on a plate shaker (500-600 rpm).

Assay Reading (8) Aspirate and wash the assay wells 3 times with 200 µl Working Wash Solution. Dry the bottom of the filter plate with clean paper towels to completely remove all residual droplets. Add 100 µl Working Wash Solution to each assay well and place the plate on the plate shaker (500-600 rpm) for 2-3 minutes.

(9) Analyze the bead suspension in a multi-color fluorescence particle analyzer (such as a FACS system or modified XMAP instrument) that includes color channels for each fluorescent label. For maximal sensitivity, the assay is run under conditions where any particle is likely to have only zero or one bound analyte and the amount of analyte is quantitated by counting the number of particles specific for a given analyte (based on particle coding) that comprise both fluorescent labels. Optionally, the assay can be run in a multiplex format using coded beads where the code indicates the analyte specificity of the capture antibody on a bead, and additional pairs of detection antibodies for each analyte. Where coding is determined, as in XMAP using additional fluorescence colors incorporated in the beads, the analyzer should have additional detection channels for measuring the additional colors and identifying the bead code.

(b) Bead-Based Immunoassay Format Using Coded Particles Including an Anchoring Moiety, Using Two Detection Reagents Modified with Nucleic Acid Probes As outlined in Example 5(a), all assay steps are performed in a 96-well filter plate. Wash solution and assay standard is prepared as described in Example 5(a) and a pair of detection antibodies to a target analyte are modified by the addition of proximity probes 1 and 2 as described in Example 1. Analyte is captured on capture beads as described in Example 5(a). Capture beads include an anchoring moiety, immobilized to the bead surface as a BSA-oligonucleotide conjugate, with the oligonucleotide selected to be specific for a rolling circle amplicon. The sequence of the anchoring oligonucleotide used is SEQ ID NO: 3.

Twenty-five (25) µl assay diluent, calibrator, or sample (diluted as appropriate) is mixed with a mixture of capture beads. The mixture is incubated with shaking for 1-3 hours and washed. A solution of detection antibodies labeled with proximity probes 1 and 2, prepared as described above, is added to the mixture, and incubated with shaking for 1-2 hours (alternatively, each individual detection antibody can be sequentially added, with each addition followed by a 1 hour incubation). The ligation mix described in Example 1 is added. The mixture is incubated with the ligation mix for 30 minutes at 37 C, washed to remove excess circularization oligonucleotides, and incubated with RCA mixture for 1.5 hour at 37 C, wherein the RCA mixture is described above in Example 1. The mixture is washed and a mixture of fluorescein-labeled detection probes is added and incubated for 30 minutes at 37 C, wherein the detection probe mixture is described above. The mixture is washed and the particles are aspirated into a multi-channel fluorescence particle analyzer.

(c) Bead-Based Format and Separation of Capture Analyte Molecules into Individual Nanowells Sample is prepared in 100 ul of 25% bovine serum (2-4 fold dilution) and 500K beads (paramagnetic 2.7 um, optionally fluorescently coded) coated with capture antibody are added to the sample. The sample is incubated for about 2 hrs at 23° C. The sample is washed three times with PBS (5×, 0.1% Tween-20), and a mixture of labeled detection antibodies is added (a mixture including a first biotinylated detection antibody and a hapten-conjugated antibody). The mixture is incubated for about 1 hr at 23° C. The mixture is washed three times with PBS (5×, 0.1% Tween-20), enzyme label is added, streptavidin-beta-galactosidase (40 pM), anti-hapten conjugated enzyme is also added, and the mixture is incubated for about 30 min at 23° C. (or 3 min in a SIMOA analyzer). The mixture is washed seven times with PBS (5×, 0.1% Tween-20) and enzyme substrate is added, 15 ul of resorufin-beta-d-galactopyranoside (100 uM, in loading buffer).

The mixture is drawn over an array of nanowells (provided by QUANTERIX in a DVD format, made from a cyclic olefin polymer, with 24-samples per disc) and allowed to settle for about 2 minutes. The array is flushed with buffer, the array is sealed with fluorocarbon oil, incubated for 2-5 min at 23° C., and the results are read on a multicolor fluorescence imager. Image analysis is used to count the number of nanowells that contain both fluorescent enzyme products and thereby provide a value that correlates with the concentration of analyte in the sample.

(d) Flow Cell Analyzed, Bead Based Immunoassay Format

First incubation: 10 µl of sample, a biotinylated monoclonal analyte-specific capture antibody (working solution at 2.6 mg/l), and a mixture of monoclonal analyte-specific antibodies, each conjugated to oligonucleotides (working solution at 0.3 mg/l) react to form a sandwich complex. The mixture of monoclonal analyte-specific antibodies are prepared as in Example 1 and the mixture includes a pair of antibodies conjugated to proximity probes 1 and 2 as described above in Example 1.

Second incubation: after the addition of streptavidin-coated microparticles (DYNAL M280, 2.8 um, 0.72 mg/ml, binding capacity for biotin 470 ng/mg), the complex becomes bound to the solid phase via interactions between biotin and streptavidin. A ligation mix is added to the mixture, wherein the ligation mix is prepared according to the protocol described in Example 1. The mixture is incubated with the ligation mix for 30 minutes at 37 C, washed to remove excess circularization oligonucleotides, and incubated with RCA mixture as described in Example 1. The mixture is washed and a mixture of biotin-labeled detection probes are added and incubated for 30 minutes at 37 C, wherein the detection probe mixture is prepared as described in Example 1. To incorporate the electrochemiluminescence label SULFO-TAG (Meso Scale Diagnostics), the detection probe is synthesized with a terminal biotin label and pre-bound to SULFO-TAG labeled streptavidin.

The reaction mixture is aspirated into the measuring cell where the microparticles are magnetically captured onto the surface of the electrode. Unbound substances are then removed with PROCELL (TPA containing buffer). Application of a voltage to the electrode then induces chemiluminescent emission which is measured by a photomultiplier. Results are determined via a calibration curve which is instrument specifically generated by 2-point calibration and a master curve provided via the reagent bar code.

Example 6. Detection of HIV-1 P24

Materials, Methods, and Results

Figure 12:
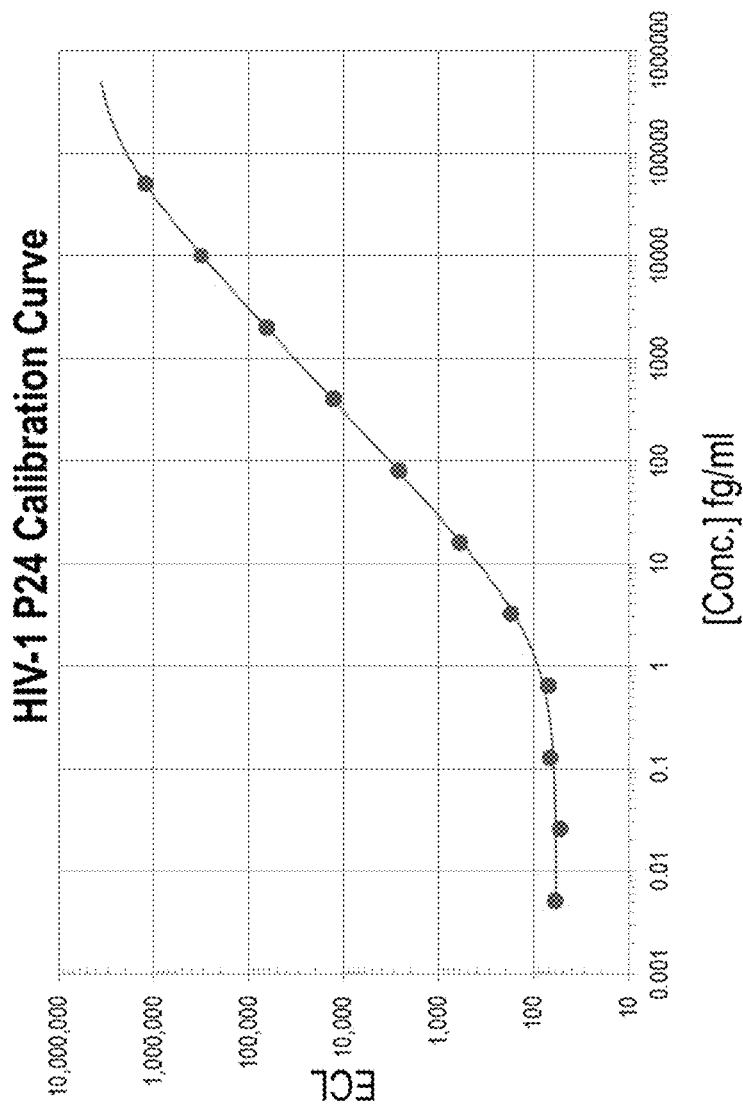
FIG. 12 shows a calibration curve for an HIV p24 assay conducted using the method described in Examples 1 and 6.

The procedure described in Example 1 was used to detect HIV-1 p24. Approximately 64 serum or plasma samples were tested from an HIV-1 mixed titer performance panel (available from Seracare Life Sciences, www.seracarecatalog.com), HIV-1 seroconversion panel (also available from Seracare Life Sciences), HIV antibody positive samples (available from ProMedDx, LLC, www.promeddx.com), and normal matched samples (available from Bioreclamation, www.bioreclamation.com). A calibration curve for an HIV-1 p24 assay conducted according to the procedure described above is shown in FIG. 12. The LOD for the assay was found to be 1.3 fg/mL, LLOQ was 3.0 fg/mL, and ULOQ was 37,500 fg/mL. A detection limit of 1.3 fg/mL for a 25 μL sample corresponds to approximately 650 p24 molecules and each virus particle (molecule) produces approximately 2000 copies of p24 protein.

The mixed titer performance panel, PRA2>4(B), consisted of a set of ten specimens with reactivity ranging from weakly to strongly positive for HIV p24 antigen by commercially available assays (bioMerieux, Perkin Elmer, and Zeptometrix). Two negative specimens were included in the panel. The results of the assays are shown in Table 6 below:

TABLE 6

| Panel member | bioMerieux HIV Ag VIDAS p24 (pg/mL) | Perkin Elmer HIV Ag p24 (s/co) | Zeptometrix HIV Ag p24 (s/co) | MSD 3AB format (pg/mL) | MSD 3AB format (ECL) |
|---|---|---|---|---|---|
| PRA204(B)-09 | >400 | >42 | 75 | >38 | 1915873 |
| PRA204(B)-10 | <3 | 1 | 0 | 0.0 | 174 |
| PRA204(B)-11 | 85 | 18 | 16 | >38 | 1674519 |
| PRA204(B)-12 | 60 | 11 | 14 | >38 | 1601078 |
| PRA204(B)-13 | 170 | 47 | 41 | >38 | 1902237 |
| PRA204(B)-15 | 192 | 45 | 36 | >38 | 1884816 |
| PRA204(B)-17 | >400 | 42 | 61 | >38 | 1897359 |
| PRA204(B)-20 | <3 | 1 | 0 | 0.0 | 150 |
| PRA204(B)-21 | 68 | 14 | 18 | >38 | 1422070 |
| PRA204(B)-22 | 17 | 3 | 1 | 10 | 347517 |
| PRA204(B)-23 | 14 | 2 | 2 | 7 | 237726 |
| PRA204(B)-24 | 15 | 3 | 3 | 9 | 306728 |

HIV p24 levels were high and above the ULOQ for most of the samples. All ten positive samples were detectable and comparable to commercially available p24 kits, while negative samples (based on commercial assays, PRA204(B)-10 and -20, respectively) were quite low at approximately 3 and 2 fg/mL, respectively.

Figure 13:
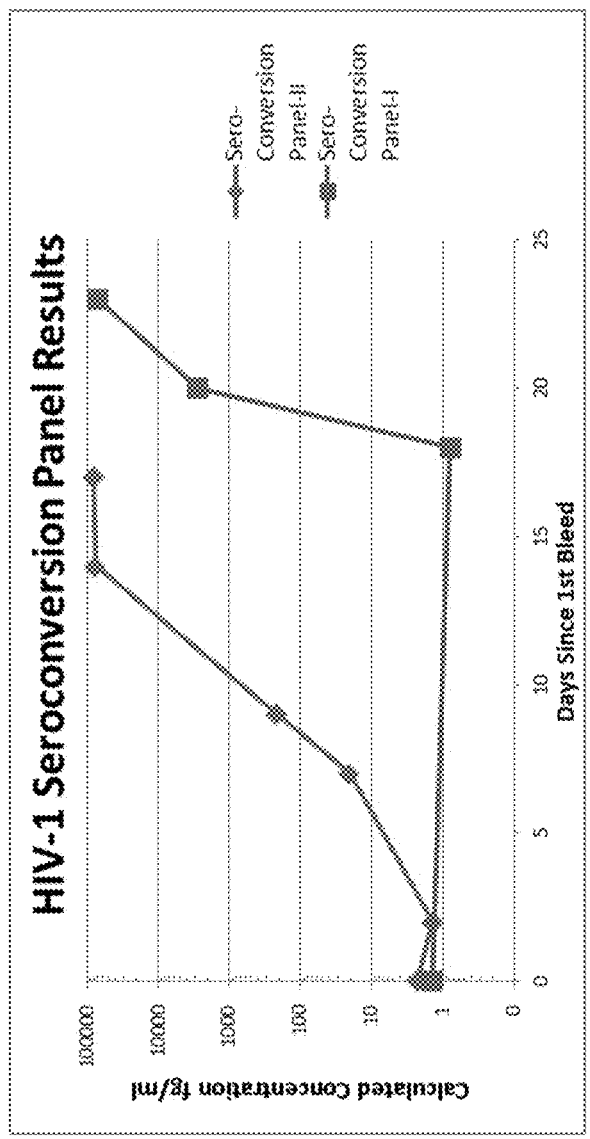
FIG. 13 shows the results of an analysis of a seroconversion panel using the method described in Examples 1 and 6.

The results for the analysis of the seroconversion panel are shown in FIG. 13. The 3-antibody assay format was found to be as sensitive as PCR and the estimated delay in the time to detect the first positive sample and the p24 levels in both samples from PRB948 and PRB962 panels compares with the PCR kit and performs better than other commercial p24 assays. The data are shown in Table 7.

TABLE 7

| Panel & member | Days since 1$^{st}$ bleed | Abbott BBI (s/co) | Coulter BBI (s/co) | DuPont BBI (s/co) | Inno. (s/co) | MSD 3AB (pg/mL) | MSD 3AB (ECL) | Roche PCR (co/mL) |
|---|---|---|---|---|---|---|---|---|
| Panel I-I, PRB948-01 | 0 | 0.4 | 0 | 0.1 | 0.4 | 0.001 | 121 | BLD |
| Panel I-I, PRB948-02 | 18 | 0.4 | 0 | 0.1 | 0.4 | 0.001 | 100 | BLD |
| Panel I-I, PRB948-01 | 20 | 0.5 | 0.2 | 0.5 | 1 | 3 | 97688 | 3 × 10$^4$ |
| Panel I-I, PRB948-01 | 23 | 5 | 23 | 15 | 31 | >38 | 1736809 | 6 × 10$^5$ |

| Panel & member | Days since 1$^{st}$ bleed | Coulter (s/co)2 | PE (s/co)2 | Roche Elecsys (s/co)2 | Zepto (s/co)2 | MSD 3AB (pg/mL) | MSD 3AB (ECL) | Roche Ultra (co/mL) | Roche standard |
|---|---|---|---|---|---|---|---|---|---|
| Panel I-II, PRB962-01 | 0 | 0.3 | 0.3 | 0.1 | 0.1 | 0.002 | 149 | <50 | NT |
| Panel I-II, PRB962-02 | 2 | 0.2 | 0.2 | 0.2 | 0.2 | 0.001 | 120 | <50 | NT |
| Panel I-II, PRB962-03 | 7 | 0.2 | 0.2 | 0.2 | 0.2 | 0.021 | 778 | NT | 7.6 × 10$^2$ |
| Panel I-II, PRB962-04 | 9 | 0.6 | 0.3 | 0.3 | 0.3 | 0.2 | 7603 | NT | 7.7 × 10$^2$ |

TABLE 7-continued

| | | | | | | | | | |
|---|---|---|---|---|---|---|---|---|---|
| Panel I-II, PRB962-05 | 14 | >40 | 30 | 23 | 10 | >38 | 1808344 | NT | 7.0 × 10³ |
| Panel I-II, PRB962-06 | 17 | >40 | >49 | 155 | 24 | >38 | 1863699 | NT | 1.2 × 10⁷ |

Abbott BBI refers to Abbott BBI HIV-1 Antigen test.
Coulter BBI refers to Coulter BBI HIV-1 Antigen test.
DuPont BBI refers to DuPont BBI HIV-1 Antigen test.
Inno. refers to Innogenetics R129 HIV-1 Antigen test.
Roche PCR refers to Roche PCR HIV RNA BBI test.
Coulter refers to Coulter ELISA HIV-1 Antigen test.
PE refers to Perkin Elmer ELISA HIV-1 Antigen test.
Zepto. refers to Zeptometrix ELISA HIV-1 Antigen test.
Roche Ultra refers to Roche Ultrasensitive HIV-1 RNA test.
Roche standard refers to the Roche standard HIV-1 RNA test.
BLD = below detection limit and NT = not tested.

CONCLUSIONS

Patients who have recently been infected with HIV contribute disproportionately to the spread of the disease. Viral loads are high in the first few weeks after infection, and newly infected patients are unlikely to be aware that they are infected and can spread the disease to others. Therefore, early detection of acute HIV infection is of great importance for public health. PCR methods are the gold standard with respect to sensitivity; they can detect as few as 60 HIV RNA copies per mL of serum or plasma (30 virus particles per mL). However, PCR technology is complex and expensive, and therefore not suitable for all settings. Immunoassays are simpler and cheaper, but the detection limit of current, 4$^{th}$ generation p24 immunoassays is only about 10 pg/mL, or approximately 250 million capsid proteins per mL. On a per virus basis, these immunoassays are several thousand times less sensitive than PCR testing, despite the fact that there are about 2,000 p24 capsid proteins per virus.

As described herein, a next-generation electrochemiluminescence assay format based on MSD's MULTI-ARRAY® technology was developed and its performance characterized. The detection limit for this novel p24 immunoassay was approximately 1 fg/mL, 10,000 fold more sensitive than current p24 immunoassays. A sensitivity of 1 fg/mL corresponds to less than 1 virus particle in our sample volume of 25 μL. The lower and upper limits of quantitation were 3 fg/mL and 38,000 fg/mL, respectively. Within-plate CV was 7%, and total CV 15%. Spike recovery and dilution linearity were between 80% and 120%. p24 was undetectable in the serum or plasma of 32 apparently healthy donors. The p24 mixed titer panel showed good correlation between 3-AB HIVp24 assays and commercial p24 immunoassays. Two seroconversion panels were tested: SeraCare PRB948 (days 0 and 18, PCR negative; days 22 and 23, PCR positive) and PRB962 (days 0 and 2, PCR negative; days 7, 9, 14, and 17, PCR positive). In both cases, the 3AB HIVp24 assay result was negative for all PCR-negative samples and positive for all PCR-positive samples, and infection was detected well before conventional p24 immunoassays.

In conclusion, the 3-AB HIVp24 immunoassay described herein is 10,000 times more sensitive than the current limits of p24 ELISAs and comparable in sensitivity to PCR assays. The assay does not require specialized equipment and can be run on the MESO QUICKPLEX SQ 120, and SECTOR® Imagers.

Example 7. Concentration of Analyte, Followed by 3-AB RCA/PLA Assay (a) The conditions of the experiment are shown in Table 8(a), below:

TABLE 8(a)

| Reagent | Type | Amount | Binding Conditions |
|---|---|---|---|
| Reagents | | | |
| Magnetic beads | DYNABEADS® MYONE™ Streptavidin T1 | 0.25 mg | NA |
| Capture oligonucleotide | PP1 complement | 100 pmol | Diluent 100 (1 hr) |
| Proximity Probe (PP)-analyte detection antibody | PP1-detection antibody specific for HIVp24 | 6.7 pmol | (1) 1M NaCl (40 min.) (2) 0.5M NaCl (40 min.) |
| Antigen | HIVp24 | 7 pg/ml | (1) 1M NaCl (overnight) (2) 0.5M NaCl (overnight) |
| Control | Beads w/o capture, including PP1 and antigen | .25 mg | Same binding conditions as testing samples, without release step |
| Release Conditions | | | |
| PP/Antigen complex | PP1/HIVp24 | 0 salt | 25 C. 30 C. 37 C. |
| | | 10 mM salt | 25 C. 30 C. 37 C. |

For the capture of relatively short oligonucleotide proximity probe sequences (e.g., from 9-13 nucleotides long), capture oligonucleotides complementary to a portion of proximity probe sequences were prepared and biotinylated at the 3' end. Table 8(b) shows the details of the proximity probe and capture oligonucleotide sequences:

TABLE 8(b)

| PP1 sequence | /5ThioMC6-D/AAAAAAAAAAGACGCTAATAGTTAAGACGCTTmUmUmU (SEQ ID NO.: 23) | | |
|---|---|---|---|
| Capture oligo | Sequence Name | Sequence Length | Sequence (5'-3') 5'/Poly A (20 spacer Biotin/ |
| Capture oligo 1 | Cap-1:16 | 16 | Aagcgtcttaactatt (SEQ ID NO.: 24) |
| Capture oligo 2 | Cap-1:13 | 13 | Aagcgtcttaact (SEQ ID NO.: 25) |
| Capture oligo 3 | Cap-1:12 | 12 | Aagcgtcttaac (SEQ ID NO.: 26) |
| Capture oligo 4 | Cap-1:11 | 11 | Aagcgtcttaa (SEQ ID NO.: 27) |
| Capture oligo 5 | Cap-1:10 | 10 | Aagcgtctta (SEQ ID NO.: 28) |
| Capture oligo 6 | Cap-1:9 | 9 | Aagcgtctt (SEQ ID NO.: 29) |
| Capture oligo 7 | Cap-1:8 | 8 | Aagcgtct (SEQ ID NO.: 30) |

The calculated melting temperatures are shown in Table 8(c):

| | Tm | | | |
|---|---|---|---|---|
| PP1 [C.], nM | 10 | 10 | 10 | 10 |
| Cap [C.], nM | 10 | 10 | 10 | 100 |
| Salt, mM | 1200 | 500 | 40 | 40 |
| Cap1-16 | 57 | 51 | 37 | 43 |
| Cap1-13 | 51 | 46 | 33 | 39 |
| Cap1-12 | 46 | 42 | 28 | 35 |
| Cap1-11 | 36 | 32 | 19 | 26 |
| Cap1-10 | 34 | 29 | 16 | 24 |
| Cap1-9 | 34 | 30 | 18 | 26 |
| Cap1-8 | 26 | 22 | 9 | 19 |

Beads modified with capture oligonucleotides were prepared as follows: fifty (50) μL of DYNAL MYONE Streptavidin T1 bead slurry were added after vortexing to five 1.5 mL Eppendorf tubes, each having twice the amount required for division across two binding condition experiments. The beads were washed three times with 1 ml Diluent 100 (available from Meso Scale Discovery, Rockville, MD) and 1.2 mL of each capture oligonucleotide was added to each vial at 200 pmol/ml of each capture oligonucleotide in Diluent 100 including EDTA. The solutions were incubated by rotating for 1 hour at room temperature and the solution in each tube was spiked with free biotin to 5 nmol/mL in Diluent 100 including EDTA. The solutions were incubated by rotating for 15 minutes at room temperature and the beads were washed three times with 1 mL of 0.5M NaCl/BSA solution. The tubes were filled with 1 mL 0.5 M NaCl/BSA, mixed, and each capture oligonucleotide-bead mixture was aliquoted into 2 vials, for a total of 10 vials.

Solution was aspirated from all vials and 1 mL PP1(PP1 sequence bound to a detection antibody specific for HIVp24) at 1 ug/mL (6.7 pmol/mL) in 0.5 M and 1 M NaCl/BSA was added to each capture tube. The solutions were incubated for 40 minutes with rotation at room temperature. Each tube was washed three times with a salt solution (controls that do not include capture oligonucleotides were not washed). To four tubes, 1 mL HIVp24 was added at 7 pg/mL, while antigen was spiked from a stock solution into the no capture control tube. The solutions were incubated with rotation at 4 C overnight and each tube with capture oligonucleotide was washed three times with salt solution (1 mL each). Each tube was filled ⅓ with wash buffer (0.1λ PBS, 500 mM NaCl, 1 mM EDTA, 0.1% Triton X-100, 2 mg/mL BSA), mixed, and an aliquot of 400 μL of beads was added into two vials for 2 release salt conditions for a total of 18 tubes. The wash buffer was removed from all vials except the no capture control tubes, and 400 μL 0.0M and 10 mM salt buffer was added to the tubes. The contents of the tubes were mixed and an aliquot of 100 μL from each tube (including control beans without capture) was added to three matrix plates for analysis of three temperature release conditions. The plates were incubated at 25 C, 30 C, and 37 C, respectively, in a thermoshaker with mixing for 5 minutes. The beads were magnetically separated and 25 μL of supernatant was added to a well of an assay plate spiked with 5 μL 6× PBS, including mIgG (three replicates per condition). The plate was incubated 1 hour at room temperature with shaking and washed three times in PBS buffer. As described in Example 1, each binding domain on the plate included a capture antibody and an anchoring moiety, and following the incubation step, a complex is formed at each binding domain that included a capture antibody bound to the antigen, which is bound to a detection antibody having a PP1 sequence (except for control binding domains).

A solution of detection antibodies labeled with PP2 (or PP1+PP2 for controls) was added to each well (25 μL per well), and incubated with shaking for 1 hour, followed by a wash. As described in Example 1, ligation mix was added to each well and the plate was incubated with the ligation mix for 30 minutes at room temperature, washed to remove excess circularization oligonucleotides, and incubated with RCA mixture for 1.5 hour at 37 C. The plate was washed and a mixture of detection probes were added and incubated for 30 minutes at 37 C. The plate was washed and filled with 150 μl MSD read buffer and read immediately on an MSD SECTOR Reader.

The results of this experiment are shown in FIG. 14.

(b) An additional experiment was conducted to further evaluate analyte concentration conditions. The general experimental conditions are described in Table 9(a):

| Capture-Release with PP1 beads | | | |
|---|---|---|---|
| Buffer | Volume | Time, temperature | Concentration factor |
| Liquid Phase Binding | | | |
| Diluent 2 (available from Meso Scale Discovery, Rockville, MD) | 5 mL | Overnight, 4 C. | NA |
| Release | | | |
| 0 salt solution (1 mM EDTA, 2 mg/mL BSA) | 100 μL | 6 minutes, 25 C. | 50X |
| Control conditions | | | |
| No beads, no capture-release, antigen + PP1 Capture-release with beads, no concentration step Assay plate binding (solid phase conditions) | | | |
| 1X PBS | 3 μL 10X PBS/mIgG + 30 uL sample | 1.5 h, room temperature | NA |

Fifty (50) μL of DYNAL MYONE Streptavidin T1 bead slurry were added after vortexing to a microcentrifuge tube. The beads were washed three times with 1 ml Diluent 100 and 1 mL of capture oligonucleotide Cap 1:9 was added Diluent 100 including EDTA. The solution was incubated by rotating for 1 hour at room temperature and the solution was spiked with free biotin to 10× excess in Diluent 100 including EDTA. The solution was incubated by rotating for 30 minutes at room temperature and the beads were washed three times with 1 mL of wash buffer. One (1.0) mL PP1 in binding buffer was added and the solution was incubated for 40 minutes with rotation at room temperature. The tube was washed three times with a wash buffer and 1 mL Diluent 2 was added to the beads, mixed, and the bead solution was divided across 12 tubes for 1×, 0.5×, 0.25×, and 0.125× bead-PP1 concentration at antigen levels 2-4. The required volume of bead-PP was transferred to a control tube. HIVp24 and Diluent 2 were added to bead solutions for required final concentrations of antigen and bead-PP at a total volume of 5 mL. No bead control tubes were spiked to include free PP1 at 1× concentration only and all 4 levels of antigen. The tubes were incubated with rotating at 4 C overnight, and 5 mL bead solutions were transferred to 1.5 mL Eppendorf tubes by transferring 1 mL at a time. Each tube was washed with wash buffer (three times). Control tubes without beads were not washed. After the third wash, 100 μL of 0 salt solution was added to test tubes, and 500 μL of 0 salt solution to control tubes, and the tubes were incubated at 25 C for 6 minutes. Supernatant was transferred to an assay plate and analyzed as in Example 7(a). The results are shown in Table 9(b)-(c):

TABLE 9(b)

| Sample # | [C.], fg/ml | Cap-Release on beads | | No beads | Signal increase, X |
|---|---|---|---|---|---|
| | | Non-[C.]ed | 50 × [C.]-ed | Cntrl | |
| 1 | 120 | 3,764 | | 3,687 | |
| 2 | 12 | | 15,314 | 369 | 41.5 |
| 3 | 1.2 | | 1,941 | 71 | NA |
| 4 | 0.12 | | 280 | 32 | NA |
| Zero | | | | 32 | |

TABLE 9(c)

| Ag [C.], fg/ml | ~virion number/ml | ~p24 #/ml | ~p24 # in 30 μL |
|---|---|---|---|
| 120 | 1000 | 3,000,000 | 90,000 |
| 12 | 100 | 300,000 | 9,000 |
| 1.2 | 10 | 30,000 | 900 |
| 0.12 | 1 | 3000 | 90 |

Figure 15:
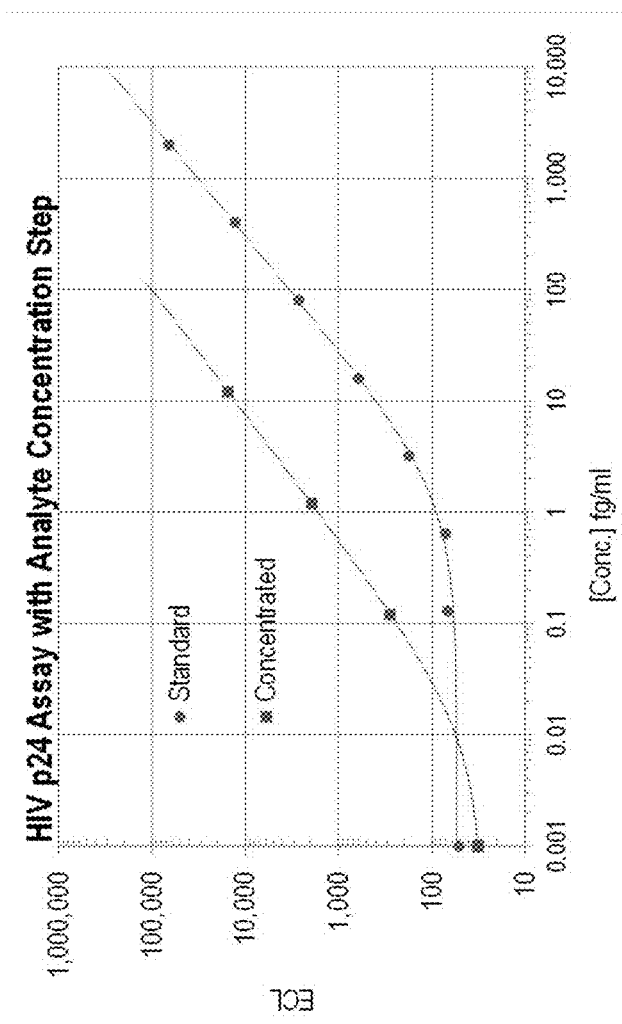
FIG. 15 shows a calibration curve for an HIVp24 assay including an analyte concentration step.

An increase in signal of approximately fifty fold was observed after analyte concentration with magnetic beads. Non-concentrated sample #1 showed results similar to Control #1 signals, which indicated release of PP-Antigen complex with the highest efficiency. Using analyte preconcentration, detection of less than 0.1 fg/mL was achieved, which is comparable to 1 virion/mL viral load. In contrast, commercial viral assays can reasonably detect approximately 50 copies/mL, which is equivalent to 25 virion/mL. A calibration curve with and without preconcentration for this experiment is shown in FIG. 15.

Example 8. 3-AB RCA/PLA Bead-Based Assay Using Bead Settling Protocol

A 3-AB RCA/PLA assay for IL-4 was conducted as described in Example 7, except that silica beads were used instead of DYNABEADS. RCA and detection incubations were performed in MSD large spot multi-well assay plates (available from Meso Scale Discovery, Rockville, MD), stationary at 37° C. The beads did not include an anchoring reagent. Beads were allowed to settle slowly during the RCA incubation step by gravity onto the surface of a well, with an approximate settling time of 5-8 minutes, depending on the solution volume. The plates were washed by spinning the plates in a swinging bucket centrifuge. Preliminary testing indicated that the beads were uniformly dispersed after spinning with only a slight gradient across the well surface.

The protocol was tested with 15 vs. 90 minute RCA incubations. It was found that the sensitivity and dynamic range of the assay were improved approximately 10-fold with a 15 minute RCA incubation using the bead settling protocol compared to magnetic capture. Sensitivity was further improved with a 90 minute RCA incubation step (up to approximately 50-100 fold).

Alternatively, a 3-AB RCA/PLA assay is performed as described herein, in which the bead includes anchoring reagent and a blocking agent (approximately 2.5 mg/ml) is added during the ligation step to decrease non-specific binding. A variety of blocking agents can be used, including but not limited to, mBSA, sheared poly(A), polyBSA-I, mIgG, Tween, polyBSA-II, yeast RNA, mBSA+poly(a), and/or polyBSA+poly(A).

Example 9. Modified Bridging Immunoassay Format

Figure 19:
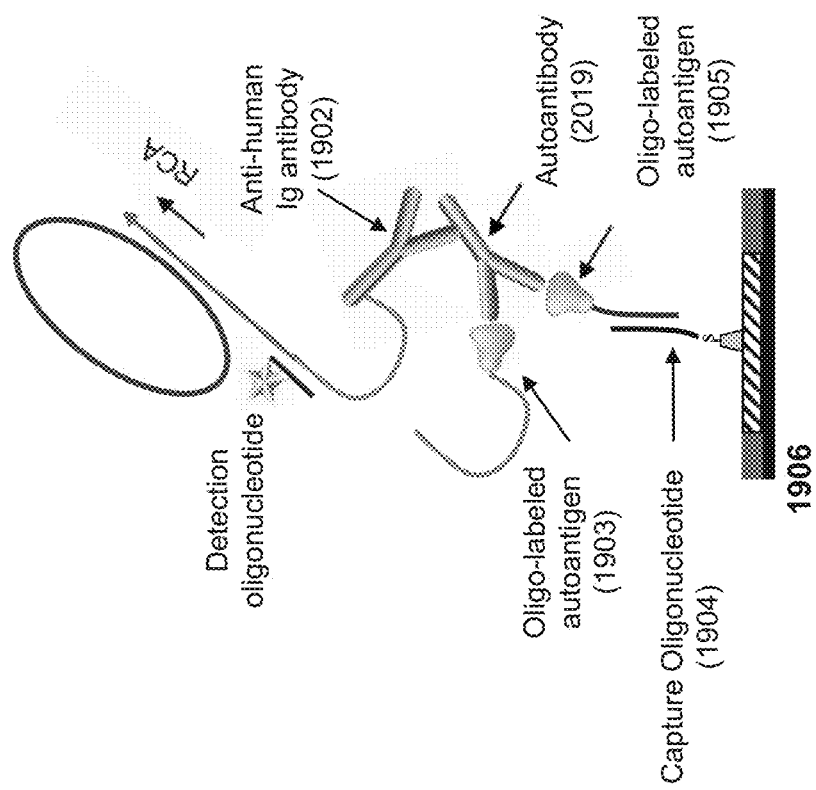
FIG. 19 is a schematic representation of a bridging immunoassay format incorporating 3AB PLA-RCA technique and the use of a targeting moiety and its complement to bind the capture reagent to the surface.

As stated above, the procedure described in Example 1 was used in bridging and isotyping Ig assays using TNFalpha model system, bridging and isotyping Ig assays using Hep B surface antigen, and bridging and isotyping Ig assays using Lyme C6. A modification to this procedure is shown in FIG. 19 in which an autoantibody (1901) was detected using (i) a PP2-modified anti-human Ig antibody (1902), and (ii) a PP1-labeled autoantigen (1903), followed by PLA-RCA as described in Example 1. The format shown in FIG. 19 also shows the use of a targeting moiety (1904) and its complement bound to autoantigen (1905) as a means of adhering a capture moiety, in this case, autoantigen, to the surface (1906).

Likewise, an immunoassay for an antibody, e.g., an autoantibody, can be conducted as described in Example 1 wherein antigen for that antibody is used as the capture moiety (directly attached to the surface or via a targeting moiety and its complement), and the two detection species are an isotype antibody attached to PP1, and antigen attached to PP2 (or vice versa). The sandwich complex is formed, followed by PLA-RCA as described in Example 1. These modified assay formats can also include an anchor moiety to adhere the amplicon to the surface.

Example 10. Biosynthetic Method for the Generation of Proximity Ligation Rolling Circle Templates Proximity ligation rolling circle templates can be generated biosynthetically. This method makes use of an initially highly purified and well-characterized template to generate an RCA product in an efficient solution-based ligation and RCA reaction series. This process can also be done on beads to enhance the selectivity of the reactions.

Figure 20A:
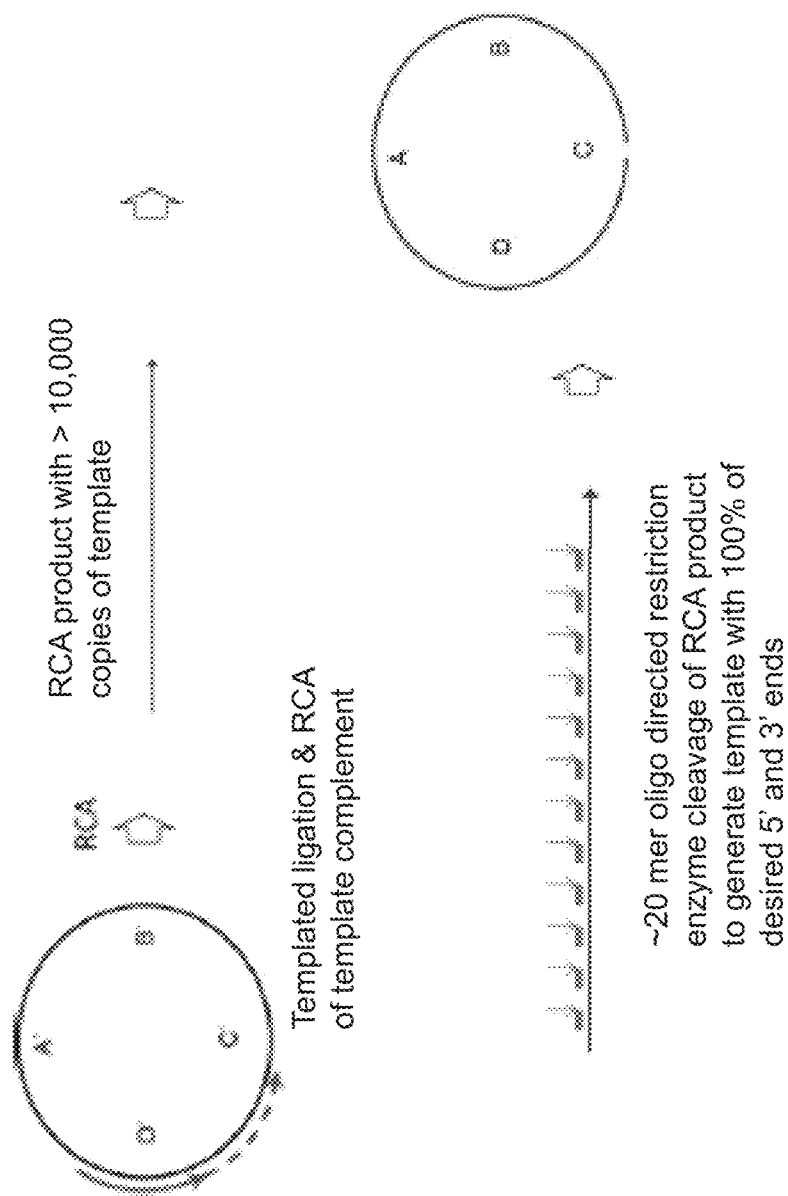
FIGS. 20(a)-(b) are schematic representations of biosynthetic methods for template formation.
Figure 20B:
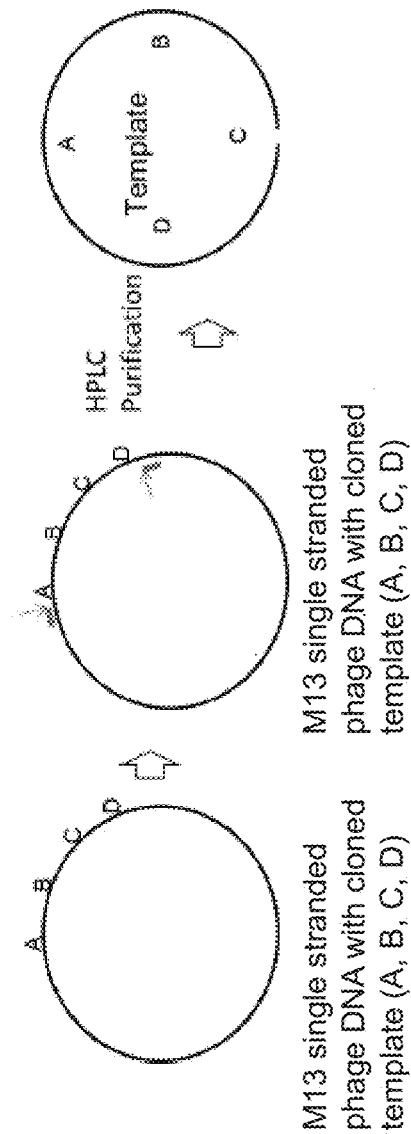

Following the amplification of the seed RCA template, the single stranded product is subjected to site specific cleavage using a unique restriction enzyme in combination with a short synthetic sequence. Therefore, the RCA template is generated from its own product. The biosynthetically generated RCA template is subjected to HPLC or gel purification to generate a product that contains 100% of the correct 5' and 3' termini. This method is illustrated in FIG. 20(*a*). This approach requires the addition of a restriction site into the RCA template to direct cleavage at the desired ligation site. Restriction enzymes such as those cutting approximately 14-20 bases away from the restriction site, are preferable. Alternatively the single stranded template can also be generated in milligram amounts using this approach in combination with single stranded DNA from M13 phage, or similar. This approach can obviate the need to carry out an RCA-based amplification of the RCA template, only requiring the cloning of the template into an M13 vector for DNA production. This is illustrated in FIG. 20(*b*).

Example 11. Sample Multiplexing

The methods described herein are used to multiplex samples based on the use of spectral signatures. Multiplexing samples offers the user the ability to do internal calibration and control, reduce costs and increase throughput. The ability to multiplex analytes through the use of unique signatures based spatial and spectral signatures, coded to that analyte can also be used to multiplex samples.

Figure 21:
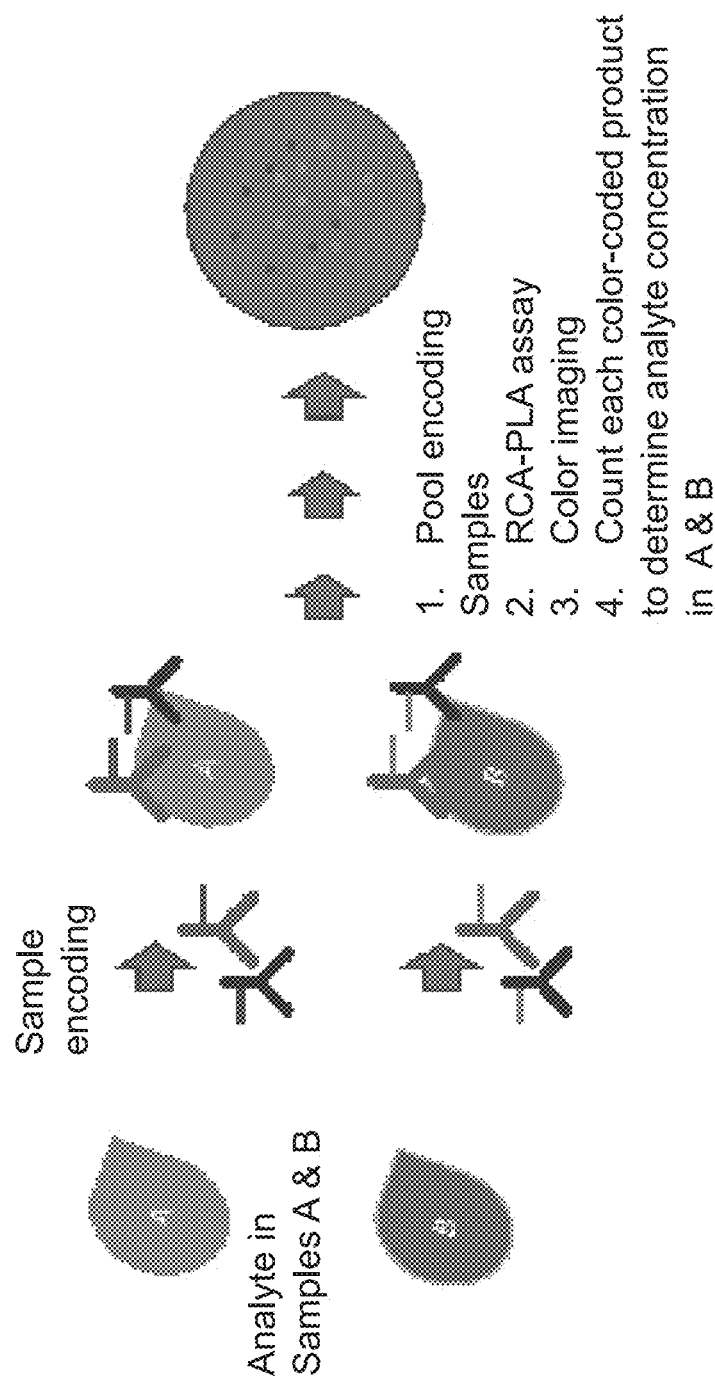
FIG. 21 is a schematic representation of sample multiplexing.

Samples are multiplexed using a fluorescent dye ratio coding of imaged amplified products. For each analyte in a sample, a set of unique assay reagents able to produce unique rolling circle products are employed, each detectable with a unique detection oligonucleotide. The synthesis and use of a set of unique assay reagents can be done according to the procedure described, e.g., in Example 1. As illustrated in FIG. 21, each sample, A and B, containing analyte of interest is incubated with the two detection antibodies specific for that analyte, each bearing a unique proximity probe. This incubation step links a set of unique proximity probes with the analyte in that sample, thereby forming a two antibody complex with the analyte and "encoding" the samples. Following this incubation, the encoding samples are pooled, added as a mixture to a single capture antibody surface, incubated and washed.

Following the wash step, the captured three antibody complexes, the linear rolling circle templates for each set of proximity probes are added, and the mixture is subjected to hybridization conditions as described in Example 1. This mixture is ligated to generate the rolling circle template, washed, subjected to rolling circle amplification, and washed. Each rolling circle amplicon is hybridized to a complementary and unique detection oligonucleotide, encoded with a unique spectral signature based on the ratio(s) of 2 or more fluorescent labels. Following the hybridization of the detection probes, the assay surface is imaged and each rolling circle product is decoded based on its spectral signature, e.g., the ratio(s) of the 2 or more fluorescent labels, and counted. This allows for the determination of analyte levels in multiple samples. Using this approach, a user can combine sample and analyte multiplexing, allowing multiple analytes to be tested in test and control samples simultaneously.

Example 12. Detection of Lipoprotein Complexes

The methods described herein are used to detect and quantify sets of protein complexes present in lipoprotein complexes, e.g., HDL and LDL. For example, using the method described in Example 1, three differing proteins and/or epitopes are detected within a lipoprotein complex, and therefore, a profile of the proteins within a patient's lipoproteins can be analyzed.

In humans blood lipoproteins are classified into 5-major groups, HDL, LDL, IDL, VLDL and chylomicrons. Of these, the HDL and LDL fractions have received the most clinical interest, as risk markers of cardiovascular health. These key lipoproteins are composed of complexes of multiple proteins and lipids. The proteins associated with these lipoproteins consist of proteins integral to their function and passenger proteins. These lipoproteins may also be subjected to modifications, such as oxidation, that modify the risk profile of an individual. For example, higher levels of oxidized HDL and LDL are associated with an increased risk of adverse cardiovascular events. LDL is typically composed of two core proteins Apo(a) and ApoB, and lipids. Elevated Apo(a) is associated with increased risk of heart disease; in addition, variations in the length of the Apo(a) protein are also associated with altered risk profiles. Apo(a) proteins vary in size due to a size polymorphism, which is caused by a variable number of so-called kringle repeats in the LPA gene. ApoB in the LDL particle carries the ligand for the LDL receptors in various tissues. High levels of ApoB are also associated with plaque formation, leading to cardiovascular disease. HDL is typically composed of a set of core proteins including; ApoA1, ApoE, ApoC and ApoA-II. In addition to these core proteins, HDL is also known to be associated with additional proteins that also have clinical value. For example, HDL associated SAA and SP-B have been demonstrated to be associated with cardiac events and mortality. Variations in HDL composition, through elevated ApoA-II, have also been linked to atherogenic risk.

Figure 22:
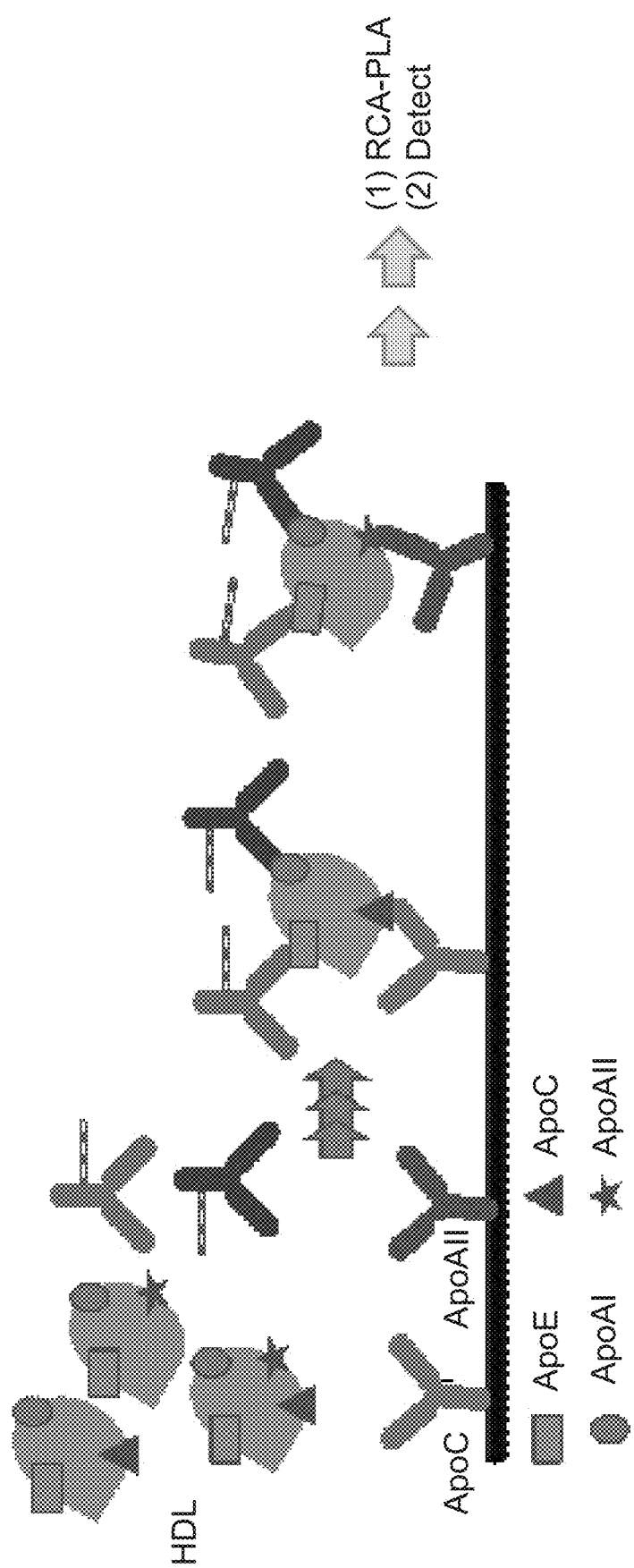
FIG. 22 is a schematic representation of the detection of lipoprotein complexes using the methods described herein.

Following the procedure described in Example 1, a multiplexed proximity assay for lipoprotein complexes is conducted as outlined in FIG. 22. FIG. 22 illustrates the detection of HDL lipoprotein complexes, wherein capture antibodies specific for each of the core proteins are immobilized to a surface to bind the lipoprotein complex to the surface. Detection antibodies specific for the additional core proteins are added, each bearing a proximity probe. The assay is completed as described in Example 1.

Example 13. Simplified Protocol for Forming Antibody-Oligonucleotide Conjugates

An antibody solution was prepared containing 2 mg/mL of antibody in phosphate buffer saline, pH 7.4+1 mM EDTA (PBS/EDTA). If the antibody provided was in an incompatible solution, such as containing components that interfere with NHS ester or maleimide reactions, the antibody was first buffer-exchanged into PBS/EDTA using a Zeba 40 gel filtration spin column or a 10 kD cutoff AMICON centrifugal ultrafiltration device and then diluted to 2 mg/mL.

The antibody was then reacted with (i) a heterobifunctional cross-linker having NHS ester and maleimide moieties (compound of Formula V, where r=4 (compound 1)) and (ii) a single stranded DNA oligonucleotide (oligonucleotide sequence=5'-GACAGAACTAGACAC-3' (SEQ ID NO: 33)) modified with a 5' terminal thiol (compound of Formula IIIA (compound 2)) to form a conjugate of the antibody and the oligonucleotide.

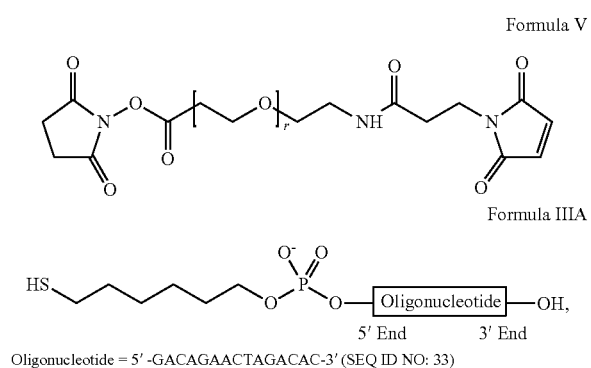

Formula V

Formula IIIA

Oligonucleotide = 5'-GACAGAACTAGACAC-3' (SEQ ID NO: 33)

The reaction was carried out by adding an appropriate volume of the cross-linking agent (as a 1.5 mM solution in DMSO) to the antibody solution to achieve a challenge ratio of cross-linker ($CR_{xl}$) equal to 6, where $CR_{xl}$ is defined as the ratio of the number of added cross-linker molecules to the number of antibody molecules. The resulting solution was mixed and then incubated at 23° C. for a cross-linker incubation time ($T_{xl}$) equal to 1 hour. An appropriate volume of the thiol-modified oligonucleotide (as a 2 mg/mL solution in PBS/EDTA) was then added to achieve a challenge ratio of oligonucleotide ($CR_{on}$) equal to 9, where $CR_{on}$ is defined as the ratio of the number of added oligonucleotide molecules to the number of antibody molecules. The resulting solution was mixed and then incubated at 23° C. for an oligonucleotide incubation time ($T_{xl}$) equal to one hour. Under this protocol, there was a 1.5-fold molar excess of oligonucleotide relative to cross-linking agent. These conditions should produce a conjugate with an average number of oligonucleotides per antibody around 3 to 4. Note: the amount of cross-linker molecules could be adjusted up (e.g., $CR_{xl}$=8 or 10), or lower (e.g., $CR_{xl}$=3 or 4) to generate product with higher or lower average numbers of conjugated oligonucleotides per antibody; in these cases, the $CR_{on}$ would be adjusted to maintain a 1.5-fold excess relative to the cross-linker.

For reaction having between 100 pg and 500 pg of antibody, the final reaction mixtures were loaded onto a 2 mL (±0.1 mL) column of Sephadex G100 Superfine gel filtration resin (pre-equilibrated in a collection buffer consisting of PBS/EDTA plus 0.05% sodium azide) by adding it to the top of the column and allowing it to pass into the column. An additional stacking volume of collection buffer was then loaded onto the column such that the total volume (reaction solution plus stacking volume) loaded on the column was 0.65 mL. A collection tube was then placed under the column outlet, an additional elution volume of collection buffer was loaded and the resulting eluent containing the antibody-oligonucleotide conjugate was collected. The elution volume was set at 100 μL per 100 pg of antibody plus 200 μL, up to a maximum of 500 μL (alternatively, the maximum elution volume of 500 μL could be used across the reaction scales, with a cost of additional dilution of the conjugate at the lower scales). The table below lists the volumes of reactants and collection buffer aliquots at three different reaction scales. Reaction scales containing more than 500 μg of antibody can be achieved by using a larger column and scaling the volumes appropriately.

| Ab Wt. (μg) | Reaction Volumes (μL) | | | | Collection Buffer Volumes (μL) | |
|---|---|---|---|---|---|---|
| | Ab | X-Linker | Oligo | Total | Stacking | Elution |
| 100 | 50 | 4.4 | 20 | 74 | 576 | 300 |
| 200 | 100 | 9 | 40 | 149 | 501 | 400 |
| 500 | 250 | 22 | 98 | 370 | 280 | 500 |

Example 14. Simplified Protocol for Measuring Extent of Olignucleotide Incorporation into Antibody-Olignucleotide Conjugates The concentrations of protein in solutions of an antibody-oligonucleotide conjugate were measured using standard protein measurement assays, in particular, the bicinchoninic acid (BCA) assay (available in kit format from ThermoFisher Scientific). The conjugate was then diluted in collection buffer (see Example 13) to give a protein concentration of 100 μg/mL.

The concentration of oligonucleotide in the diluted conjugate was measured by binding the oligonucleotide to SYBR-Green I, a DNA-sensitive fluorescent dye.

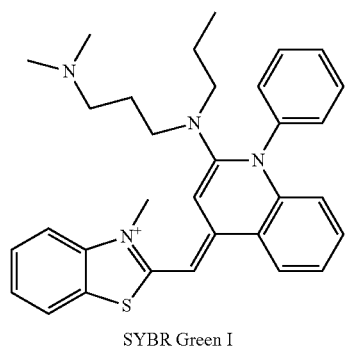 [SMILES: CCCN(CCCN(C)C)C1=C/C(=C\c2sc3ccccc3[n+]2C)c2ccccc2N1c1ccccc1]

SYBR Green I

A 1000× stock solution of SYBR Green I was prepared in DMSO at a concentration that provided an optical absorbance of about 0.8 to 1.0 with 370 nm light. A 1×SYBR Green I reagent was prepared by diluting the 1000× solution 1000-fold into PBS. A 10 µL volume of the conjugate was added to 200 µL of the 1× solution of SYBR-Green I. The mixture was incubated at room temperature for 5 minutes and then the fluorescence of the mixture was measured using a fluorescence plate reader using an excitation wavelength of 485 nm and an emission wavelength of 528 nm. A quantitative concentration value was determined by comparison to a calibration curve generated by testing serial dilutions of the free oligonucleotide used to generate the conjugate (using the compound of Formula IIIA from Example 13 as the calibration standard). Dividing the molar concentration of oligonucleotide by the molar concentration of antibody provides the number of oligonucleotides per antibody.

Alternatively, a more qualitative assessment of conjugation level can be used. For example, a single concentration of the compound of Formula IIIA (a low control sample) could be tested at a level equal to the minimum acceptable concentration of oligonucleotide in the conjugate (e.g., for some applications, a threshold concentration may be set that is indicative of an average number of oligonucleotides per protein greater than or equal to 2): in this case a simple comparison of the fluorescence signal of the conjugate sample to the fluorescence of the low control can be used to determine if the conjugate has an acceptable level of labeling (fluorescence of conjugate≥fluorescence of low control) or not (fluorescence of conjugate<fluorescence of low control). Similarly another standard prepared from a compound of Formula IIIA (a high control sample) having a level above the maximum expected concentration of oligonucleotide in the conjugate could also be tested (e.g., for some applications, a threshold concentration may be set that is indicative of an average number of oligonucleotides per protein less than or equal to 6); in this case a comparison of the fluorescence signal of the conjugate to the fluorescence signal can be used to determine if the conjugate was over-labeled or if the purification step did not adequately remove unconjugated oligonucleotide (fluorescence of conjugate>fluorescence of high control).

Figures 23A, 23B:
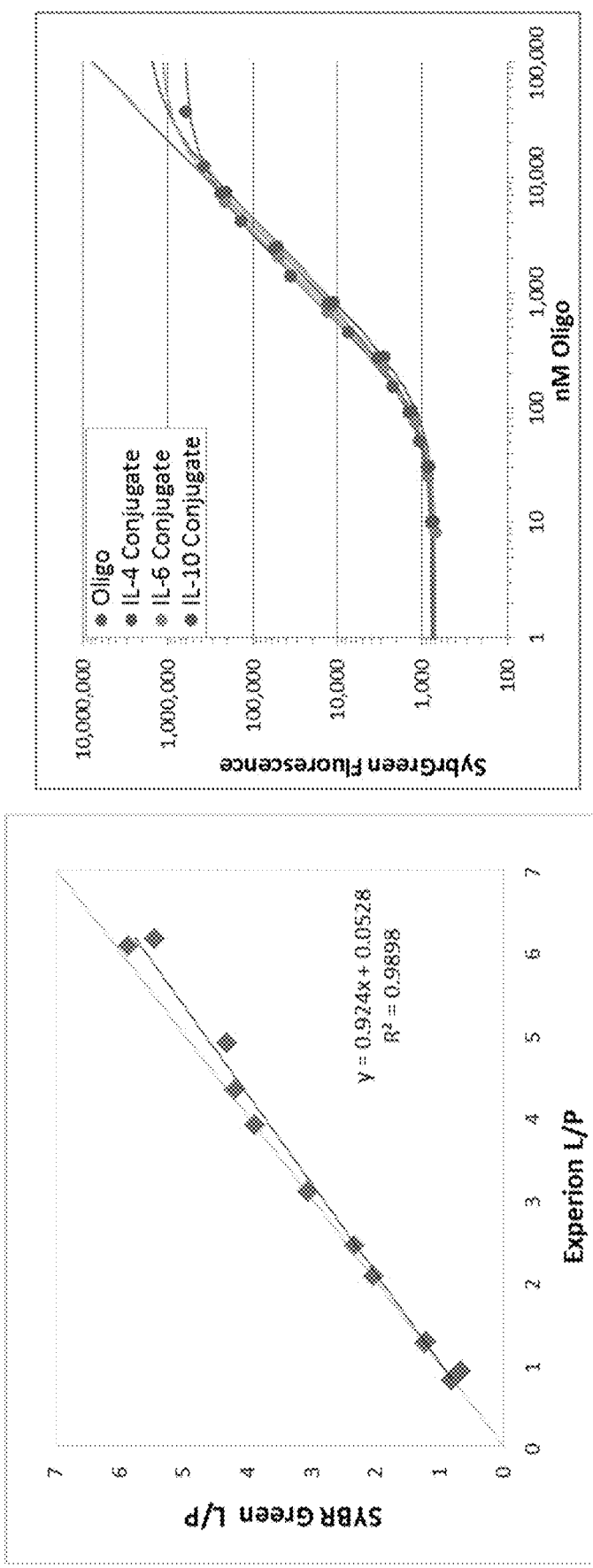
FIG. 23 shows (a) a comparison of the average label per protein (L/P) ratios for antibody-oligonucleotide conjugates measured by a fluorescence dye method and by gel electrophoresis and (b) the signals measured by the fluorescence dye method as a function of oligonucleotide concentration for free oligonucleotide and oligonucleotide in antibody-oligonucleotide conjugates.

For a set of antibody-oligonucleotide conjugates prepared as in Example 14, but using varying levels of cross-linker to vary the ratio of bound oligonucleotides per antibody molecule, FIG. 23a shows that the labeling ratio determined by the fluorescence method correlates well with the labeling ratio determined based on the average molecular weight (as measured by gel electrophoresis using an EXPERION instrument). FIG. 23b compares the fluorescence assay signal for free oligonucleotide and antibody-oligonucleotide complexes formed from three different antibodies, as a function of the concentration of oligonucleotide in the preparation (determined, in the case of the conjugates, by gel electrophoresis using an EXPERION instrument). The figure shows that fluorescence was not affected by conjugation or by antibody-to-antibody differences.

Example 15. Synthesis of Labeled Detection Probes

A series of oligonucleotides presenting one or more primary alkylamino groups (compounds numbered 4 to 7 below) were synthesized by solid phase synthesis and labeled at the alkylamino groups with MSD SULFO-TAG NHS Ester (Meso Scale Diagnostics) to generate oligonucleotides labeled with one or more SULFO-TAG (STAG) labels (compounds numbered 9 to 12 below). These tested oligonucleotides included oligonucleotides where labeling sites were introduced in the oligonucleotide sequence through the use of modified thymidines (compounds numbered 5 and 10 below) and oligonucleotides where all the modification sites were external to the oligonucleotide sequence (compounds numbered 4, 6, 7, 9, 11 and 12 below) (SEQ ID NOS: 31, 31, and 31 disclosed below).

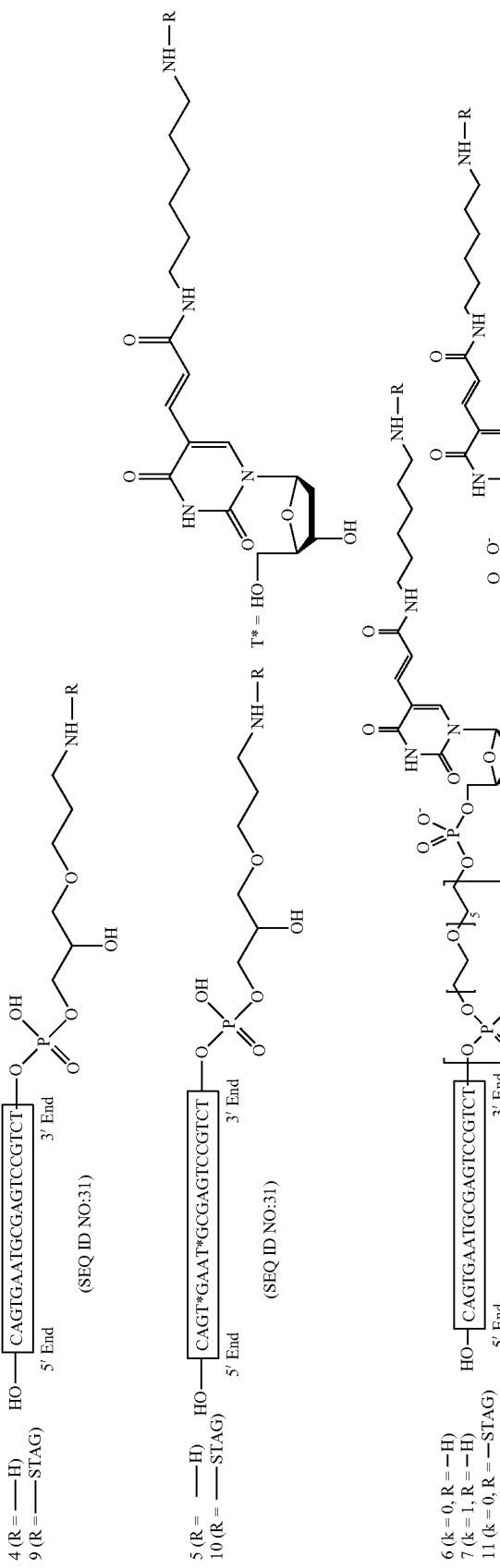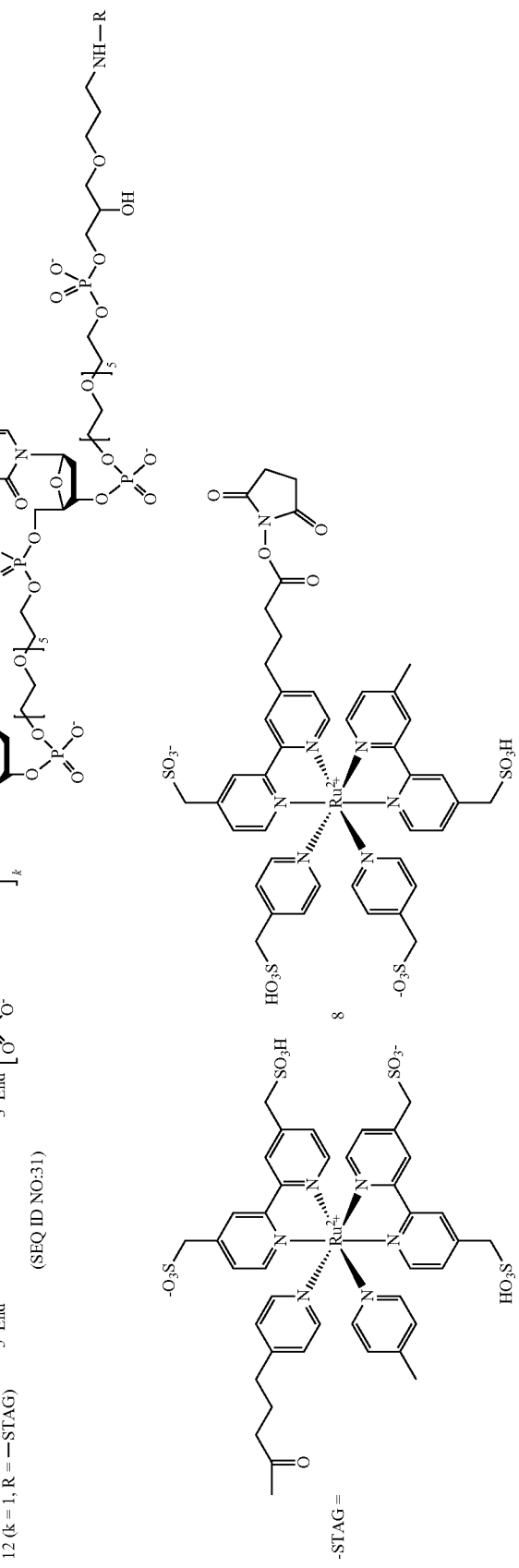

The labeling reactions were run in a phosphate buffer at pH 8 using a roughly 13-fold excess of the NHS ester, relative to the number of alkylamino groups, to drive labeling of all of these groups. The labeled products were purified by ion exchange chromatography on a cationic resin using a salt gradient at pH 8. The fully labeled products came out as single peaks near the end of the gradient.

Example 16. A Protocol for Two Antibody Amplified Sandwich Immunoassays

Assays were run in MSD MULTI-ARRAY multi-well plates that include integrated carbon ink electrodes on the bottom of each well. The electrodes act as solid phase supports for capture reagents in solid phase binding assays, as well as the source of electrochemical energy for generating ECL from ECL labels present in binding complexes on the electrodes. The specific MULTI-ARRAY plates used in the procedure were MSD GOLD 96 Small Spot SA Plates, which are provided with an immobilized layer of streptavidin on the working electrode in each well. The capture antibodies were biotin-labeled using a biotin NHS ester reagent (EZ-Link Sulfo-NHS-Biotin, ThermoFisher Scientific) according to conventional procedures. Conjugates of the detection antibody and the probe oligonucleotide (detection antibody—probe conjugate) were prepared according to the procedure in Example 14. The circularization oligonucleotide had a 5' terminal phosphate group. The detection oligonucleotide was compound 11, as described in Example 15. The assay and detection antibody diluents used were optimized for each assay to provide optimal antigen-antibody binding and to minimize sample matrix effects, although for use in the amplified format, the assay diluents were modified by adding salmon sperm DNA to a concentration of 15 ug/mL. The procedure described in this example used the following oligonucleotide sequences:

```
Anchor oligonucleotide (Anchor):
                               (SEQ ID NO: 37)
5'-AAGAGAGTAGTACAGCAGCCGTCAA-3'

Probe oligonucleotide (Probe):
                               (SEQ ID NO: 33)
5'-GACAGAACTAGACAC-3'

Circularization oligonucleotide (Circ):
                               (SEQ ID NO: 36)
5'-GTTCTGTCATATTTCAGTGAATGCGAG

TCCGTCTAAGAGAGTAGTACAGCAAGAGTGTCTA-3'

Detection oligonucleotide (Detector):
                               (SEQ ID NO: 32)
5'- CAGTGAATGCGAGTCCGTCTAAG-3'
```

The capture antibody and anchor oligonucleotide were immobilized on the electrodes in the MSD plates through the binding of biotin-labeled reagents to the streptavidin coated electrodes. First the wells of the plate were washed three times with PBS containing 0.05% Tween-20 (PBS-T). To each well was then added 50 µL of a solution containing biotin-labeled capture antibody (0.25 µg/mL) and 3'-biotin-labeled anchor oligonucleotide (Compound 13, 0.2 ng/mL) in a bovine serum albumin (BSA)-containing buffer (prepared by combining stock solutions of the capture antibody and the anchor). The plates were then incubated for at least one hour at room temperature with shaking or overnight without shaking, and then washed 3 times with PBS-T to remove unbound biotin-labeled reagents.

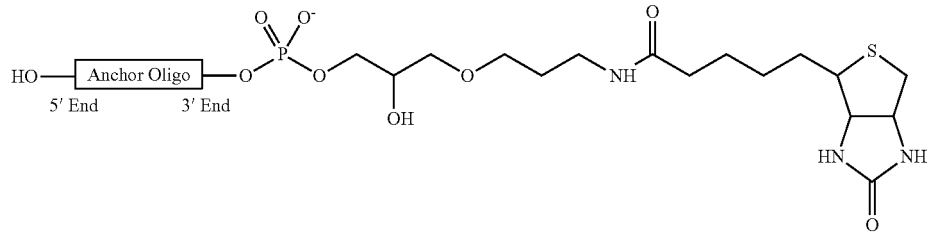

To each well was then added 25 µL of an assay diluent containing salmon sperm DNA and 25 µL of a sample and the plate was incubated at room temperature for 1 to 2 hours. The plates were washed again three times with PBS-T to remove excess sample. The detection antibody—oligonucleotide probe conjugate (50 µL typically at a concentration between around 0.01 µg/mL and 0.5 µg/mL) in an antibody diluent was then added to the wells and incubated for one hour at room temperature to complete formation of the sandwich complex. Excess detection antibody was then removed by washing the wells three times with PBS-T.

Sandwich complexes were bound to DNA circles to prepare for rolling circle amplification by adding to each well 50 µL of a solution containing DNA ligase, Circ oligonucleotide, acetylated and polymerized BSA, $MgCl_2$, DTT, and ATP in Tris-HCl buffer, pH 7.4 and incubating the plates at room temperature with shaking for 30 minutes to allow the Circ oligonucleotide to bind to the probe component of any bound detection antibody-oligonucleotide probe conjugates and for the ligase to circularize the Circ oligonucleotide to form a bound circle. The plates were then washed three times with PBS-T to remove unbound Circ oligonucleotide and ligase. Rolling circle amplification and labeling of the amplification product with ECL labels was carried out by adding to each well 50 µL of a solution containing DNA polymerase, each of the four standard dNTPs, detection probe, potassium acetate, 50 mM potassium chloride, magnesium acetate, DTT, and Tween-20 in Tris buffer, pH 8.2 and shaking the plate at 27° C. for one hour to extend the probe oligonucleotide by rolling circle amplification, anchor the amplification product to the anchor oligo and hybridize detection oligonucleotide to the amplification product. Excess detection oligonucleotide is then removed by washing the plate three times with PBS-T.

Figure 24:
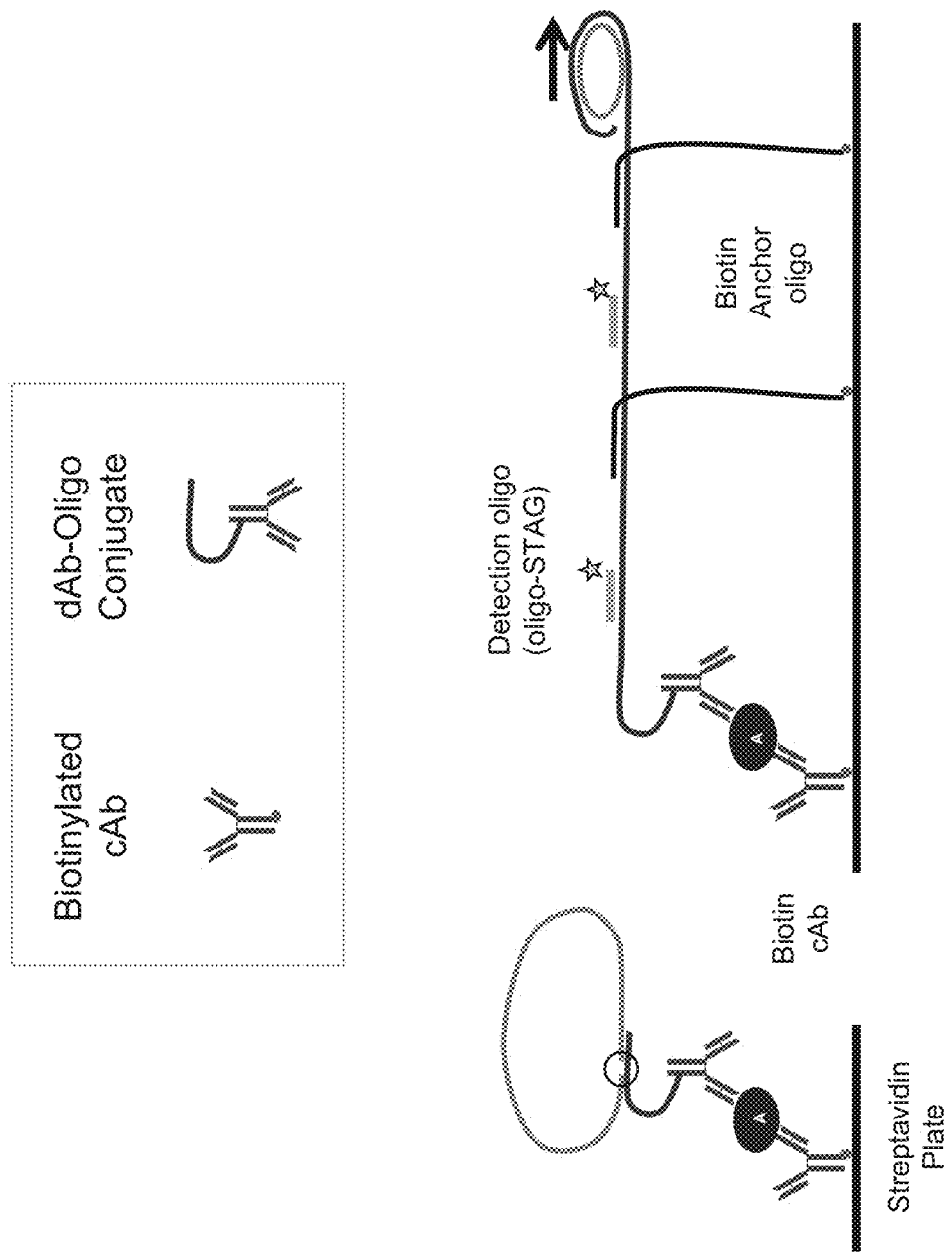
FIG. 24 shows a schematic description of a two antibody amplified ECL immunoassay carried out on a streptavidin-coated surface.

To carry out the ECL measurement, 150 µL of an ECL coreactant-containing ECL read buffer (MSD Read Buffer Gold, Meso Scale Diagnostics) was added to each well and the plate was analyzed on an ECL plate reader (MSD Sector Imager 6000 or MSD QuikPlex 120, Meso Scale Diagnostics). The plate readers apply a potential to the working electrode (and associated counter electrodes) in each well of the plate, image the resulting electrochemiluminescence emission and report a quantitative value proportional to the amount of emitted light for each assay measurement. A schematic of the two antibody amplified assay format is provided in FIG. 24 which illustrates the binding of the Circ oligonucleotide and its subsequent ligation and rolling circle amplification to form an extended product that binds to both the immobilized anchor sequence and the labeled detection sequence.

Example 17. Selection of Size-Exclusion Resins for Purification of Antibody-Oligonucleotide Conjugates Antibody-oligonucleotide conjugates having a 15-mer oligonucleotide were prepared at a 200 pg scale as described in Example 13, except for the conjugate purification step. In this example, purifications using a number of different size exclusion resins were compared to each other and to purification through use of a centrifugal ultrafiltration device (an AMICON ultrafiltration device with a 50 kD cut-off used according to the manufacturers recommendations). To compare size-exclusion resins, products of the conjugation reactions were loaded on 2 mL columns of the following resins:

| Resin | Vendor | Part # | Particle Size (µm) |
|---|---|---|---|
| Sephadex G-50 Fine | Sigma | G5080 | 20-80 |
| Sephadex G-50 Fine | Roche | 03117928001 | 20-80 |
| Sephadex G-100 Fine | Sigma | 27119-5 | 40-120 |
| Sephadex G-100 Superfine | GE Healthcare | 17-0061-01 | 10-40 |
| Superdex G-200 | GE Healthcare | 17-1043-01 | 24-44 |
| Sephacryl S-200 | GE Healthcare | 17-0584-10 | 50 |
| Sephacryl S-300 | GE Healthcare | 17-0599-10 | 50 |

In addition, runs were also conducted with pure conjugate, unconjugated antibody and unconjugated oligonucleotide to identify the peak position for each possible component of the reaction mixture. After loading of the resin, the product was eluted with collection buffer and collected in 0.2 mL fractions.

Figure 25A:
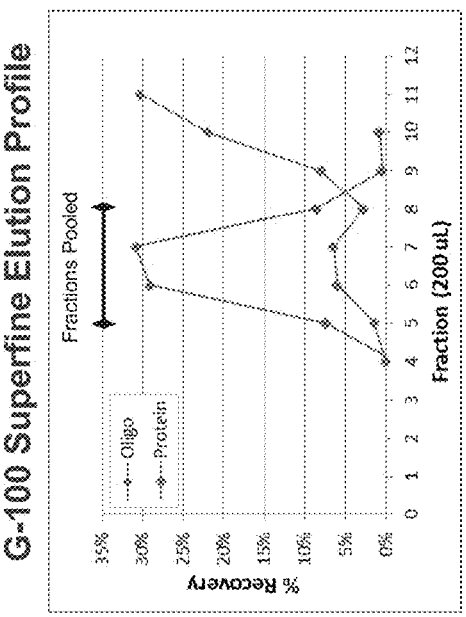
FIG. 25 shows (a) the elution profile from a G-100 Superfine column for the crude product of an antibody-oligonucleotide conjugation reaction vs. the profiles for unconjugated antibody, unconjugated oligonucleotide and purified conjugate; (b) the elution profile and collected fraction for an IL-6 detection antibody-oligonucleotide conjugate; and (c) calibration curves for an amplified ECL immunoassay using the G-100 purified IL-6 detection antibody—oligonucleotide conjugate vs. the results when the conjugate was purified by centrifugal ultrafiltration.

Of the resins tested, G-100 Superfine had the best separation of conjugate and unconjugated oligonucleotide. The elution profile of unpurified conjugate using the G-100 Superfine resin is shown in FIG. 25(a), as are control profiles of unconjugated antibody, unconjugate oligonucleotide and pure conjugate. The eluate fractions were quantified for protein using the BCA assay and for oligonucleotide using the SYBR Green I assay (as described in Example 14). As shown in the figure, purification on a G-100 Superfine column could provide purified conjugate in high yield (typically 80 to 85%), with minimal contamination of unconjugated oligonucleotide (typically less than 10%).

Figure 25B:
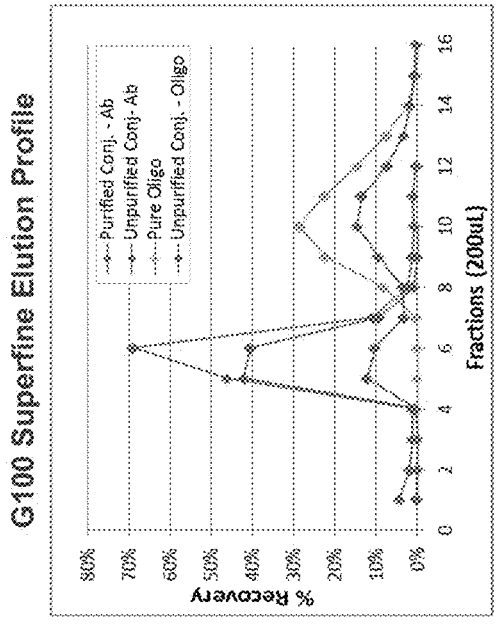
Figure 25C:
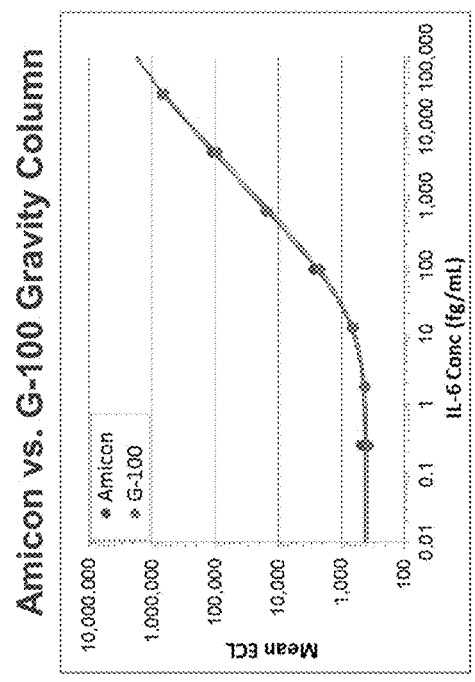

To test the activity of the purified conjugates, conjugates were prepared for the detection antibody of a sandwich immunoassay for IL-6. The conjugates were purified using the G-100 Superfine column or using an Amicon ultrafiltration device. The fractions from the G-100 purification that were used in the assay are shown in the G-100 elution profile in FIG. 25(b). The detection antibody conjugates were paired with a biotin-labeled IL-6 capture antibody and used to measure a series of IL-6 calibration standards in a rolling circle amplified two antibody assay (using a protocol analogous to the one described in Example 16). FIG. 25(c) provides the measured ECL signal as a function of calibrator concentration and shows that detection antibody purified using the G-100 method and the Amicon method gave almost identical assay signals. The result shows that use of the G-100 gravity purification did not negatively affect the antibody-oligonucleotide function, despite being much simpler to carry out and faster than the Amicon method (which requires multiple centrifuge runs to prepare the device and carry out the purification).

Example 18. Alternate Fluorescent Dyes for Quantitation of Antibody-Oligonucleotide Conjugates A number of fluorescent dyes were identified that are known to have increased fluorescence when bound to nucleic acid. The ability of the dyes to sensitively and specifically measure a 15-mer oligonucleotides in antibody-oligonucleotide conjugates was tested using a format analogous to that described in Example 14 (except for varying the dye). The dyes that were tested are listed in the following table along with the sensitivity reported by the manufacturer for detecting unconjugated nucleic acid in electrophoresis gels (either in absolute concentration or relative to the use of ethidium bromide stain). The table also provides the reported sensitivity for different forms of nucleic acid, as well as the peak excitation and emission wavelengths for dye fluorescence.

| Reagent | Specificity | Sensitivity | Ex/Em |
|---|---|---|---|
| Quant-iT OliGreen | All nucleic acids, esp. thymine (ssDNA >10 bp) | 1 pg/µL | 480/520 |
| Quant-iT RiboGreen | RNA & DNA, esp. adenine or cytosine | ~1 pg/µL | 480/520 |
| QuantiFluor ssDNA System | ssDNA | ~1 pg/µL | 492/528 |
| SYBR Green I | dsDNA with lower binding to ssDNA | 5-25X EtBr | 497/520 |
| SYBR Green II | RNA with lower binding to ssDNA | 5-25X EtBr | 497/520 |
| SYBR Gold | All nucleic acids | 25-100X EtBr | 495/537 |

FIG. 26(a) shows three graphs comparing the performance of the dyes. The left panel shows the fluorescence signal for unconjugated oligonucleotide relative to an equivalent concentration of oligonucleotide in an antibody conjugate (where the concentration of oligonucleotide in the conjugate was determined based on the average molecular weight measured using gel electrophoretic separation in an Experion electrophoresis instrument); all dyes had roughly equivalent fluorescence signals for unconjugated and conjugated oligonucleotide (ratios between about 0.9 and 1.1) indicating that conjugation of the oligonucleotide to a protein did not interfere with the generation of fluorescence signal. The middle panel compares the signals for unconjugated antibody in the absence of oligonucleotide relative to the signals for an equivalent concentration of conjugate; all dyes provided low signals for the antibody relative to the conjugate (ratios less than about 2%) indicating that the presence of antibody did not interfere with the measurement. The right panel shows the signal to background ratio for the signal obtained from 100 ng of conjugate (based on protein measurement); all dyes had ratios above 5 (and some had ratios greater than 10 or 15) indicating that the assay method has sufficient sensitivity to analyze oligonucleotide levels in as little as 100 ng of conjugate. While all the dyes tested had adequate performance, SYBR Green I was selected for further development because it is in common use for quantitation of DNA in gels and qPCR and it works well with filter sets developed for measuring fluorescein (excitation at 497 nm, emission at 520 nm). FIG. 26(b) shows the fluorescence signal from SYBR Green I as a function of the concentration of oligonucleotide in free form or as the antibody conjugate, and demonstrates that the signals for the two forms are closely matched over a wide assay dynamic range.

Example 19. Alternate Labeled Detection Probes

To compare different possible structures for labeled detection probes for use in rolling circle amplified assays, the two antibody procedure described in Example 16 was carried out using capture—detection antibody pairs for IL-4, IL-6 and IL-10, and varying the structure of the detection probe that was used. In this experiment the detection probes that were compared are the following SULFO-TAG labeled compounds described in Example 15: Compound 9 (having a single 3' label, referred to in the example as "1×3"), compound 10 (having 2 internal label nucleotides and a 3' label, referred to in the example as "2× Internal & 3'"), compound 11 (having a structure with 3 labels linked to the 3' end, referred to in the example as "3×3'+18EG B") and compound 12 (having a structure with 3' labels linked to the 3' end through a PEG linker, referred to in the example as "3×3'+18EG") from Example 15. Another detection probe approach that was evaluated was the use of a 3'biotin-labeled probe pre-bound to SULFO-TAG labeled streptavidin (referred to as "SA Detect"). In addition to the protocol described in Example 16 (referred to as the "Simultaneous" protocol because the detection probe was added together with the polymerase, such that binding of the detection probe occurs as the rolling circle product is formed), a modified protocol was also run termed the "Sequential" protocol. In the sequential protocol, the detection probe was omitted from the polymerase reaction, a wash step was added after the polymerase reaction step to remove the polymerase solution, and the detection probe was added in an additional incubation step. After the detection probe was allowed to bind, the wells were washed, filled with ECL Read Buffer and ECL was measured as in the Simultaneous protocol.

Figure 27A:
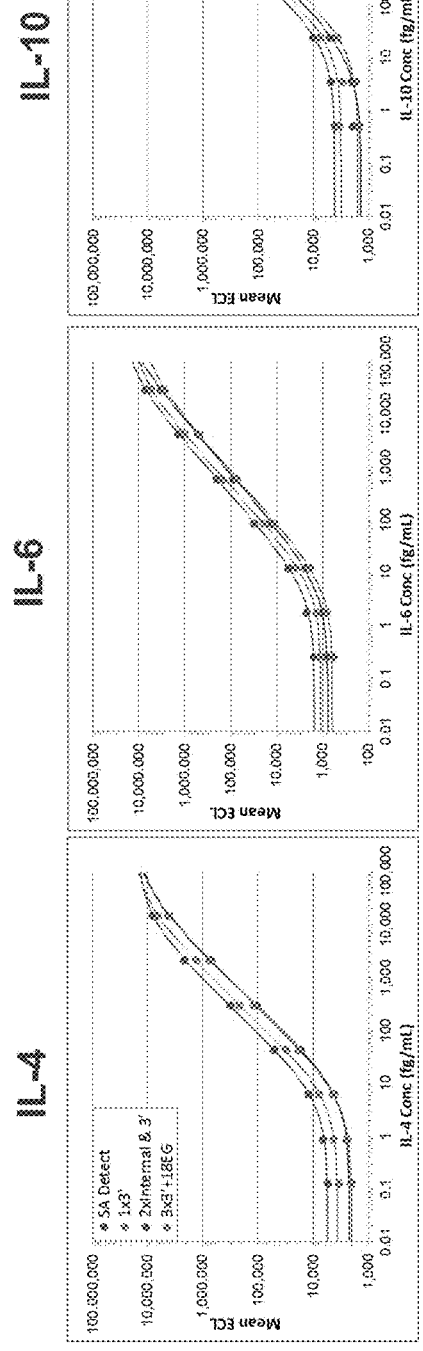
FIG. 27 compares the performance of 4 different labeled detection oligonucleotide constructs in amplified ECL assays for three different analytes in (a) sequential and (b) simultaneous assay formats.
Figure 27B:
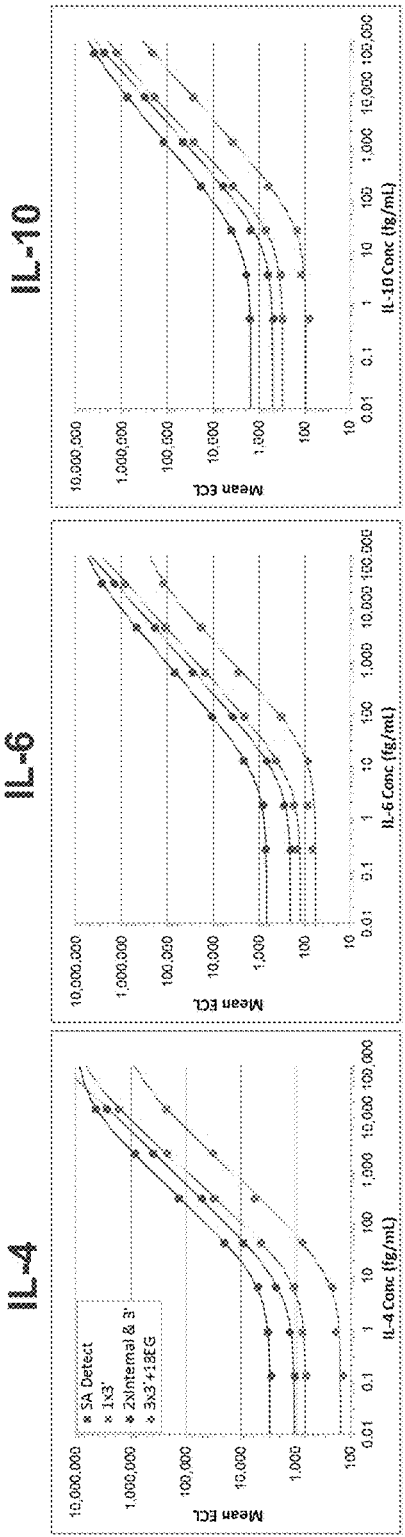
Figure 28:
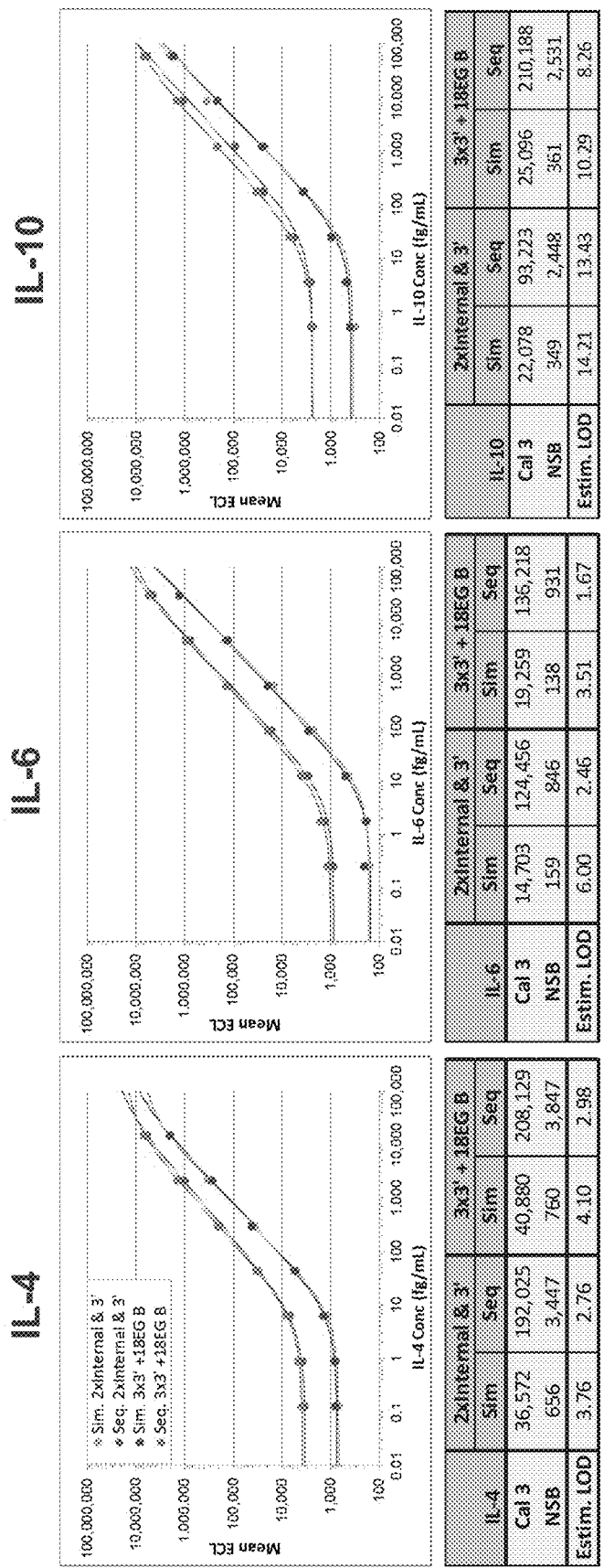
FIG. 28 compares the performance of 2 different labeled detection oligonucleotide constructs in amplified ECL assays for three different analytes in sequential and simultaneous assay formats.

In a first experiment, the "SA Detect", "1×3'", "2×Internal & 3'" and "3×3'+18EG" detection probes were compared using the sequential (FIG. 27(a)) and simultaneous (FIG. 27(b)) protocols. In the sequential protocol, the graphs showed that the use of the multi-labeled oligonucleotide structures ("2×Internal & 3'" and "3×3'+18EG") provided 1.5 to 2-fold increases in signal relative to the singly labeled "1×3'" structure indicating that multiple ECL labels, even when closely spaced on a small oligonucleotide, could provide increased ECL signals without disrupting hybridization efficiency. In the simultaneous protocol, the internally labeled structure ("2×Internal & 3'") also provided increased signal relative to the singly labeled structure, however, the terminally labeled "3×3'+18EG" gave much lower signals, possibly due to an interaction of the probe with the polymerase. Surprisingly, removal of a polyethylene glycol linker between the "3×3+18EG" structure and the oligonucleotide (i.e., to provide the "3×3+18EG B" structure) eliminated this interference. In a second experiment, it was shown that the "2×Internal & 3'" and "3×3'+18EG B" detection probes performed roughly equivalently in both the sequential and simultaneous protocols. FIG. 28 shows calibration curves measured with the two detection probes under the two protocols, and also has a table that presents the signal for a mid-level calibration standard ("Cal3"), the blank signal ("NSB" and the estimated limit of detection (LOD)). Note that while the signals for the sequential protocol tend to be higher than the simultaneous protocol, the background signals tend to be similarly higher, such that the overall sensitivity for the two protocols is roughly comparable.

Example 20. Alternate Conditions for Forming Antibody-Oligonucleotide Conjugates Antibody-oligonucleotide probe conjugates of an IL-4 detection antibody were prepared according to the procedure of Example 13, except for varying two parameters: (i) the challenge ratio of x-linking agent ($CR_{xl}$) was varied from 3 to 14 (test CR, values included 3, 5, 8, 9, 10, 11, 12 and 14) and (ii) the incubation time with the cross-linking agent ($T_{xl}$) was either 0 minutes or the default 60 minutes. The challenge ratio of oligonucleotide ($CR_{on}$) and incubation time with oligonucleotide ($T_{on}$) were kept constant at 15 and 1 hour, respectively. For the $T_{xl}=0$ condition (referred to as the "Simultaneous" condition, the oligonucleotide was added at the same time as the cross-linking agent (one approach is to add the oligonucleotide prior to the cross-linking agent such that the cross-linking agent when added reacts simultaneously with both the protein and oligonucleotide). The default condition, where the cross-linking agent was allowed to react with the protein prior to addition of the oligonucleotide, was referred to as the "Sequential" condition. The performance of the resulting antibody-oligonucleotide probe conjugates was analyzed by (i) determining the number of attached oligonucleotides per antibody molecule using the protein and oligonucleotide assay procedures described in Example 14 and (ii) by measuring the signal generated from a mid-level IL-4 calibration standard when using the antibody-oligonucleotide probe conjugates as the detection antibody in an IL-4 assay run as described in Example 16.

Figures 29A, 29B:
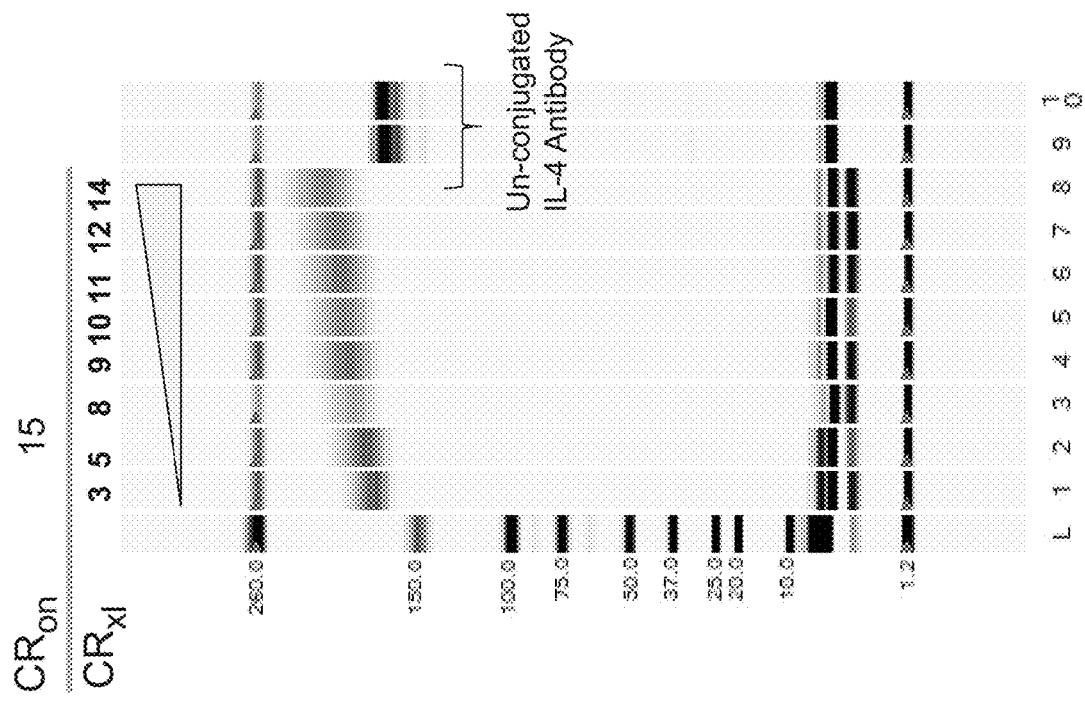
FIG. 29 shows the effect of cross-linker challenge ratio and conjugation protocol on the generation and performance of antibody-oligonucleotide conjugates providing (a) labels per protein (L/P) and performance in an amplified ECL assay, as well as (b) characterization of conjugate formation by gel electrophoresis.

The table in FIG. 29a shows that both the sequential and simultaneous protocols were effective in generating conjugates that provided ECL signals in the IL-4 assay. A $CR_{xl}$ value of 3 in the sequential protocol or 8 in the simultaneous protocol was sufficient to achieve conjugates with a label to protein ratio ("L/P", the average number of attached oligonucleotides per antibody) that was above the target value of 3 oligonucleotides per antibody. At this label to protein ratio, the Poisson distribution predicts less than 5% remaining unlabeled antibody (the low level of unlabeled antibody is confirmed by the EXPERION gel electrophoresis results shown in FIG. 29b as modeled gel images). FIGS. 29a and 29b also show that further increases in $CR_{xl}$ could be used to provide both higher labeling ratios and higher signals in the immunoassay.

Example 21. Optimization of Oligonucleotide Sequences for Use in Rolling Circle Amplified Immunoassays In development of the procedure described in Example 16, a variety of oligonucleotide sequences and structures were tested and compared to optimize performance while minimizing the cost, size and complexity of the reagents. The data was run using procedures analogous to the procedure in Example 16, except for the substitution of the oligonucleotide sequences or reagents.

Anchoring Oligonucleotide Sequence

Variations of biotinylated anchoring oligonucleotide were tested and compared to a control anchor having an anchor sequence with a long PolyA linker (similar to the anchoring oligonucleotide used in Example 1). The tested structures are shown below:

(SEQ ID NO: 37)

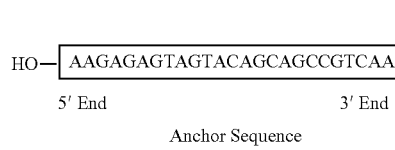 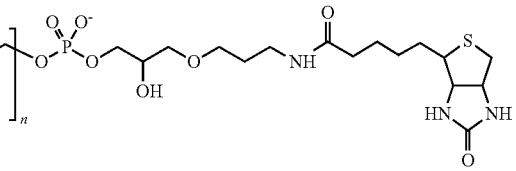

Anchor Sequence

| Anchor Oligo | Modification | m, n |
|---|---|---|
| Control | Poly A Linker to Biotin | m = 18, n = 0 |
| Oligo 1 | No Poly A Linker | m = 0, n = 0 |
| Oligo 2 | No Poly A Linker + 1 PEG Spacer | m = 0, n = 1 |
| Oligo 3 | No Poly A Linker + 2 PEG Spacer | m = 0, n = 2 |
| Oligo 4 | No Poly A Linker + 3 PEG Spacer | m = 0, n = 3 |

Figure 30A:
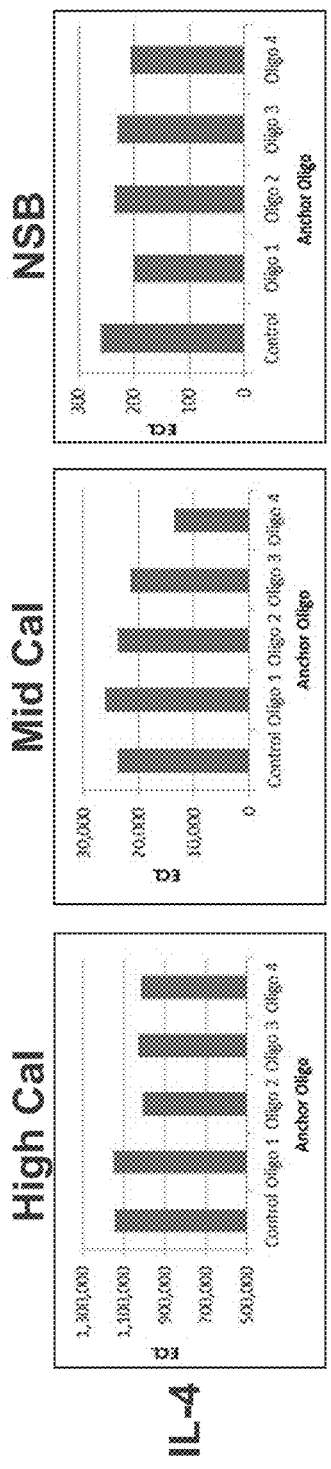
FIG. 30 compares the performance of different biotin-anchor oligonucleotide constructs in amplified ECL assays for two analytes.
Figure 30B:
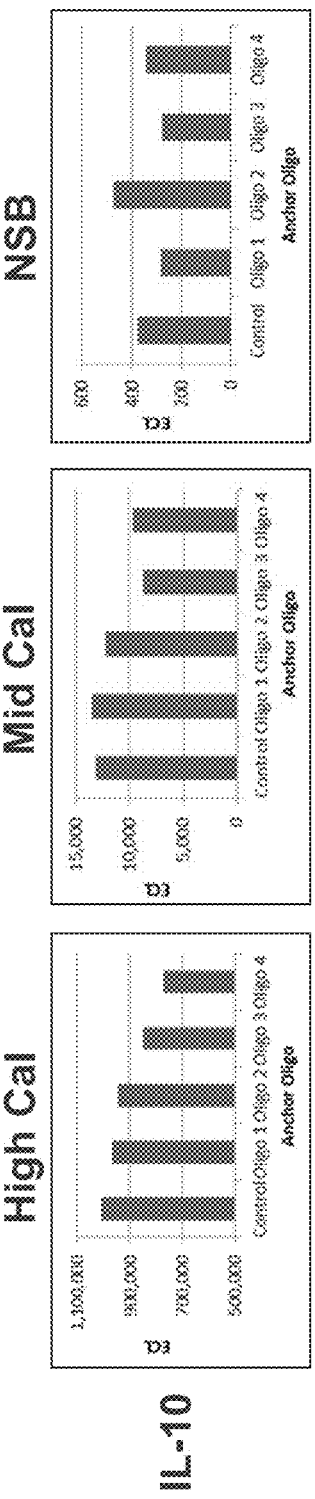

Each of these anchoring oligonucleotides was tested in amplified ECL assays for IL-4 and IL-10. Results shown in FIGS. 30(a) and 30(b) provide the ECL signals measured for each assay for samples containing a high-level calibration standard (High-Cal), a mid-level calibration standard (Mid-Cal) and a blank sample (NSB). The graphs indicate that optimal performance can be maintained in the absence of Poly A or PEG spacers.

Oligonucleotide Probe Sequence in Antibody-Oligonucleotide Conjugate

Experiments were conducted to determine optimal probe configuration for use in antibody-oligonucleotide conjugates by modifying the thiol-modified proximity probe 2 construct described in Example 1 (structure below).

length) to around 14 to 15 bases. Use of the shorter probe not only provides better performance, but reduces the cost and complexity of producing the probe and simplifies the procedure for purifying the antibody-probe conjugate by enabling the use of simple size separation devices to separate conjugate for unconjugated probe. Based on the experiments, a 15-mer probe sequence was selected for use: 5'-GACAGAACTAGACAC-3' (SEQ ID NO: 33).

Modifications to the sequence of the 15-mer probe were also investigated. The selected sequence has a GC content of about 47% (7 of 15 bases). Another 15-mer probe was tested where the GC content was raised to greater than 60%, or about 67% (10 of 15 bases); analogous changes were made to the complementary region of the Circ oligonucleotide.

```
High GC Probe:
                                   (SEQ ID NO: 42)
TGCACAGC-TCGACGC High GC Circ:
                                   (SEQ ID NO: 43)
GCTGTGCAATATTTCAGTGAATGCGAGTCCGTCTAAG

AGAGTAGTACAGCAAGA-GCGTCGA
```

Figure 31A:
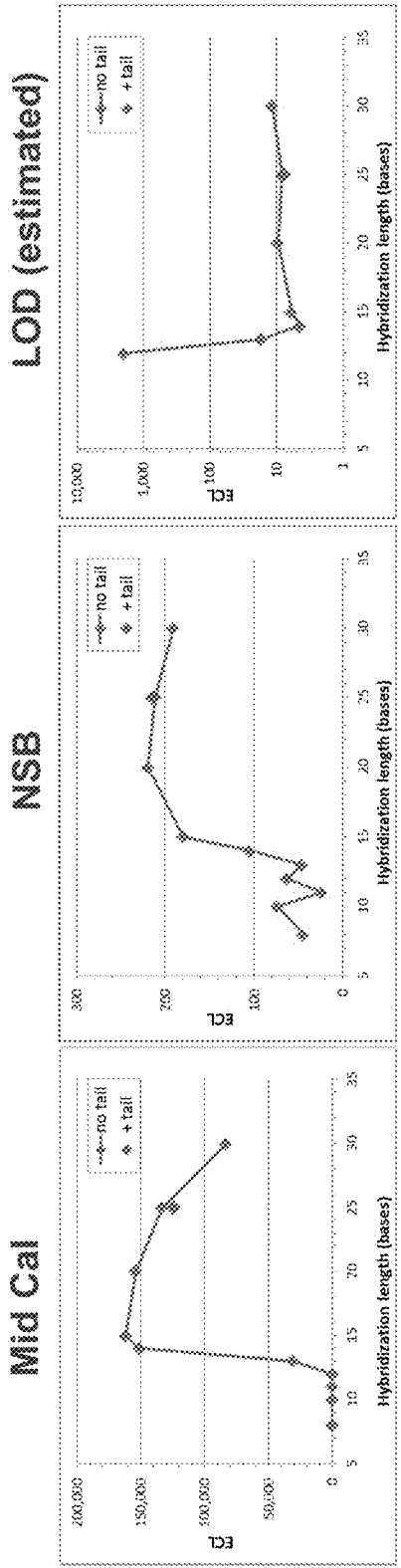
FIG. 31 shows (a) the effect of probe length for detection antibody—oligonucleotide probe conjugates on the signals, background and detection limit obtained for assays using the conjugate and (b) the effect of GC content in the probe on the sensitivity of a ligation step in the assay to varying temperature.
Figure 31B:
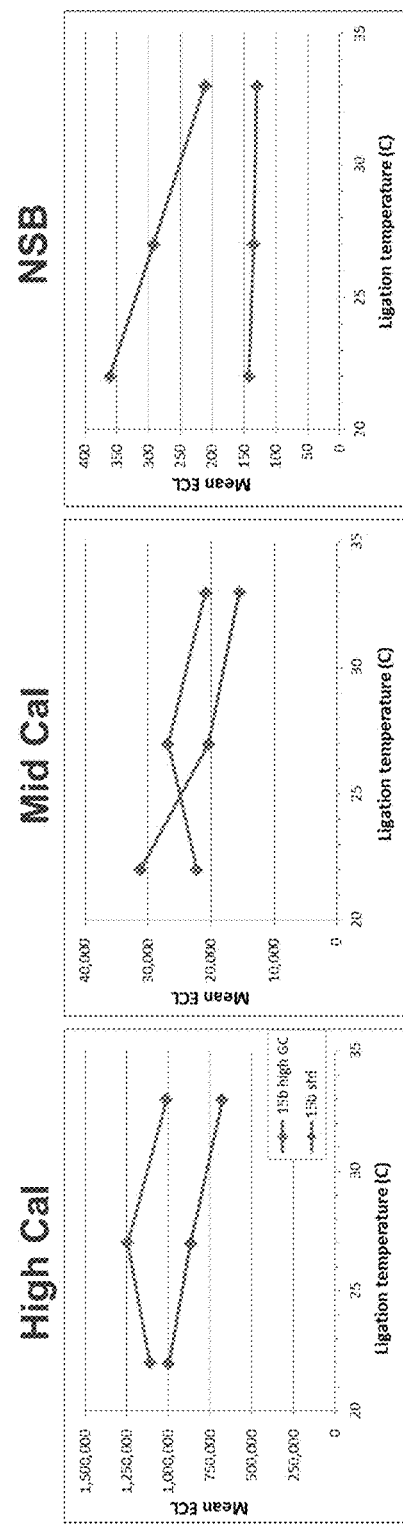

FIG. 31(b) provides signals for high level (High Cal), mid level (Mid-Cal) and blank (NSB) calibration standards, as a function of temperature during the ligation step and shows that the increased GC sequences can provide better stability

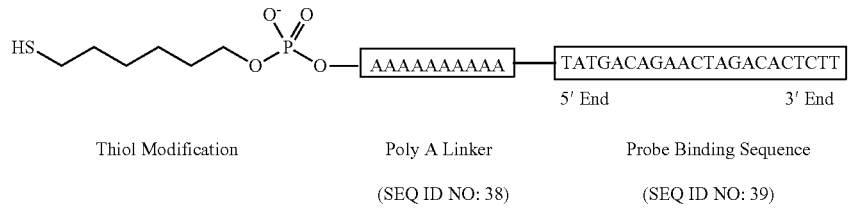

Thiol Modification    Poly A Linker    Probe Binding Sequence (SEQ ID NO: 38)    (SEQ ID NO: 39)

In the new probes, the Poly A linker was removed and a series of probe binding sequences of varying length (between 8 and 30 bases) were generated by adding or removing bases from the two ends of the probe binding sequence, while maintaining complementarity to the ends of the Circ oligonucleotide. These new probe constructs were conjugated to the detection antibody for an IL-10 immunoassay (analogously to Example 13) and tested in a two antibody rolling circle amplified format (analogous to Example 16). FIG. 31(a) shows the specific signal measured for a mid-level Il-2 calibration standard (Mid Cal), the non-specific signal in the absence of IL-2 (NSB) and the estimated limit of detection (LOD). Surprisingly, signal increased and limit of detection improved by omitting the linking unit and shortening the probe binding sequence (hybridization of the probe-Circ complex at higher temperature, which may provide an opportunity to increase the temperature and kinetics of the ligation step of the amplified assay format.

Template (Circ) Oligonucleotide Sequence

Experiments were conducted to determine the optimal Circ oligonucleotide construct by modifying the one-piece connecting oligonucleotide (Circ) with a single ligation site for proximity probe 2 as described in Example 3 and FIG. 11(a). This Circ oligonucleotide which was designed for use in a three antibody proximity thiol-modified proximity probe 2 construct described in Example 1 (structure below). This Circ included binding sites for two antibody oligonucleotide probe conjugates (including one that is not used in the two antibody amplified format) that were not length optimized. The Circ sequences that were tested included:

| Circ Oligonucleotide | Length | Modification |
|---|---|---|
| Regular Circ2 | 90 bp | Original full length Circ |
| LCS2 Min 2 | 78 bp | Removed unused probe binding site |
| LCS2 Min 1 | 68 bp | Removed all unused sequences |
| LCS2 Min 3 | 61 bp | Reduced anchor sequence from 25 to 16 bp |
| LCS2 Min 4 | 53 bp | Reduced probe binding sequence from 25 to 16 bp |

All Circ sequences were made to include a 5' terminal phosphate. The Circ sequences were tested in an assay for IL-10 using a detection antibody-oligonucleotide probe sequence having the 15-mer probe. FIG. 32 shows the assay signals as a function of the concentration of IL-10 when using the different Circ sequences. The results show that assay signals increased as the Circ length was reduced below 90 base pairs (bps), or to around or below 78 bp with maximum signal achieved in the range of around 61 to around 68 bps. The reduced Circ length not only improved performance but reduced the cost and complexity of producing the oligonucleotide, can lead to increased copy number of circle replicates in the rolling circle amplification product and can reduce the risk of undesired nucleic acid interactions. The 61 bp sequence was selected for use in the assay:

(SEQ ID NO: 36)
GTTCTGTCATATTTCAGTGAATGCGAGTCCGTCTAAGAGAGTAGT

ACAGCAAGAGTGTCTA.

Figure 33:
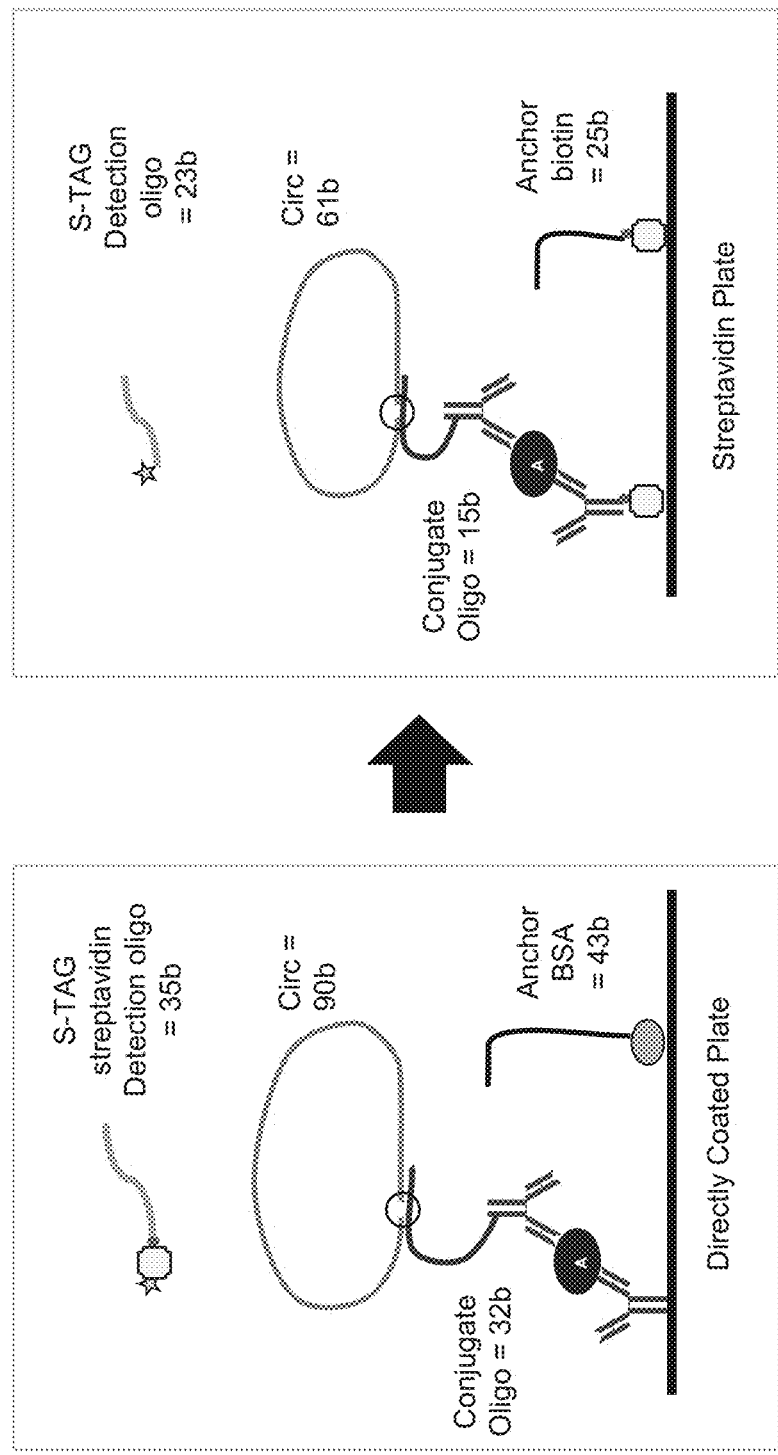
FIG. 33 is a schematic description of improvements made during optimization of reagents for carrying out amplified ECL assays.

A summary of the modifications to the anchor, template, conjugate, and detection oligonucleotides described in this Example, relative to those used in Example 3, is shown in FIG. 33.

Example 22. Comparison of Two Antibody Rolling Circle Amplified Assays to Conventional Non-Amplified Immunoassays Assays for a series of different analytes were carried out as described in Example 16. Each assay used a biotin-labeled capture antibody and a detection antibody-oligonucleotide probe conjugate prepared and characterized as described in Examples 13 and 14. The assay performance was compared to a conventional ECL assay format. In the conventional format, instead of using a detection-antibody probe conjugate, the detection antibody was labeled with MSD SULFO-TAG NHS label at a challenge ratio of 20 (typically providing a final labeling ratio of around 8 labels per antibody). The conventional assay was run identically as the amplified assay, up through the detection antibody-binding step (except for the difference in the labeled detection antibody that was used). In the conventional assay, on completion of the incubation step with the detection antibody, the plates were washed 3 times with PBS-T, 150 μL of MSD GOLD Read Buffer was added to each well, and the plates were analyzed on the ECL plate reader.

Figures 34A, 34B:
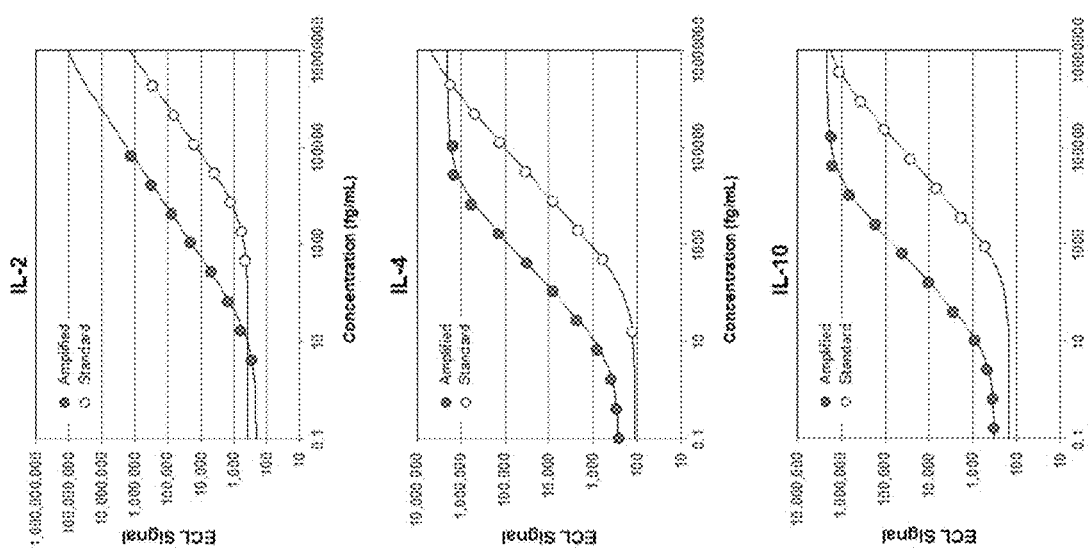
FIG. 34 shows (a) calibration curves for assays for three analytes comparing signals obtained with a conventional and an amplified format; and (b) a comparison of the limits of detection obtained with the two formats for 41 different assays targeting different analytes.

FIG. 34a shows calibration curves for three assays (IL-2, IL-4 and IL-10) that were significantly improved by amplification. The graphs compare the signals obtained with the standard and amplified assay formats and demonstrating improvements in signals ranging from about 30-fold to about 100-fold with amplification. FIG. 34b compares the detection limits (estimated as the concentration that gives a signal 2.5 standard deviations above the assay background) for the standard and amplified versions of 41 assays for human protein targets: IL-2, IL-4, IL-6, IL-10, IL-17A, TSLP, TNF-α, IL-21, IFN-γ, GM-CSF, IL-1β, IL-33, IL-31, IL-12p70, IL-22, IL-5, G-CSF, IL-15, IL-16, VEGF-A, IL-23, IFN-α 2a, Eotaxin-3, IFN-β, IL-9, IL-7, IL-29/IFN-λ1, TPO, IL-27, MCP-3, MIP-3α, IL-3, I-TAC, IL-1α, IL-17B, IL-17C, IL-17E/IL-25, IL-17F, IL-17D, IL17A/F, and TNF-β. Of the assays tested, around 90% (37/41) had at least a 2-fold improvement in detection limit with amplification, around 68% (28/41) had at least a 5-fold improvement, around 56% (23/41) had at least a 10-fold improvement, around 44% (18/41) had at least a 25-fold improvement, and around 21% had at least a 100-fold improvement. The maximum improvement was about 718-fold.

Example 23. Two-Antibody Assays Conducted on Additional Immunoassay Platforms (a) Bead-Based Immunoassay Format Using Coded Particles All assay steps are performed in a 96-well filter plate. Remove liquid from the plate with a vacuum manifold (not exceeding 10 In. of Hg). Never turn the plate over. If clogging should occur, use the pointed end of a 15 ml conical tube to gently press the area under the clogged well and then use a 1 ml Pasteur pipette rubber bulb or place thumb over clogged well to dislodge clog by generating pressure. Following final aspiration step, lightly tap bottom of plate on a stack of paper towels and then dab the bottom of the filter plate with a Kimwipe to remove residual liquid/droplets.

Wash Solution Preparation: Prepare 1× Working Wash Solution by diluting the entire contents of the 20× Wash Solution bottle with 285 ml deionized water.

Assay Standard Preparation: Reconstitute the lyophilized standard in 100% Assay Diluent (serum and plasma samples) or 50% Assay Diluent/50% tissue culture media (tissue culture supernatants); Reconstitution Volumes: (i) 1 vial: 1 ml; (ii) 2 vials: 0.5 ml per vial. Rehydrate at room temperature for 8-10 minutes. Gently invert the vial(s) several times and allow the vials to sit an additional 3-5 minutes to ensure complete hydration. If more than 1 standard is used, combine equal volumes of each standard and gently mix. Perform 3-fold serial dilutions of the reconstituted standard to prepare a seven point standard curve.

Analyte Capture:
(1) Vortex (30 sec) and sonicate (30 sec) the 10× Capture Bead stock. In a foil wrapped tube, dilute the 10× Capture Bead stock (2.5 μl per well) in Working Wash Solution (25 μl per well ~2,000 to 5,000 beads/assay). For higher multiplexing adjust the volume of Working Wash Solution to account for the extra volumes of 10× Capture Bead stocks retained.
(2) Pre-wet the standard and sample wells with 200 μl Working Wash Solution.
(3) Vortex (30 sec) and sonicate (30 sec) the diluted Capture Bead solution. Immediately add 25 μl to each assay well followed by 200 μL of 1× Wash Solution. Aspirate and repeat the wash with 200 μL of Working Wash Solution. Tap and dab the bottom of the filter plate as needed.
(4) Add 50 μl Incubation Buffer to all assay wells.
(5) Add 100 μl standard into designated wells. For wells designated for samples, add 50 μl Assay Diluent followed by 50 μl sample. Cover and incubate the plate for 2 hours at room temperature on an orbital plate shaker (500-600 rpm). Cover the assay plate with an opaque lid during all incubations to protect from light. The speed may need to be adjusted depending upon the radius of the orbital shaker.

Analyte Detection (6) Prepare 1× of fluorescently labeled detection antibody: Dilute the 10× detection antibody (10 µl per well) in diluent (100 µl per well). The detection antibody is labeled with a fluorescent label, such as Alexa Fluor 350 (blue fluorescent label) or Alexa Fluor 594 (red fluorescent label) (available from Life Technologies, Grand Island, NY). For higher multiplexing, adjust the volume of diluent to account for the extra volumes of 10× antibody stocks required. Aspirate and wash the assay wells twice with 200 p1 Working Wash Solution. Add 100 µl diluted detection antibody to each assay well. Cover and incubate the plate for 1 hour on a plate shaker (500-600 rpm).

Assay Reading (8) Aspirate and wash the assay wells 3 times with 200 p1 Working Wash Solution. Dry the bottom of the filter plate with clean paper towels to completely remove all residual droplets. Add 100 µl Working Wash Solution to each assay well and place the plate on the plate shaker (500-600 rpm) for 2-3 minutes.

(9) Analyze the bead suspension in a multi-color fluorescent particle analyzer (such as a FACS system or modified XMAP instrument) that includes color channels for each fluorescent label. For maximal sensitivity, the assay is run under conditions where any particle is likely to have only zero or one bound analyte and the amount of analyte is quantitated by counting the number of particles specific for a given analyte (based on particle coding) that comprise the fluorescent label. Optionally, the assay can be run in a multiplex format using coded beads where the code indicates the analyte specificity of the capture antibody on a bead and detection antibody for each analyte. Where coding is determined, as in XMAP using additional fluorescence colors incorporated in the beads, the analyzer should have additional detection channels for measuring the additional colors and identifying the bead code.

(b) Bead-Based Immunoassay Format Using Coded Particles Including an Anchoring Moiety, Using a Detection Reagent Modified with a Nucleic Acid Probe As outlined in Example 23(a), all assay steps are performed in a 96-well filter plate. Wash solution and assay standard is prepared as described in Example 23(a) and a detection antibody to a target analyte is modified by the addition of a nucleic acid probe of SEQ ID NO: 33 as described in Example 13. Analyte is captured on capture beads as described in Example 23(a). Capture beads include an anchoring moiety, immobilized to the bead surface as a BSA-oligonucleotide conjugate, with the oligonucleotide selected to be specific for a rolling circle amplicon. The sequence of the anchoring oligonucleotide used is SEQ ID NO: 37 or 45.

Twenty-five (25) µl assay diluent, calibrator, or sample (diluted as appropriate) is mixed with a mixture of capture beads. The mixture is incubated with shaking for 1-3 hours and washed. A solution of detection antibody labeled with the nucleic acid probe of SEQ ID NO: 33, prepared as described above, is added to the mixture, and incubated with shaking for 1-2 hours (alternatively, each individual detection antibody can be sequentially added, with each addition followed by a 1 hour incubation). The ligation mix described in Example 1 is added. The mixture is incubated with the ligation mix for 30 minutes at 37° C., washed to remove excess circularization oligonucleotides, and incubated with RCA mixture for 1.5 hour at 37° C., wherein the RCA mixture is described above in Example 1. The mixture is washed and a mixture of fluorescein-labeled detection probes is added and incubated for 30 minutes at 37° C., wherein the detection probe mixture is described above. The mixture is washed and the particles are aspirated into a multi-channel fluorescence particle analyzer.

(c) Bead-Based Format and Separation of Capture Analyte Molecules into Individual Nanowells Sample is prepared in 100 ul of 25% bovine serum (2-4 fold dilution) and 500K beads (paramagnetic 2.7 um, optionally fluorescently coded) coated with capture antibody are added to the sample. The sample is incubated for about 2 hrs at 23° C. The sample is washed three times with PBS (5×, 0.1% Tween-20), and labeled detection antibody is added (a biotinylated detection antibody or a hapten-conjugated antibody). The mixture is incubated for about 1 hr at 23° C. The mixture is washed three times with PBS (5×, 0.1% Tween-20), enzyme label is added, streptavidin-beta-galactosidase (40 pM), anti-hapten conjugated enzyme is also added, and the mixture is incubated for about 30 min at 23° C. (or 3 min in a Simoa analyzer). The mixture is washed seven times with PBS (5×, 0.1% Tween-20) and enzyme substrate is added, 15 ul of resorufin-beta-d-galactopyranoside (100 µM, in loading buffer).

The mixture is drawn over an array of nanowells (provided by QUANTERIX in a DVD format, made from a cyclic olefin polymer, with 24-samples per disc) and allowed to settle for about 2 minutes. The array is flushed with buffer, the array is sealed with fluorocarbon oil, incubated for 2-5 min at 23° C., and the results are read on a multicolor fluorescence imager. Image analysis is used to count the number of nanowells that contain both fluorescent enzyme products and thereby provide a value that correlates with the concentration of analyte in the sample.

(d) Flow Cell Analyzed, Bead Based Immunoassay Format

First incubation: 10 ul of sample, a biotinylated monoclonal analyte-specific capture antibody (working solution at 2.6 mg/l), and a monoclonal analyte-specific detection antibody conjugated to a nucleic acid probe (working solution at 0.3 mg/1) react to form a sandwich complex. The monoclonal analyte-specific detection antibody is conjugated to a nucleic acid probe of SEQ ID NO: 33, as described in Example 13.

Second incubation: after the addition of streptavidin-coated microparticles (DYNAL M280, 2.8 um, 0.72 mg/ml, binding capacity for biotin 470 ng/mg), the complex becomes bound to the solid phase via interactions between biotin and streptavidin. A ligation mix is added to the mixture, wherein the ligation mix is prepared according to the protocol described in Example 1. The mixture is incubated with the ligation mix for 30 minutes at 37° C., washed to remove excess circularization oligonucleotides, and incubated with RCA mixture as described in Example 1. The mixture is washed and a mixture of biotin-labeled detection probes are added and incubated for 30 minutes at 37° C., wherein the detection probe mixture is prepared as described in Example 1. To incorporate the electrochemiluminescence label SULFO-TAG (Meso Scale Diagnostics), the detection probe is synthesized with a terminal biotin label and pre-bound to SULFO-TAG labeled streptavidin.

The reaction mixture is aspirated into the measuring cell where the microparticles are magnetically captured onto the surface of the electrode. Unbound substances are then removed with PROCELL (TPA containing buffer). Application of a voltage to the electrode then induces electrochemiluminescent emission which is measured by a photomultiplier. Results are determined via a calibration curve which is instrument specifically generated by 2-point calibration and a master curve provided via the reagent bar code.

Optionally, to stabilize the attachment of the amplified complex to the bead, a biotin-anchoring oligonucleotide comprising SEQ ID NO: 37 or 45 is bound to the bead prior to commencement of the procedure, or prior to, or during the addition of RCA mixture.

Example 24. Three-Antibody RCA/PLA Bead-Based Assay Using Magnetic Beads

A three-antibody RCA/PLA assay for IL-4 was conducted essentially as described in Example 1, using DYNABEAD 280; 2.8 µm magnetic beads with epoxy attachment chemistry. These DYNAL beads were coated with IL-4 capture antibody and BSA anchor oligonucleotide, at a 20:1 antibody to anchor ratio. Following the coating step, the beads were blocked with 0.5% BSA in PBS, washed and stored in 0.1% BSA. RCA and detection incubation steps were performed as in Example 1 in PCR tube strips with incubations on a rotating mixer, with magnetic separation for the washing steps. Following the RCA and detection step the beads were washed and resuspended in 1× read buffer and transferred to MSD large spot multi-well assay plates (available from Meso Scale Discovery, Rockville, MD). The magnetic beads in the MSD large spot plates were pulled down onto the electrode surface of the large spot multi-well assay plates using an array of 96 magnets, prior to reading ECL. Results from the IL-4 assay are shown in the table below.

The following table shows data from a three-antibody RCA/PLA IL-4 assay on DYNAL magnetic beads, using magnetic capture for the beads. ECL signals are from two replicates of a calibration curve.

| IL-4 Calibrator pg/mL | Replicate 1 | Replicate 2 |
| --- | --- | --- |
| 200 | 73,879 | 63,937 |
| 20 | 6,681 | 5,404 |
| 2 | 840 | 1,867 |
| 0 | 182 | 155 |

Example 25. A Protocol for Amplified Sandwich Immunoassays: Adding the Anchor Oligonucleotide after Sample Incubation The assay format in Example 16 was altered to allow the introduction of the anchoring DNA sequence after the capture of analyte onto the solid phase. These formats allow the incubation of sample containing analyte with the capture antibody in the absence of the anchoring DNA, removing the potential for interferences due to sample DNA interactions such as, for example, anti-DNA reactivity, DNA binding protein interactions and analyte DNA interactions.

Assays were run in MSD MULTI-ARRAY multi-well plates that include integrated carbon ink electrodes on the bottom of each well essentially as described in Example 16 with the following modifications. The Anchor oligonucleotide contained the same sequence as in Example 16, with the addition of a 5' amino modifier (/5AmMC6/) and 3' amino modified dT base (/3AmMC6T/). This amino modified Anchor was labeled with dinitrophenol (DNP) using a NHS ester of DNP (DNP-X-SE D2248; THERMOFISHER) at a molar challenge ratio of 20:1, followed by desalting using a 7K ZEBA resin. The incorporation of DNP was measured at 1.9 DNPs per oligonucleotide. The anti-DNP monoclonal antibody clone 3571-E73-2 (MSD) was labeled using a biotin NHS ester reagent (EZ-LINK Sulfo-NHS-Biotin, THERMOFISHER SCIENTIFIC) according to manufacturer procedures. The detection antibody in Example 16 (IL-4 antibody) was labeled with the Probe oligonucleotide (Probe High GC) as in Example 15.

Oligonucleotides used in this example were as follows (made at a commercial nucleic acid probe manufacturer);

Anchor oligonucleotide (Anchor):
                (SEQ ID NO: 45 with modifications)
5'-/5AmMC6/AAGAGAGTAGTACAGCAGCCGTCAA/3AmMC6T/3'

Probe oligonucleotide (High GC Probe):
                (SEQ ID NO: 42 with modifications)
5'-/5ThioMC6-D/TGCACAGCTCGACGC Circularization oligonucleotide (High GC Circ):
                (SEQ ID NO: 43 with modifications)
/5Phos/GCTGTGCAATATTTCAGTGAATGCGAGTCCGTCTAAGAGAGTA
GTACAGCAAGAGCGTCGA Detection oligonucleotide (Detector):
                (SEQ ID NO: 44 with modifications)
5'-CAGTGAATGCGAGTCCGTCTAAG/iAmMC6T/iSp18/iAmMC6T/
iSp18/3AmMO/-3'

The capture antibody and anti-DNP antibody were immobilized on the electrodes in the MSD plates through the binding of biotin-labeled reagents to the streptavidin coated electrodes. First the wells of the plate were washed three times with PBS containing 0.05% Tween-20 (PBS-T). To each well was then added 50 µL of a solution containing biotin-labeled capture antibody (0.25 µg/mL) and anti-DNP antibody (20 ng/mL) in a bovine serum albumin (BSA)-containing buffer (prepared by combining stock solutions of the IL-4 capture antibody and the anti-DNP antibody). The plates were then incubated for at least one hour at room temperature with shaking or overnight without shaking, and then washed 3 times with PBS-T to remove unbound biotin-labeled antibodies. These plates were incubated with samples containing added IL-4 calibrator.

In one format, the detection antibody was added with 2 nM DNP labeled Anchor oligo at the IL4-Probe incubation step. The detection antibody was processed as in Example 15, but with the High GC Circ as above. In an alternative format, the 0.5 nM DNP labeled Anchor was added to the ligation step of Example 16, followed by the process as in Example 15 with the use of the High GC Circ as above. Both of these formats were able to produce similar results as shown in the table below, to the standard format as outlined in Example 16.

TABLE

| ECL Signals from Assays with Different Anchoring Formats. | | | |
| --- | --- | --- | --- |
| IL-4 pg/mL | Standard Example-16 | DNP-Anchor Probe Step | DNP-Anchor Ligation Step |
| 2.14 | 232,336 | 130,379 | 272,295 |
| 0.00 | 191 | 136 | 183 |

As shown in the table above, ECL signals from IL-4 calibrator were tested in three different anchoring formats for the amplified sandwich immunoassay: the standard as in Example 16 and two alternative methods that allow the introduction of the Anchor oligonucleotide following sample incubation, using an antibody-based capture approach. In the first alternative approach, the Anchor oligonucleotide was introduced with the Probe labeled anti IL-4 antibody (DNP-Anchor Probe Step). In the second alternative approach, the Anchor oligonucleotide was introduced at the ligation step (DNP-Anchor Ligation Step).

The present invention is not to be limited in scope by the specific embodiments described herein. Indeed, various modifications of the method in addition to those described herein will become apparent to those skilled in the art from the foregoing description and accompanying figures. Such modifications are intended to fall within the scope of the claims. Various publications are cited herein, the disclosures of which are incorporated by reference in their entireties.

REFERENCES

1. U.S. Pat. No. 7,306,904
2. U.S. Pat. No. 7,320,860
3. U.S. Pat. No. 7,351,528
4. U.S. Pat. No. 7,192,703
5. U.S. Pat. No. 6,878,515
6. Zhou et al., Genome Biology (2004), 5: R28
7. Dean et al., Genome Research (2001), 11: 1095-1099
8. Soderberg et al., Methods (2008), 45: 227-232
9. Fredriksson et al., Nature Biotech (2002), 20: 473-477
10. Fredriksson et al., Nature Methods (2007), 4(4): 327-329
11. Vincent et al., EMBO Reports (2005), 5(8): 795-800
12. Gajadjar et al., Biotechniques (1010), 48(22): 145-152
13. Schallmeiner et al, Nature Methods (2007) 4(2): 135-137
14. Ericsson et al., Nucl. Acids Research (2008), 36(8): e45
15. Darmanis et al., Biotechniques (2007), 43: 443-450
16. Dahl et al., Proc. Natl. Acad. Sci. (2004), 101(13): 4548-4553
17. Weibrecht et al., Expert Rev. Proteomics (2010), 7(3): 401-409
18. Spits et al., Nature Protocols (2005), 1(4): 1965-1970
19. Nordengrahn et al., Vet. Microbio (2008), 127: 227-236
20. Vuoriluoto et al., Mol. Oncology (2011), 5: 105-111
21. Zhang et al., Clinica Chimica Acta (2006), 363: 61-70
22. Andras et al., Mol. Biotech. (2001), 19: 29-44
23. Schweltzer et al., Proc. Natl. Acad. Sci. (2000), 97(18): 10113-10119
24. Jeong, et al., Cell. Mol. Life Sci. (2009), 66: 3325-3336
25. Gill et al., Nucleosides, Nucleotides, and Nucleic Acids (2008), 27: 224-245
26. Gullberg, et al., Current Op. in Biotech. (2003), 14: 82-86
27. Gustafsdottir, et al., Clinical Chemistry (2006), 52(6): 1152-1160
28. U.S. Patent Publication No. 20100075862
29. U.S. Pat. No. 8,222,047
30. U.S. Pat. No. 8,236,574
31. U.S. Pat. No. 8,338,776
32. U.S. Patent Publication No. 20110212537
33. U.S. Patent Publication No. 20120196774
34. U.S. Patent Publication No. 20120289428
35. Kopecky, C., et al., Clin. J. Am. Soc. Nephrol. 2014 Nov. 25
36. Watanabe, J., et al., Arthritis Rheum. 2012 June; 64(6): 1828-37
37. Ribas, V., et al., Circ. Res. 2004 Oct. 15: 95(8): 789-97

The invention claimed is:

1. A labeled probe of Formula I:

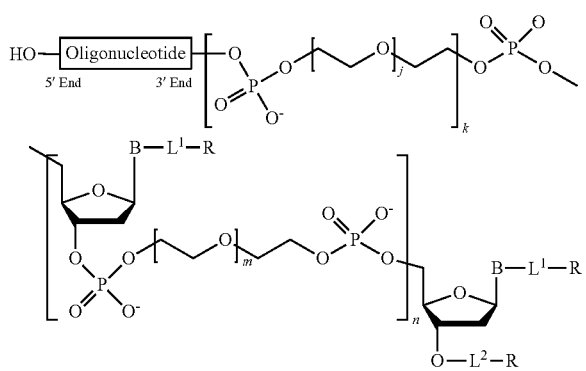

Formula I,
wherein B is a nucleotide base, R is an electrochemiluminescent label, $L^1$ is a linking group, $L^2$ is a linking group, j is an integer between 0 and 11, k is an integer between 0 and 1, m is an integer between 0 and 11, and n is an integer between 0 and 5.

2. The labeled probe of claim 1, wherein R of the compound of Formula I comprises ruthenium complex $RP^1P^2P^3$, wherein each of $P^1$, $P^2$ and $P^3$ is independently a bipyridine, a substituted bipyridine, a phenanthroline, or a substituted phenanthroline.

3. The labeled probe of claim 1, wherein the oligonucleotide of Formula I comprises a sequence having at least 90% sequence identity to

```
                                    (SEQ ID NO: 31)
    5'-CAGTGAATGCGAGTCCGTCT-3'  or (SEQ ID NO: 32)
    5'-CAGTGAATGCGAGTCCGTCTAAG-3'.
```

4. A kit for measuring electrochemiluminescence comprising a labeled probe according to claim 1, and
  (a) an electrode;
  (b) an ECL read buffer;
  (c) a nucleic acid polymerase;
  (d) a nucleic acid ligase;
  (e) an assay diluent;
  (f) additional nucleic acid reagents;
  (g) an assay consumable; or
  (h) a combination thereof.

5. A kit for conducting an assay comprising:
  (a) an anchoring reagent comprising an anchoring oligonucleotide;
  (b) a labeled probe according to claim 1;
  (c) a connector oligonucleotide comprising a 5' terminal nucleotide sequence; a 3' terminal nucleotide sequence, wherein the 5' and 3' terminal nucleotide sequences are capable of hybridizing to a nucleic acid probe; a first internal nucleotide sequence capable of hybridizing to a complement of the anchoring oligonucleotide; and a second internal nucleotide sequence capable of hybridizing to a complement of a detection oligonucleotide of the labeled probe;
  (d) a nucleic acid ligase; and
  (e) a nucleic acid polymerase.

6. The kit of claim 5, wherein the anchoring oligonucleotide is 10-30 nucleic acids in length and/or wherein the anchoring oligonucleotide comprises 5'-AAGAGAGTAGTACAGCA-3' (SEQ ID NO:35); and/or
  wherein the connector oligonucleotide further comprises a 5' terminal phosphate group;
  wherein the connector oligonucleotide is 53-61 nucleotides in length;
  wherein the connector oligonucleotide comprises the 5' terminal nucleotide sequence GTTCTGTC and the 3' terminal nucleotide sequence GTGTCTA; and/or
  wherein the connector oligonucleotide sequence consists of 5'-GTTCTGTCATATTTCAGTGAATGCGAGTCCGTCTAAGAGAGTAGTACAGCAAGAGTGTCTA-3' (SEQ ID NO:36).

7. The labeled probe of claim 1, wherein R of the compound of Formula I is

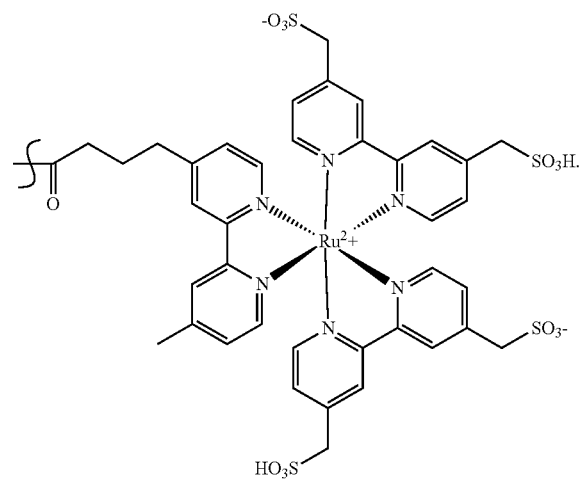

8. The labeled probe of claim 1, wherein B of the compound of Formula I is a uracil attached to $L^1$ at position 5 of the uracil.

9. The labeled probe of claim 1, wherein each $L^1$ of the compound of Formula I independently comprises:

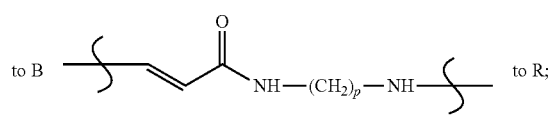

or

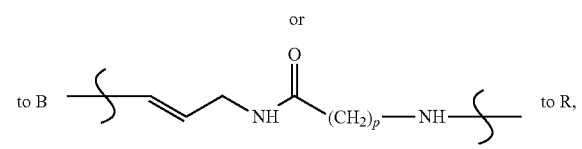

wherein p is an integer between 1 and 12.

10. The labeled probe of claim 1, wherein $L^2$ of the compound of Formula I comprises:

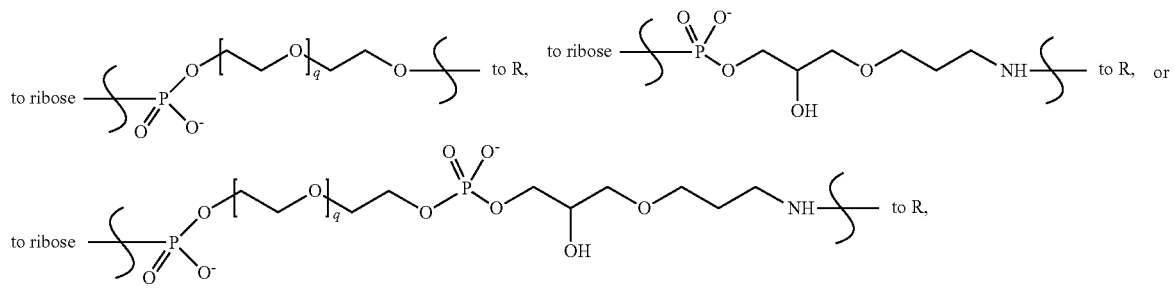

wherein q is an integer between 0 and 11.

11. The labeled probe of claim 1, wherein k is 0, j is 0, m is 1, and n is 5.

12. The kit of claim 4, wherein the electrode is a carbon-based electrode.

13. The kit of claim 4, wherein the ECL read buffer comprises tripropylamine or butyldiethanolamine.

14. The kit of claim 4, wherein the assay consumable is a multi-well plate assay consumable, and each well of the plate comprises a carbon ink electrode.

15. A labeled probe of Formula II:

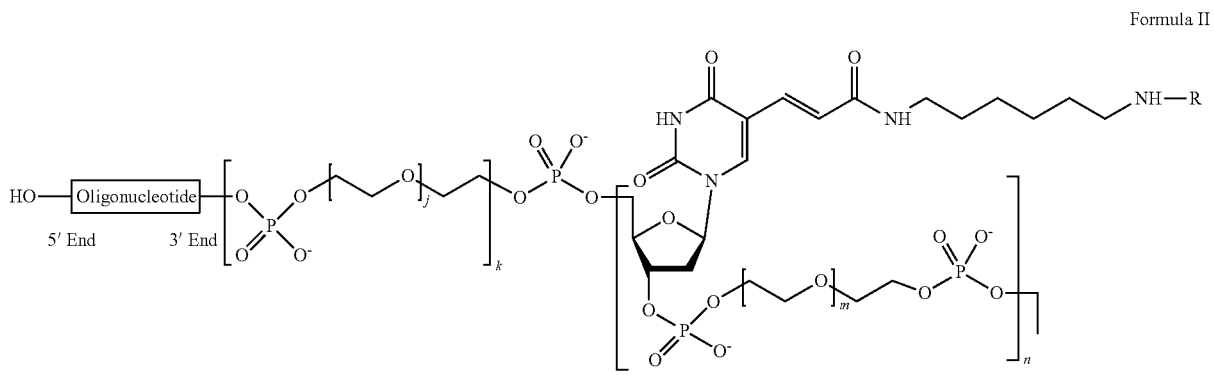

Formula II

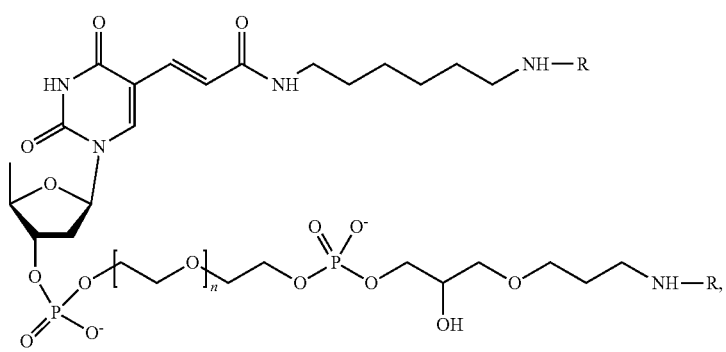

wherein j is an integer between 0 and 11, k is an integer between 0 and 1, m is an integer between 0 and 11, n is independently an integer between 0 and 5, and R is an electrochemiluminescence label:

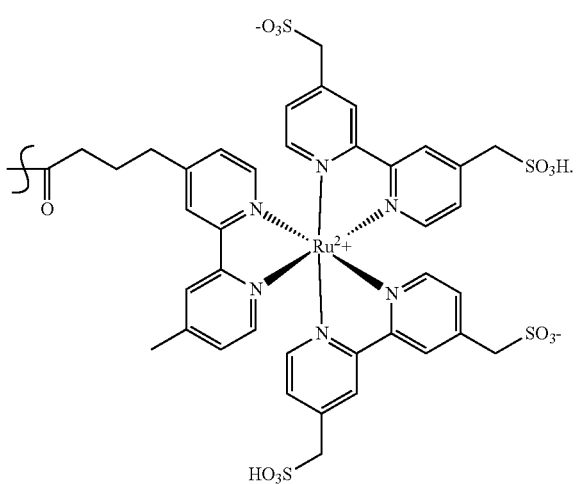

16. The labeled probe of claim 15, wherein the oligonucleotide of Formula II comprises a sequence having at least 90% sequence identity to

```
                                    (SEQ ID NO: 31)
5'-CAGTGAATGCGAGTCCGTCT-3' or (SEQ ID NO: 32)
5'-CAGTGAATGCGAGTCCGTCTAAG-3'.
```

17. A kit for measuring electrochemiluminescence comprising a labeled probe according to claim 15, and
(a) an electrode;
(b) an ECL read buffer;
(c) a nucleic acid polymerase;
(d) a nucleic acid ligase;
(e) an assay diluent;
(f) additional nucleic acid reagents;
(g) an assay consumable; or
(h) a combination thereof.

18. The kit of claim 17, wherein:
the electrode is a carbon-based electrode;
the ECL read buffer comprises tripropylamine or butyldiethanolamine;
the assay consumable is a multi-well plate assay consumable, and each well of the plate comprises a carbon ink electrode; or
any combination thereof.

19. A kit for conducting an assay comprising:
(a) an anchoring reagent comprising an anchoring oligonucleotide;
(b) a labeled probe according to claim 15;
(c) a connector oligonucleotide comprising a 5' terminal nucleotide sequence; a 3' terminal nucleotide sequence, wherein the 5' and 3' terminal nucleotide sequences are capable of hybridizing to a nucleic acid probe; a first internal nucleotide sequence capable of hybridizing to a complement of the anchoring oligonucleotide; and a second internal nucleotide sequence capable of hybridizing to a complement of a detection oligonucleotide of the labeled probe;
(d) a nucleic acid ligase; and
(e) a nucleic acid polymerase.

20. The kit of claim 19, wherein the anchoring oligonucleotide is 10-30 nucleic acids in length and/or wherein the anchoring oligonucleotide comprises 5'-AAGAGAGTAGTACAGCA-3' (SEQ ID NO:35); and/or
wherein the connector oligonucleotide further comprises a 5' terminal phosphate group;
wherein the connector oligonucleotide is 53-61 nucleotides in length;
wherein the connector oligonucleotide comprises the 5' terminal nucleotide sequence GTTCTGTC and the 3' terminal nucleotide sequence GTGTCTA; and/or
wherein the connector oligonucleotide sequence consists of 5'-GTTCTGTCATATTTCAGTGAATGCGAGTCCGTCTAAGAGAGTAGTACAGCAA GAGTGTCTA-3' (SEQ ID NO:36).

* * * * *

SEQUENCE LISTING

```
<160> NUMBER OF SEQ ID NOS: 45

<210> SEQ ID NO 1
<211> LENGTH: 35
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"
<220> FEATURE:
<221> NAME/KEY: source
<223> OTHER INFORMATION: /note="Description of Combined DNA/RNA
      Molecule: Synthetic probe"

<400> SEQUENCE: 1
aaaaaaaaaa gacgctaata gttaagacgc ttuuu                               35

<210> SEQ ID NO 2
<211> LENGTH: 32
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 2
aaaaaaaaaa tatgacagaa ctagacactc tt                                  32
```

```
<210> SEQ ID NO 3
<211> LENGTH: 35
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 3
aagagagtag tacagcagcc gtcaaaaaaa aaaaa                              35

<210> SEQ ID NO 4
<211> LENGTH: 65
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 4
ctattagcgt ccagtgaatg cgagtccgtc taagagagta gtagagcagc cgtcaagagt   60
gtcta                                                              65

<210> SEQ ID NO 5
<211> LENGTH: 25
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 5
gttctgtcat atttaagcgt cttaa                                        25

<210> SEQ ID NO 6
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 6
cagtgaatgc gagtccgtct                                              20

<210> SEQ ID NO 7
<211> LENGTH: 12
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 7
acatcggtag tt                                                      12

<210> SEQ ID NO 8
<211> LENGTH: 37
<212> TYPE: DNA
<213> ORGANISM: Artificial Sequence
<220> FEATURE:
<221> NAME/KEY: source
<223> OTHER INFORMATION: /note="Description of Artificial Sequence:
```

```
        Synthetic probe"
<220> FEATURE:
<221> NAME/KEY: source
<223> OTHER INFORMATION: /note="Description of Combined DNA/RNA
        Molecule: Synthetic probe"

<400> SEQUENCE: 8
aaaaaaaaaa cactaagctg ttagtccatt accguuu                              37

<210> SEQ ID NO 9
<211> LENGTH: 34
<212> TYPE: DNA
<213> ORGANISM: Artificial Sequence
<220> FEATURE:
<221> NAME/KEY: source
<223> OTHER INFORMATION: /note="Description of Artificial Sequence:
        Synthetic probe"

<400> SEQUENCE: 9
aaaaaaaaaa gctggaggtt cagacgattt tgcg                                 34

<210> SEQ ID NO 10
<211> LENGTH: 65
<212> TYPE: DNA
<213> ORGANISM: Artificial Sequence
<220> FEATURE:
<221> NAME/KEY: source
<223> OTHER INFORMATION: /note="Description of Artificial Sequence:
        Synthetic oligonucleotide"

<400> SEQUENCE: 10
aacagcttag tgacatcggt agttaacaga ttgatcttga cacatcggta gttcgcaaaa     60
tcgtc                                                                 65

<210> SEQ ID NO 11
<211> LENGTH: 27
<212> TYPE: DNA
<213> ORGANISM: Artificial Sequence
<220> FEATURE:
<221> NAME/KEY: source
<223> OTHER INFORMATION: /note="Description of Artificial Sequence:
        Synthetic oligonucleotide"

<400> SEQUENCE: 11
tgaacctcca gctttcggta atggact                                         27

<210> SEQ ID NO 12
<211> LENGTH: 35
<212> TYPE: DNA
<213> ORGANISM: Artificial Sequence
<220> FEATURE:
<221> NAME/KEY: source
<223> OTHER INFORMATION: /note="Description of Artificial Sequence:
        Synthetic oligonucleotide"

<400> SEQUENCE: 12
acagattgat cttgaaaaaa aaaaaaaaaa aaaaa                                35

<210> SEQ ID NO 13
<211> LENGTH: 37
<212> TYPE: DNA
<213> ORGANISM: Artificial Sequence
<220> FEATURE:
<221> NAME/KEY: source
<223> OTHER INFORMATION: /note="Description of Artificial Sequence:
        Synthetic probe"
<220> FEATURE:
<221> NAME/KEY: source
```

```
<223> OTHER INFORMATION: /note="Description of Combined DNA/RNA
      Molecule: Synthetic probe"

<400> SEQUENCE: 13
aaaaaaaaaa agagtccaga ggcaaagcgt gaatuuu                              37

<210> SEQ ID NO 14
<211> LENGTH: 34
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 14
aaaaaaaaaa gataaggaag gggccttagc gaca                                 34

<210> SEQ ID NO 15
<211> LENGTH: 65
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 15
cctctggact ctacatcggt agtttggaac attttattct aacatcggta gtttgtcgct     60
aaggc                                                                 65

<210> SEQ ID NO 16
<211> LENGTH: 27
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 16
cccttcctta tctttattca cgctttg                                         27

<210> SEQ ID NO 17
<211> LENGTH: 35
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 17
ggaacatttt attctaaaaa aaaaaaaaaa aaaaa                                35

<210> SEQ ID NO 18
<211> LENGTH: 37
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"
<220> FEATURE:
<221> NAME/KEY: source
<223> OTHER INFORMATION: /note="Description of Combined DNA/RNA
      Molecule: Synthetic probe"
```

```
<400> SEQUENCE: 18
aaaaaaaaaa aacaactccg attgcttgct tcttuuu                              37

<210> SEQ ID NO 19
<211> LENGTH: 34
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 19
aaaaaaaaaa tagccctacg tgccctgcat agac                                 34

<210> SEQ ID NO 20
<211> LENGTH: 65
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 20
atcggagttg ttacatcggt agttcgcgca ggtcgggaat tacatcggta gttgtctatg     60
caggg                                                                 65

<210> SEQ ID NO 21
<211> LENGTH: 27
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 21
cacgtagggc tatttaagaa gcaagca                                         27

<210> SEQ ID NO 22
<211> LENGTH: 35
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 22
gcgcaggtcg ggaataaaaa aaaaaaaaaa aaaaa                                35

<210> SEQ ID NO 23
<211> LENGTH: 35
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"
<220> FEATURE:
<221> NAME/KEY: source
<223> OTHER INFORMATION: /note="Description of Combined DNA/RNA
      Molecule: Synthetic probe"

<400> SEQUENCE: 23
aaaaaaaaaa gacgctaata gttaagacgc ttuuu                                35
```

```
<210> SEQ ID NO 24
<211> LENGTH: 16
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 24
aagcgtctta actatt                                                         16

<210> SEQ ID NO 25
<211> LENGTH: 13
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 25
aagcgtctta act                                                            13

<210> SEQ ID NO 26
<211> LENGTH: 12
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 26
aagcgtctta ac                                                             12

<210> SEQ ID NO 27
<211> LENGTH: 11
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 27
aagcgtctta a                                                              11

<210> SEQ ID NO 28
<211> LENGTH: 10
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 28
aagcgtctta                                                                10

<210> SEQ ID NO 29
<211> LENGTH: 9
<212> TYPE: DNA
<213> ORGANISM: Artificial Sequence
<220> FEATURE:
<221> NAME/KEY: source
<223> OTHER INFORMATION: /note="Description of Artificial Sequence:
```

Synthetic oligonucleotide"

<400> SEQUENCE: 29 aagcgtctt                                                                9

<210> SEQ ID NO 30
<211> LENGTH: 8
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 30 aagcgtct                                                                 8

<210> SEQ ID NO 31
<211> LENGTH: 20
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 31
cagtgaatgc gagtccgtct                                                   20

<210> SEQ ID NO 32
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 32
cagtgaatgc gagtccgtct aag                                               23

<210> SEQ ID NO 33
<211> LENGTH: 15
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 33
gacagaacta gacac                                                        15

<210> SEQ ID NO 34
<211> LENGTH: 23
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 34
cagtgaatgc gagtccgtct aag                                               23

<210> SEQ ID NO 35
<211> LENGTH: 17

```
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 35
aagagagtag tacagca                                                     17

<210> SEQ ID NO 36
<211> LENGTH: 61
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 36
gttctgtcat atttcagtga atgcgagtcc gtctaagaga gtagtacagc aagagtgtct      60
a                                                                      61

<210> SEQ ID NO 37
<211> LENGTH: 25
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 37
aagagagtag tacagcagcc gtcaa                                            25

<210> SEQ ID NO 38
<211> LENGTH: 10
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 38
aaaaaaaaaa                                                             10

<210> SEQ ID NO 39
<211> LENGTH: 22
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 39
tatgacagaa ctagacactc tt                                               22

<210> SEQ ID NO 40
<211> LENGTH: 14
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"
```

```
<400> SEQUENCE: 40
acagaactag acac                                              14

<210> SEQ ID NO 41
<211> LENGTH: 14
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 41
gacagaacta gaca                                              14

<210> SEQ ID NO 42
<211> LENGTH: 15
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 42
tgcacagctc gacgc                                             15

<210> SEQ ID NO 43
<211> LENGTH: 61
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 43
gctgtgcaat atttcagtga atgcgagtcc gtctaagaga gtagtacagc aagagcgtcg    60
a                                                                   61

<210> SEQ ID NO 44
<211> LENGTH: 24
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic probe"

<400> SEQUENCE: 44
cagtgaatgc gagtccgtct aagt                                   24

<210> SEQ ID NO 45
<211> LENGTH: 26
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 45
aagagagtag tacagcagcc gtcaat                                 26
```